United States Patent
Jun

(10) Patent No.: US 10,019,610 B2
(45) Date of Patent: Jul. 10, 2018

(54) SCANNER, SCANNING APPARATUS AND SCANNING METHOD FOR A SHELF

(71) Applicant: HANMI IT CO., LTD., Seoul (KR)

(72) Inventor: Chulwoo Jun, Seoul (KR)

(73) Assignee: HANMI IT CO., LTD., Seoul (KR)

( * ) Notice: Subject to any disclaimer, the term of this patent is extended or adjusted under 35 U.S.C. 154(b) by 0 days.

(21) Appl. No.: 15/808,487

(22) Filed: Nov. 9, 2017

(65) Prior Publication Data

US 2018/0075268 A1    Mar. 15, 2018

Related U.S. Application Data

(63) Continuation of application No. 14/375,121, filed as application No. PCT/KR2013/000627 on Jan. 25, 2013, now Pat. No. 9,864,883.

(30) Foreign Application Priority Data

| Jan. 26, 2012 | (KR) | 10-2012-0007994 |
| Apr. 20, 2012 | (KR) | 10-2012-0041639 |
| Apr. 20, 2012 | (KR) | 10-2012-0041640 |
| Jul. 19, 2012 | (KR) | 10-2012-0078720 |
| Sep. 19, 2012 | (KR) | 10-2012-0103887 |
| Sep. 19, 2012 | (KR) | 10-2012-0103888 |
| Sep. 26, 2012 | (KR) | 10-2012-0107141 |
| Oct. 25, 2012 | (KR) | 10-2012-0118784 |
| Nov. 16, 2012 | (KR) | 10-2012-0130367 |
| Dec. 14, 2012 | (KR) | 10-2012-0146268 |
| Dec. 14, 2012 | (KR) | 10-2012-0146269 |
| Jan. 3, 2013 | (KR) | 10-2013-0000548 |

(51) Int. Cl.
*H04Q 5/22* (2006.01)
*G06K 7/10* (2006.01)
*G06K 17/00* (2006.01)

(52) U.S. Cl.
CPC ..... *G06K 7/10356* (2013.01); *G06K 7/10376* (2013.01); *G06K 2017/0074* (2013.01)

(58) Field of Classification Search
CPC ........... G06K 7/10356; G06K 7/10376; G06K 2017/0074
See application file for complete search history.

(56) References Cited

U.S. PATENT DOCUMENTS

| 5,198,823 A * | 3/1993 | Litchford | G01S 3/20 |
| | | | 342/32 |
| 7,474,214 B2 * | 1/2009 | Bauchot | B60C 23/0416 |
| | | | 340/3.7 |
| 7,518,519 B2 * | 4/2009 | Sullivan | G06K 7/0008 |
| | | | 340/10.1 |
| 8,485,240 B2 * | 7/2013 | Schinelli | B65C 9/00 |
| | | | 156/521 |

(Continued)

*Primary Examiner* — Quang D Pham
(74) *Attorney, Agent, or Firm* — KORUS Patent, LLC; Seong Il Jeong

(57) ABSTRACT

Provided are a scanner, a scanning apparatus, and a scanning method for a shelf, capable of scanning articles stored in accommodation spaces of a plurality of layers in the shelf. The scanning apparatus for a shelf is configured in that a scanner having an antenna scans the accommodation spaces in the shelf without a shadow zone while moving along the shelf, thus accurately acquiring location information on the articles in the accommodation spaces.

5 Claims, 100 Drawing Sheets

(56) References Cited

U.S. PATENT DOCUMENTS

| | | | |
|---|---|---|---|
| 8,502,645 B2* | 8/2013 | Thomas | F25D 29/00 340/10.1 |
| 8,791,824 B2* | 7/2014 | Hollister | G01S 13/825 340/10.1 |
| 2004/0008114 A1* | 1/2004 | Sawyer | G01S 7/003 340/572.1 |
| 2008/0024306 A1* | 1/2008 | Bomber | G06K 7/10336 340/572.7 |
| 2008/0042847 A1* | 2/2008 | Hollister | G01S 13/825 340/572.7 |
| 2008/0120200 A1* | 5/2008 | Hurtis | G06Q 10/087 705/28 |
| 2008/0297348 A1* | 12/2008 | Onderko | B66F 9/0755 340/572.1 |
| 2009/0160638 A1* | 6/2009 | Jesme | G01S 13/825 340/539.11 |
| 2009/0224040 A1* | 9/2009 | Kushida | G06Q 10/08 235/385 |
| 2010/0060453 A1* | 3/2010 | Kushida | G06Q 10/087 340/572.1 |
| 2010/0090807 A1* | 4/2010 | Tsujimoto | G06K 7/0008 340/10.4 |
| 2010/0141395 A1* | 6/2010 | Nagai | G06K 7/0008 340/10.4 |
| 2010/0328037 A1* | 12/2010 | Thomas | F25D 29/00 340/10.1 |
| 2011/0004338 A1* | 1/2011 | Bianco | G07F 11/62 700/235 |
| 2011/0147455 A1* | 6/2011 | Mok | G06K 17/00 235/385 |
| 2012/0019362 A1* | 1/2012 | Arumugam | G01S 5/12 340/10.1 |
| 2012/0024943 A1* | 2/2012 | Kangas | G06K 19/06009 235/375 |
| 2012/0029687 A1* | 2/2012 | Hagen | B65G 1/0407 700/218 |
| 2013/0049925 A1* | 2/2013 | Subramanian | G06K 7/10079 340/3.1 |
| 2014/0043162 A1* | 2/2014 | Siciliano | B65D 83/12 340/568.8 |
| 2014/0291397 A1* | 10/2014 | Caputo | G06Q 10/087 235/385 |
| 2015/0006321 A1* | 1/2015 | Cozad | G06Q 10/087 705/26.9 |
| 2015/0069122 A1* | 3/2015 | Zumsteg | G06K 7/1443 235/438 |
| 2015/0102908 A1* | 4/2015 | Griesmann | G06K 7/10198 340/10.1 |
| 2015/0379366 A1* | 12/2015 | Nomura | G06Q 50/28 382/203 |
| 2016/0121913 A1* | 5/2016 | Lim | G06K 7/10792 701/19 |
| 2017/0136632 A1* | 5/2017 | Wagner | B25J 9/1612 |
| 2017/0173638 A1* | 6/2017 | Wagner | B07C 5/3412 |
| 2017/0228688 A1* | 8/2017 | Bourlon | G06Q 10/087 |
| 2017/0316634 A1* | 11/2017 | Umili | G07F 11/04 |

* cited by examiner

SCANNER, SCANNING APPARATUS AND SCANNING METHOD FOR A SHELF

TECHNICAL FIELD

The present invention relates to a scanner, a scanning apparatus, and a scanning method for a display case, and more particularly a scanner, a scanning apparatus, and a scanning method for a display case which can achieve a high scanning rate for articles without a blind area in the display case and can accurately find out the position information of articles in the display case, using a scanner that moves and rotates in a plurality of storage sections in the display case.

BACKGROUND ART

In general, an RFID (Radio Frequency Identification) tag is a device making it possible to read the information of articles and products, using local RF wireless communication with an IC chip. The RFID tag can efficiently update the information stored in the tag in real time every time articles are moved, as compared with barcodes or smart cards.

Further, because the RFID tag uses local RF wireless communication in the bands of UHF and VHF, non-contact recognition is possible, so it is possible to obtain accurate information without an error and to read information by approaching a nonmetallic material, regardless of a complicated environment, a dirty environment, and the weather.

Recently, articles and products are stored and displayed, with RFID tags attached thereon, in display cases.

As described above, when an RFID tag is attached to articles and products, the tag information of the articles and the products can be read by a reader. Accordingly, it is possible to check the present state of storage and delivery of articles and products stored in a display case and to obtain detailed information such as the individual features, the date of manufacture, and the period of circulation.

In particular, when articles and products with RFID tag thereon are stored in a display case, it is required to install a reader and an antenna connected with the reader on the display case in order to efficiently and quickly read the tag information.

Accordingly, as shown in FIGS. 1a to 1c, a display case 10 of the related art is provided with a plurality of layers of storage sections 11 for articles and products and at least two fixing-typed antennas 20 are fixed on the rear plate of each of the storage sections 11, toward the front of the storage sections 11.

The fixing-typed antennas 20 are connected with readers on the display case 10 by coaxial cables (not shown) through slide holes 13 in the storage sections 11. The bodies of the fixing-typed antennas 20 are fixed to the rear plates of the storage sections 11 by fastening members 21 such as bolts or adhesives.

A flexible bottom plate 14 made of a nonmetallic material is disposed in each of the storage sections 11 and a plurality of pattern-typed antennas 30 that can cover a bottom 15 is uniformly arranged under the bottom plate 14 in each of the storage sections 11. The pattern-typed antennas 30 are additionally provided to remove blind areas that the fixing-typed antennas 20 cannot scan.

However, in this related art, since the antennas are fixed to a display case, it is required to install a plurality of expensive antennas on the rear plates and the bottoms of the storage sections in a display case. Further, since it is required to install a reader connected with the antennas by coaxial cables in each of the storage sections, the material cost and the installation cost are necessarily increased.

Further, the scanning operation of the antennas on the layers of a display case is made in a switching type, so that the storage sections are not simultaneously scanned, but individually and sequentially scanned. Accordingly, for a display case with at least three or more layers of storage sections, the scanning time of an antenna is three or more minutes and it necessarily takes a long time to scan each of the racks.

Further, even if scanning is performed for a long time, since the antennas in the storage sections are fixed, such that there is a critical problem in that there are non-scanned blind areas or the scanning rate necessarily decreases, depending on the features of products (for example, a liquid material).

Further, when there is a need of remodeling a display case with a plurality of antennas fixed or changing the shape of a display case to fit to articles to store, it is required to individually separate the fixed antennas and then fix them again to fit to the remodeled or changed shape. Accordingly, this work acts as a main factor that increases the cost for remodeling or changing a display case.

Accordingly, it has been recently required to develop a scanning apparatus that makes it possible to reduce the cost for installing and operating antennas. Further, it has been required to develop a scanning device that makes it possible to reduce the cost for remodeling a display case or changing the shape of the display case. Further, it has been required to develop a scanning device that has an improved scanning rate for the RFID tag information of articles and products. Further, it has been required to develop a scanning device that can make sure of high-speed scanning within a short time with a high recognition rate.

DISCLOSURE

Technical Problem

An object of the present invention for solving those problem is to provide a scanner, a scanning apparatus, and a scanning method for a display case, which can improve a recognition rate of an article by scanning a storage section in a display case without a blind area, using a scanner having an antenna and automatically moving horizontally on the display case.

Further, an object of the present invention is to provide a scanner, a scanning apparatus, and a scanning method for a display case, which can make it possible to accurately find out position information of an article in a storage section by approaching a scanner arm to the inside of the storage section in the display case, when the scanner moves horizontally with respect to the display case.

Further, an object of the present invention is to provide a scanner, a scanning apparatus, and a scanning method for a display case, which can effectively scan an article in a display case by moving a scanner in the vertical direction of a display case.

Technical Solution

In order to achieve the objects, a scanning apparatus according to the present invention may include: a scanner that has a plurality of antennas for scanning articles and is disposed to face the storage spaces of the display case; a horizontal driving unit that is connected to the scanner for moving the scanner in the horizontal direction of the display case; and a control unit that controls movement of the scanner through the horizontal driving unit and collects information data about the articles from scan information received from the scanner.

The scanning apparatus for a display case may further include a distance sensor that senses objects or obstacles in the movement direction of the scanner and sends a sensed distance sensing signal to the control unit.

Further, the antennas may be disposed to correspond to the layers of the display case, respectively.

Further, the scanner may be equipped with a plurality of arm antennas that has an arm joint capable of changing the position toward the inside of the storage sections and may protrude at a predetermined distance from each other between the positions of the antennas, corresponding to the positions of the storage sections of the layers in the display case.

A return spring may be disposed between joints of bolts and nuts so that at least one or more arms of which antennas are combined with fixing brackets fixed to the scanner can make horizontal joint deformation and return, in the arm antennas.

Further, a return spring may be disposed between joints of bolts and nuts so that at least one or more arms of which antennas are combined with fixing brackets fixed to the scanner can make vertical joint deformation and return to the display case, in the arm antennas.

Further, the scanner may include a scanner body extending in the vertical direction of the display case and a scanner arm of which an end is rotatably mounted on the scanner body to move horizontally in the storage sections and which scans the articles through an antenna.

Further, the scanner arm may include a side scanner arm deploying in one direction in the storage section and another scanner arm deploying in the other direction in the storage section.

Further, the scanner arm 120 may be formed by connecting a plurality of scanner arms having different diameters in a telescopic shape.

Further, a fixing plate having a blocking layer may be mounted on the scanner body.

Further, the scanner may have a plurality of scanner bars disposed in the same line and detachably combined in a multistage type.

Further, the scanner arm may be mounted on the scanner body by a mounting bracket connecting ends of the scanner bars with each other.

Further, the mounting bracket may have an insertion holder in which ends of the scanner bars are inserted on each other, a bolt for fixing the scanner bars inserted in the insertion holder, an elastic rotary bar to which the base end of the scanner arm is connected to rotate the scanner arm, a contact pin protruding on the elastic rotary bar, and a pair of arm sensors spaced from each other in the rotational direction of the scanner arm with the contact pin therebetween, sensing the number of times of reciprocating rotation of the scanner arm, and sends a sensed tapping sensing signal to a controller.

Further, the mounting bracket may be equipped with a tapping motor connected to the scanner arm to rotate the scanner arm to the left and right.

Further, the scanner arm may be composed of a plurality of scanner arms having different lengths and rotatably mounted on the mounting bracket.

Further, the scanner may include a scanner body extending in the vertical direction of the display case and a film type antenna of which an end is mounted on the scanner body to protrude into the storage section and scanning the articles.

Further, the film type antenna may be mounted on the scanner body by the mounting bracket, and the mounting bracket may include an insertion holder that is inserted in the scanner bar, a bolt for fixing the scanner bar inserted in the insertion holder, a mounting member that vertically extends, and a memory holder that is spaced perpendicularly to the mounting member and on which the film type antenna is mounted.

Further, the memory holder may be made of a shape memory alloy that returns to the original shape, when it deforms.

Further, the film type antenna may include a side film type antenna disposed in one direction in the storage section and another film type antenna disposed in the other direction in the storage section.

Further, the display case may be formed in a rectangular tetrahedron shape having a plurality of layers of storage parts and a guide rail that guides horizontal movement of the horizontal driving unit may be disposed in the longitudinal direction of the rectangular tetrahedron shape.

Further, the horizontal driving unit may include: a motor that is operated by predetermined driving power and rotates its driving shaft at a predetermined speed; a rotor that is combined with the driving shaft of the motor and has a plurality of threads on the cylindrical outer side; at least one wheel that is rotatably combined with a support bracket fixed to the scanner, to which interlocking members having a plurality of threads formed in a circle along rotary shafts, respectively, are fixed, and rolls in a guide rail; and a turning belt that is engaged with the rotor at the motor and the interlocking members attached to at least one of the wheels by the threads formed throughout its inner side and the threads of the rotor and the thread of the wheel, and that maintains predetermined tension in order to keep engaged with the rotor and the interlocking members by the threads.

Further, the guide rail may have: a bottom rail side on which at least one of the wheels rolls in contact with it; a front guide part that protrudes at a predetermined height on the front side in the longitudinal direction of the guide rail and guides at least one of the wheels to prevent the wheel from being separated to the front; and a rear guide part that protrudes at a predetermined height on the rear side in the longitudinal direction of the guide rail and guides at least one of the wheels to prevent the wheel from being separated to the rear.

Further, the guide rail may include: a lower guide rail including a bottom rail side on which at least one wheel of a horizontal driving unit disposed at the lower portion of the scanner rolls in contact with it, a front guide part that protrudes at a predetermined height on the front side in the longitudinal direction of the guide rail and guides at least one of the wheels to prevent the wheel from being separated to the front side, and a rear guide part that protrudes at a predetermined height on the rear side in the longitudinal direction of the guide rail and guides at least one of the wheels to prevent the wheel from being separated to the rear side; and an upper guide rail that is disposed at the upper portion of the scanner and guides support wheels freely rolling, to function as a support for maintaining a predetermined gap between the scanner and the display case in horizontal movement, due to the horizontal driving unit disposed at the lower portion of the scanner.

Further, the horizontal driving unit may further include: an auxiliary wheel that freely rolls without power in close contact with the rear portion of the guide rail to support the scanner so that the distance from the display case is maintained when the scanner horizontally moves; and an auxiliary wheel support bracket that is fixed to the scanner and combined with the auxiliary wheel such that free rolling is possible.

Further, the display case may be formed in a cylindrical shape having a plurality of storage sections that has a circular round shape and are continuously arranged and a guide rail having a circular path and guides horizontal driving of the horizontal driving unit may be disposed along the circular shape of the cylindrical display case.

Further, the horizontal driving unit may include: a motor that is operated by predetermined driving power and rotates its driving shaft at a predetermined speed; a rotor that is combined with the driving shaft of the motor and has a plurality of threads on the cylindrical outer side; at least one wheel which can make angle tilting and can roll on the guide rail having a circular path by rotatable combination of an arc-shaped coupling portion at an end of a bending portion of a support bracket fixed to the scanner and bent in a U-shape, to which interlocking members having a plurality of threads formed in a circular shape along its rotary shaft, and which rolls in the guide rail having a circular path; and a turning belt that is engaged with the rotor at the motor and the interlocking members attached to at least one or more of the wheels by the threads formed throughout its inner side and the threads of the rotor and the thread of the wheel, and that maintains predetermined tension in order to keep engaged with the rotor and the interlocking members by the threads.

Further, the guide rail having a circular path may include: a bottom rail side on which at least one of the wheels rolls along its circular path in contact with it; a front guide part that protrudes at a predetermined height on the front side along a continuous path making a circle formed by continuously connecting round shapes to fit to the cylindrical shape of the display case and that guides at least one of the wheels to prevent the wheel from being separated to the front side; and a rear guide part that protrudes at a predetermined height on the rear side along a continuous path making a circle formed by continuously connecting round shapes to fit to the cylindrical shape of the display case and that guides at least one of the wheels to prevent the wheel from being separated to the rear side.

Further, the guide rail having a circular part may include: a lower guide rail including a bottom rail side on which at least one of wheels disposed at the lower portion of the scanner rolls along its circular path in contact with it, a front guide part that protrudes at a predetermined height on the front side along a continuous path making a circle formed by continuously connecting round shapes to fit to the cylindrical shape of the display case and that guides at least one of the wheels to prevent the wheel from being separated to the front side, and a rear guide part that protrudes at a predetermined height on the rear side along a continuous path making a circle formed by continuously connecting round shapes to fit to the cylindrical shape of the display case and that guides at least one of the wheels to prevent the wheel from being separated to the rear side; and an upper guide rail that is disposed at the upper portion of the scanner and guides support wheels freely rolling, to function as a support for maintaining a predetermined gap between the scanner and the display case in horizontal movement, due to the horizontal driving unit disposed at the lower portion of the scanner.

Further, the horizontal driving unit may include a guide rail extending in the horizontal direction of the display case, a moving bracket disposed to be movable along the guide rail by a driving roller, a driving motor mounted on the moving bracket and connected to the driving roller by a turning belt, and a wheel sensor measuring and converting the number of revolutions of the driving motor into a movement distance and sends a converted movement sensing signal to the controller.

Further, the driving roller may include a main driving roller disposed over the guide rail and connected to the driving roller and a sub-driving roller disposed under the guide rail and supporting the guide rail.

Further, the control unit may include a reader receiving scan information from the antennas and reads article information data of scanned articles, a local controller comparing and analyzing the article information data of the reader and registered article information data, and a scanner controller applying an operation signal to the horizontal driving unit to enable the scanner to reciprocate horizontally in a storage section.

Further, the scanner controller may calculate a movement distance that the scanner can move, by comparing an initially inputted standard distance data value with a distance sensing signal received from a distance sensor or by comparing an initially inputted standard distance data value with a movement sensing signal of the scanner received from a wheel sensor of the horizontal driving unit.

Further, the scanner controller may be connected with the reader, the distance sensor, the horizontal driving unit, the arm sensor, and the wheel sensor, using a PLC (Power Line Communication) network.

Further, the local controller may calculate the number of times of scan information of the scanner for each articles, when the scanner repeats moving, may select the position of an article having the largest number of times of scan information in the calculated number of times of scan information as the actual position of the article, and may collect article information data of the article from the scan information of the selected article.

Further, the distance sensor may include a plurality of right distance sensors and a plurality of left distance sensors which sense distances from objects and obstacles at the right and left and are disposed at the left and right of the scanner, at a predetermined distance from each other in the longitudinal direction of the scanner.

Further, the right distance sensors and the left distance sensors may be any one sensor device in electronic non-contact sensor device such as an infrared sensor and an ultrasonic sensor, and mechanical contact sensor device such as a limit switch sensor.

Further, a power supply unit that supplies driving power to the horizontal driving unit may be a power battery equipped with any one battery of a primary battery or a secondary battery that can be repeatedly charged.

Further, in a power supply unit that supplied power to the horizontal driving unit, first and second power supply lines electrically connected with a power plug and a stabilizer may extend on a bottom rail side in the longitudinal direction of the bottom rail side that the wheel of the horizontal driving unit comes in contact with on a guide rail, first and second power brushes supplied with power in contact with the first and second power supply lines may be fixed at both sides of the wheel of the horizontal driving unit, and AC power applied from an AC converter electrically connected with the first and second brushes may be converted into DC power and the converted DC power may be supplied to the power battery to charge the power battery.

Further, in the power supply unit that supplies driving power to the horizontal driving unit, first and second power supply terminals may be formed and exposed at a power supply block fixed to a corner of one side of the display case by a fixing block and connected with a power plug, first and second power input terminals correspondingly being in contact with the first and second power supply terminals of the power supply block may be formed and exposed at a power input block fixed to a side of the scanner corresponding to the attachment position of the power supply block by a fixing block, and common AC power applied from a DC converter electrically connected with the power input block may be converted into DC power and the converted DC power may be supplied to the power battery to charge the power battery.

Further, the scanner may be made of any one of metallic material in steel and aluminum for blocking to prevent a scanning error of the antenna.

Further, an RFID tag may be attached to the articles and the antenna may recognize the RFID tag.

A scanning apparatus according to the present invention is a scanning apparatus of a display case for scanning articles in storage sections of a display case having at least one or more layers, which may include: a scanner that has a plurality of antennas for scanning articles and is disposed to face the storage spaces of the display case; a vertical driving unit that is connected to the scanner for moving the scanner in the vertical direction of the display case; and a control unit that controls movement of the scanner through the vertical driving unit and collects article information data about the articles from scan information received from the antennas.

The scanning apparatus for a display case may further include a distance sensor that senses obstacles in the movement direction of the scanner and sends a sensed distance sensing signal to the control unit.

Further, the control unit may include a reader that receives scan information from the antennas and read article information data of the articles, a memory that stores the article information data of the reader, and a microprocessor that applies an operation signal to the vertical driving unit so that the scanner is disposed to face the storage section on any one layer.

Further, the control unit may further include a switch unit connected between the reader and the antennas to select and operate at least one antenna from the antennas.

Further, the microprocessor may calculate a movement distance that the scanner can move by comparing standard distance data from which a movement distance of the scanner is calculated with a distance sensing signal received from the distance sensor, and may position the scanner in the storage section of a layer selected from the storage sections on a plurality of layers in the display case in consideration of the calculated movement distance.

Further, the microprocessor may calculate the number of times of scan information of the scanner for each articles, when the scanner repeats moving, may select the position of an article having the largest number of times of scan information in the calculated number of times of scan information as the actual position of the article, and may collect article information data of the article from the scan information of the selected article.

Further, the scanner may be formed in a ring shape surrounding the storage section of the display case.

Further, the display case may be implemented by a rack assembly in which a plurality of case blocks is arranged to maintain a predetermined lateral gap, and the scanner may be formed in a ring shape surrounding the case block across the gap and laterally continuously disposed.

Further, the display case may include an inner case block having a plurality of storage sections and an outer case block having a door and surrounding the inner case block.

Further, the vertical driving unit may include a guide rail vertically extending a side of the display case, a moving member fixed to the scanner to move along the guide rail, and a driving motor connected to the moving member by a turning belt.

Further, the vertical driving unit may include a wire with one end connected to the upper portion of the scanner, a support member disposed at the upper end of the display case to support the wire through a plurality of support grooves formed at a predetermined distance from each other at their upper end, and a rotary motor of which a rotary pulley where the other end of the wire is wound is mounted on a driving shaft.

Further, an RFID tag may be attached to the articles and the antenna may recognize the RFID tag.

Further, the present invention is a scanning apparatus for a display case which moves on a display case for scanning articles in the display case with a scanner, which may include: a body equipped with a scanner; a driving motor fixed to the body; a driving roller coupled to a driving shaft of the driving motor and moving along a guide bar when the driving motor operates; and a support roller mounted on the body to be supported on the guide bar.

Further, the present invention is a scanning apparatus of a display case for scanning articles in case cells having at least one or more layers, which may include: a body extending in the vertical direction of the display case; a scanner having an antenna mounted at a predetermined height on the body and scanning the articles in the case cells; a horizontal driving unit where the body is mounted and that moves along a rail formed in the longitudinal direction of the display case; a balancing arm connected to the horizontal driving unit to be rotatable horizontally and having a side support roller supported in close contact with a rail side of the rail, at an end; and a controller controlling movement of the body rail and collecting information data of the articles from scan information received from the antenna.

Further, the apparatus may further include a trigger sensor disposed on the horizontal driving unit to sense a trigger detachably mounted on the rail and send a sensing signal to the controller.

Further, the balancing arm may include: a pair of rotary bars connected to the horizontal driving unit to be rotatable horizontally and extending in both directions of the horizontal driving unit; a side support roller restricting movement in one direction of the rotary bars by being supported by the rail side of the rail, coupled to ends of the rotary bars, and rolling along the rail; and an elastic spring applying tension to the side support roller to bring the side support roller in close contact with the rail side of the rail.

Further, the horizontal driving unit may include: a driving body mounted at the upper portion of the body; a driving motor fixed to the driving body; a driving roller coupled to a driving shaft of the driving motor and moving along a rail on the top of the rail when the driving motor operates; and a lower support roller mounted on the driving body to support the bottom of the rail.

Further, the scanner may include: a mounting bracket disposed at a predetermined height on the body; a rotary member rotatably hinged to the mounting bracket; an antenna mounted at a rotary end of the rotary member and scanning the articles in the case cells; and a return spring providing an elastic return force to the rotary member to position the antenna in the case cells.

Further, the moving unit may include: a holder fixed to the upper portion of the body; a sliding housing having a guide groove formed on the inner side in which the holder can move, and having a sliding bar mounted on its upper portion; and a sliding block disposed at the lower portion of the horizontal driving unit to be movable along the sliding bar.

Further, the controller may receive scan information from the antennas, may read article information data of scanned articles, may compare and analyze the read article information data and registered article information data, and may apply an operation signal to the horizontal driving unit to enable the scanner to reciprocate horizontally in a case cell.

Further, the present invention is a scanning apparatus of a display case for scanning articles in case cells having at least one or more layers, which may include: a body extending in the vertical direction of the display case; a scanner having an antenna mounted at a predetermined height on the body and scanning the articles in the case cells; a horizontal driving unit for moving the body in the horizontal direction of the display case; a trigger disposed in a movement path of the body; and trigger sensor mounted at both sides of the body to recognize the trigger, in which movement of the body may be controlled in accordance with a recognition pattern of the trigger.

Further, the trigger may include: a direction trigger providing conversion position information saying a change in movement direction of the body to the trigger sensor; and a curved trigger providing curve position information saying the body enters a curved portion of a rail to the trigger sensor.

Further, the guide bar may include: a first bar rail that extends in the longitudinal direction of the display case and with which the driving roller is in close contact; and a second bar rail that is disposed in parallel with the first bar rail at a predetermined distance under the first bar rail and with which the support roller is in close contact.

Further, the support roller may include: a first support roller disposed ahead of the body moving; and a second support roller disposed behind the body moving.

Further, a scanning apparatus of a display case for scanning articles in a display case, may include: a body equipped with a scanner; a cable that is movably disposed on the display case and to which the body is fixed; a driving unit for moving the cable; and a support member mounted on a ceiling or the display case to support the cable.

Further, the present invention may further include a guide pulley supporting the cable to change side movement of the cable.

Further, the driving unit may include a driving motor mounted on the ceiling or the display case; a driving shaft transmitting a rotational force of the driving motor to the cable; and a driving roller that is mounted on the driving shaft and on which an end of the cable can be wound.

Further, the support member may include: a fixed member fixed to the ceiling or the display case; and a support pulley fixed to the fixed member and supporting the cable.

Further, the present invention is a scanning apparatus of a display case for scanning articles in case cells having at least one or more layers, which may include: a body extending in the vertical direction of a display case; a scanner mounted on the body to be movable up/down and having an antenna scanning articles in the case cells; a horizontal driving unit for moving the body in the horizontal direction of the display case; an article sensor mounted at both sides of the body to sense the articles; and a controller moving up/down the scanner, when the body horizontally moves, to move the antenna close to the articles in accordance with the sensing result of the article sensor.

Further, the scanner may include: a guide rail mounted on the body to be movable up/down by a moving-up/down unit extending in the height direction of the body; a moving-up/down member disposed movably along the guide rail and having a side to which the scanner is connected; and a moving-up/down motor connected to the moving-up/down member.

Further, the controller may send a moving-up signal for moving up the scanner to the moving-up/down motor of the moving-up/down unit, when the article sensor senses an article, and may send a moving-down signal for moving down the scanner to the moving-up/down motor of the moving-up/down unit, when the article sensor does not sense an article.

Further, the present invention may include: a scanner body disposed to face the case cells and moving in the horizontal direction of the display case; a scanner arm mounted on the scanner body to protrude toward the case cells; and An antenna disposed on the scanner arm and having a curved portion elastically deformed by contact with the articles in the case cells.

Further, the antenna may be a ring-shaped antenna formed in the shape of a circular or elliptical ring band.

Further, the scanner arm may include: a plurality of support arms connected in a telescopic type; and an elastic spring elastically supporting the support arms therebetween.

Further, the present invention is a scanner for a display case for scanning articles in case cells, which may include: a scanner body moving in the horizontal direction of a display case; a vertical antenna mounted on the scanner body to face the case cells; and a horizontal antenna mounted on the scanner body to protrude toward the case cell.

Further, the vertical antenna may include a thin patch antenna.

Further, the horizontal antenna may include a bar-shaped horizontal flexible antenna horizontally disposed on the display case to approach the insides of the case cells.

Further, the present invention may include: a horizontal scanning step of repeatedly scanning articles in a display case by reciprocating a scanner with an antenna in the horizontal direction of the display case; an article locating step of selecting the position of an article that is the most scanned as the actual position of the article, when the scanner repeats moving; and an article information data acquiring step of collecting article information data of an article from scan information of the selected article.

Further, the horizontal scanning step may set position tags for a plurality of layers in the display case, may set product tags for articles in a plurality of layers of storage sections, and may repeatedly scan the articles by reciprocating a scanner in the horizontal direction of the display case, and the locating step may select the position of an article, which has the number of times of recognizing the most scanned position tag and product tag in the number of times of recognizing the scanned position tags and the number of times of recognizing the product tags, as the actual position of the article.

Further, the locating step may include: a step of summing up the number of times of position tags and the number of times of product tags of the articles on a plurality of layer repeatedly scanned by a plurality of antennas of a scanner and of mapping the article having the largest number of times of position tags in the summed number of times of position tags to a reading position of the product tag, when the scanner moves first time; a step of repeating the mapping to the reading position and then summing up the number of times of product tags for a plurality of layers of the article mapped to the reading position of the position tag in the mapping step; and a step of selecting the article having the largest number of product tags by comparing the calculated numbers of times for a plurality of layers.

Further, the information data acquiring step may compare position information and product information of the selected article with position information and product information of registered articles, and may collect article information data of the selected article, when the position information and the product information of the selected article and a registered article are the same.

Further, the present invention is a method of scanning a display case for scanning articles in a plurality of layers of storage sections in a display case, which may include: a vertical scanning step of repeatedly scanning articles on at least one or more layers in a display case by reciprocating a scanner in the vertical direction of the display case; an article locating step of selecting the position of an article that is the most scanned as the actual position of the article, when the scanner repeats moving; and an article information data acquiring step of collecting article information data of an article from scan information of the selected article.

Further, the vertical scanning step may set position tags for a plurality of layers in the display case, may set product tags for articles in a plurality of layers of storage sections, and may repeatedly scan the articles in the vertical direction of the display case, and the article locating step may select the position of an article, which has the number of times of recognizing the most scanned position tag and product tag in the number of times of recognizing the scanned position tags and the number of times of recognizing the product tags, as the actual position of the article.

Further, the present invention is a method of scanning a display case, which may include: a mapping step of mapping a plurality of layers of case cells and article initially exhibited in the case cells; an article locating step for one line of determining key positions of articles by scanning the case cells and the articles in one line; an article locating step for another line of determining key positions of articles by scanning the case cells and the articles in another line; and a step of determining the actual positions of articles in the key positions of the articles determined in one line and another line.

Further, the method may further include an article excluding step of excluding the actual position of the article determined in the step of determining the actual step, when the article at the actual position is not included in a registered product group.

Further, the method may further include an article information data collecting step of collecting article information data of an article from scan information of the article at the actual position.

Further, the mapping step may include: a tag setting step of setting cell tags for a plurality of case cells on a plurality of layers in a display case and of setting article tags for articles in the case cells; and a mapping storing step of storing the mapping relationships between the case cells and read cell tags, by reading the cell tags and the article tags.

Further, the article position determining step for one line or another line may include: an antenna locating step of selecting the present position of an antenna by reading cell tags of case cells in a line; and key position determining step of selecting a key position of an article by reading the article tag at the present position of the antenna selected in the antenna position determining step.

Further, the present invention may include: a step of horizontally moving a scanner in the horizontal direction of a case cell; a step of sensing articles in the case cell positioned in a movement direction of the scanner; a step of setting a moving-up/down pattern of the scanner in accordance with a sensing range of the articles; and a step of moving up/down the scanner in accordance with the set moving-up/down pattern of the scanner.

Further, the step of setting a moving-up/down pattern of the scanner may set a moving-up pattern for moving up the scanner, when the article is sensed, and may set a moving-down pattern for moving down the scanner, when the article is not sensed.

Further, the step of sensing articles in the case cell may sense the vertical position to the edges of the articles and the horizontal position to the edges of the articles in the case cell.

Further, the present invention may include: a) a step of moving a scanner in the horizontal direction of a case cell to which an identification is attached; b) a step of reading a serial number from the identification close to the scanner; c) a step of setting a movement path of the scanner in accordance with the read serial number and of reading an article tag attached to an article; and d) a step of determining an exhibition position of an article from the number of times of reading the article tag.

Further, the step c) may reciprocate the scanner in the section between the present read identification and the previously read identification, when the number of times of reading of the read serial number is smaller than the number of times of reading of a predetermined serial number.

Further, in the step c), a start serial number providing movement start information of the scanner, a movement serial number providing operation information for instructing the scanner to move and read an article, and an end serial number providing movement end information of the scanner may be selectively stored in the identification.

Further, in the step d), the position of the case cell having the most read article tag in the number of times of reading of articles read by the scanner may be selected as an exhibition position of an article.

Further, the present invention may include: an exhibition cell in which articles are stacked; and scanner cells disposed in the exhibition cell with a partition therebetween and providing a movement space of an antenna arm for sensing the article.

Further, the scanner cells may include: an upper scanner cell disposed at the upper portion of the exhibition cell; and a lower scanner cell disposed at the lower portion of the exhibition cell.

Further, the exhibition cell may be implemented by an exhibition cell assembly in which a plurality of exhibition cells may be arranged in a matrix type, and the scanner cell may be disposed between a plurality of exhibition cells vertically arranged.

Further, the partition may be made of a signal transmissive material that transmits receiving signals read by the antenna arm.

Effect of the Invention

According to the present invention, it is possible to achieve the following remarkable effects.

First, since the antennas can be moved in the horizontal direction of the display case by an electric motor in the embodiments of the present invention, it is possible to greatly reduce the material cost for accessories such as an antenna, a cable, and a reader and reduce the cost for installing equipment too, as compared with when a plurality of antennas are fixed on each layer of a display case.

Second, since the arm antenna approach the storage sections on the layers in the embodiments of the present invention, there is no blind area that has not been scanned in the display case and the recognition rate of articles can be considerably improved.

Third, since the scanner are disposed to be able to move horizontally with respect to a display case in the embodiment of the present invention, even if it is required to reconstruct a display case or change the shape to fit to articles and products to be received, there is no need of disassembling and reassembling an antenna, the cost for reconstructing and replacing a display case is greatly reduced, and the work time taken to reconstruct and replace a display case can be significantly reduced.

Fourth, since it is possible to accurately find out position information of articles in a display case by reducing the error range generated by an RFID reader in the embodiment of the present invention, it is possible to improve reliability of articles in a display case.

Fifth, since the flexible film type antenna is used for scanning articles in the embodiments of the present invention, it is possible to ensure an accurate recognition rate in scanning articles in a display case regardless of obstacles due to the height and volume of the exhibited articles.

Sixth, since the scanner scans articles in a display case while moving in the vertical direction of the display case in the embodiments of the present invention, it is possible to achieve high scanning recognition rate for articles without a blind area in the display case.

DESCRIPTION OF DRAWINGS

FIG. 1b is a view enlarging a fixing-typed antenna shown in FIG. 1a.

FIG. 1c is a view enlarging pattern-typed antennas on a bottom of a storage section show in FIG. 1a.

FIG. 48b is an enlarged view taken along line III-III in FIG. 48a.

BEST MODE

Figure 1A:
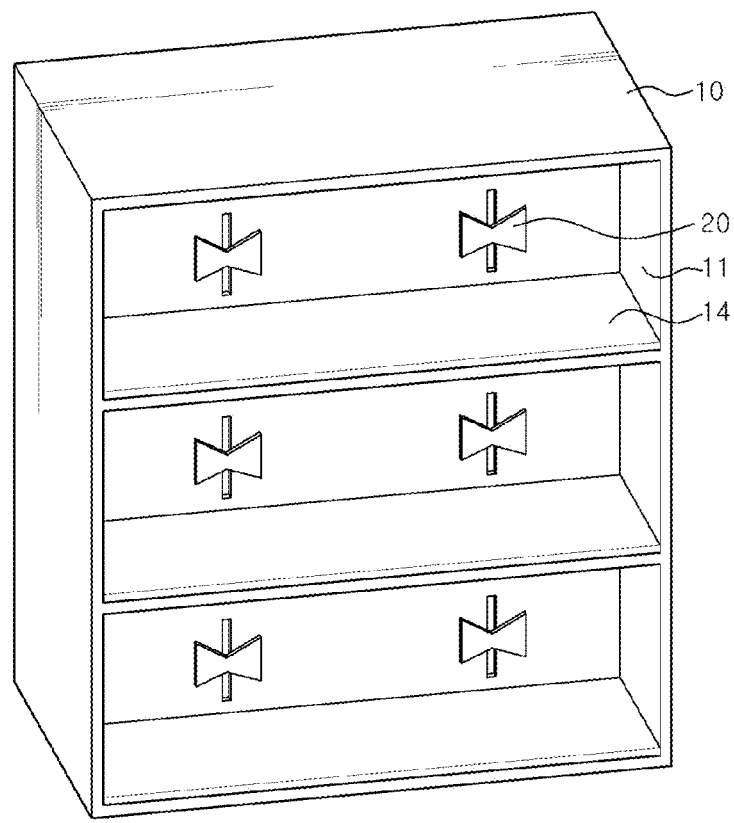
FIG. 1a is a view schematically showing an arrangement of antennas in a display case of the related art.
Figure 1B:
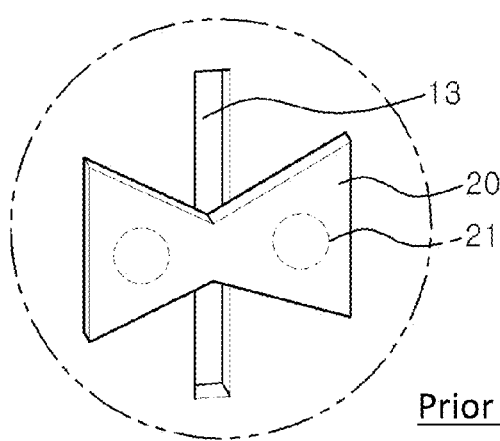
Figure 1C:
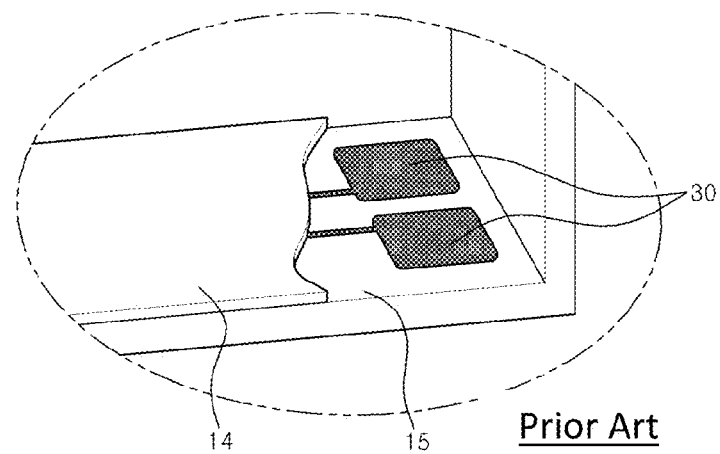

First, in the specification, in adding reference numerals to components throughout the drawings, it should be noted that like reference numerals designate like components even though components are shown in different drawings. Further, in describing the present invention, well-known functions or constructions will not be described in detail since they may unnecessarily obscure the understanding of the present invention.

Embodiments of the present invention are described hereinafter in detail with reference to the accompanying drawings.

Figure 2:
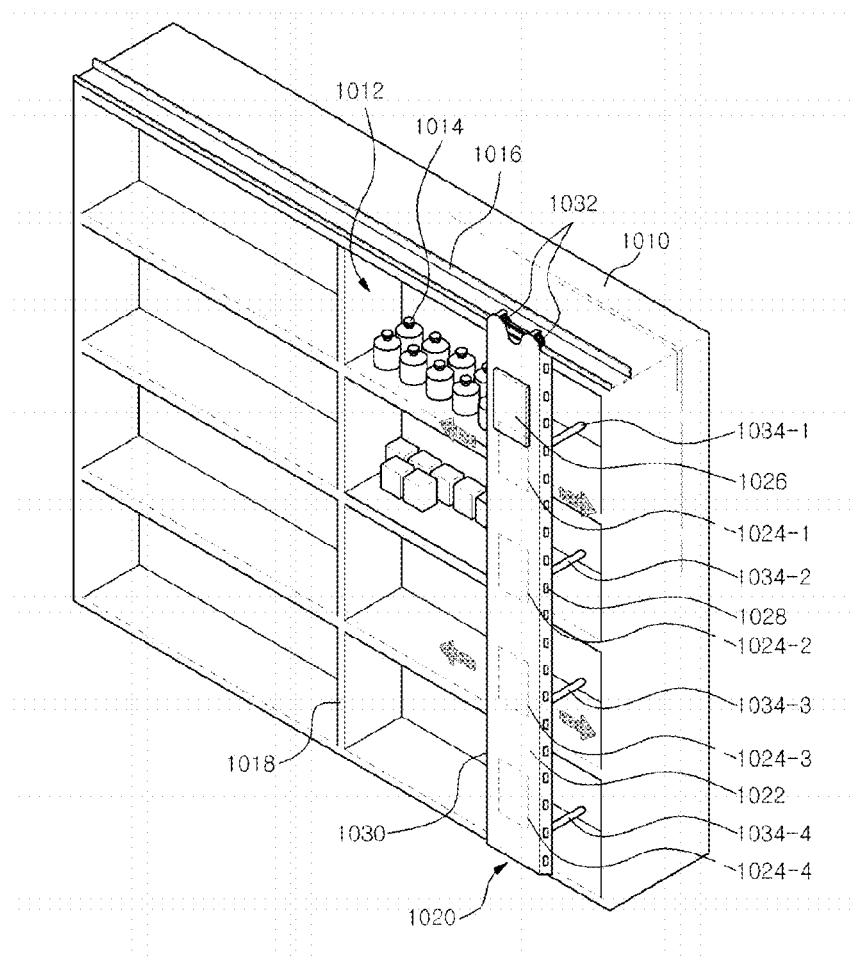
FIG. 2 is a view showing the entire external appearance of a scanning apparatus for a display case according to a first embodiment of the present invention.
Figure 3:
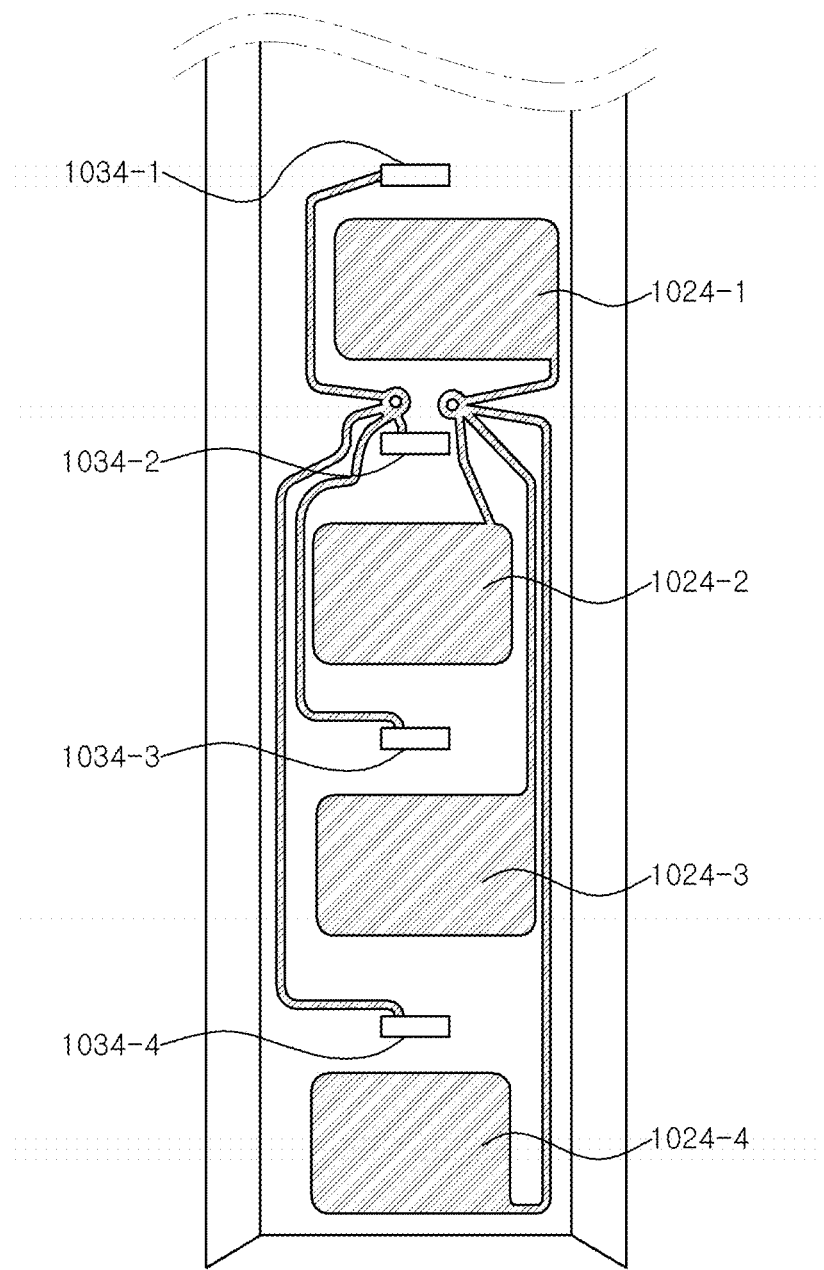
FIG. 3 is a view showing in detail the arrangement of a plurality of antennas on the scanning apparatus according to the first embodiment of the present invention.

As shown in FIGS. 2 and 3, in a scanning apparatus for a display case according to a first embodiment of the present invention, a display case 1010 to which the present invention is applied may have a plurality layers of storage sections 1012 which is vertically arranged to receive a plurality of articles 1014. The layers of storage sections 1012 can be divided into horizontally adjacent storage sections by a vertical wall 1018. An RFID tag that is a wireless identification may be attached to the layers of storage sections 1012.

A scanner 1020 may be disposed on the front side of the display case 1010. The scanner 1020 extends vertically from the top to the bottom of the display case 1010 and a plurality of antennas 1024-1, 1024-2, 1024-3, and 1024-4 may be attached at positions facing the layers of storage sections 1012.

A guide rail 1016 that guides the scanner 1020 horizontally moving may be fixed to the front upper portion of the display case 1010. The guide rail 1016 may extend in the width direction of the display case 1010.

A horizontal driving unit 1032 is disposed on the body 1022 of the scanner 1020. The horizontal driving unit 1032 horizontally reciprocates the scanner 1020 by horizontally moving along the guide rail 1016 in contact with the guide rail 1016 by means of a motor. The bottom of the body 1022 of the scanner 1020 may be designed to be spaced at a predetermined distance from the flower in order to easily move using the horizontal driving unit 1032.

The number of the antennas fixed to the scanner 1020, for example, may be the same as the number of the layers in the display case 1010. In an embodiment of the present invention, the first to fourth antennas 1024-1, 1024-2, 1024-3, and 1024-4 may be disposed with regular intervals on the longitudinal direction of the body 1022 to be matched with the number of layers and the positions of the storage sections 1012 on the layers in the display case 1010. Further, the antennas 1024-1, 1024-2, 1024-3, and 1024-4 may be fixed to the inside of the body 1022 in a pattern of a polygon (box in FIG. 3) having a height corresponding to the height of the corresponding storage sections 1012 and a width that can cover predetermined areas of the storage sections 1012, as shown in the figure.

The first to fourth antennas 1024-1, 1024-2, 1024-3, and 1024-4 may be electrically connected with an RFID reader 112 of control unit 1026 fixed to the scanner 1020 along patterned conductive lines.

In this embodiment, although the storage sections 1012 are formed in four layers in the display case 1010 and the four antennas 1024-1, 1024-2, 1024-3, and 1024-4 are disposed to correspond to the four layers, the present invention is not limited thereto and three or less, or five or more antennas may be provided to be matched with the number of the storage sections 12 in the display case 1010.

Further, a plurality of arm antennas 1034-1, 1034-2, 1034-3, and 1034-4 corresponding to the number of the layers of the storage sections 1012 may be disposed at positions facing the inside of the scanner 1020, that is, the corresponding storage sections 12 in the display case 110. The arm antennas 1034-1, 1034-2, 1034-3, and 1034-4 approaches to the storage sections 1012 and scans their inside while the scanner 1020 horizontally moves along the display case 1010.

The arm antennas may be disposed over or between the first to fourth antennas 1024-1, 1024-2, 1024-3, and 1024-4. The arm antennas may be arranged with regular intervals between the first to fourth arm antennas 1034-1, 1034-2, 1034-3, and 1034-4 in consideration of the number of layers and the positions of the storage sections 1012 on the layers in the display case 1010.

Further, similar to the first to fourth antennas 1024-1, 1024-2, 1024-3, and 1024-4, the arm antennas 1034-1, 1034-2, 1034-3, and 1034-4 are electrically connected with the RFID reader of the control unit 1026 fixed to the scanner 20 along patterned conductive lines.

The first to fourth arm antennas 1034-1, 1034-2, 1034-3, and 1034-4 may protrude toward the insides of the storage sections 1012 of the display case 1010 to maintain an angle of 90° on the body 1022 of the scanner 1020. The arm antennas 1034-1, 1034-2, 1034-3, and 1034-4 each are preferably implemented in an arm type having at least one return joint. Accordingly, the arm antennas 1034-1, 1034-2, 1034-3, and 1034-4 can return to 90° in the next storage sections 1012 without damaging obstacles and articles, which may be in the storage sections 1012, and without being damaged by the vertical wall 1018 dividing the storage sections 1012. For example, the arm antennas 1034-1, 1034-2, 1034-3, and 1034-4 may return after flexibly folding.

Figure 4:
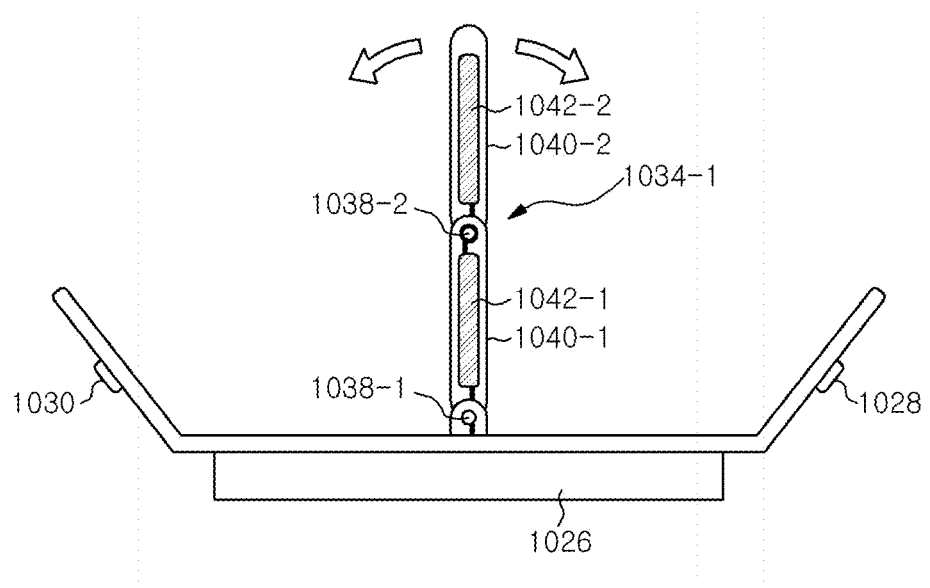
FIG. 4 is a plan view showing an approach arm antenna of the scanning apparatus according to the first embodiment of the present invention.
Figure 5:
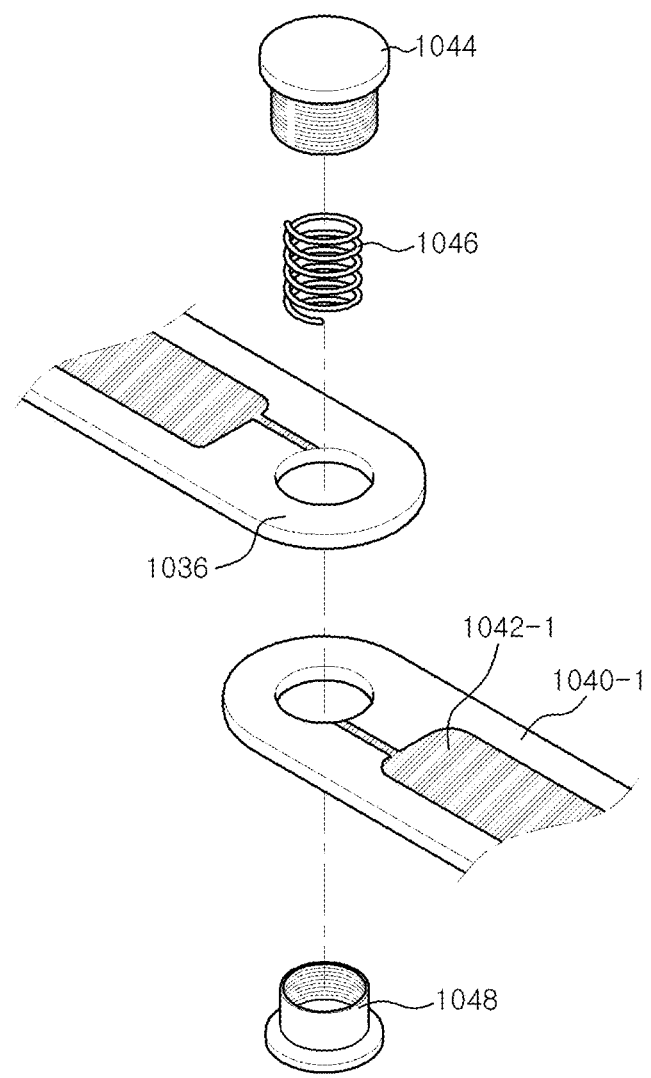
FIG. 5 is an exploded perspective view showing the structure of the approach arm antenna shown in FIG. 4.

As shown in FIGS. 4 and 5, for the first to fourth arm antennas 1034-1, 1034-2, 1034-3, and 1034-4, a fixing bracket 1036 is fixed to the body 1022 of the scanner 1020 and first and second arms 1040-1 and 1040-2 can be combined with the fixing bracket 1036 to be returned by two, that is, first and second return joints 1038-1 and 1038-2.

Although the arm antennas 1034-1, 1034-2, 1034-3, and 1034-4 each have two arms 1040-1 and 1040-2 and two return joints 1038-1 and 1038-2 in this embodiment, but the embodiment is not limited thereto and three or more arms and return joints may be provided in consideration of the depth of the storing spaces 1012 of the display case 1010 and the distance from the scanner 1020 and the display case 1010.

First and second antenna patterns 1042-1 and 1042-2 may be fixed to the first and second arms 1040-1 and 1040-2, respectively. The first and second antenna patterns 1042-1 and 1042-2 are connected with each other by a patterned conductive line and extend, and they may be connected with a patterned conductive line (see FIG. 3) formed in the body 1022 of the scanner 1020.

At the return joints 1038-1 and 1038-2 of the arm antennas 1034-1, 1034-2, 1034-3, and 1034-4, the fixing bracket 1036 and the first arm 1040-1, and the first arm 1040-1 and the second arm 1040-2 may be rotatably combined by a bolt 1044 and a nut 1048. Further, a return spring 1046 may be disposed at the combined portion of the bolt 1044 and the nut 1048.

Accordingly, in each of the arm antennas 1034-1, 1034-2, 1034-3, and 1034-4, the fixing bracket 1036 and the first arm 1040-1, and the first arm 1040-1 and the second arm 1040-2 may be supported by the return springs 1046 and may protrude at 90° against the surface of the body 1022 of the scanner 1020, in a normal state. Further, even if the arm antennas come in contact with articles and obstacles in the storage section 1012 or the vertical wall 1018, they can be deformed at a predetermined angle by elasticity and then return to protrude at the right angle by restoring of the return springs 1046.

That is, the arm antennas 1034-1, 1034-2, 1034-3, and 1034-4 approaches the inside of the storage sections 1012 of the display case 1010 and move left and right, thereby receiving information signals from the RFID tag on the products stored and displayed in the corresponding storage sections 1012.

By means of the return spring 1046, the first to fourth arm antennas 1034-1, 1034-2, 1034-3, and 1034-4 can keep protruding at the right angle against the surface of the body 1022 of the scanner 1020 in a normal state and can deform at a predetermined angle when they coming in contact with articles and obstacles in the storage sections 1012 or the vertical wall 1018. However, the present invention is not limited thereto and it is possible to provide tensile strengths corresponding to each other by disposing a rubber band having predetermined tension at the joint between the fixing bracket 1036 and the first arm 1040-1 and the joint between the first arm 1040-1 and the second arm 1040-2, and accordingly, the tension of the rubber band can substitute the elastic action of the return spring 1046.

The first to fourth arm antennas 1034-1, 1034-2, 1034-3, and 1034-4 according to the present invention can scan RFID tags by having the arms 1040-1 and 1040-2 directly approach to the insides of the storage sections 1012. However, since the arms 1040-1 and 1040-2 may come in direct contact with the articles stored and displayed in the storage sections 1012, articles that are weak to an external shock may be damaged. The structure of approaching an arm antenna, as shown in FIG. 6, can be used to preclude a possibility of damaging an article.

Figure 6:
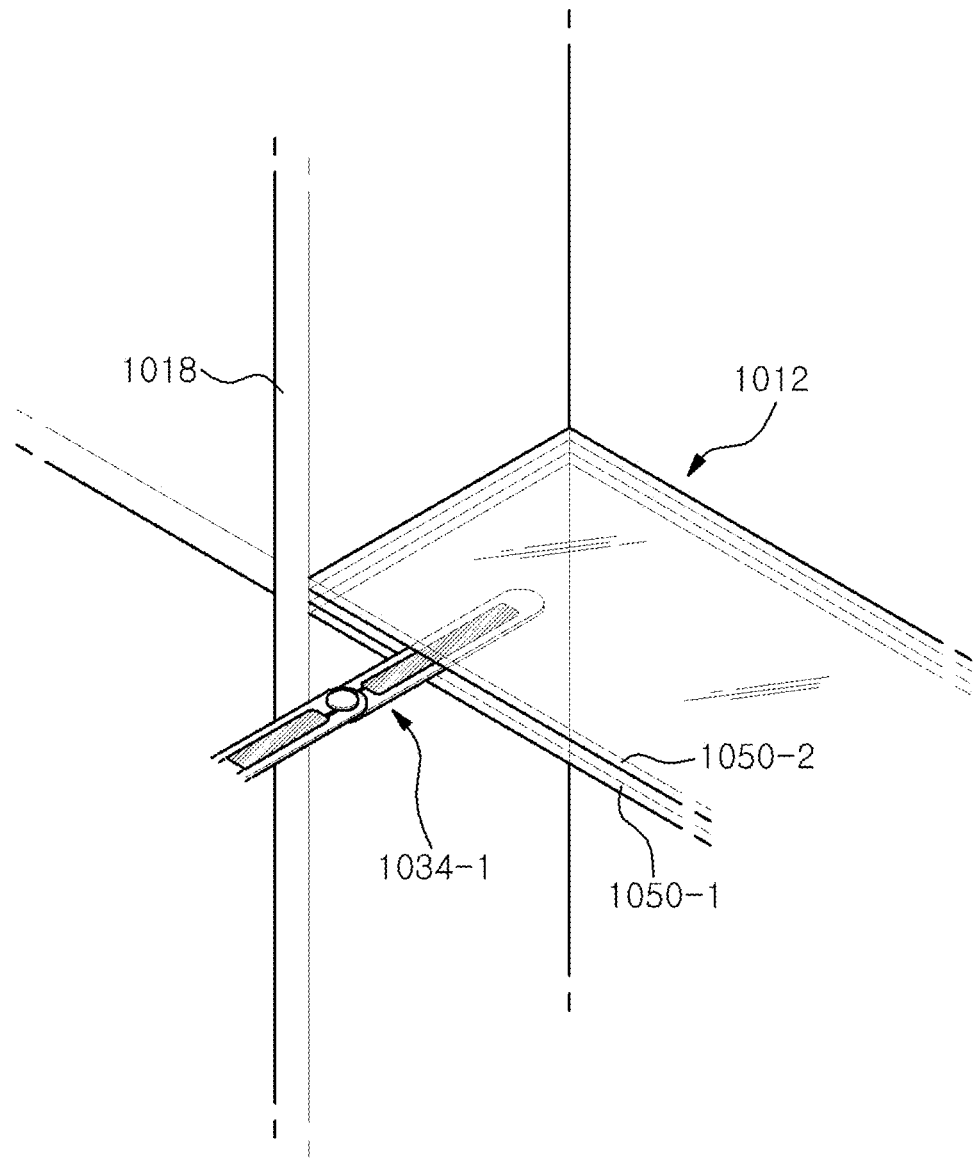
FIG. 6 is an exemplary view showing the approach arm antenna approached in a storage section of a display case according to another embodiment of the present invention.

As shown in FIG. 6, first and second bottom plates 1050-1 and 1050-2 made of metal may be disposed in a double layer on the bottom of the storage section 1012. A predetermined space may be defined between the double first and second bottom plates 1050-1 and 1050-2 so that the arm antennas 1034-1, 1034-2, 1034-3, and 1034-4 can sufficiently approach the spaces and horizontally move.

The first and second bottom plates 1050-1 and 1050-2 include a nonmetallic material. For example, a glass plate, a transparent/opaque synthetic resin plate, and a wood plate can be used for the first and second bottom plates 1050-1 and 1050-2.

When the structure in which the arm antennas 1034-1, 1034-2, 1034-3, and 1034-4 approach to the inside of the spaces defined between the double first and second bottom plates 1050-1 and 1050-2 is used, the arms 1040-1 and 1040-2 of the arm antennas 1034-1, 1034-2, 1034-3, and 1034-4 do not come in direct contact with the articles in the storage sections 1012, such that precise scanning is possible even without damaging the articles.

Further, although the first to fourth arm antennas 1034-1, 1034-2, 1034-3, and 1034-4 that are applied to the present invention move only horizontally in the same direction as that in which the body 1022 of the scanner 20 horizontally moves with respect to the display case 1010, as another example of the present invention, members having elasticity like the elastic spring 1046 may be used in the same way. The joints between the fixing bracket and the first arm and between the first arm and the second arm may be combined in a vertical type so that the arm antennas can vertically operate in the storage sections 1012. An arm antenna implemented in a vertical operation type keeps protruding at the right angle perpendicular to the body 1022 of the scanner 1020 in a normal state, and it can perpendicularly deform when it comes in contact with an article and an obstacle in the storage section 1012 or the vertical wall 1018.

On the other hand, the body 1022 of the scanner 1020 may be made of metal such as steel and aluminum. It is possible to perform a blocking function for preventing the first to fourth antennas 1024-1, 1024-2, 1024-3, and 1024-4 and the first to fourth arm antennas 1034-1, 1034-2, 1034-3, and 1034-4 from performing rearward scanning (that is, toward the front side of the display case 1010) other than the storage sections 1012 of the display case 1010.

In the scanner 1020, a plurality of right distance sensors 1028 and a plurality of left distance sensors 1030 may be disposed with regular intervals in the longitudinal direction of the body 1022, at the left and right sides of the body 1022.

The right distance sensors 1028 and the left distance sensors 1030 sense the distance between facilities and obstacles at the left and right sides, respectively, when the scanner 1020 moves right and left, and they can provide sensing signals to the control unit 26.

That is, the right distance sensors 1028 and the left distance sensors 1030 perform a function for monitoring whether the scanner 1020 can normally move from the right end to the left end and from the left end to the right end of the display case 1010.

The right distance sensors 1028 and the left distance sensors 1030 may be devices that can sense right and left distances. The right distance sensors 1028 and the left distance sensors 1030 may be electronic non-contact sensors such as an infrared sensors and ultrasonic sensors and may be mechanical contact sensors such as limit switch sensors.

The horizontal driving unit 1032 applied to the scanner 1020 according to the first embodiment of the present invention is disposed at the upper portion of the body 1022 and can reciprocate horizontally to the left and right along the guide rail 1016 disposed at the upper end of the display case 110.

Figure 7:
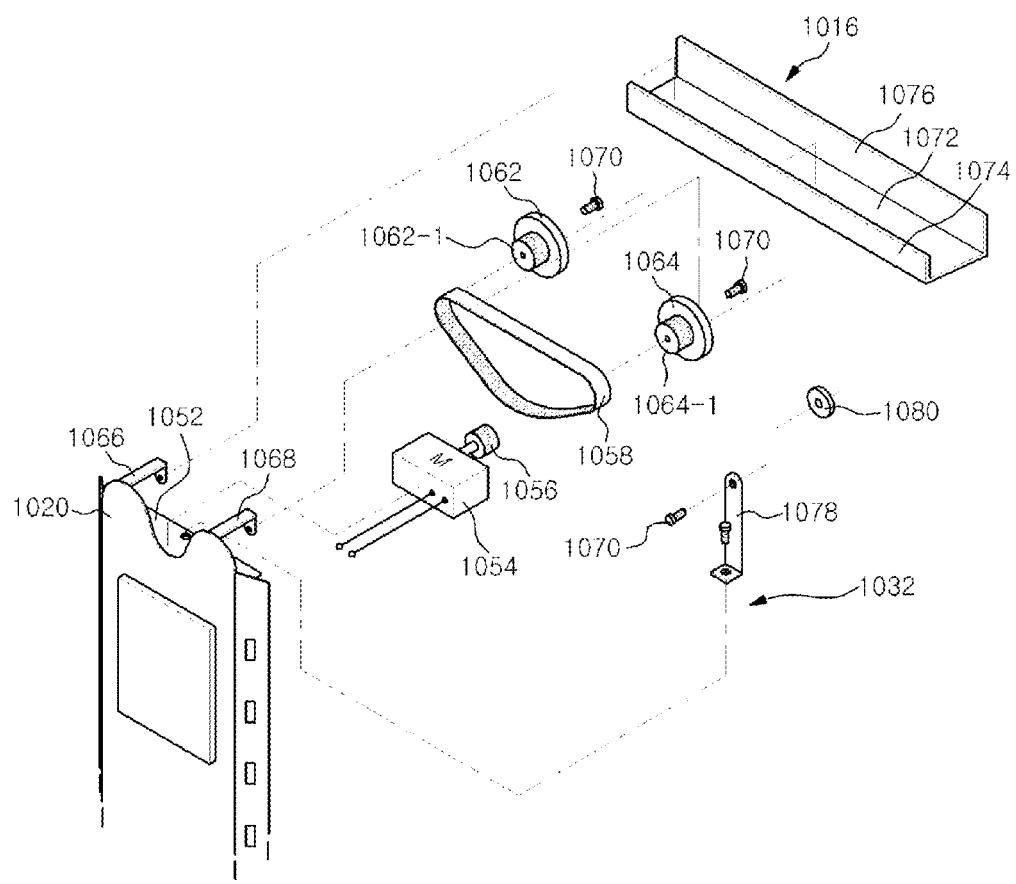
FIG. 7 is an exploded perspective view showing in detail the configuration of an actuating mechanism for a horizontal driving unit of the scanning apparatus according to the first embodiment of the present invention.
Figure 8:
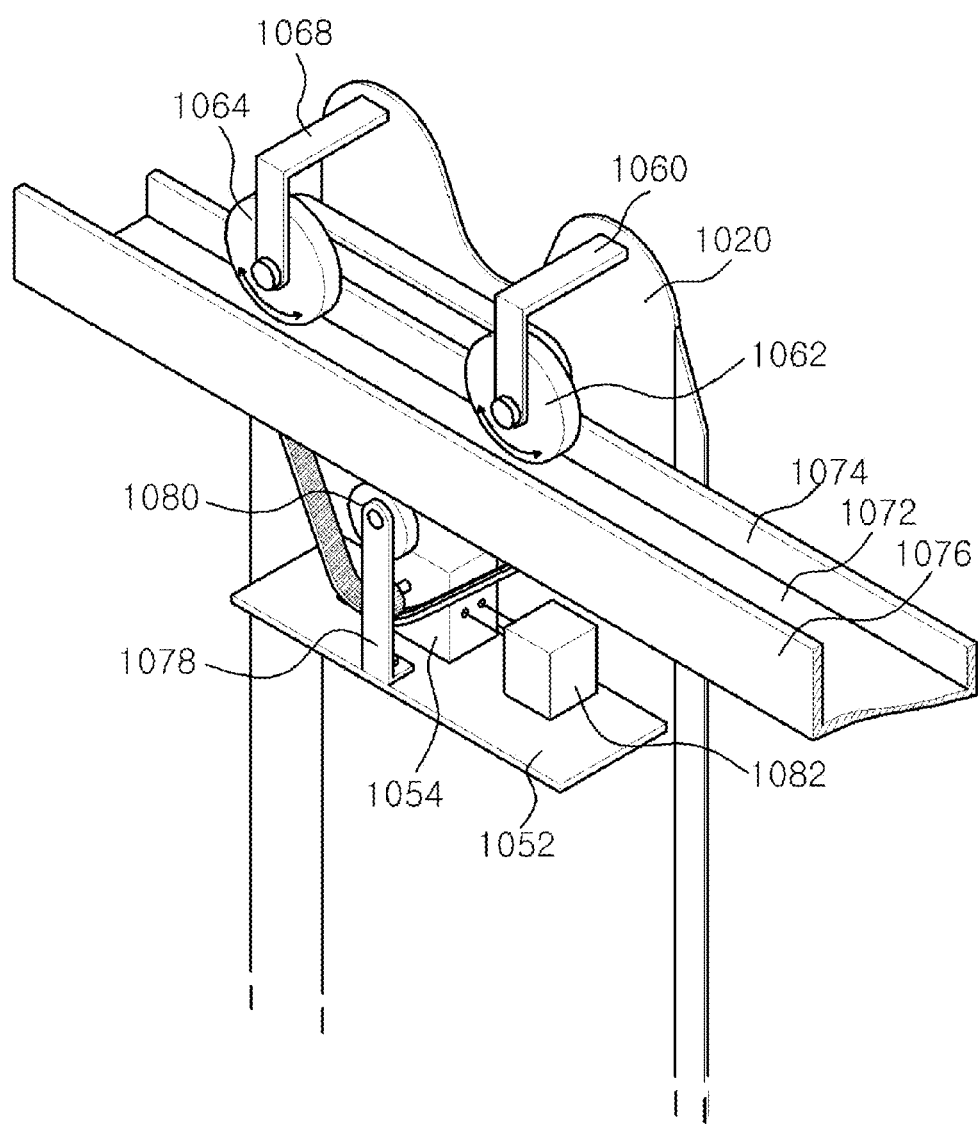
FIG. 8 is a view showing a state when the horizontal actuating mechanism of the scanning apparatus shown in FIG. 7 is horizontally movably disposed on a horizontal guide rail of a display case.

As shown in FIGS. 7 and 8, the horizontal driving unit 1032 may include a motor 1054 fixed to a seat 1052, a rotor 1056 combined with a driving shaft of the motor 1054, a turning belt 1058, first and second wheels 1062 and 1064, first and second wheel support brackets 1066 and 1068, an auxiliary wheel 1080, and an auxiliary wheel support bracket 1078.

The motor 1054 is driven by a predetermined driving voltage, for example, 12V, and can rotate the driving shaft at a predetermined speed. The rotor 1056 combined with the driving shaft is formed in a cylinder shape and a plurality of threads is formed on the outer side of the cylinder shape, such that the threads are fitted to threads formed throughout the inner side of the turning belt 1058, and accordingly, the rotor can rotate the turning belt 1058 with itself.

The turning belt 1058 is engaged with the rotor 1056 at the motor 1054 by the threads formed throughout its inner side and the threads of the rotor, and it can be engaged with first and second interlocking members 1062-1 and 1064-1 attached to the fronts of the first and second wheels 1062 and 1064 by threads formed on the interlocking members. The turning belt 1058 maintains predetermined tension, not being loose, in order to keep engaged with the rotor 1056 and the first and second interlocking members 1062-1 and 1064-1 by the threads.

The first and second wheels 1062 and 1064 are rotatably combined with the first and second wheel support brackets 1066 and 1068 by bolts 1070, and the first and second interlocking members 1062-1 and 1064-1, which are engaged with the turning belt 1058 by threads, can be fixed along the rotation axes of the wheels 1062 and 1064.

On the other hand, the guide rail 1016 may be composed of a bottom rail side 1072, a front guide part 1074, and a rear guide part 1076. The front guide part 1074 protrudes at a predetermined height on the front side in the longitudinal direction of the guide rail 1016 and serves to guide the first and second wheels 1062 and 1064 rolling in contact with the bottom rail side 1072 so that they are not separated to the front side.

Further, the rear guide part 1076 protrudes at a predetermined height on the rear side in the longitudinal direction of the guide rail 1016 and serves to guide the first and second wheels 1062 and 1064 rolling in contact with the bottom rail side 1072 so that they do not move over the rear side.

It is preferable that the bottom rail side 1072 is made of a material having a sufficiently large friction force. Accordingly, the bottom rail side 1072 enables the first and second wheels 1062 and 1064 to move on the rail side without sliding by fully receiving the driving force from the motor 1054.

The auxiliary wheel support bracket 1078 may be fixed to the seat 1052 of the scanner 1020 and may be combined with the auxiliary wheel 1080 to be freely rolled by the bolt 1070.

The auxiliary wheel 1080 can support the body 1022 of the scanner 1020 spaced in the air from the ground so that the body does not incline to the display case 1010, when the first and second wheels 1062 and 1064 roll. Accordingly, the auxiliary wheel 1080 freely rolls without power in close contact with the rear side of the guide rail 1016.

The motor 1054 can receive power from a power source for rotating operation. As a basic power supply unit of the present invention, a disposable primary battery or a power battery 1082 equipped with a rechargeable battery as a secondary battery may be fixed to the seat 1052 of the scanner 1020, so it can supply power to the motor 1054 through a power line.

Figure 9:
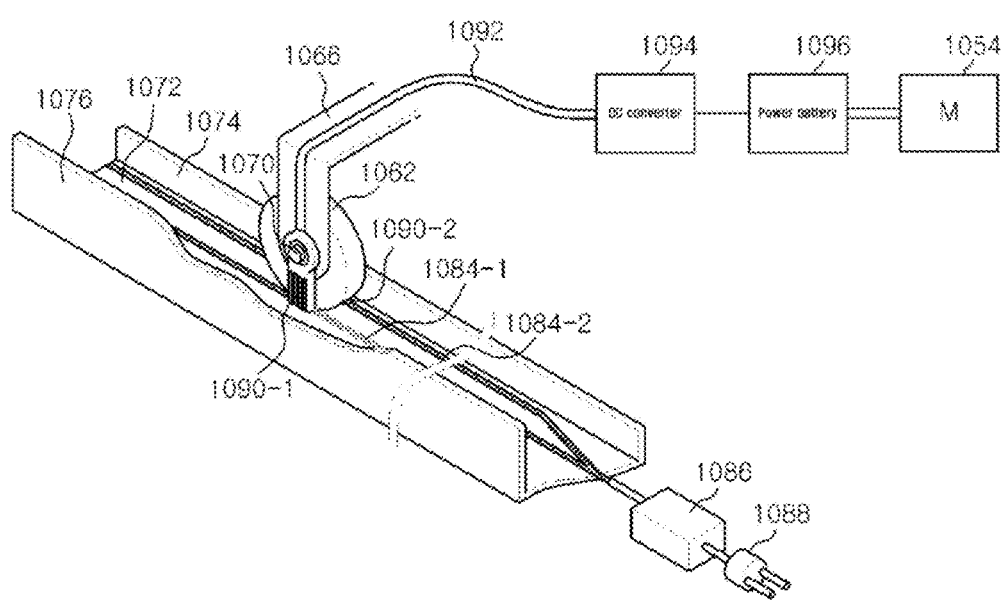
FIG. 9 is a view showing a modified example of a device for supplying power to the scanning device for a display case according to the first embodiment of the present invention.

As in FIG. 9, as a modification of the power supply unit, first and second power supply lines 1084-1 and 1084-2 electrically connected with a power plug 1088 and a stabilizer 1086 may be laid on the bottom rail side 1072 of the guide rail 1016, extending in the longitudinal direction of the bottom rail side 1072. Further, first and second power brushes 1090-1 and 1090-1 supplied with power in contact with the first and second power supply lines 1084-1 and 1084-2 may be fixed by bolts 1070, at both sides of the first and second wheels 62 and 64 rotating on the bottom rail side 1072 in contact with it.

The first and second power brushes 1090-1 and 1090-2 are supplied with common AC power through the stabilizer 1086 and the power plug 1088 connected with the power supply lines 1084-1084-2, respectively, keeping in contact with the first and second power supply lines 1084-1 and 1084-2 regardless of the rotation of the wheels 1062 and 1064.

The first and second power brushes 1090-1 and 1090-2 can be electrically connected with a power line 1092. The power line 1092 may be connected with a DC converter 1094 in the seat 1052 of the scanner 1020. The DC converter 1094 may be connected with the power battery 1096 supplying power to the motor 1054.

The DC converter 1094 can convert the common AC power applied through the power line 1092 from the power brushes 1090-1 and 1090-2 into DC power by rectifying and smoothing it, and then it can supply the converted DC power to the power battery 1096.

The power battery 1096, which is equipped with a built-in rechargeable battery that can be repeatedly charged, can be charged with power for driving the motor 1054 at any time even while the first and second wheels 1062 and 1064 rotate along the bottom rail side 1072 of the guide rail 16.

Figure 10A:
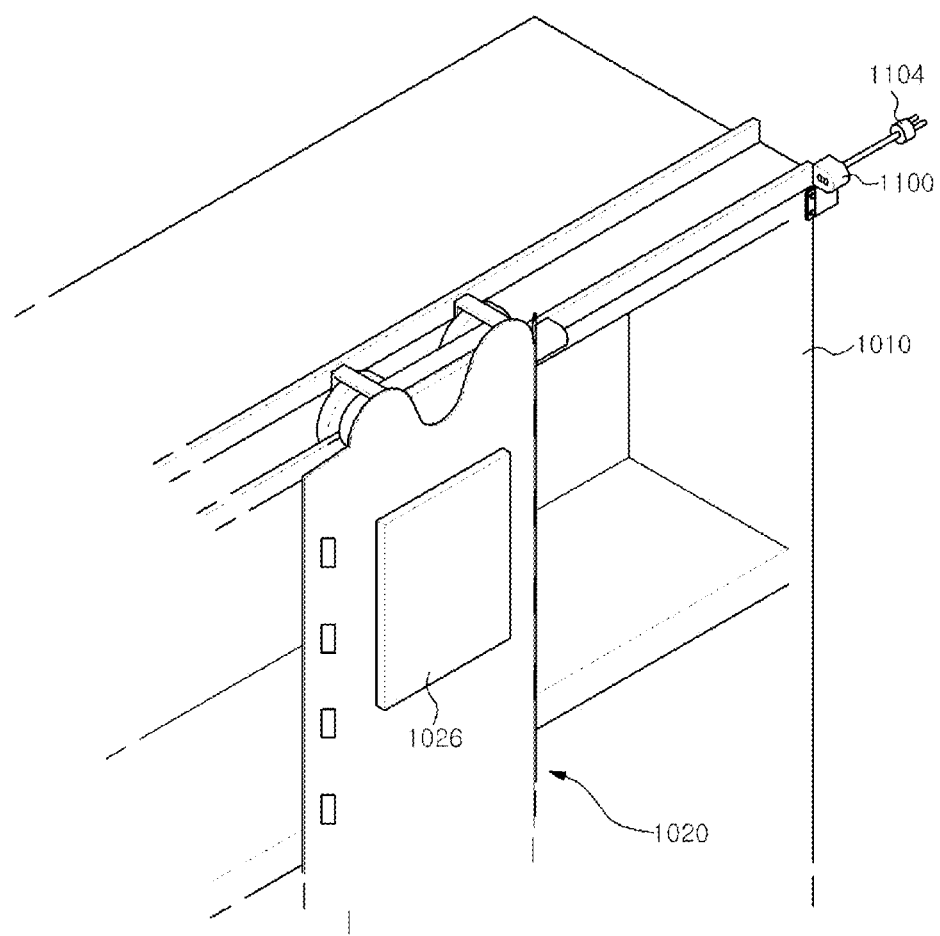
FIG. 10a is a view showing another modified example of a device for supplying power to the scanning device for a display case according to the first embodiment of the present invention.
Figure 10B:
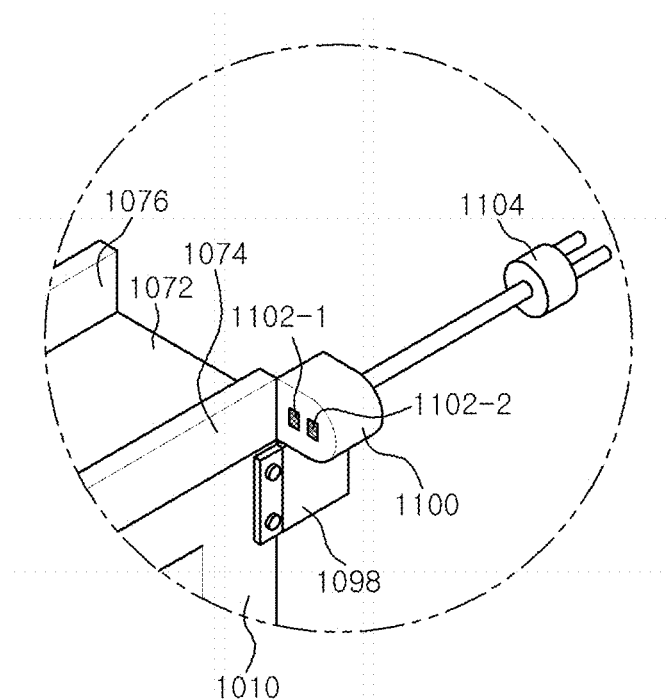
FIG. 10b is an enlarged view showing a power supply block according to the first embodiment of the present invention.
Figure 10C:
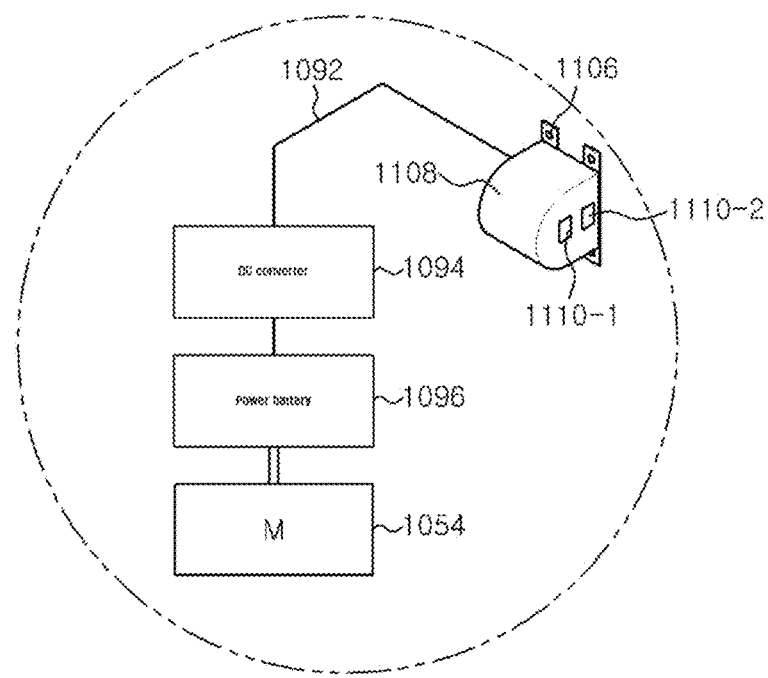
FIG. 10c is an enlarged view showing a power line of the power supply block according to the first embodiment of the present invention.

Further, as shown in FIGS. 10a to 10c, as another example of the power supply unit of the present invention, a power supply block 1100 connected with a power plug 1104 may be fixed to a vertical wall 1018 at one end of the display case 1010 by a fixing member 1098, at a corner of the upper portion (for example, right upper corner) of the display case 1010. Corresponding to the attachment position of the power supply block 1100, a power input block 1108 supplied with common AC power by electric contact, when the scanner 20 moves to the attachment position of the power supply block 1100, may be fixed to the scanner 1020 by a fixing member 1106, at a side of the upper portion (for example, right upper side) of the scanner 1020.

The power supply block 1100 may be equipped with a built-in stabilizer and first and second power supply terminals 1102-1 and 1102-2 may be formed and exposed at the portion where the power supply block comes in contact with the power input block 1108 attached to the scanner 1020.

The power input block 1108 has first and second power input terminals 1110-1 and 1110-2 at positions corresponding to the first and second power supply terminals 1102-1 and 1102-2 of the power supply block 1100 and can be connected with the DC converter 1094 through the power line 1092.

The DC converter 1094 can convert common AC power inputted from the power input block 1108 through the power line into DC power by rectifying and smoothing it, and then it can supply the converted DC power to the power battery 1096.

That is, while the scanner 1020 does not perform the scanning operation, the power supply block 1100 is positioned at one end of the display case 1010 where the power supply block 1100 is attached, and is supplied common AC power through the power input block 1108 to be able to charge the power battery 1096.

Figure 11:
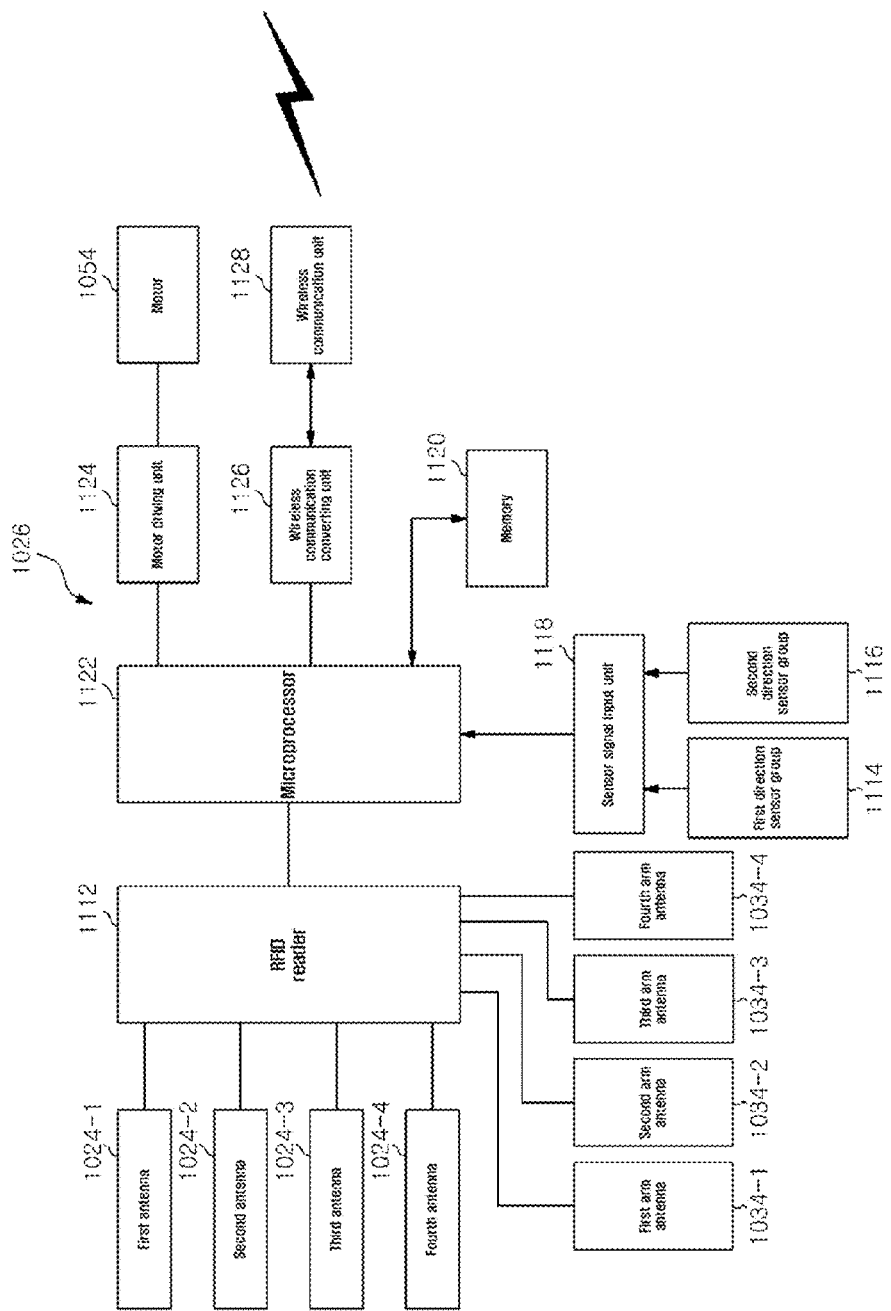
FIG. 11 is a block diagram showing the configuration of a scanning control unit in the scanning apparatus for a display case according to the first embodiment of the present invention.

Next, as shown in FIG. 11, a scanning control device 1026 applied to the first embodiment of the present invention may include the first to fourth antennas 1024-1, 1024-2, 1024-3, and 1024-4, the first to fourth arm antennas 1034-1, 1034-2, 1034-3, and 1034-4, an RFID reader 1112, a first direction sensor group 1114 including the right distance sensors 1028, a second direction sensor group 1116 including the left distance sensors 1030, a sensor signal input unit 1118, a memory 1120, a microprocessor 1122, a motor driving unit 1124, a wireless communication converting unit 1126, and a wireless communication unit 1128.

The RFID reader 1112 is individually connected with the first to fourth antennas 1024-1, 1024-2, 1024-3, and 1024-4 and the first to fourth arm antennas 1034-1, 1034-2, 1034-3, and 1034-4 through conductive lines and can read out tag information signals in a UHF band or a VHF band from the RFID tags received from the antennas.

The first direction sensor group 1114 generally means the group of right distance sensors 1028 arranged with regular intervals at the right side of the scanner 20. Further, the second direction sensor group 1116 generally means the group of left distance sensors 1030 arranged with regular intervals at the left side of the scanner 1020.

The sensor signal input unit 1118 can receive first direction sensor signals generated by the right distance sensors 1028 of the first direction sensor group 1114 and second sensor signals generated by the left distance sensors 1030 of the second direction sensor group 1116, and convert the signals into digital signals that the microprocessor 1122 can recognize.

The memory 120 can store the tag information data about articles in the display case 1010 which are read by the RFID reader 1112 and can store operation order information of the scanner 1020 received from the outside through the wireless communication unit 128.

The memory 1120 keeps the sensor default data for calculating the distance that the scanner 1020 reaches by the sensor signals of the first direction sensor group 1114 and the second direction sensor group 1116 and standard distance data based on the sensor default values, and it can temporarily store the distance data of the reached point calculated on the basis of the sensor signals.

Although the memory 1120 is shown as a single block in the drawings of the present invention, it is preferable to separately provide a device operation program for operating the entire function of the scanner control device, a nonvolatile memory storing nonvolatile information such as the sensor default data, and a volatile memory storing volatile data such as the tag information data, the operation order data, and the distance calculation data.

The microprocessor 1122 can perform control for collecting the tag information data read by the RFID reader 1112 and transmitting it to an external central tag information collecting system by wireless communication through the wireless communication converting unit 1126 and the wireless communication unit 1128.

Further, the microprocessor 1122 calculates the reached point of the display case 1010 due to horizontal movement of the scanner 1020 on the basis of the sensor default data and the standard distance data on the memory 1120 in response to the sensor signals from the first direction sensor group 1114 and the sensor signals from the second direction sensor group 1116 which are inputted through the sensor signal input unit 1118, such that it can control the motor driving unit 124 so that the scanner 1020 can keep moving in the present direction or can change the direction and move in the opposite direction.

On the other hand, the microprocessor 1122 can control the entire scanning function due to horizontal reciprocation of the scanner 1020 basically in accordance with the algorithm for executing the device operation program that controls the operation of the scanning control device.

Further, the microprocessor 1122 receives operation orders from the outside by wireless communication through the wireless communication unit 1128 and the wireless communication converting unit 1126 and can determine the number of times of horizontal reciprocation, the period of horizontal reciprocation, and the time period for horizontal reciprocation in accordance with the operation orders.

The control unit 1026 of the present invention, as a modification, may control the horizontal driving of the scanner 1020 on the basis of key-inputted operation orders from the microprocessor 1122 by mounting a key-input unit on the outer side of the scanning control device and enabling an operator to input various operation orders for horizontal reciprocation of the scanner 1020 through the key-input unit.

The wireless communication converting unit 1126 converts various items of information, such as the collection data of the tag information generated from the microprocessor 1122 or report information relating to the driving control of the scanner 1020, to a signal band that can be wirelessly transmitted, and it can process and decode the wireless communication signals received through the wireless communication unit 1128 into a data type that can be processed by the microprocessor 1122.

The wireless communication unit 1128 can wirelessly transmit the information signals converted through the wireless communication converting unit 1126 or can receive information signal in a specific signal band received from the outside and provide them to the wireless communication converting unit 1126.

The wireless communication unit 1128 can perform bidirectional wireless communication with at least one computing device for monitoring which has a wireless communication function, a smart phone, or a specific exclusive control system, by functioning as an AP (Access Point) having a communication type such as local RF communication and Bluetooth communication.

Next, the second embodiment of the present invention will be described in detail with reference to the accompanying drawings.

Figure 12A:
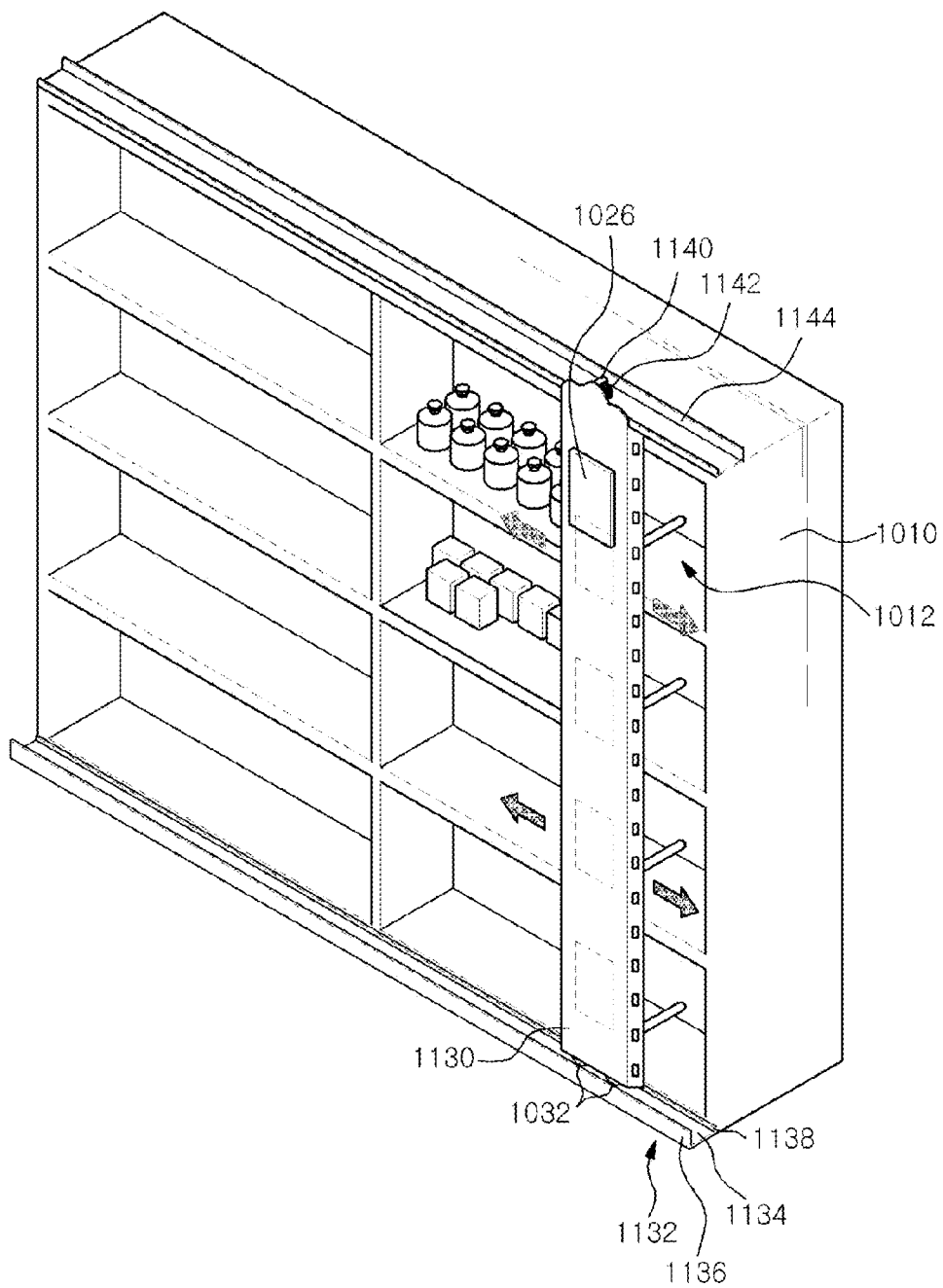
FIG. 12a is a view showing the entire external appearance of a scanning apparatus for a display case according to a second embodiment of the present invention.

FIG. 12a is a view showing the entire external appearance of a scanning apparatus for a display case according to a second embodiment of the present invention, in which the components having the same functions and operations as those of the components in the first embodiment of the present invention are given the same reference numerals and the detailed description is not provided.

As shown in FIG. 12a, the scanning apparatus for a display case according to the second embodiment of the present invention may include a display case 1010 with a plurality of storage sections 1012, and first to fourth antennas 1024-1, 1024-2, 1024-3, and 1024-4 and first to fourth arm antennas 1034-1, 1034-2, 1034-3, and 1034-4, which are vertically arranged with regular intervals. The scanning apparatus may include a scanner that horizontally reciprocates to the left/right with respect to the display case 110 by a horizontal driving unit 130 controlled to operate by a control unit 26, a lower guide rail 1132 that guides horizontal driving of the horizontal driving unit 130, a support wheel 1142 that supports the top of the scanner in conjunction with the scanner horizontally reciprocating so that the scanner is driven in close contact with the front of the display case 1010, and an upper guide rail 1144 that is disposed at the upper portion of the display case 1010 and guides the support wheel 1142 horizontally moving.

The horizontal driving unit 1130 of the scanner according to the second embodiment of the present invention may have the same components and operation as those of the horizontal driving unit 1032 according to the first embodiment of the present invention shown in FIG. 7. However, unlike the first embodiment, the horizontal driving unit 1130 may be disposed not at the upper portion of the display case 1010, but at the lower portion.

Further, the lower guide rail 1132 according to the second embodiment of the present invention is composed of a bottom rail side 1134, a front guide part 1136, and a rear guide part 1138, which have the same shapes and functions as those of the bottom rail side 1072, the front guide part 1074, and the rear guide part 1076 of the guide rail 1016 according to the first embodiment of the present invention. However, unlike the first embodiment, the lower guide rail 1132 may be disposed not at the upper portion of the display case 1010, but at the lower front.

That is, as the first and second wheels 1062 and 1064 of the horizontal driving unit 1130 horizontally reciprocate to the left/right with respect to the display case 1010 while rotating along the lower guide rail 132 on the lower front of the display case 1010, the scanner can scan the tag information of articles in the storage section 1012, using the first to fourth antennas 1024-1, 1024-2, 1024-3, and 1024-4 and the first to fourth arm antennas 1034-1, 1034-2, 1034-3, and 1034-4.

The support wheel 1142 at the upper portion of the scanner is rotatably combined with a support bracket 140 fixed to the upper portion of the scanner and can support the scanner at the upper portion so that the body of the scanner can keep a predetermined distance from the display case 1010 without shaking due to the gravity, by rotating along the upper guide rail 1144 at the front end of the display case 1010.

For the scanner according to the second embodiment of the present invention, similar to the first embodiment of the present invention, a power battery with a primary battery or a secondary battery may be individually provided or a power supply unit that charges a battery with commercial AC power that keeps supplied from the outside may be applied.

Figure 12B:
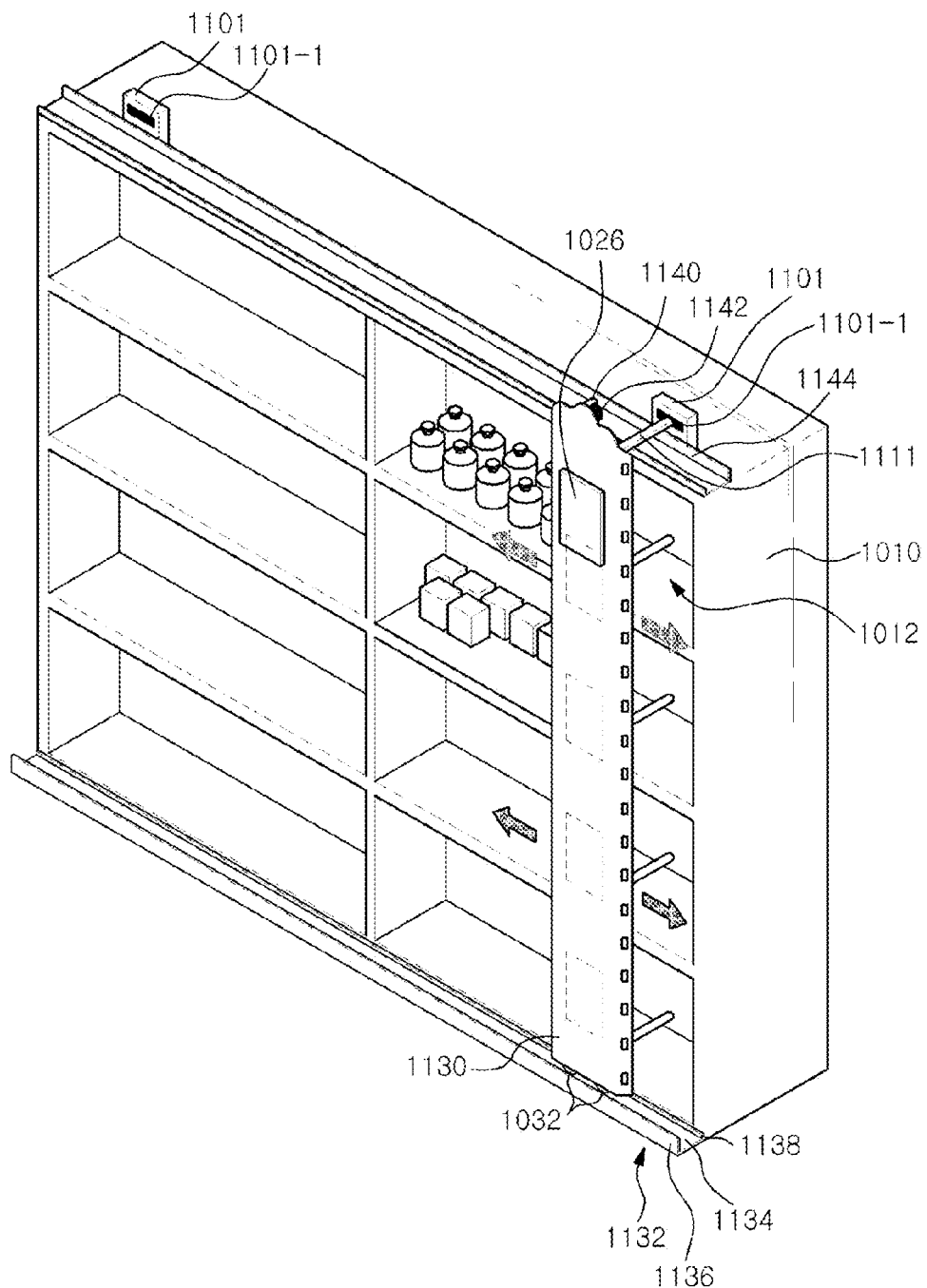
FIG. 12b is a view showing the entire external appearance of a scanning apparatus for a display case according to a modified example of the second embodiment of the present invention.

As shown in FIG. 12b, in the scanning apparatus according to a modified example of the second embodiment, a power supply input block 1111 with a charging input terminal (not shown) may be disposed at the scanner and a charging station 1101 with a charging input terminal 1101-1 that can come in contact with the charging input terminal may be disposed at the display case.

For example, with the scanner moving along the upper guide rail 1144 of the display case 1010 or stopped, when the charging input terminal of the charging input block 1111 comes in contact with the charging input terminal 1101-1 of the charging station 1101, the charging input block 1111 of the scanner can be charged with AC power from the charging station 1101.

Next, a third embodiment of the present invention will be described in detail with reference to the accompanying drawings.

Figure 13:
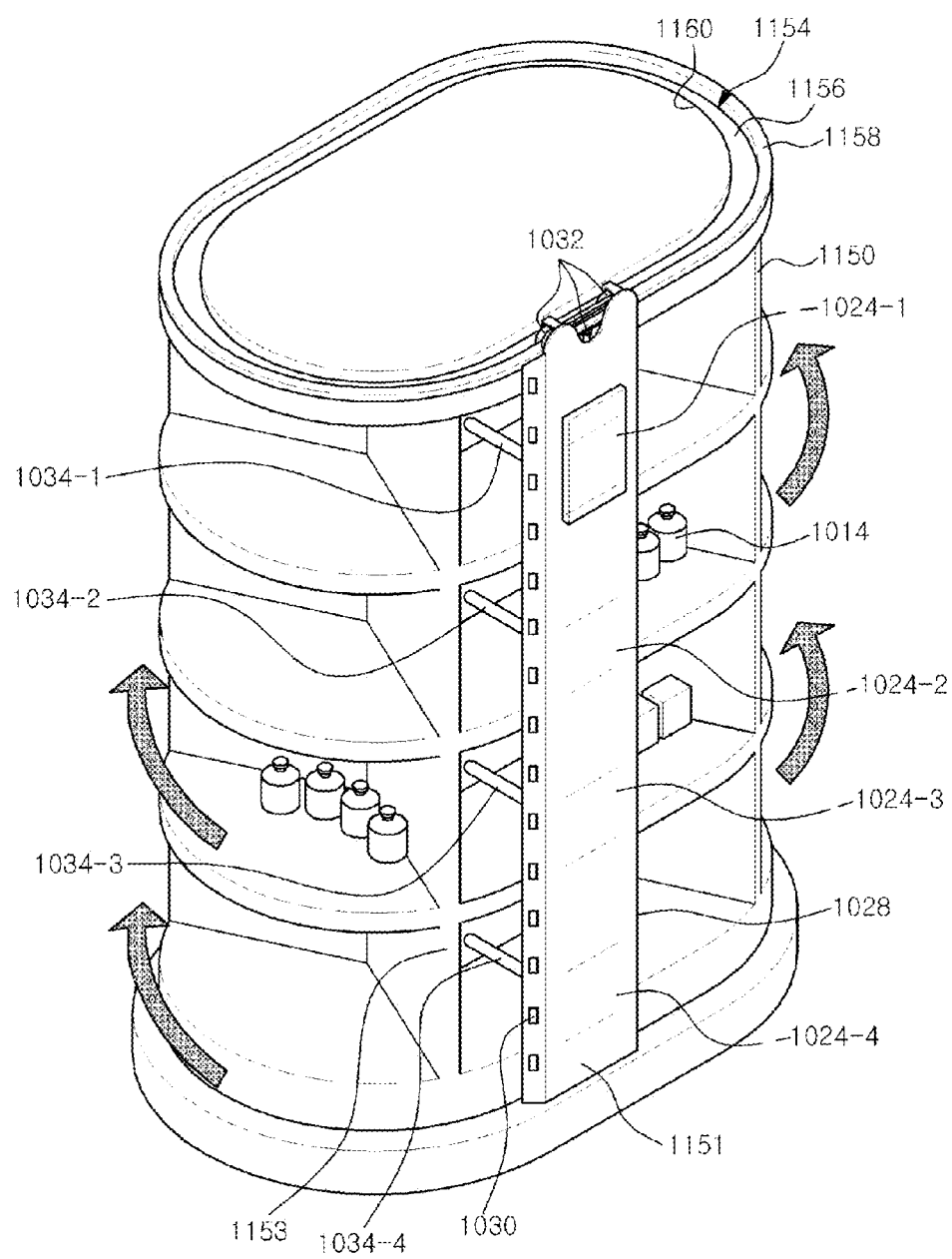
FIG. 13 is a view showing the entire external appearance of a scanning apparatus for a display case according to a third embodiment of the present invention.

FIG. 13 is a view showing the entire external appearance of a scanning apparatus for a display case according to a third embodiment of the present invention, in which the components having the same functions as those in the first embodiment of the present invention are given the same reference numerals and the detailed description is not provided.

The scanning apparatuses for a display case according to the first embodiment and the second embodiment of the present invention were applied to the display case 1010 formed in a tetrahedral shape with predetermined width and depth.

In contrast, as shown in FIG. 13, the scanning apparatus according to the third embodiment of the present invention can be applied to a cylindrical display case 1150 having a plurality of storage sections having a circular round shape and continuously arranged.

That is, in the cylindrical display case 1150, a plurality of layers of storage sections are continuously arranged around the cylindrical shape, various articles 1014 with an RFID tag can be stored in the storage sections, and the outer sides of the storage sections can be supported and the storage sections can be divided by a vertical wall 1153, respectively.

A scanner 1151 applied to the cylindrical display case 1150, similar to the scanner 1020 according to the first embodiment of the present invention, includes first to fourth antennas 1024-1, 1024-2, 1024-3, and 1024-4 and first to fourth arm antennas 1034-1, 1034-2, 1034-3, and 1034-4, which are vertically arranged with regular intervals and can be horizontally moved to the left or right by a horizontal driving unit 1032 controlled to operate by a control unit 1026. However, since the display case 1150 equipped with the scanner 1151 of the present invention has a cylindrical shape, the scanner may reciprocate to the left/right with respect to any one point on the display case 1150 or may selectively continuously rotate horizontally in any one of the left and the right, in accordance with control orders from the control unit 1026.

Further, the scanner 1151 according to the third embodiment of the present invention, similar to the scanner 1020 applied to the first embodiment, may be driven with the horizontal driving unit 1032, which is disposed at the upper portion of the scanner, held on a guide rail 1154 having a circular path at the upper end of the display case 1150, at a predetermined height from the floor where the display case 1150 is installed.

The configuration of the horizontal driving unit 1032 has the same components and driving mechanism as those of the configuration of the horizontal driving unit according to the first embodiment. However, since the horizontal driving unit 1032 according to the third embodiment of the present invention has to horizontally turn the scanner 1151 around the cylindrical display case 1150, it is required to change a portion of the shape to fit to the circular path of the guide rail 1154 composed of continuous round shapes.

Although the guide rail 1154 having a circular path has a circular continuous path formed by continuously connecting round shapes to fit to the circular shape of the display case 1150, it may be composed of a bottom rail side 1156, a front guide part 1158, and a rear guide part 1160, similar to the guide rail 1016 according to the first embodiment of the present invention.

Figure 14:
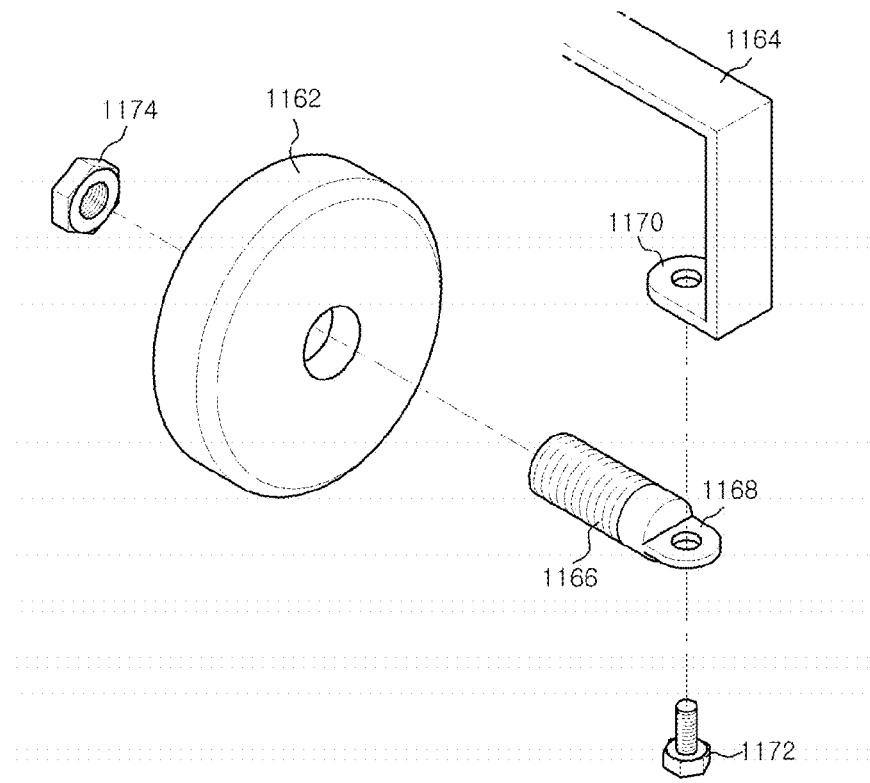
FIGS. 14 and 15 are views showing a wheel for circulating along a circular path of a cylindrical display case, in the scanning apparatus for a display case according to the third embodiment of the present invention.
Figure 15:
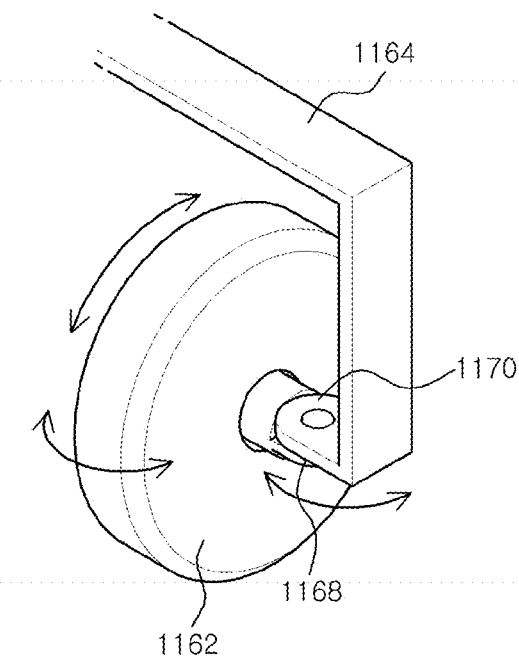
Figure 16:
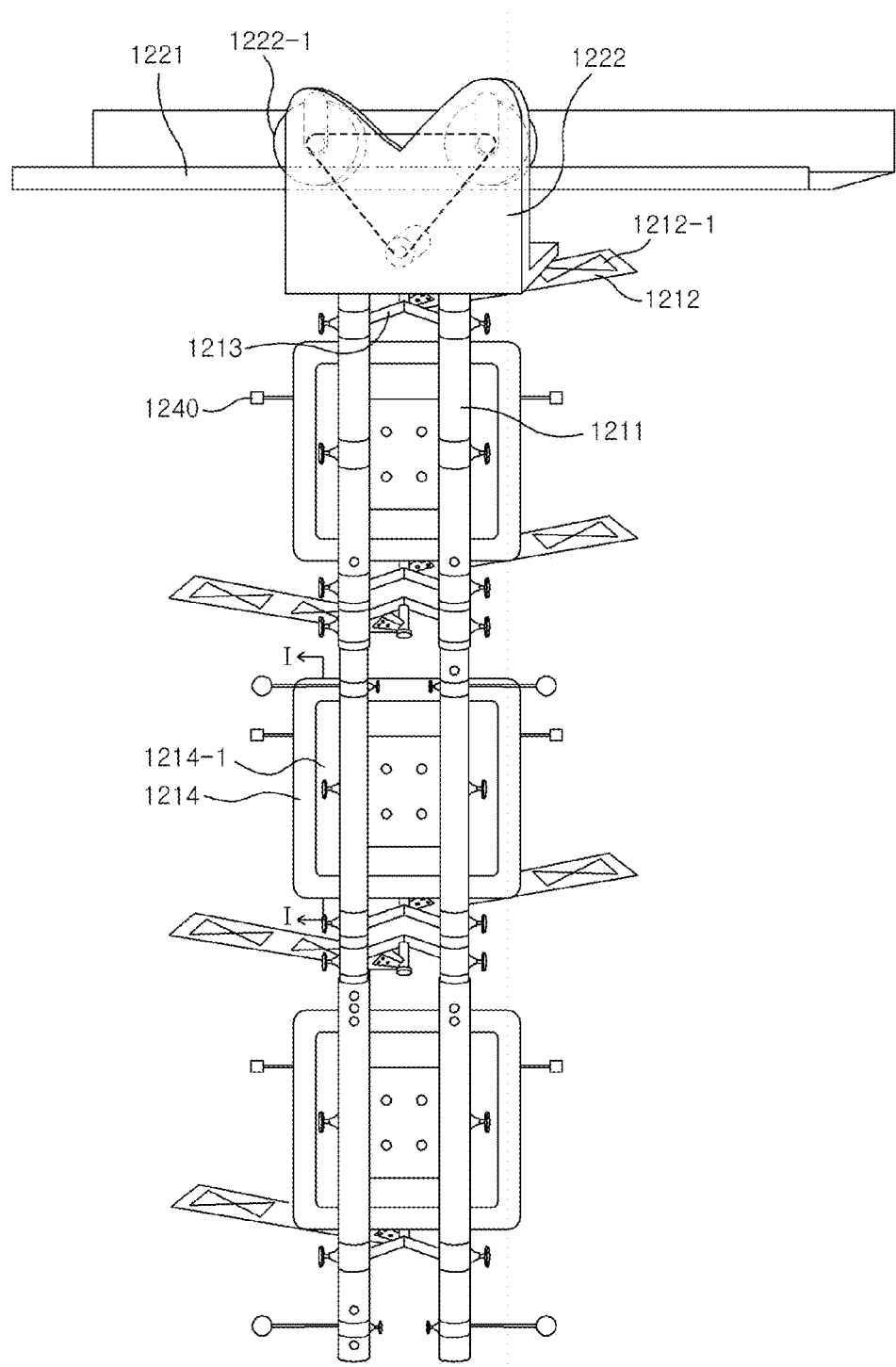
FIG. 16 is a front perspective view showing a scanning apparatus for a display case according to a fourth embodiment of the present invention.
Figure 17:
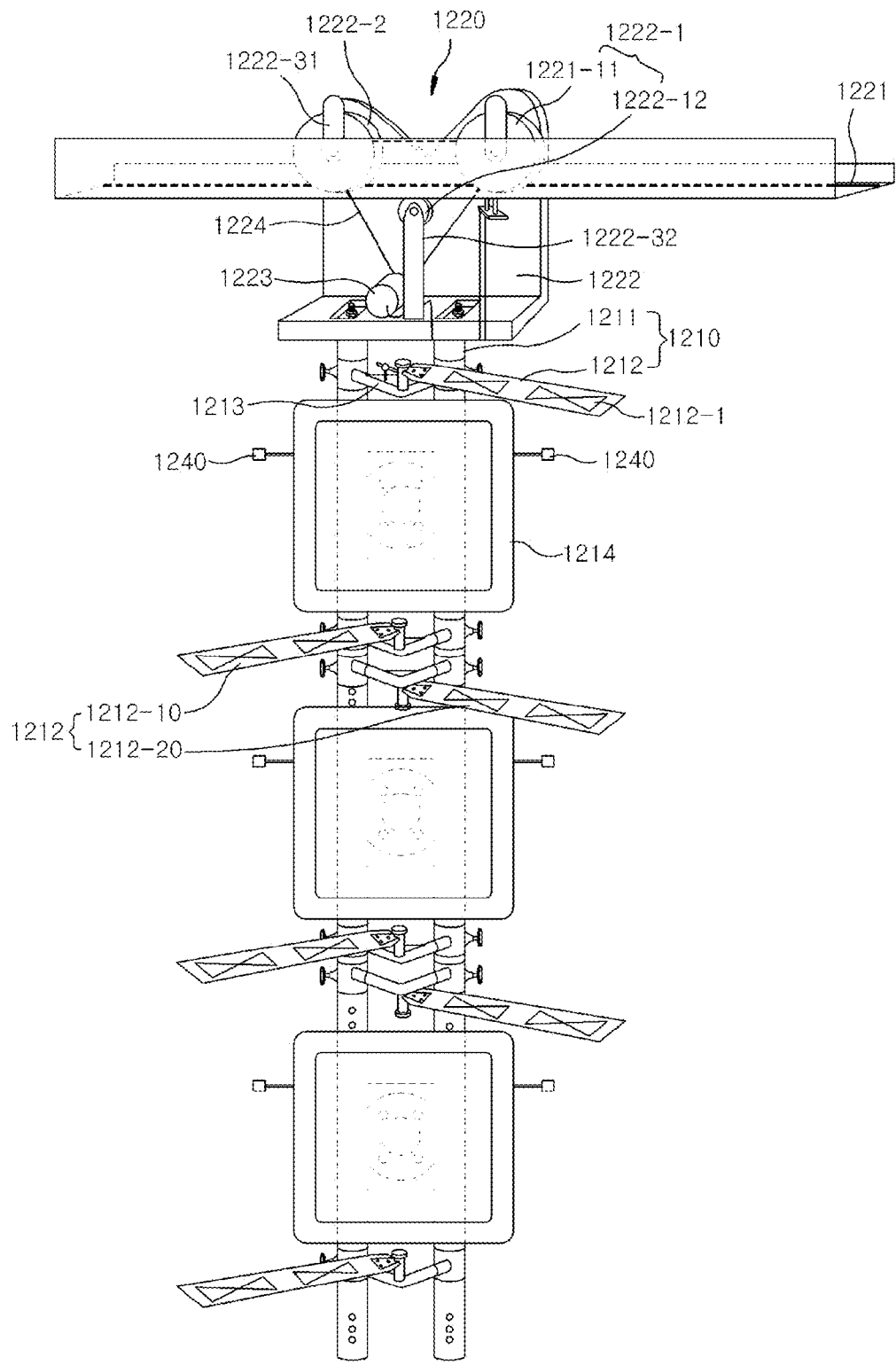
FIG. 17 is a rear perspective view showing the scanning apparatus for a display case according to a fourth embodiment of the present invention.
Figure 18:
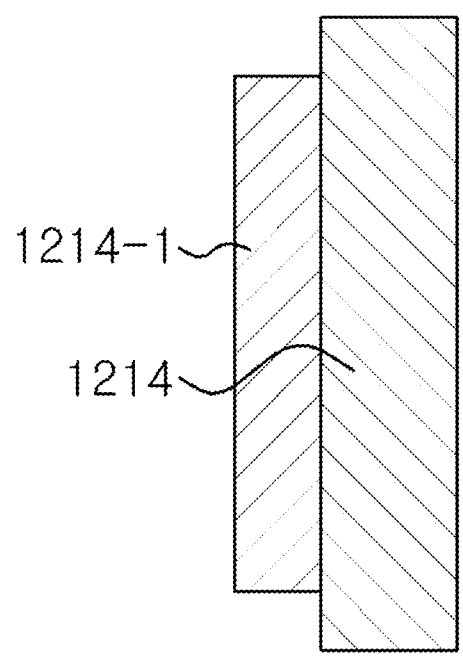
FIG. 18 is a cross-sectional view taken along line I-I in FIG. 16.
Figure 19:
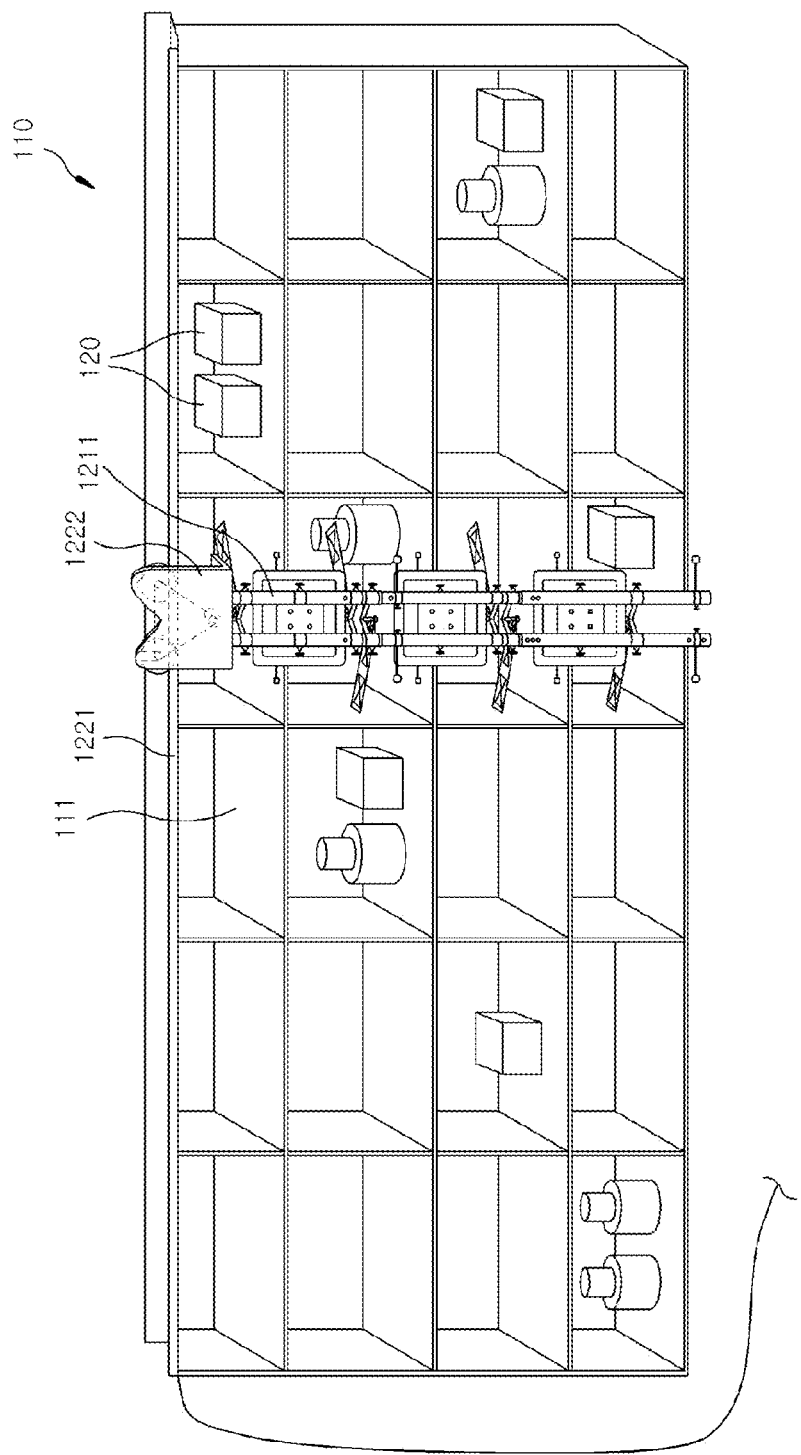
FIG. 19 is a view showing a display case equipped with the scanning apparatus for a display case according to the fourth embodiment of the present invention.
Figure 20:
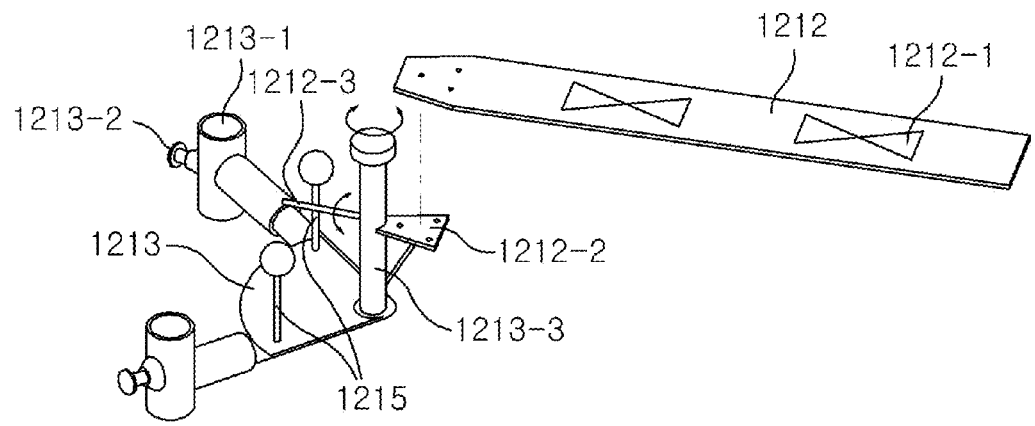
FIG. 20 is an enlarged view showing a scanner of the scanning apparatus for a display case according to the fourth embodiment of the present invention.

The horizontal driving unit 1032 may have a modified wheel structure, as shown in FIGS. 14 and 15, to smoothly run along the round shape of the guide rail 1154 having the circular path, without the wheel separating from the path and without being locked to the front guide part 1158 or the rear guide part 1160.

That is, as shown in FIGS. 14 and 15, the wheel support bracket 1164 fixed to the upper portion of the scanner 1151 may be bent in a U-shape. The support bracket 1164 may have an arc-shaped coupling portion 1170 that is coupled to the wheel 1162, at the end of the bending portion. In a rotary bolt 1166, which is combined with a nut 1174 through a hole at the center of the wheel 1162, a fastening portion 1168 of which the front end is formed in an arch shape, the same as the coupling portion 1170 of the support bracket 1164, may be rotatably coupled to the coupling portion 1170 through the bolt 1172.

Accordingly, since the arc-shaped coupling portion 1170 and fastening portion 1168 of the wheel support bracket 1164 and the wheel 1162, respectively, are coupled to be rotatable forward/backward, the wheel 1162 can turns without moving straight while tilting without a problem along the round shape of the guide rail 1154 having the circular path.

Further, for the scanner 151 according to the third embodiment of the present invention, similar to the first embodiment of the present invention, a power battery with a primary battery or a secondary battery may be individually provided, or, as shown in FIGS. 9 and 10, a power supply unit that charges a battery with commercial AC power that keeps supplied from the outside may be applied.

On the other hand, in a scanning system for a display case according to the third embodiment of the present invention shown in FIG. 13, the horizontal driving unit 1032 is disposed at the upper portion of the scanner 1151 and the guide rail 1154 having a circular path is disposed at the upper end of the display case 1150 to correspond to the position of the horizontal driving unit 1032, but the present invention is not limited thereto, the horizontal driving unit may be disposed at the lower portion of the body of the scanner 1151 and a guide rail that guides the horizontal driving unit 1032 may be correspondingly disposed at the lower portion of the cylindrical display case 1150, similar to that described in the second embodiment.

As exemplified in the second embodiment of the present invention, it is preferable that a support wheel and an upper guide rail are additionally disposed at the upper portions of the scanner 1151 and the cylindrical display case 1150, respectively, to support the scanner 1151 so that the scanner 1151 can keep a predetermined distance from the display case 1150 without the body shaken due to the gravity, when it turns around the display case 1150.

As shown in FIGS. 16 to 24, the present invention according to a fourth embodiment includes a scanner 1210 having a scanner body 1211 and a scanner arm 1212, a horizontal driving unit 1220 for horizontally moving the scanner 1210, a distance sensor 1240 that senses objects or obstacles in the movement direction of the scanner 1210, and a controller 1230 controlling the scanner 1210, the horizontal driving unit 1220, and the distance sensor 1240.

In detail, in order to scan an article 120 in a storage section 111 of the display case 110, the scanner 1210 is equipped with a plurality of antennas 1212-1 that can recognize signals from a wireless recognition part on the article 120.

In this embodiment an RFID-based technology is applied to the wireless recognition part on the article 120 and the antenna 1212-1 of the scanner 1210. An RF tag is attached as the wireless recognition part to the article 120 and antenna 1212-1 that can receive an RF signal from the RF tag on the article 120 is mounted on the scanner 1210. Obviously, other than the RFID-based technology, other types of wireless recognition technologies that can wirelessly transmit the information of the articles 120 may be applied in various ways to the present invention.

The scanner 1210 includes a scanner body 1211, a mounting bracket 1213, and a scanner arm 1212. The scanner body 1211 is provided in a pair having a predetermined length perpendicular to the display case 1211 and the pair of scanner bodies 1211 are connected by a fixing plate 1214-1. The fixing plate 1214-1 includes an external cover and is arranged to face an article and it may have a patch antenna therein. Further, on the fixing plate 1214-1, a blocking layer 1214 that blocks signals may be disposed or a display device (not shown) that displays the information etc. of a scanned article may be mounted.

The scanner bodies 1211 are each composed of a plurality of scanner bars 1211-10~1211-40 connected by the mounting bracket 1213. In particular, a plurality of mounting holes 1211-1 in which bolts 1213-2 for fixing the scanner bars 1211-10~1211-40 and the mounting brackets 1213 are longitudinally spaces, when the scanner bars 1211-10~1211-40 are combined by the mounting brackets 130, the entire length of the scanner 1210 can be adjusted in accordance with the fixing positions of the bolts 1213-2 to the mounting holes 1211-1.

The mounting brackets 1213 of the scanner 1210 are disposed between the scanner bars 1211-10~1211-40, such that they connect the opposite ends of the scanner bars 1211-10~1211-40 with each other and the scanner arm 1212 is rotatably mounted on at one end of each of the mounting brackets.

To this end, an insertion holder 1213-1, an elastic rotary bar 1213-3, and an arm sensor 1215 are combined with the mounting bracket 1213. The insertion holder 1213-1 is a through-hole in which an end of each of the scanner bars 1211-10~1211-40 are inserted, the ends of the scanner bars 1211-10~1211-40 facing each other are inserted on each other and the inserted ends of the scanner bars 1211-10~1211-40 are fixed by the bolt 1213-2. The elastic rotary bar 1213-3 is rotatably fixed to the mounting bracket 1213 by a spring bearing (not shown) and has one end to which the base end of the scanner arm 1212 is connected by a connecting pin 1212-2 and the other end where a contact pin 1212-3, which can come in contact with a pair of arm sensors 1215 when the scanner arm 1212 rotates, is formed. The arm sensors 1215, which are sensors that sense the number of times of reciprocating rotation of the scanner arm 1212 and send sensed tapping sensing signals to the controller 1230, are disposed in a pair at a predetermined distance from each other in the rotation direction of the scanner 1212, with the contact pin 1212-3 therebetween.

Figure 21:
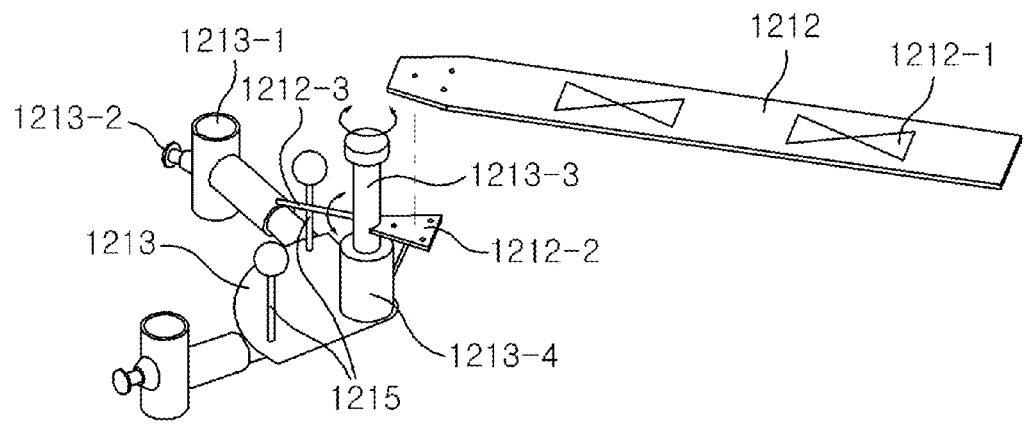
FIG. 21 is an enlarged view showing a scanner of a scanning apparatus for a display case according to a modified example of the fourth embodiment of the present invention.
Figure 22:
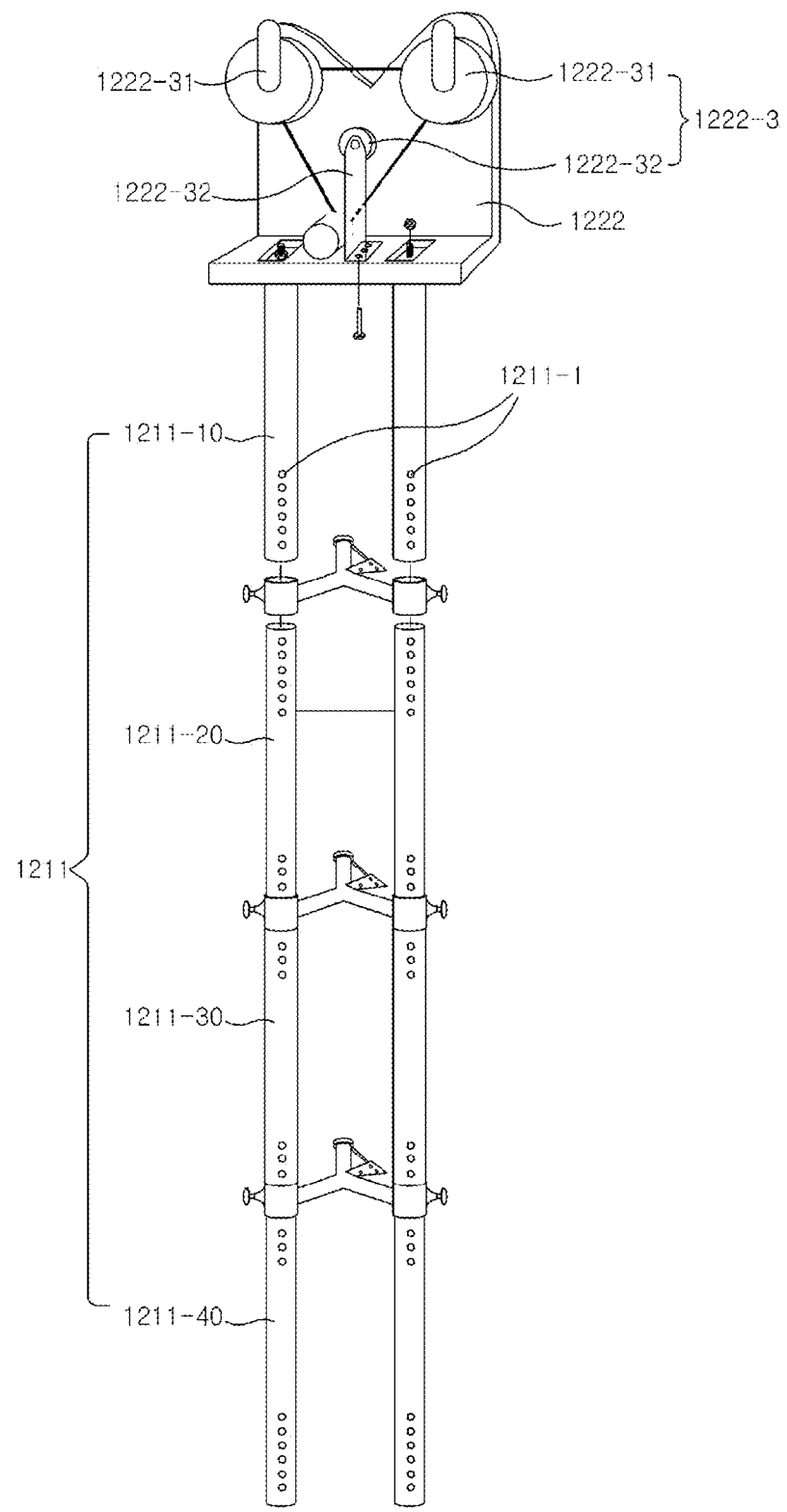
FIG. 22 is an exploded perspective view showing a portion of a horizontal driving unit and a scanner body of the scanning apparatus for a display case according to the fourth embodiment of the present invention.

As shown in FIG. 21, as a modified example of this embodiment, a tapping motor 1213-4 for automatically and repeatedly rotating the scanner arm 1212 may be mounted on the mounting bracket 1213. The tapping motor 1213-4 is connected to the base end of the scanner arm 1212 by the elastic rotary bar 1213-3 or a rotary shaft (not shown) and operates in response to an operation signal from the controller 1230, such that it can rotate the scanner arm 1212 for a predetermined number of reciprocation times.

The scanner arm 1212 of the scanner 1210 is rotatably mounted on the scanner body 1211 by the mounting bracket 1213 and scans the article 120 in the storage sections 111 on each layer of the display case 1211, using the antennas 1212-1. The antennas 1212-1 are patterned in a polygon in a predetermined area on the scanner 1210 and can perform wireless or wire communication with a reader 1231 of the control unit 1230.

In this embodiment, the scanner arm 1212 is composed of a first-directional scanner arm 1212 deploying in one direction in the storage section 111 and a second-directional scanner arm 1212 deploying in the other direction of the storage section 111, and accordingly, the scanner arm 1212 can effectively scan articles 120 even at both edges in the storage section 111.

Further, the scanner arm 1212 may be configured such that the length can be adjusted, by connecting a plurality of scanner arms having different diameters in a telescopic type.

The distance sensor 1240 senses objects or obstacles in the movement position of the scanner 1210 and sends the sensed distance sensing signal to the controller 1230.

The distance sensors 1240 are vertically spaced at both edges of the scanner 1210, in more detail, at both edges of the fixing plate 1214-1 of the scanner 1210 and sense obstacles in the horizontal direction of the scanner 1210, such that it is possible to check whether the scanner 1210 can normally move to both ends of the display case 1211.

In this embodiment, the distance sensors 1240 may be electronic non-contact sensors such as an infrared sensor and an ultrasonic sensor or may be a mechanical non-contact sensor such as a limit switch sensor.

In particular, the distance sensors 1240 may find out the positions of the storage sections 111 horizontally arranged in the display case 110 by recognizing adjacent separators of the display case 110. The distance sensors 1240 may sense the separators of the display case 110, using a laser sensor, or may recognize marks given in advance on the separators of the display case 110.

Further, when a start mark and an end mark showing the start and the end of scanning are given on the separators at the rightmost end and the leftmost end of the display case 110, the display sensors 1240 can sense the start mark and the end mark at the rightmost end and the leftmost end on the display case 110, such that the scanner 1210 can start moving or stop moving at the positions.

Figure 23:
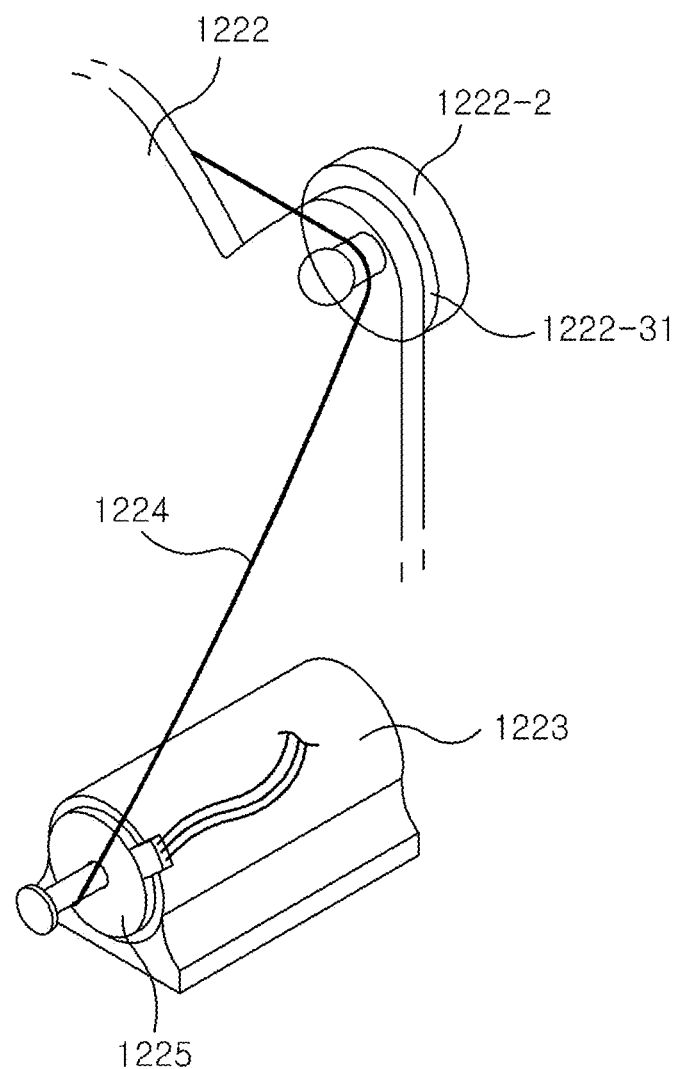
FIG. 23 is an enlarged view showing the horizontal driving unit of the scanning apparatus for a display case according to the fourth embodiment of the present invention.

As shown in FIG. 23, the horizontal driving unit 1220, which is a driving device for moving the scanner 1210 in the horizontal direction of the display case 110, may include a guide rail 1221, a moving bracket 1222, a driving motor 1223, and a wheel sensor 1225.

The guide rail 1221 of the horizontal driving unit 1220, which is a rail extending in the horizontal direction of the display case 110 at the upper end of the display case 110, guides the movement path of the moving bracket 1222. The guide rail 1221 may be provided with a power communication line (not shown) for implementing a PLC (Power Line Communication Network) to be described below, and when the PLC is used, power and data can be simultaneously transmitted to the distance sensor 1240, the horizontal driving unit 1220, the arm sensor 1215, and the wheel sensor 1225 etc.

The moving bracket 1222 of the horizontal driving unit 1220 is mounted to be movable along the guide rail 1221 by a driving roller 1222-1 having a rail locking groove 1222-2, and it moves in one direction or the other direction of the display case 110, when the driving motor 1223 operates. The driving roller 1222-1 is composed of a main driving roller 1222-11 disposed over the guide rail 1221 and connected to the driving roller 1222-1 to be driven by a circulating belt 1224, through a main support member 1222-31, and a sub-driving roller 1222-12 supporting the guide rail 1221 from under, through a sub-support member 1222-32.

The driving motor 1223 of the horizontal driving unit 1220 is connected with the driving roller 1222-1 by the circulating belt 1224 and the circulating belt 1224 is a closed-loop belt surrounding the driving shaft of the driving motor 1223 and the rotary shaft of the driving roller 1222-1 and transmits a driving force of the driving motor 1223 to the driving roller 1222-1. The wheel sensor 1225 measures the number of revolutions in conjunction with the driving shaft of the driving motor 1223 and can convert the measured number of revolutions into the movement distance of the scanner 1210. The converted movement distance of the scanner 1210 is converted into a movement sensing signal and sent to the controller 1230.

Figure 24:
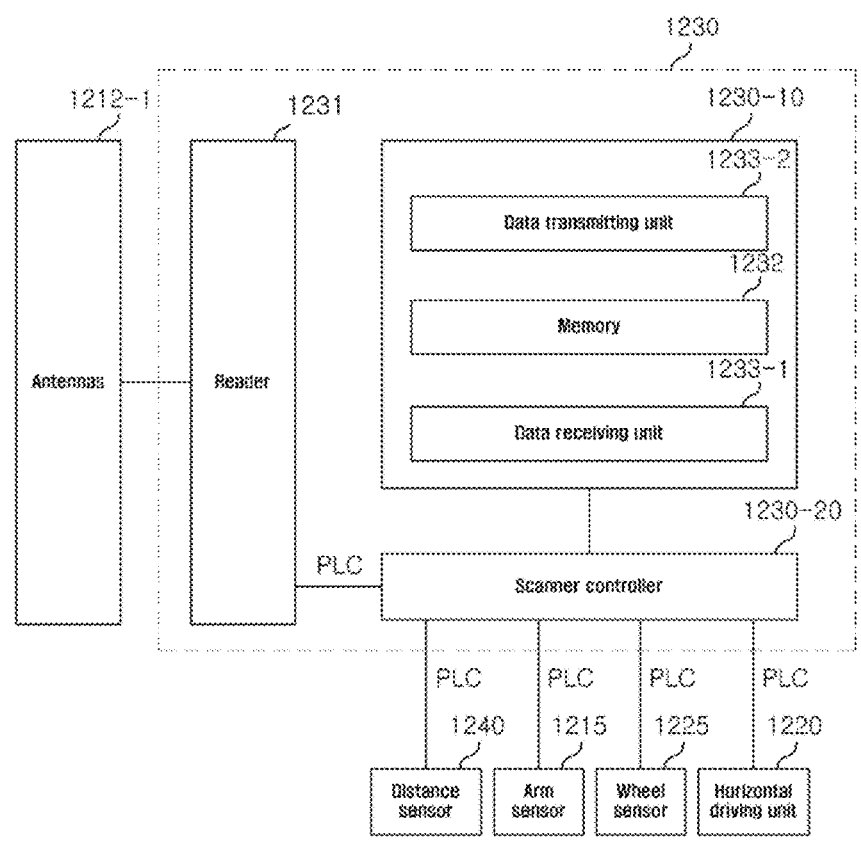
FIG. 24 is a block diagram showing a control unit of the apparatus for a display case according to the fourth embodiment of the present invention.

As shown in FIG. 24, the controller 1230 controls the horizontal movement of the scanner 1210 and collects information data of the article 120 from scan information received from the scanner 1210. In this embodiment, the controller 1230 is defined as a concept including a reader 1231, a local controller 1230-10 and a scanner controller 1230-20.

The reader 1231 of the controller 1230 receives scan information from the antennas 1212-1 and reads the article information data of the scanned article 1212. In this embodiment, the reader 1231 reads tag information signals in a UHF band or a VHF band from the RF tag on the article 120 received from the antennas 1212-1.

The local controller 1230-10 of the controller 1230, which includes a data receiving unit 1233-1, a memory 1232, a data transmitting unit 1233-2, selects the position of an article 120 having been the most scanned as the actual position of the article 120, when the scanner 1210 reciprocates, and collects the article information data of the article 120 from the scan information of the selected article 120.

In particular, when the scanner 1210 scans articles 120, the local controller 1230-10 selects the position of the article 120 having the number of recognition of position tag having the information about the position of the display case 110, and the number of recognition of the most scanned position tag and the number of recognition of the most scanned product tag in the number of recognition of product tags having the actual information of products, as the actual position of the article 120, compares the position information and the product information of the selected article 120 with the position information and the product information of registered articles 120, and collects the article information data of the selected article 120, when the position information and the product information of the selected article 120 and the registered article 120 are the same.

The scanner controller 1230-20 of the controller 1230 applies an operation signal to the horizontal driving unit 1220 so that the scanner 1210 can horizontally reciprocate along the storage section 111.

For example, the scanner controller 1230-20 calculates a movable distance of the scanner 1210 by comparing an initially inputted standard distance data value with a distance sensing signal received from the distance sensor 1240 of the scanner 1210 or calculates a movable distance of the scanner 1210 by comparing the initially inputted standard distance data value with a movement sensing signal of the scanner 1210 received from the wheel sensor 1225 of the horizontal driving unit 1220, and then applies an operation signal to the horizontal driving unit 1220 in consideration of the calculated movable distance.

The scanner controller 1230-20 can be connected with the reader 1231, the distance sensor 1240, the horizontal driving unit 1220, the arm sensor 1215, and a wheel sensor 1225, using a PLC (Power Line Communication). Accordingly, in the present invention, it is possible to simultaneously supply power and data, using one power communication line that can send a high-frequency signal of tens or more of MHz with an AC frequency, such that there is no need of a separate power line and a data transmission line for supplying power and data.

Figure 25:
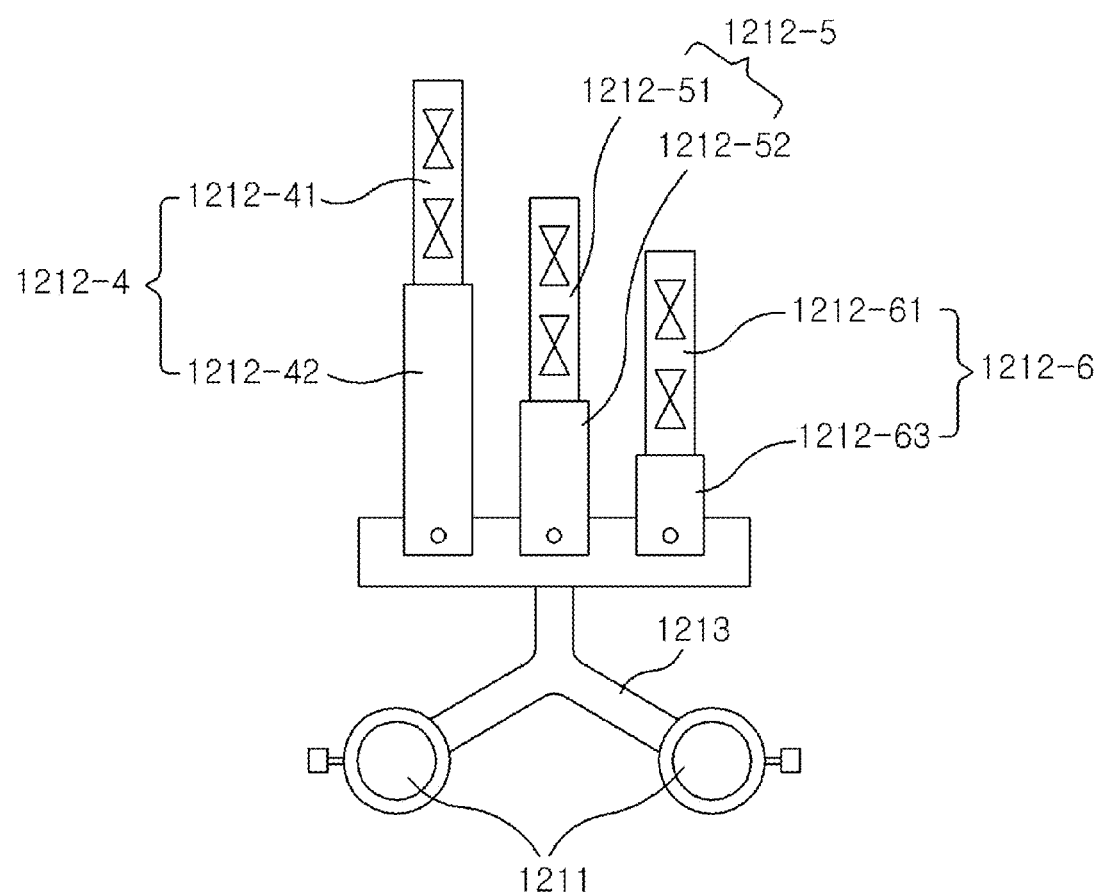
FIG. 25 is an enlarged view showing a scanner of a scanning apparatus for a display case according to another modified example of the fourth embodiment of the present invention.

As shown in FIG. 25, the present invention according to another modified example of the fourth embodiment may include a scanner 1210 having a plurality of scanner arms 1212 having different lengths, a horizontal driving unit 1220 for horizontally moving the scanner 1210, a distance sensor 1240 that senses objects or obstacles in the movement direction of the scanner 1210, and a controller 1230 controlling the scanner 1210, the horizontal driving unit 1220, and the distance sensor 1240.

The configuration of the horizontal driving unit 1220, the distance sensor 1240, and the controller 1230 is almost the same as the configuration of the horizontal driving unit 1220, the distance sensor 1240, and the controller 1230 described above, so the detailed description is not provided.

However, the scanner arms of the scanner 1210 may have different lengths in consideration of the arrangement of articles 120 at different positions in the storage sections 111 of the display case 110 and may be rotatably mounted on mounting brackets 1213.

For example, the scanner arm may include a first scanner arm 1212-6 having the smallest length, a third scanner arm 1212-4 having the largest length, and a second scanner arm 1212-5 having the middle length and each of the scanner arm may be composed of a support bar and an antenna. For example, the first scanner arm 1212-6 is composed of a first support bar 1212-63 and a first antenna 1212-61, the second scanner arm 1212-5 is composed of a second support bar 1212-52 and a second antenna 1212-51, and the third scanner arm 1212-4 is composed of a third support bar 1212-42 and a third antenna 1212-41.

The operational process of the preset invention having the configuration is described hereafter.

First, when it is the time set by a timer, the local controller 1230-10 and the PLC network are changed into an operation mode from a power save mode at the start position of the scanner 1210. When the operation mode changes, a manual/automatic mode window appears temporarily in the local controller 1230-10, and the "automatic mode" is executed, unless a worker select "manual mode" within a predetermined time. When a mode is selected by the worker, the local controller 1230-10 boots the reader 1231.

When booting of the reader 1231 is known, signals of the distance sensor 1240, the wheel sensor 1225, and the arm sensor 1215 are checked through the power line communication network, and when the scanner arm 1212 is repeatedly rotated by the tapping motor 1213-4, the arm sensor 1215 starts counting the number of reciprocation (tapping) from when the scanner arm 1212 bending at the start position of the scanner 1210 approaches the center and deploys, and the movement distance is measured by the wheel sensor 1225. The reciprocation of the scanner arm 1212 keeps in the storage section 111, until the count number of reciprocation set by the worker is reached.

Further, the distance sensor 1240 keeps whether there is an obstacle in the movement path of the scanner 100, and stops the operation of the driving motor 1223 and the reader 1231 through the power line communication network when an obstacle is recognized. Further, the wheel sensor 1225 keeps monitoring the movement distance, when the scanner arm 1212 moves over a distance set by the worker without turning, the reader 1231 stops, until a signal of the arm sensor 1215 is inputted. Thereafter, when a turning signal is inputted again from the arm sensor 1215, the reader 1231 operates and starts reading again.

When a finish signal saying that reading the entire display case 110 has been finished is inputted from the distance sensor 1240, power supply to the driving motor 1223 and the reader 1231 through the power line communication line is stopped and the local controller 1230-10 is informed that reading has been finished. When a reading finish signal is receive, the local controller 1230-10 analyzes and filters the accumulated received data and sends it out through a wireless LAN, and enters a standby mode.

Figure 26:
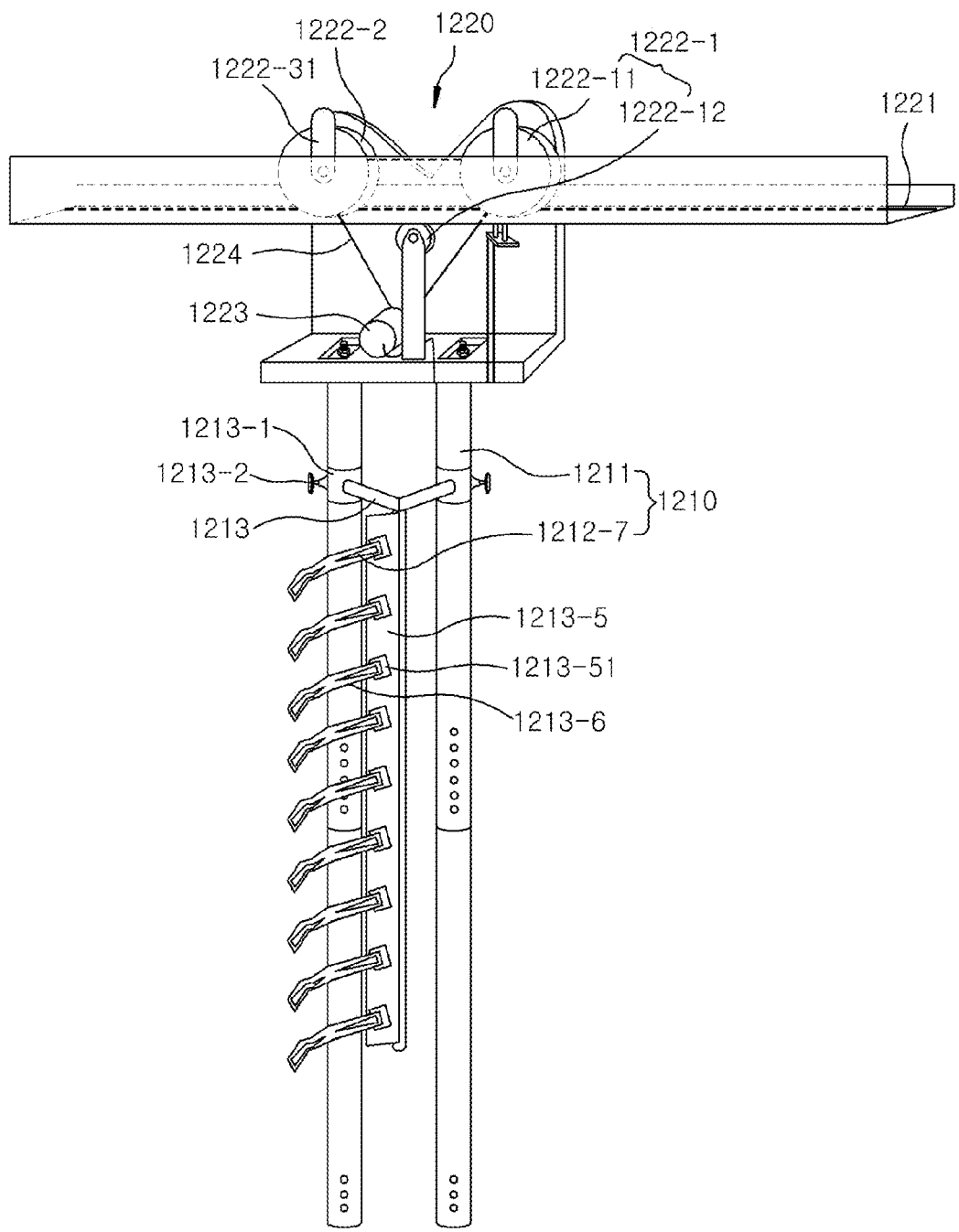
FIG. 26 is a rear perspective view showing a scanning apparatus for a display case according to a fifth embodiment of the present invention.
Figure 27:
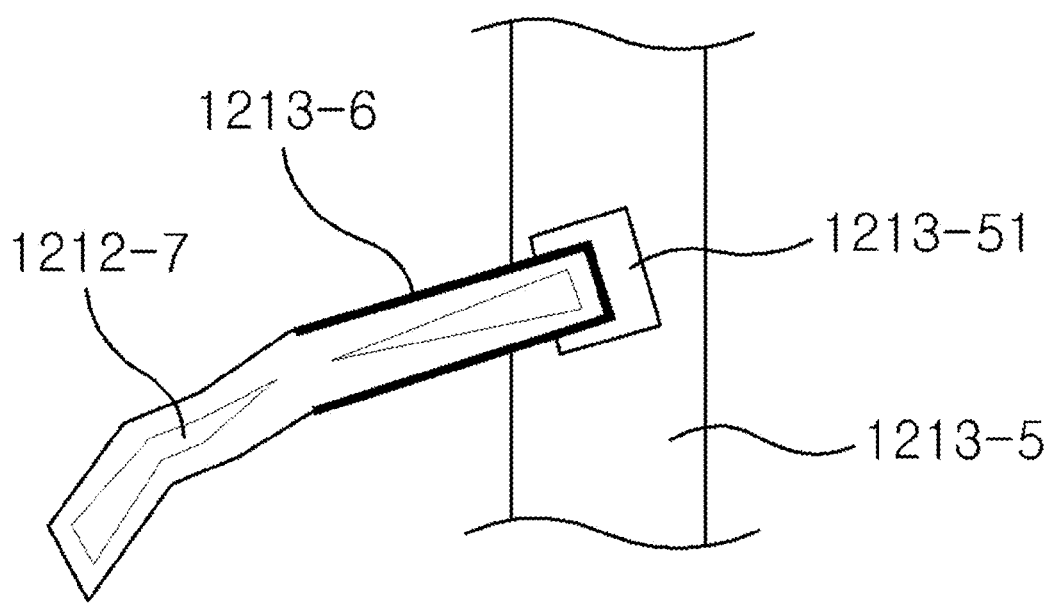
FIG. 27 is an enlarged view showing a film-typed antenna in the scanning apparatus for a display case according to the fifth embodiment of the present invention.

On the other hand, as shown in FIGS. 26 and 27, the present invention according to a fifth embodiment includes a scanner 1210 having a scanner body 1211 and a film type antenna 1212-7, a horizontal driving unit 1220 for horizontally moving the scanner 1210, and a controller 1230 controlling the scanner 1210 and the horizontal driving unit 1220. The scanner body 1211, the horizontal driving unit 1220, and the controller 1230 are generally similar to the scanner bodies 1211, the horizontal driving units 1220, and the controllers 1230 described in the previous embodiments, so the differences from this embodiment are mainly described hereafter.

The film type antenna 1212-7 of the scanner 1210, which is an antenna formed in a type of a flexible film, scans an article 120 in the storage section 111 of the display case 110 by rubbing it and can flexibly cope with objects or obstacles on the movement path of the antenna.

The film type antenna 1212-7 may be mounted on the scanner body 1211 by a mounting bracket 1213. An insertion holder 1213-1, a bolt 1213-2, a mounting member 1213-5, and a memory holder 1213-6 are combined with the mounting bracket 1213.

The insertion holder 1213-1 of the mounting bracket 1213 is a through-hole in which an end of the scanner bar 1211 is inserted, the ends of the scanner bars 1211 facing each other are inserted on each other and the inserted ends of the scanner bars 1211 are fixed by the bolt 1213-2. The mounting member 1213-5 extends perpendicular to the mounting bracket 1213 and has a plurality of mounting grooves 1213-51 on one side where the base end of the memory holder 1213-6 is mounted. The memory holder 1213-6 is formed in the shape of a socket for fixing the base end of the film type antenna 1212-7 and is made of a shape memory alloy that returns to the original shape when deforming.

As described above, since the flexible film type antenna is used for scanning articles, it is possible to ensure an accurate recognition rate in scanning articles in a display case regardless of obstacles due to the height and volume of the exhibited articles.

Figure 28:
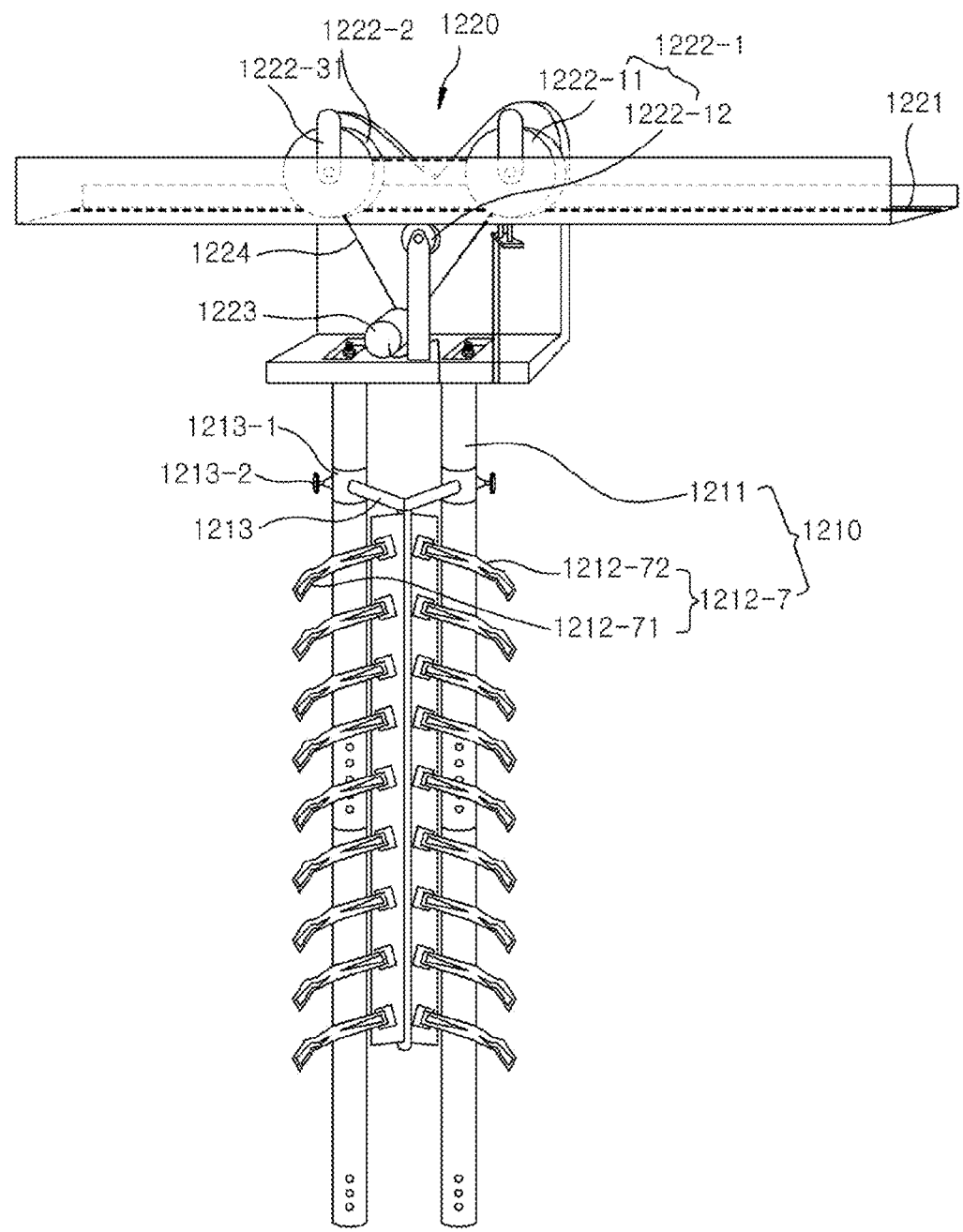
FIG. 28 is a rear perspective view showing a scanning apparatus for a display case according to a modified example of the fifth embodiment of the present invention.
Figure 29:
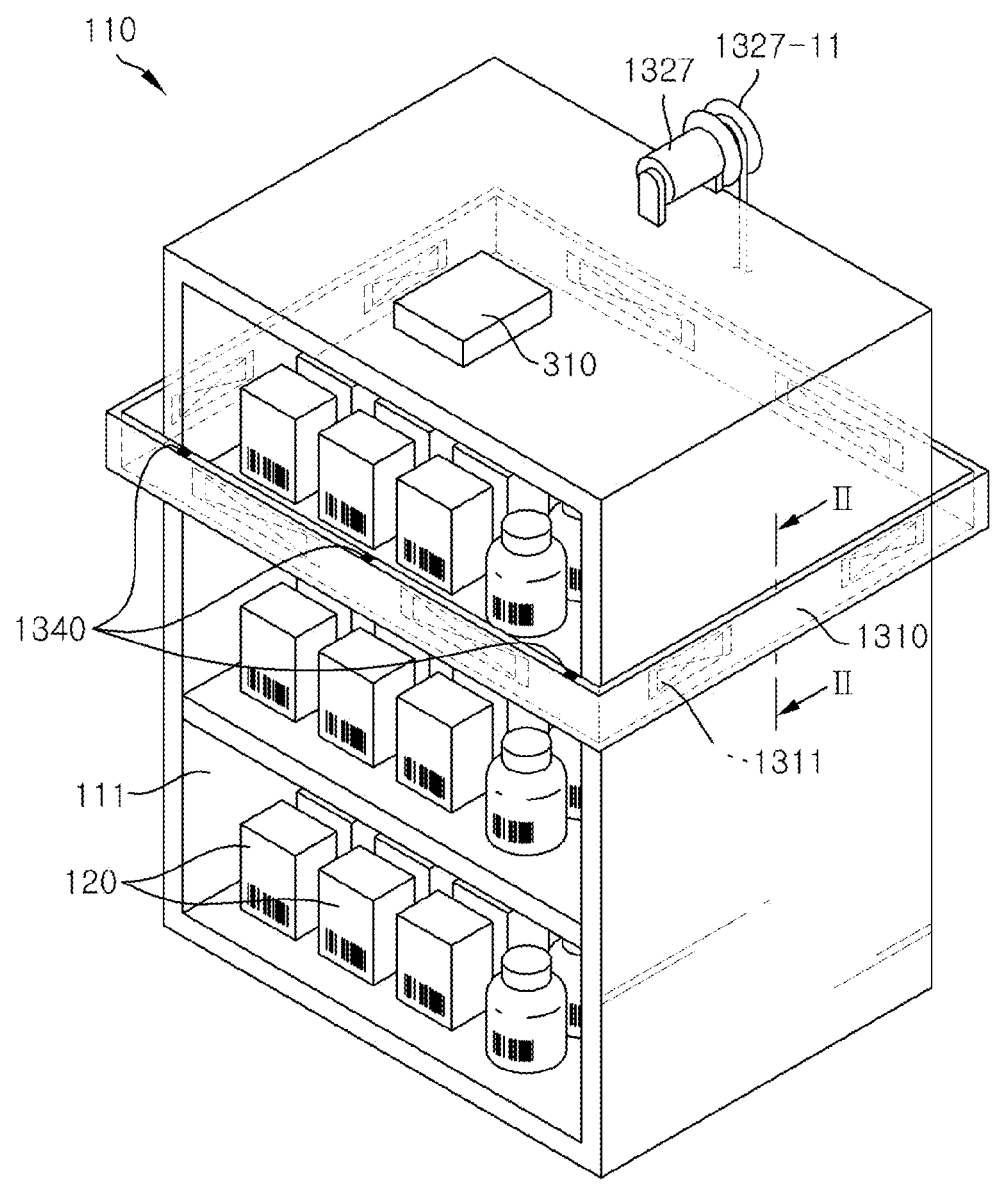
FIG. 29 is a front perspective view showing a scanning apparatus for a display case according to a sixth embodiment of the present invention.
Figure 30:
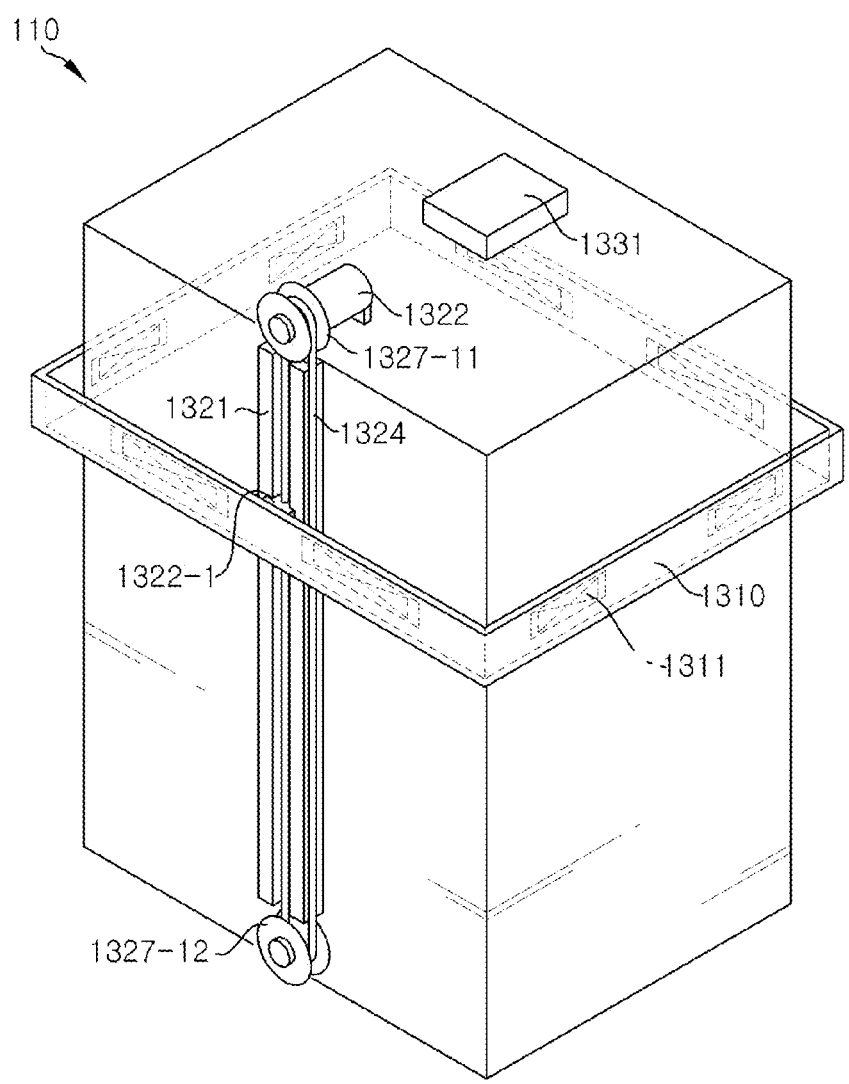
FIG. 30 is a rear perspective view showing the scanning apparatus for a display case according to the sixth embodiment of the present invention.
Figure 31:
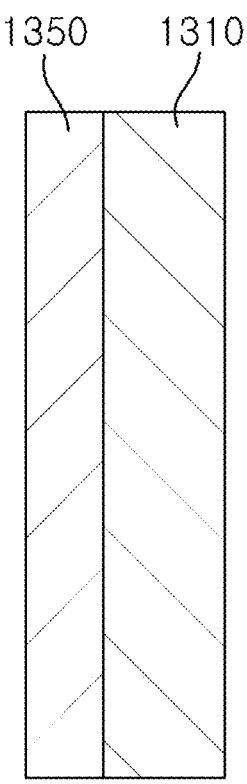
FIG. 31 is a cross-sectional view taken along line II-II in FIG. 29.
Figure 32:
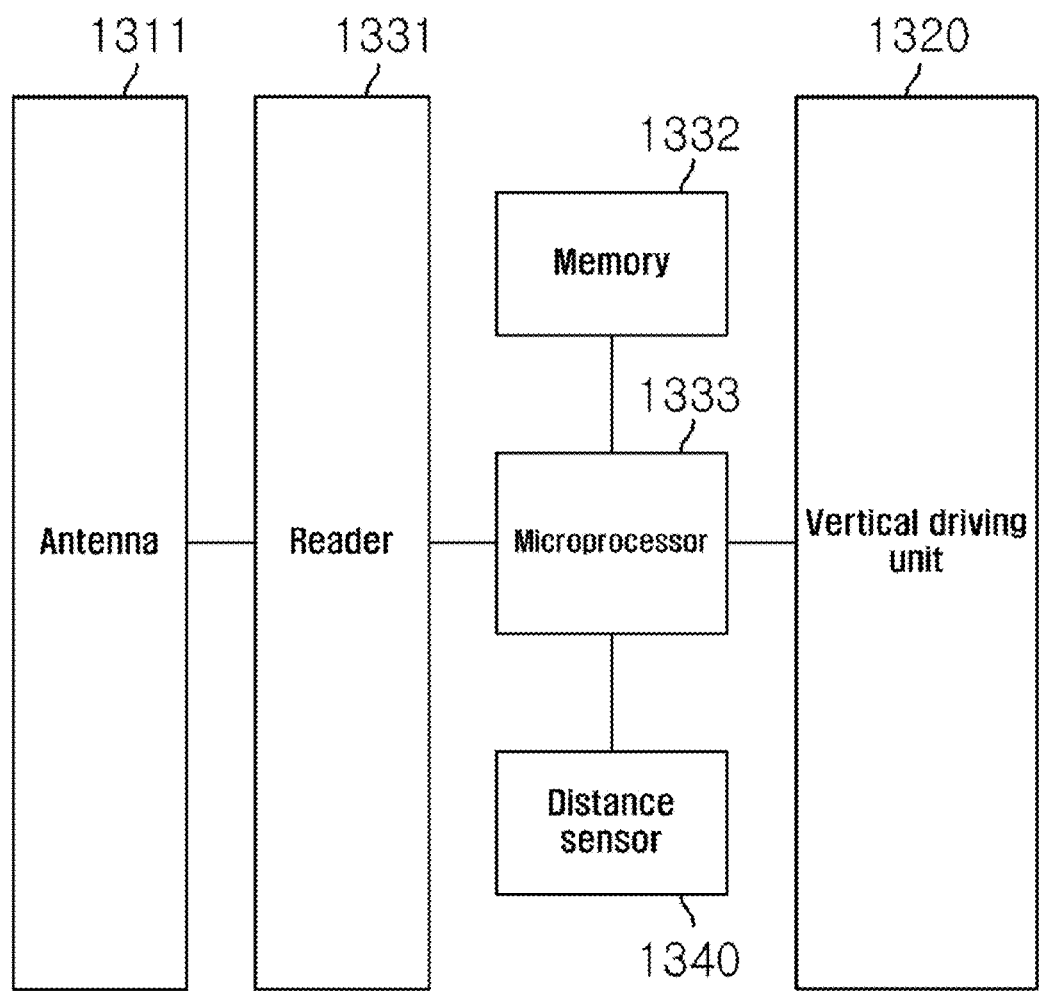
FIG. 32 is a block diagram showing a control unit of the apparatus for a display case according to the sixth embodiment of the present invention.

As shown in FIG. 28, in the present invention according to a modified example of the fifth embodiment, the film type antenna 1212-7 may be composed of a first-directional film antenna 1212-71 and a second-directional film type antenna 1212-72.

The first-directional film type antenna 1212-71 is disposed in one direction in the storage section 111 and the second-directional film type antenna 1212-72 is disposed in the other direction in the storage section 111, so the film type antenna 1212-7 can effectively scan even the articles 120 at both edges in the storage section 111.

As shown in FIGS. 29 to 32, the present invention according to a sixth embodiment may include a scanner 1310, a distance sensor 1340, a vertical driving unit 1320, and a control unit 1330.

In detail, the scanner 1310 may scan articles 120 in the storage section 111 of the display case 110. An RFID-based technology is applied to this embodiment. To this end, an RF tag as a wireless recognition part is attached to articles 120 and the scanner 1310 is equipped with an antenna 1311 that can receive RF signals from the RF tags of the articles 120. The antennal 1311 of the scanner 1310 is patterned in a polygon in a predetermined area on the scanner 1310 and is designed to be able to perform wireless or wire communication with a reader 1331 of the control unit 1330.

Although the RFID tag is attached, as a wireless recognition part, to the articles 120 in the display case 110 in this embodiment, the present invention is not limited thereto and other types of wireless recognition technologies that can wirelessly provide the information of the articles 120 may be used in various ways.

The scanner 1310 is formed in a ring shape, in more detail, a rectangular ring shape around the storage section 111 of the display case 110 and the shape of the scanner 1310 may depend on the entire shape of the display case 110.

For example, when the side edge of the display case 110 is formed in a rectangle, the scanner 1310 is formed in a rectangular ring shape, but when the side edge of the display case 110 is formed in a triangle, a hexagon, or a circle, the scanner may be formed in a triangular ring shape, a hexagonal ring shape, or a circular ring shape to correspond to the side edge. Accordingly, the antenna 1311 of the scanner 1310 can move close to the articles 120 in the storage section 111 without approaching the inside of the storage section 111 of the display case 110, such that the antenna 1311 can increase an RF signal recognition rate on the RF tags of thee articles 120.

When the sides of the display case 110 is made of a nonmetallic material, the RF signal of the RF tag of an article can pass through a nonmetallic material, such that it is preferable a plurality of antennas 1311 is disposed throughout the sides of the scanner 1310 formed in a rectangular ring shape. However, when the display case 110 is made of metallic material, the RF signal recognition rate of the antenna 1311 on the RF signals from the RF tag on articles remarkably decreases, so it is preferable that the antenna 1311 is disposed at a position corresponding to an opening of the storage section 111. Further, a blocking layer 1350 may be disposed on the outer side of the scanner 1310.

The distance sensors 1340 are mounted at the top and bottom edges of the scanner 1310 and sense whether the scanner can normally move to the top and bottom of the display case 110, by sensing obstacles in the movement direction of the scanner 1310.

For example, when the scanner 1310 vertically moves, the distance sensors 1340 sense the distances from objects and obstacles over and under the scanner 1310 and provide the sensed distance sensing signals to the control unit 1330. In this embodiment, the distance sensors 1340 may be electronic non-contact sensors such as an infrared sensor and an ultrasonic sensor or may be a mechanical non-contact sensor such as a limit switch sensor.

The vertical driving unit 1320 is provided to move the scanner 1310 perpendicularly with respect to the display case 110 and vertically reciprocates the scanner 1310 along a guide rail 1321 on a side of the display case 110.

To this end, the vertical driving unit 1320 includes the guide rail 1321, a moving member 1322, a turning belt 1324, and a driving motor 1323. The guide rail 1321 has a rail structure vertically extending on a side of the display case 110 and provides a movement path along which the moving member 1322 mounted on the scanner 1310 moves. The moving member 1322 is fixed to the scanner 1310 and moves along the guide rail 1321 with vertical movement of the scanner 1310. The turning belt 1324 makes a close-loop turning in a closed-loop shape between a rotary pulley 1327-11 of the driving motor 1323 and a connecting pulley 1327-12 at the lower end of the guide rail 1321. The driving motor 1323 is connected to the moving member 1322 to be movable by the turning belt 1324, is supplied with power from a disposable battery or a rechargeable battery, and provides a driving force to the moving member 1322 in response to an operation signal from the control unit 1330.

That is, when an operation signal of the control unit 1330 is applied to the driving motor 1323, the turning belt 1324 receives a rotational force from the driving motor 1323 and turns between the rotary shaft of the driving motor 1323 and the moving member 1322 and the moving member 1322 is moved up or down with respect to the display case 1311 along the guide rail 1321 by the turning of the turning belt 1324, such that the scanner 1310 can be moved up/down with respect to the display case 110 by the movement of the moving member 1322.

The control unit 1330 controls movement of the scanner 1310, using the vertical driving unit 1320 and collects article information data about an article 1312 from scan information received from the antennas 1311.

For example, the control unit 1330 may include a reader 1331, a memory 1332, and a microprocessor 1333. The reader 1331 receives scan information from the antennas 1311 and reads the article information data of the scanned article 120. In this embodiment, the reader 1331 reads tag information signals in a UHF band or a VHF band from the RF tag on the article 120 received from the antennas 1311.

The memory 1332 of the control unit 1330 stores the article information data of the article 120 read by the reader 1331 and temporarily stores standard distance data obtained by calculating the movement distance of the scanner 1310, a distance sensing signal from the distance sensor 1340 of the scanner 1310, and a movable distance of the scanner 1310.

The microprocessor 1333 of the control unit 1330 can collect the article information data read by the reader 1331 and wirelessly transmits it to a central tag information collecting system, calculates the movable distance of the scanner 1310 by comparing the standard distance data obtained by calculating the movement distance of the scanner 1310 with the distance sensing signal from the distance sensor 1340 of the scanner 1310, and can move the scanner 1310 into a storage section 111 on a layer selected from the storage sections 111 in the display case 110 in consideration of the calculated movement. That is, the microprocessor 1333 controls the scanner 1310 such that the scanner keeps moving in the current movement direction or changes the direction to the opposite direction, in consideration of the distance sensing signal from the distance sensor 1340.

Further, the microprocessor 1333 can generally control the scanning function by vertical reciprocation of the scanner 1310 in accordance with a driving algorithm of a system operation program, wirelessly receive operation orders from the outside, and determine the number of times of horizontal reciprocation, the period of horizontal reciprocation, and the driving time period for horizontal reciprocation of the scanner 1310 in accordance with the operation orders.

In particular, the microprocessor 1333 can calculate the number times of scan information of the scanner 1310 for the articles 120, when the scanner 1310 reciprocates, can select the position of the article 120 having the most number of times of scan information in the calculated number of times of scan information as the actual position of the article 120, and can collect the article information data for the article 120 from the scan information of the selected article 120.

When the scanner 1310 move one time, the antenna 1311 of the scanner 1310 can receive not only the RF tag of the article 120 closest to the antenna 1311, but the RF tags of the articles 120 around, so this is for selecting the position of the article 120 having the most number of times of scan information as the actual position of the article 120, by finding out the number of times of scan information of the articles 120 while the scanner 1310 reciprocates in order to sense the more accurate actual position of the articles.

Figure 33:
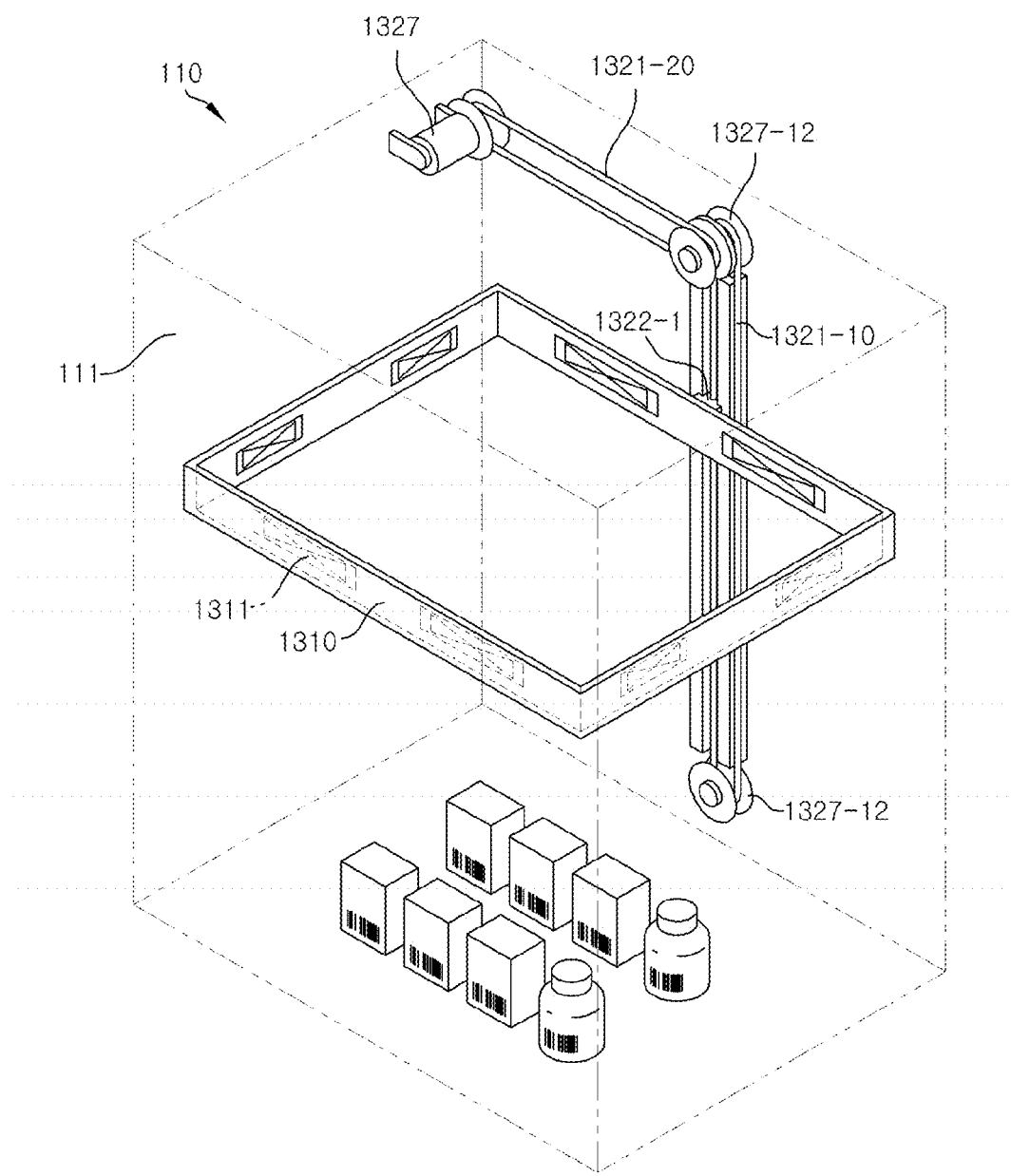
FIG. 33 is a perspective view showing a scanning apparatus for a display case according to a modified example of the sixth embodiment of the present invention.

As shown in FIG. 33, the present invention according to a modified example of the sixth embodiment may be configured to be able to move up/down with respect to the display case 110 in the storage section 111 in the display case 110. The configuration of a scanner 1310, a distance sensor 1340, and a control unit 1330 is the same as the configuration of the scanner 1310, the distance sensor 1340, and the control unit 1330 described in the previous embodiments, so the detailed description is not provided.

However, the guide rail 1321 of the vertical driving unit 1320 extends vertically on the inner side of the display case 110 and the moving member 1322 of the scanner 1310 is slidably disposed on the guide rail 1321. Accordingly, when an operation signal of the control unit 1330 is applied to the driving motor 1323, the turning belt 1324 receiving a rotational force from the driving motor 1323 turns the moving member 220 moves up or down with respect to the display case 110 along the guide rail 1321.

Figure 34:
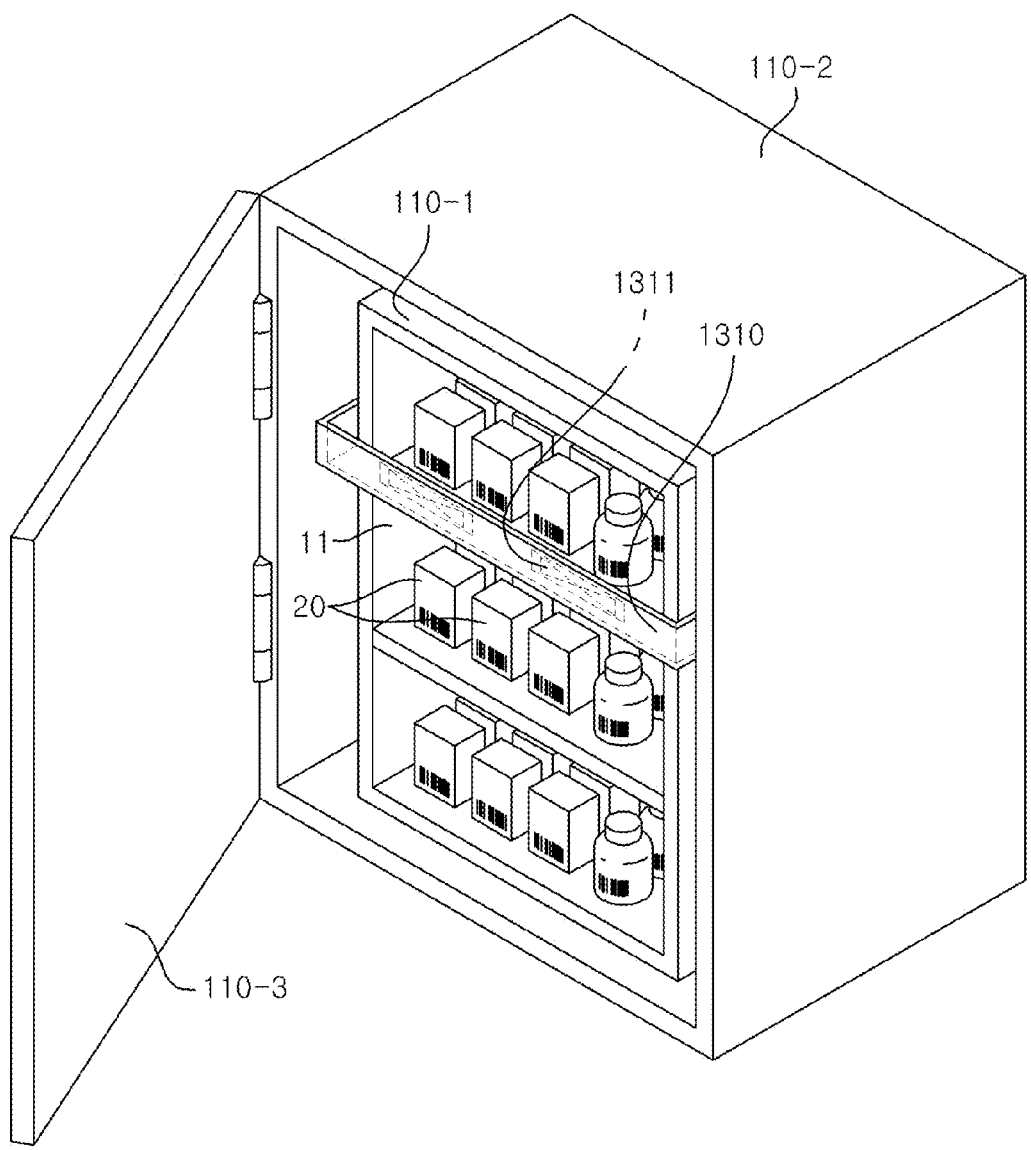
FIG. 34 is a perspective view showing a scanning apparatus for a display case according to another modified example of the sixth embodiment of the present invention.

As shown in FIG. 34, in the present invention according to another modified example of the sixth embodiment, the display case 110 may be composed of an inner case block 110-1 and an outer case block 110-2.

The inner case block 10a has a plurality of layers of storage sections 111, where the scanner 1310, the scanner 1310, the distance sensor 1340, and the driving unit 1320 can be mounted. The outer case block 110-2 surrounds the inner case block 110-1 and has a door 110-3 hinged to be able to block the inner case block 110-1 from the outside, and the door 110-3 may be equipped with a lock that can be selectively locked.

Figure 35:
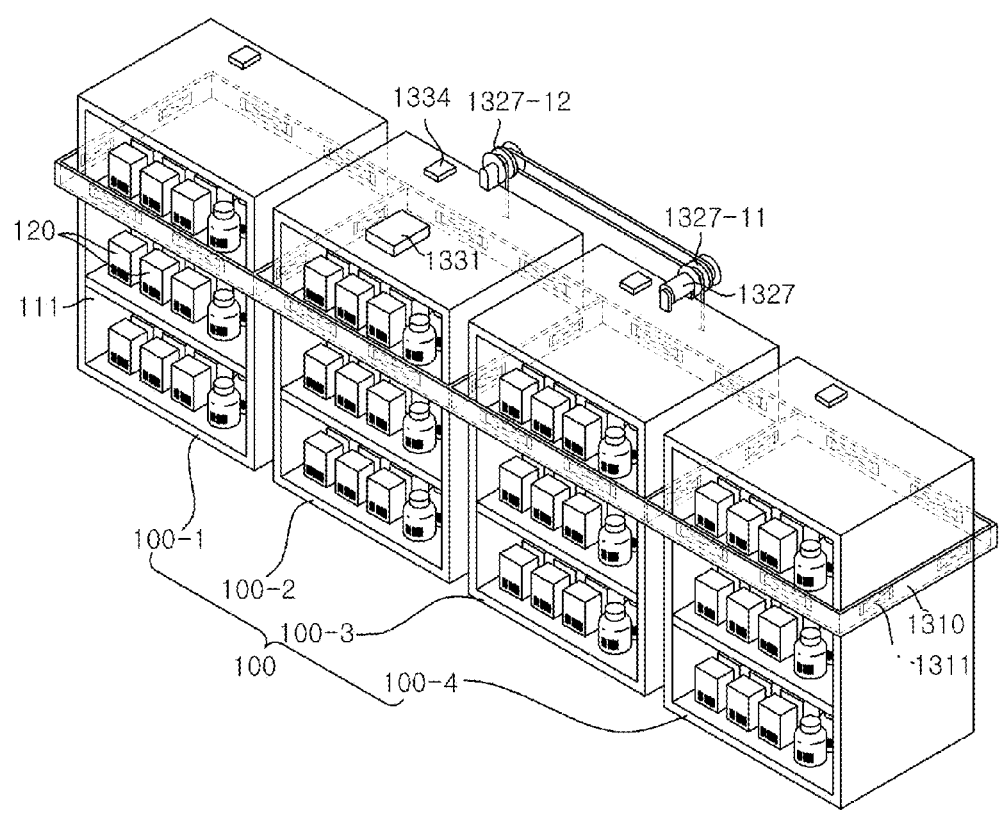
FIGS. 35 and 36 are perspective views showing a scanning apparatus for a display case according to another modified example of the sixth embodiment of the present invention.
Figure 36:
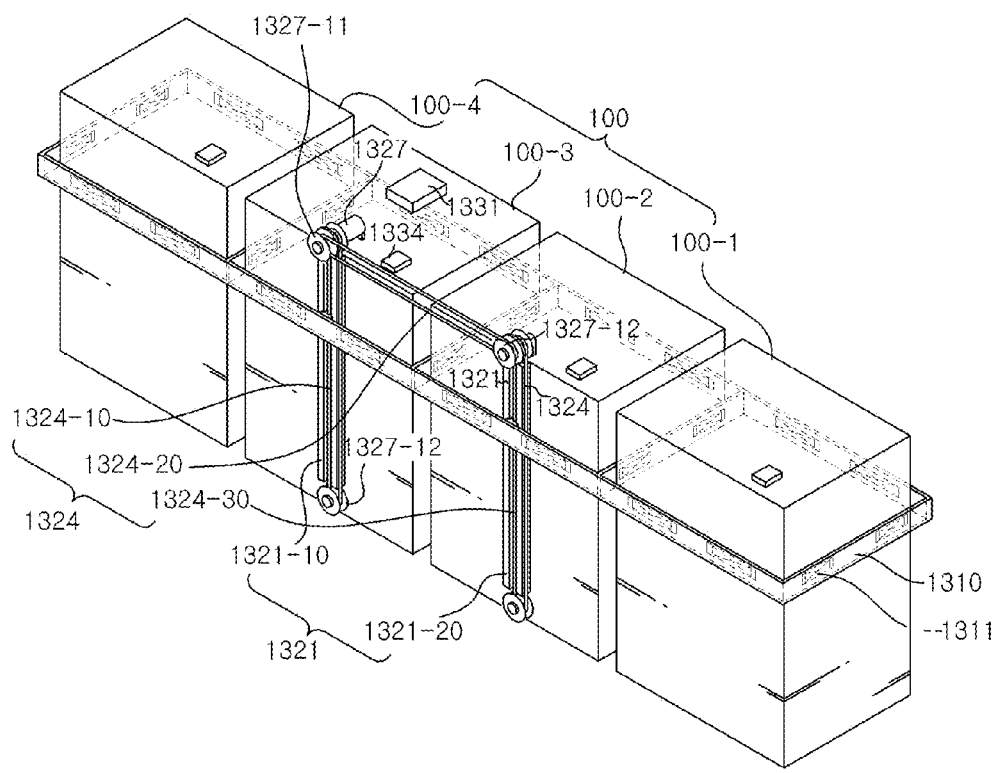
Figure 37:
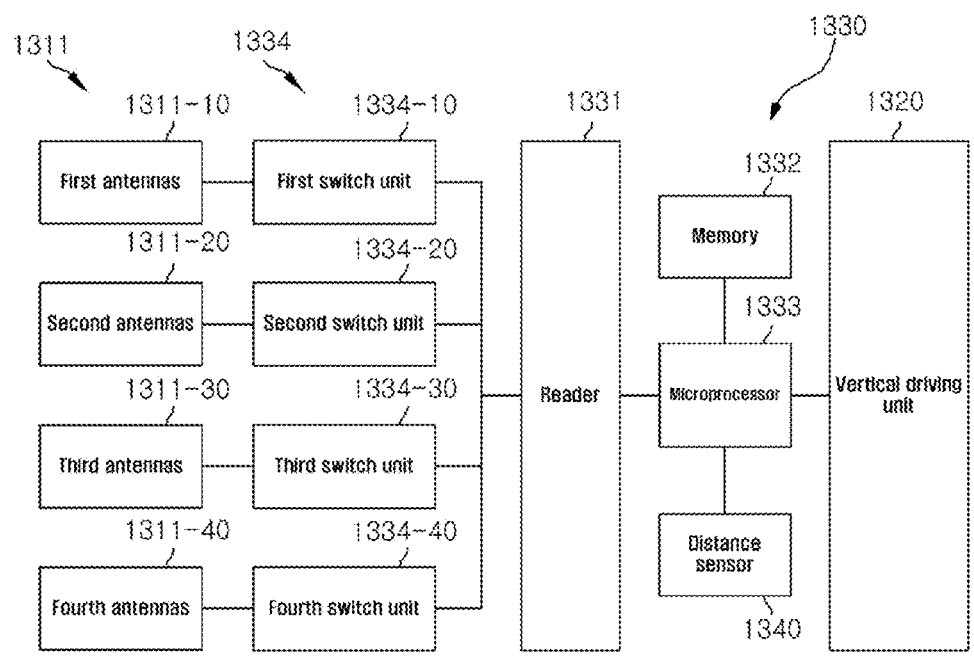
FIG. 37 is a block diagram showing a control unit of the apparatus for a display case according to the sixth embodiment of the present invention.

As shown in FIGS. 35 to 37, in the present invention according to another modified example of the sixth embodiment, a scanner 1310 having a rectangular ring shape and laterally continuously arranged may move up/down with respect to a display case assembly 100, surrounding the entire of the display case assembly 100.

In the display case assembly 100, a plurality of case blocks 100-1, 100-2, 100-3, and 100-4 are laterally arranged with predetermined gaps and they have a plurality of layers of storage sections 111 with articles 120 therein. Further, a first guide rail 1321-10 and a second guide rail 1321-20 vertically extend on sides of a display block selected from the case blocks 100-1, 100-2, 100-3, and 100-4, and first to third turning belts 1324-10, 1324-20, and 1324-30 are connected to the moving member 1322 of the scanner 1310 moving on the first guide rail 1321-10 and the second guide rail 1321-10.

In this embodiment, the scanner 1310 may be composed of four ring-shaped parts continuously connected, first to fourth antennas 1311-10, 1311-20, 1311-30, and 1311-40 are disposed on the sides of the four scanners 1310, respectively, and the four scanners 1310 are arranged through predetermined gaps between a plurality of case blocks 100-1, 100-2, 100-3, and 100-4.

First to fourth switch units 1334-10, 1334-20, 1334-30, and 1334-40 may be connected between the first to fourth antennas 1311-10, 1311-20, 1311-30, and 1311-40 and the reader 1331 of the control unit 1330. The switch unit 1334 can prevent overload on the antennas 1311 by selectively operating at least one antenna 1311 of the antennas 1311.

Figure 38:
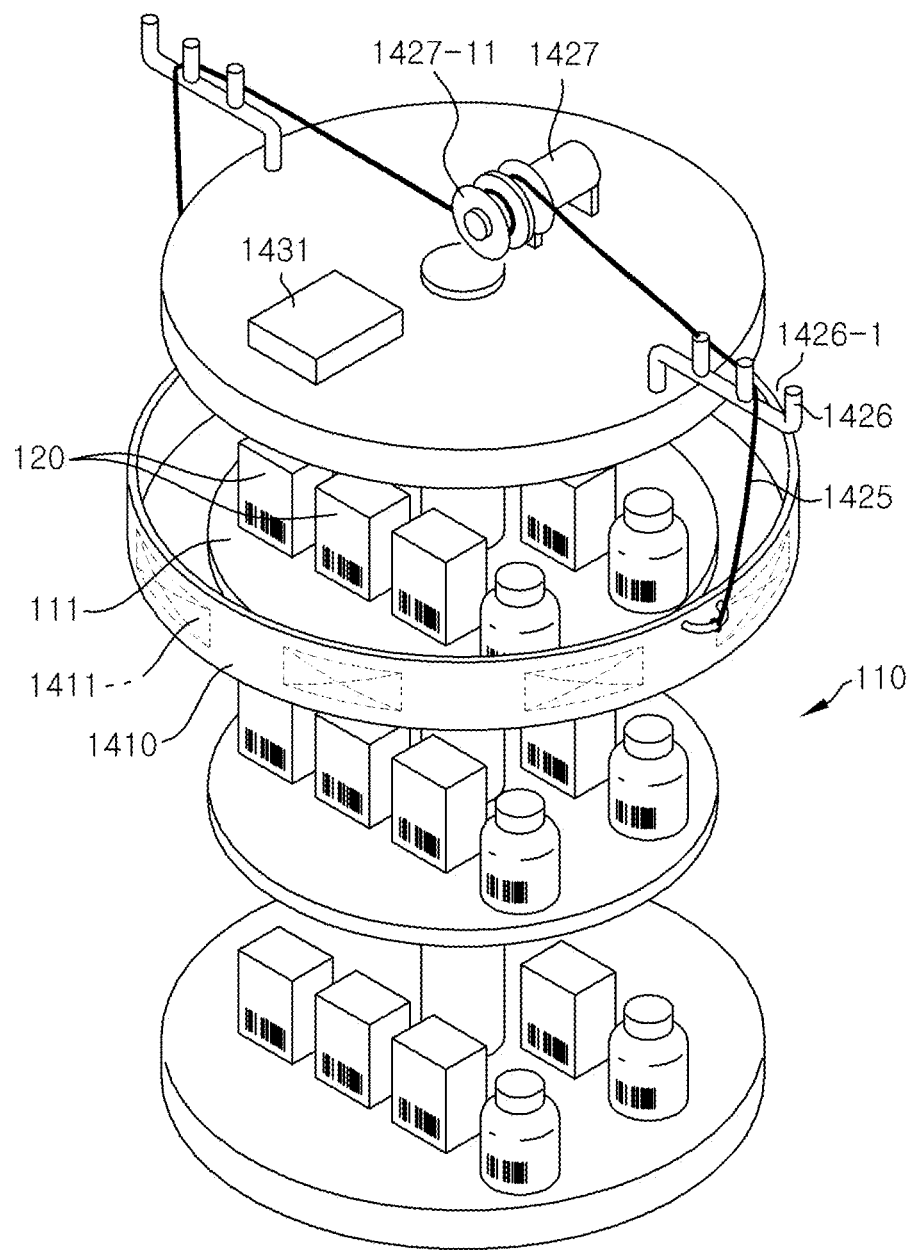
FIG. 38 is a perspective view showing a scanning apparatus for a display case according to a seventh embodiment of the present invention.

As shown in FIG. 38, in the present invention according to a seventh embodiment, a vertical driving unit 1320 that moves a scanner 1410 up/down with respect to the display case 110, using a wire 1425 is introduced.

The vertical driving unit 1420 includes a wire 1425, a support member 1426, and a rotary motor 1427. The wire 1425 has one end connected to the upper portion of the scanner 1410 and the other end connected to the rotary motor 1427 to be driven. The support member 1426 is disposed at the top of the display case 110 and has a plurality of support grooves 1426-1 spaced from each other for supporting the wire 1425, at its upper end. The rotary motor 1427 has a rotary pulley 1427-11, on which the other end of the wire 1425 is wound, on its driving shaft.

Accordingly, when an operation signal of the control unit is applied to the rotary motor 1427, the wire 1425 is wound on or unwound from the rotary shaft of the rotary motor 1427 and moves up or down with respect to the display case 110 and the scanner 1410 can be moved up/down with respect to the display case 110 by the up-down movement of the wire 1425.

Figure 39:
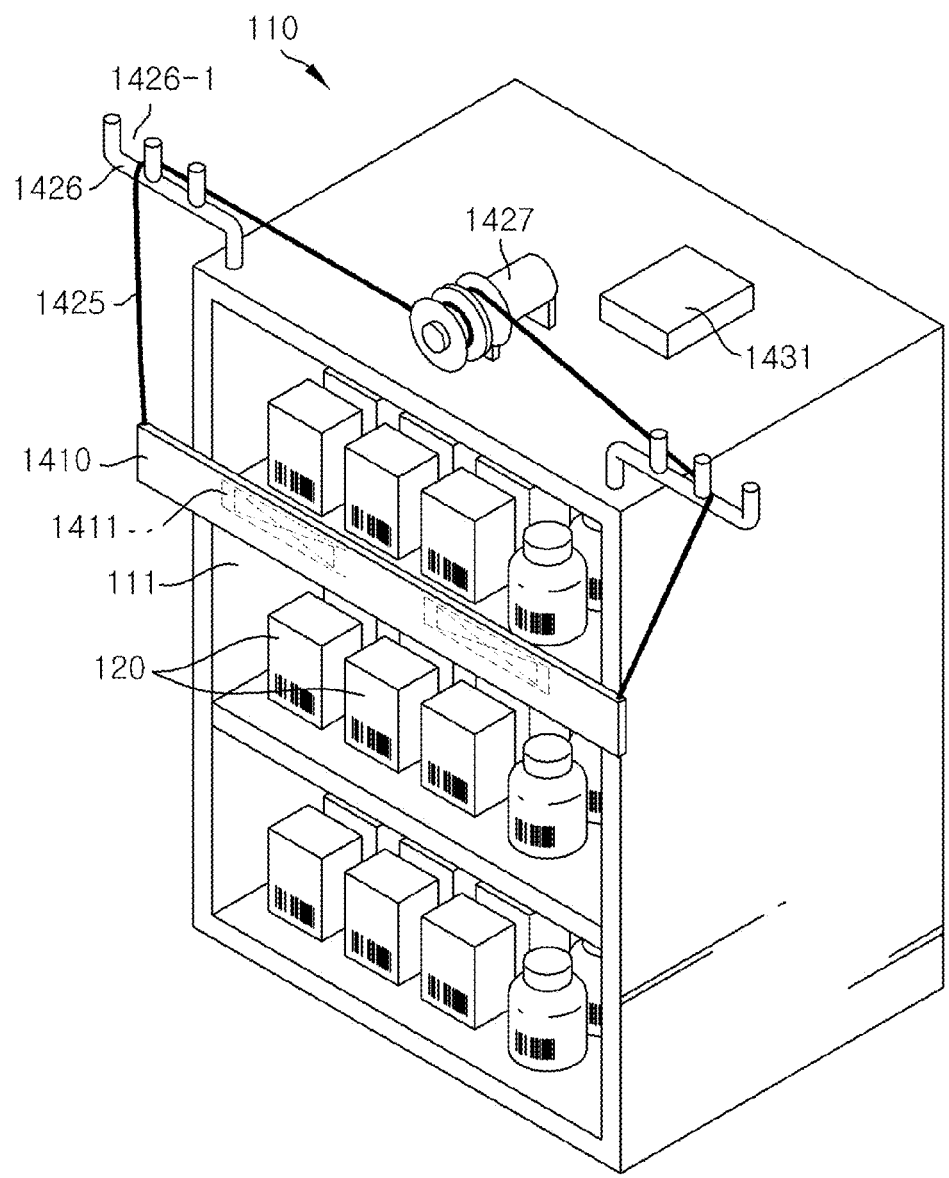
FIG. 39 is a perspective view showing a scanning apparatus for a display case according to a modified example of the seventh embodiment of the present invention.

As shown in FIG. 39, the present invention according to a modified example of the seventh embodiment provides a structure in which a bar-shaped scanner 1410 moves up/down with respect to a display case 110 through a wire 1425.

The configuration of the wire 1425, the moving member 1426, and the driving motor 1427 of the vertical driving unit 1420 is the same as the configuration of the wire 1425, the moving member 1426, and the driving motor 1427 described above, so the detailed description is not provided.

However, since the scanner 1410 is configured in a bar shape, it is positioned at an opening of the storage section 111 to scan articles 120 in the storage section 111 and the wire 1425 is connected to both ends of the scanner 1410 to maintain balance when the scanner 1410 moves up/down.

Figure 40:
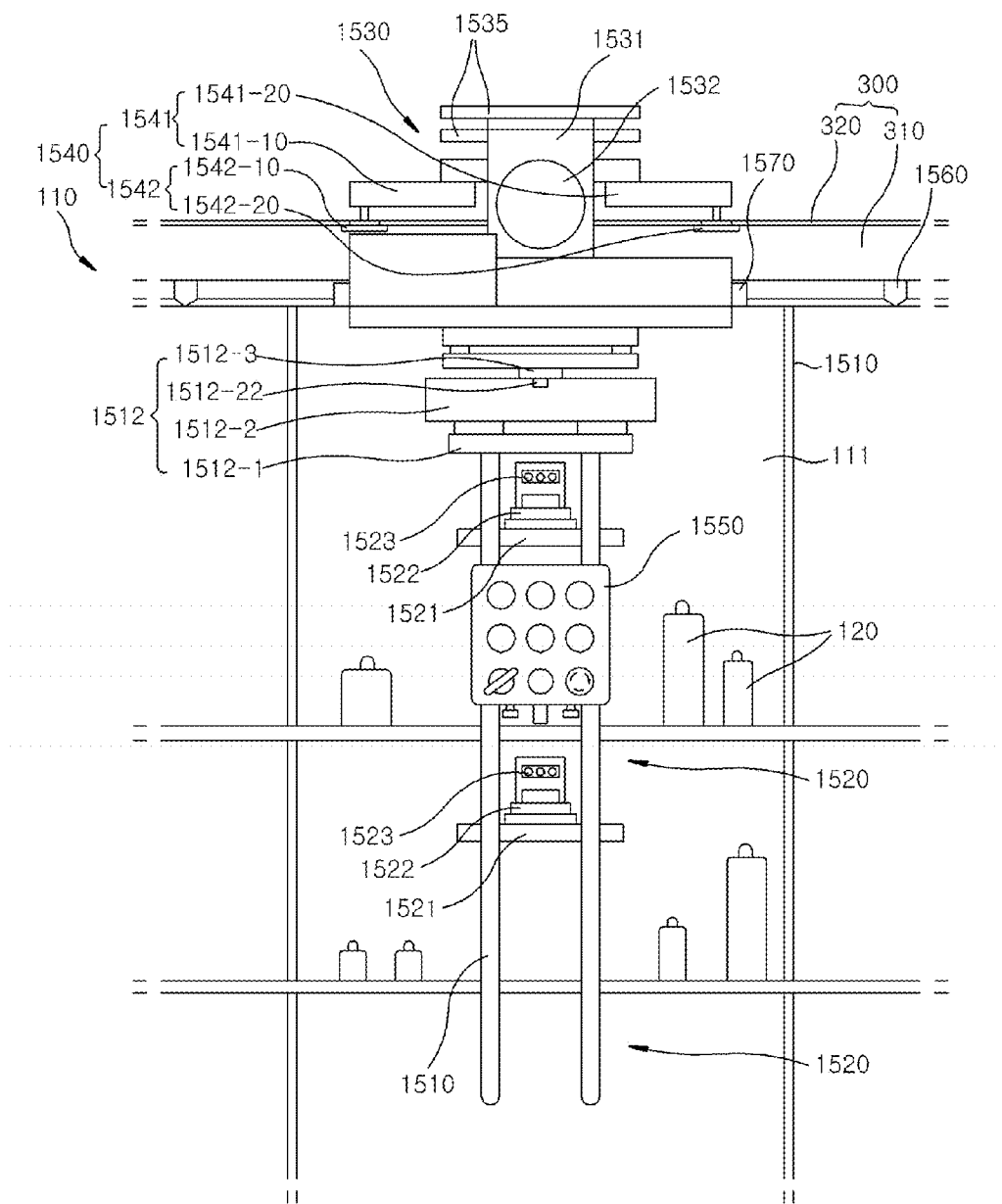
FIG. 40 is a front view showing a scanning apparatus for a display case according to an eighth embodiment of the present invention.
Figure 41:
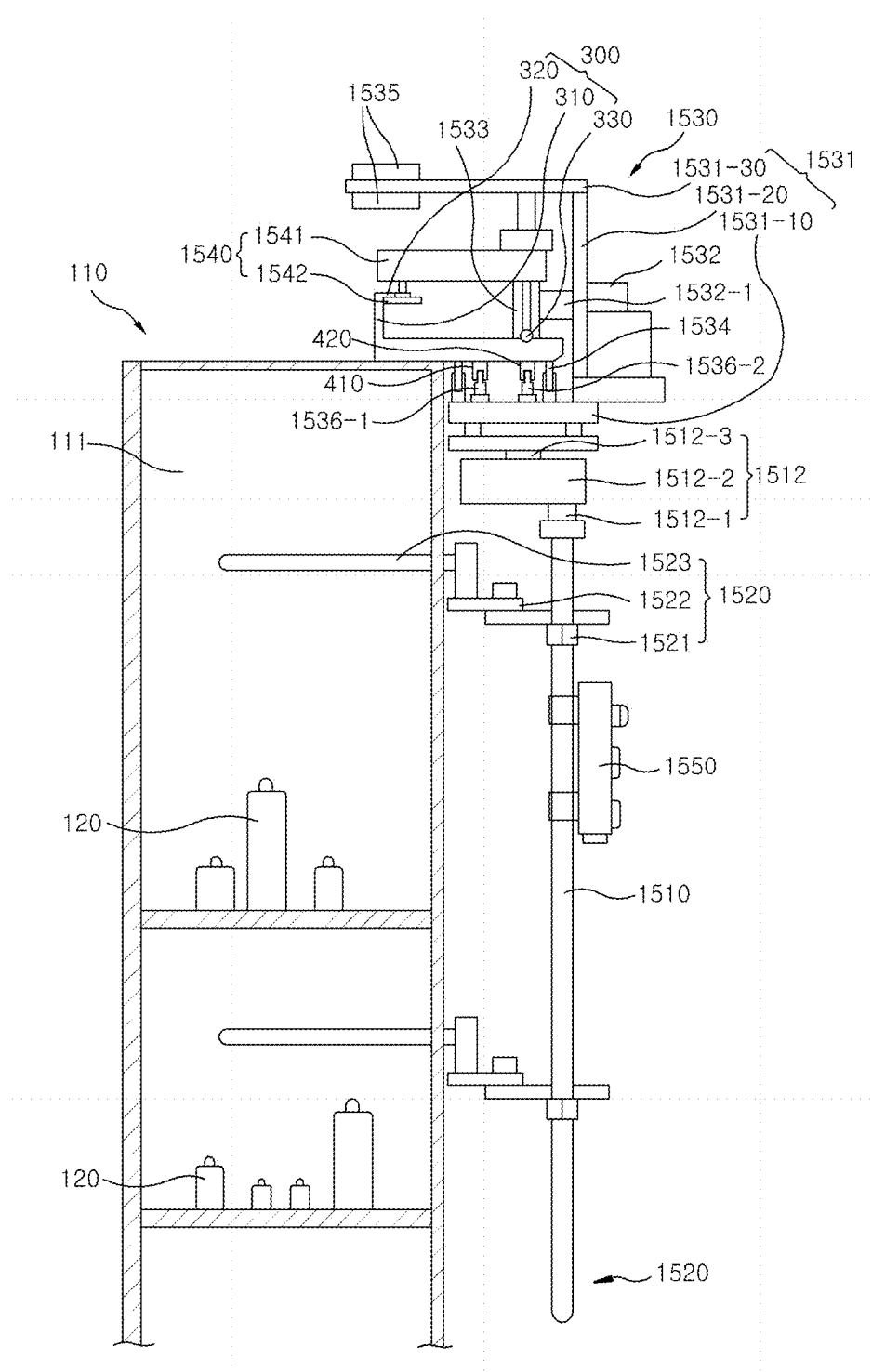
FIG. 41 is a side view showing the scanning apparatus for a display case according to the eighth embodiment of the present invention.

As shown in FIGS. 40 and 41, the present invention according to an eighth embodiment may include a body 1510, a scanner 1520, a horizontal driving unit 1530, a balancing arm 1540, and a controller 1550.

In detail, the body 1510 is a support structure where a plurality of scanners 1520 is mounted at predetermined distance from each other perpendicularly with respect to the display case 110 and can move in the horizontal direction of the display case 110 by the horizontal driving unit 1530.

The body 1510 may be configured in the type of a pair of bars having a predetermined length in the vertical direction of the display case 110. The body 1510 in the type of a pair of bars may be integrally formed in a single bar or may be configured by combining a plurality of bars to be separably on a vertical line. The when the body 1510 is formed by combining a plurality of bars, the entire length of the body 1510 can be adjusted in accordance with the number of the combined bars.

Although the body 1510 is configured in the type of a pair of bars in this embodiment, the shape is not limited and the body 1510 may be modified in various types within a range satisfying a structure in which the scanner 1520 can be matched to a plurality of layers of storage sections 111.

The horizontal driving unit 300, which is a driving device for horizontally moving the body 100 with respect to the display case 110, can be supplied with power from the outside, using a PLC (Power Line Communication) network. To this end, a first power supply line 410 and a second power supply line 420 connected with an external power source may longitudinally extend on a rail 300 and the horizontal driving unit 1530 can be supplied with power from the first and second power supply lines 410 and 420 of the rail 300 through a first power brush 1536-1 and a second power brush 1536-2.

Obviously, the horizontal driving unit can 1530 be supplied with power from a disposable battery or a rechargeable battery, other than the power supplied through a power line communication network.

The horizontal driving unit 1530 may include a driving body 1531, a driving motor 1532, a driving roller 1533, a lower support roller 1534, and a weight 1535.

The driving body 1531 of the horizontal driving unit 1530 may be composed of a main plate 1531-10, a vertical support member 1531-20 perpendicularly connected to the main plate 1531-10, a horizontal support member 1531-30 horizontally connected to the vertical support member 1531-20, and a fixing member (not shown) fixing them, and the main plate 1531-10, the vertical support member 1531-20, and the horizontal support member 1531-30 may be combined in a U-shape surrounding a rail from a side.

In this embodiment, the driving body 1531 is formed in a U-shaped block, but it is not limited thereto and may be modified in various shapes to be stably mounted on a rail.

The weight 1535 for maintaining weight balance and a balancing arm 1540 guiding stable movement may be disposed at the upper portion of the driving body 1531. Further, the first and second power brushes 1536-1 and 1536-2 and the lower support roller 1534 may be disposed at the lower portion of the driving body 1531. Further, a trigger sensing 1570 may be disposed ahead of and behind the driving body 1531. In addition, the driving body 1531 may be equipped with various electronic devices (not shown) for adjusting power from the first and second power brushes 1536-1 and 1536-2 and providing it to the driving motor 1532 and the trigger sensor 1570.

The driving motor 1532 of the horizontal driving unit 1530 may be connected with the driving roller 1533 through a driving shaft 1532-1, on the driving body 1531. The driving motor 1532 can rotate the driving shaft 1532-1 clockwise or counterclockwise, when power is applied, and the driving roller 1533 may be moved in one direction of the other direction along the rail 300 in accordance with the rotational direction of the driving shaft 1532-1. Accordingly, the horizontal driving unit 1530 can be moved forward or backward to a side or the other side of the display case 110 by movement of the driving roller 1533.

The driving roller 1533 of the horizontal driving unit 1530, which is a roller moving along the rail guard 330 of the rail 300, may have a guard groove 1533-1 on its outer circumference which is inserted in the rail guard 330. The rail guard 330 protrudes from the top of the rail 300 and longitudinally extends to be inserted in the guard groove 1533-1 of the driving roller 1533, such that it can guide the movement path of the driving roller 1533 and prevent separation of the driving roller 1533 moving.

Figure 42:
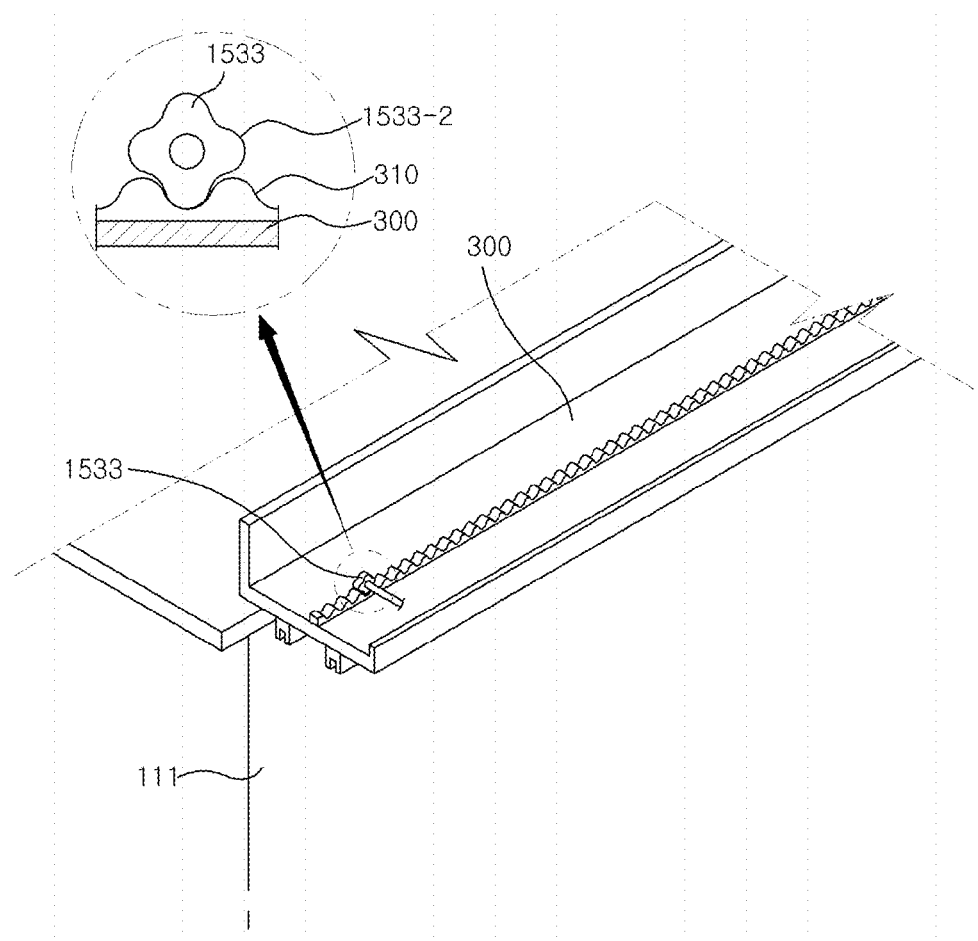
FIG. 42 is an enlarged view showing the configuration of a driving roller of a horizontal driving unit according to a modified example of the eighth embodiment.

As shown in FIG. 42, as a modified example of this embodiment, a rail prominence depression 311 is formed on the top of the rail and a roller prominence depression 1533-2 corresponding to the rail prominence depression 311 may be formed on the outer circumference of the driving roller 1533.

The rail prominence depression 311 may extend in the longitudinal direction of the display case 110, having prominences and depressions formed in a straight wave shape. The roller prominence depression 1533-2 is composed of depressions corresponding to the prominences of the rail prominence depression 311 to be engaged with the rail prominence depression 311 and depressions corresponding to the prominences of the rail prominence depression 311, on the outer circumference of the driving roller 1533, and the depressions and the prominences may be made of a metallic material and alternately and continuously formed on the outer circumference of the driving roller 1533.

As described above, the driving roller 1533 of the horizontal driving unit 1530 can improve durability of the apparatus, because the driving roller 1533 is made of a metallic material, and the contact area with the rail prominence depression 311 increases, it is possible to prevent the driving roller moving on the rail 300 from sliding and improve driving efficiency. In particular, when the rail is arranged at an angle, the roller prominence depression 1533-2 of the driving roller can smoothly move along the rail prominence depression 311, so the horizontal driving unit can smoothly move.

The lower support roller 1534 of the horizontal driving unit 1530 is in contact with the bottom of the rail 300 and may be provided in a pair supporting both sides of the rail 300. The pair of lower support rollers 1534 is arranged in parallel in the width direction of the rail 300, so the driving roller 1533 can stably move along the rail 300, when moving on the rail 300.

The weight 1535 of the horizontal driving unit 1530, which is a weight for maintaining the entire left-right balance of the scanning apparatus, may be disposed on the opposite side of the scanning apparatus where no component is disposed. For example, when the body 1510, the horizontal driving unit 1530, the scanner 1520, and the controller 1550 are concentrated on a side of the scanning apparatus, the entire left-right weight of the scanning apparatus can maintain the balance, by disposing the weight 1535 on the other side of the scanning apparatus.

Figure 43:
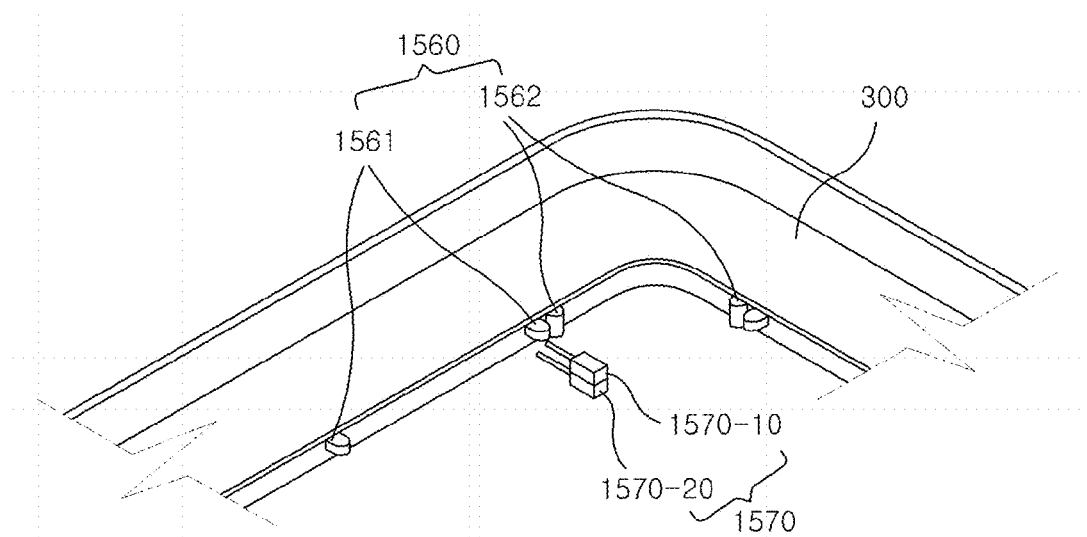
FIG. 43 is a view showing the configuration of a trigger and a trigger sensor in the scanning apparatus for a display case according to the eighth embodiment of the present invention.

As shown in FIG. 43, the trigger sensor 1570 may be disposed ahead of and behind the horizontal driving unit 1530 and a trigger 1560 may be detachably mounted on the rail 300.

The trigger 1560 may be detachably attached to the rail 300 on the movement path of the body and may include any one selected from a shape, a position, a barcode, and an RFID tag that can be distinguished and recognized by the trigger sensor 1570.

The trigger 1560 may be attached to a partition at the rightmost end or the leftmost end of the display case 110 and used as a start mark and an end mark saying the start and the end of scan. Further, the trigger 1560 may be used as a mark that provides change position information where the movement direction of the body 1510 changes or provides curve position information saying that the rail 300 comes to a curved portion from a straight portion.

For example, the trigger 1560 may include a direction trigger 1561 providing the change position information, where the movement direction of the body changes, to the trigger sensor and a curve trigger 1562 providing the curve position information, where the body 1510 comes to a curved portion of the rail 300, to the trigger sensor 1570. The direction trigger 1561 and the curve trigger 1562 are mounted at different heights with respect to the display case, but they may be mounted at the same height with respect to the display case 110, having different lengths.

In this embodiment, when the direction trigger 1561 and the curve trigger 1562 are mounted at the same height with respect to the display case 110, having different lengths, the trigger sensors 1570 for sensing the direction trigger 1561 and the curve trigger 1562 may also have different lengths to come in contact with the direction trigger 1561 and the curve trigger 1562.

The trigger sensors 1570 are formed in a probe shape protruding toward the rail 300, ahead of and behind the horizontal driving unit 1530, and can send sensing signals to the controller 1550 by coming in contact with the trigger 1560 on the rail 300.

Since the trigger sensor 1570 can sense the start mark and the end mark on the display case 110 through the trigger 1560, so it enables the scanning apparatus to start moving or to stop moving at the position of the trigger 1560.

Further, the trigger sensor 1570 can enable the horizontal driving unit 1530 to make a smooth curved motion by reducing the movement speed of the driving roller 1533, when the driving roller 1533 comes to a curved portion from a straight portion of the rail 30, by receiving the change position information where the movement direction of the body 1510 changes from the direction trigger 1561 and reciprocating in the space between a pair of direction triggers are disposed, or by receiving the curve position information where the rail 300 comes to a curved portion from a straight portion from the curve trigger 1562.

In this embodiment, the trigger sensor 1570 may be composed of a first trigger sensor 1570-10 recognizing the direction trigger 1561 by coming in contact with it and a second trigger sensor 1570-20 recognizing the curve trigger 1562 by coming in contact with it.

Figure 44:
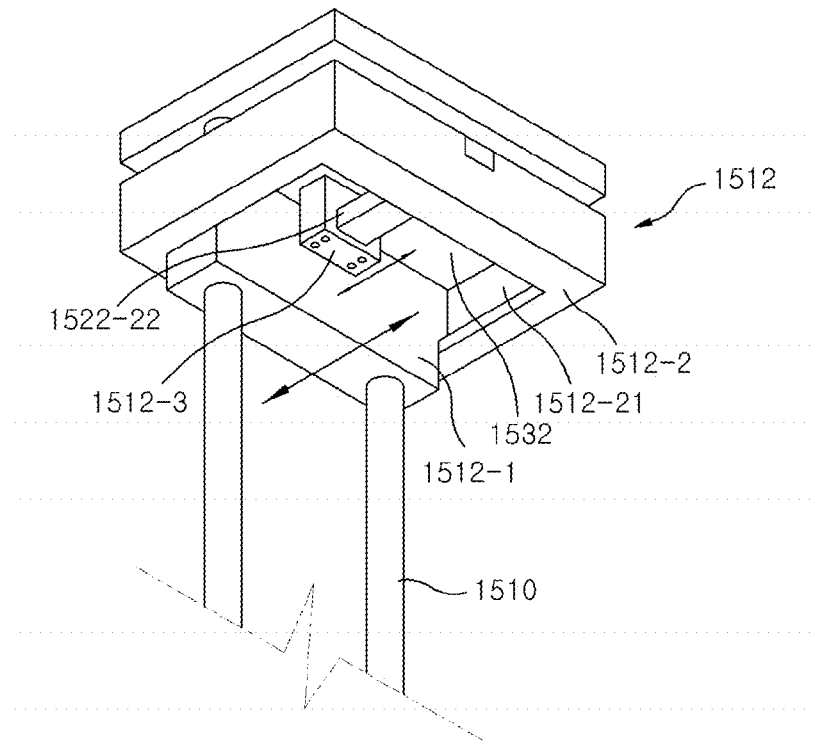
FIG. 44 is an enlarged perspective view showing a moving unit of the scanning apparatus for a display case according to the eighth embodiment of the present invention.

As shown in FIG. 44, the horizontal driving unit 1530 may be connected to the upper portion of the body 1510 through a moving unit 1512. The moving unit 1512 may include a holder 1512-1, a sliding housing 1512-2, and a sliding block 1512-3 to move the body 1510 toward the storage section 111.

For example, the lower portion of the holder 1512-1 may be fixed to the upper portion of the body 1510 and the upper portion may slide in a guide groove 1512-21 of the sliding block 1512-3. The sliding housing 1512-2 may be a hollow rectangular frame with the top and bottom open, the guide groove 1512-21 where the upper portion of the holder 1512-1 can slide may be formed on the inner side of the sliding housing, and a sliding bar 1512-22 may be mounted on the upper portion of the sliding housing. The sliding block 1512-3 may be disposed under the horizontal driving unit 1530 and may move along the sliding bar 1512-22

Accordingly, when the gap between the storage section 111 and the body 1510 or between the storage section 111 and the scanner 1520 is adjusted, it is possible to primarily adjust the distance from the storage section 111 by moving the holder 1512-1 of the body 1510 along the guide groove 1512-21 of the sliding housing 1512-2 and it is possible to secondarily adjust the distance from the storage section 111 by moving the sliding block 1512-3 along the sliding bar 1512-22.

Figure 45:
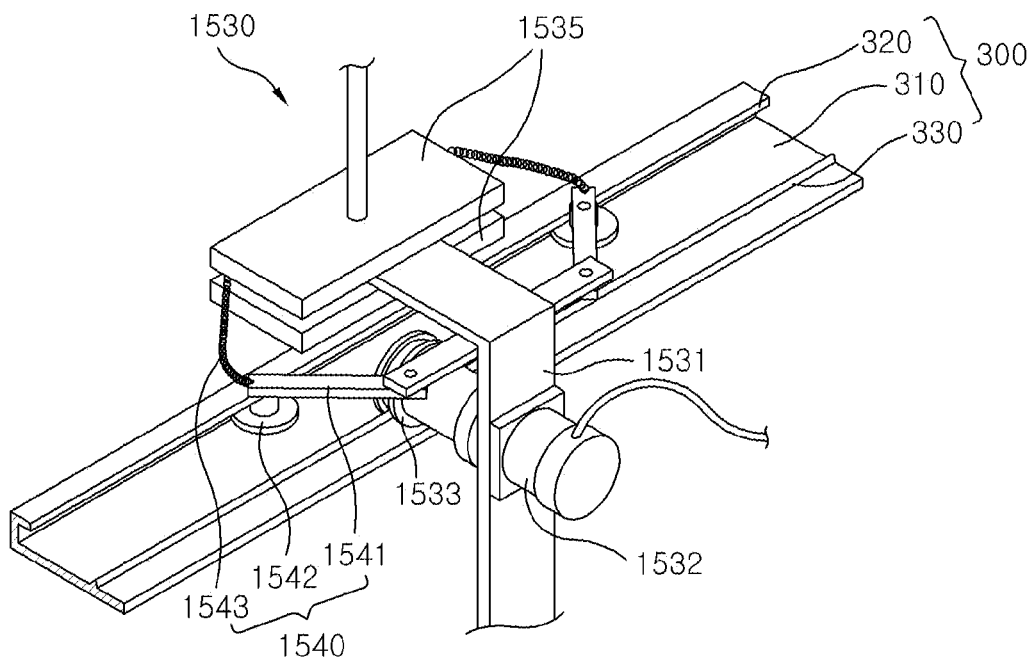
FIG. 45 is an enlarged perspective view showing a balancing arm of the scanning apparatus for a display case according to the eighth embodiment of the present invention.

As shown in FIG. 45, the balancing arm 1540 has an end supported on the rail 300 positioned ahead of and behind the horizontal driving unit 1530, so in straight or curved movement with respect to the rail 300 of the display case 110, the horizontal driving unit 1530 can be precluded from tilting forward/backward or separating from the rail 300. The rail 300 may have a rail wall 310 extending vertically on a side and rail guard 320 horizontally bending from the rail wall 310.

The balancing arm 1540 may include a pivot bar 1541, a side support roller 1542, and an elastic spring 1543.

In more detail, the pivot bar 1541 may be provided in a pair disposed ahead of and behind the horizontal driving unit 1530, of which one end may be pivotally connected to the driving body 1531 of the horizontal driving unit 1530 and the other end may be pivotally connected so that the side support roller 1542 can roll on the rail wall 310. Further, the side support roller 1542 is supported upward by the rail guard 320, so it cannot vertically move while the horizontal driving unit 1530 moves.

For example, the pivot bar 1541 may be implemented by a pair of pivot bars 1541 connected to the front portion and the rear portion of the horizontal driving unit 1530 to be able to horizontally pivot.

Further, the elastic spring 1543 can bring the side support roller 1542 in close contact with the rail wall 310 by being connected to the other end of the pivot bar 1541 and providing tension. In this embodiment, although the elastic spring 1543 provides tension to the other end of the pivot bar 1541 by connecting the other end of the pivot bar 1541 with the eight 1535, the elastic spring 1543 may be mounted on the pivot bar 1541 in various ways, as long as it can provide tension for bringing the side support roller 1542 in close contact with the rail wall 310. For example, by disposing the elastic spring 1543 to a rotary shaft connecting one end of the pivot bar 1541 with the driving body 1531, it is possible to provide tension bringing the other end of the pivot bar 1541 in close contact with the rail side 310.

Figure 46A:
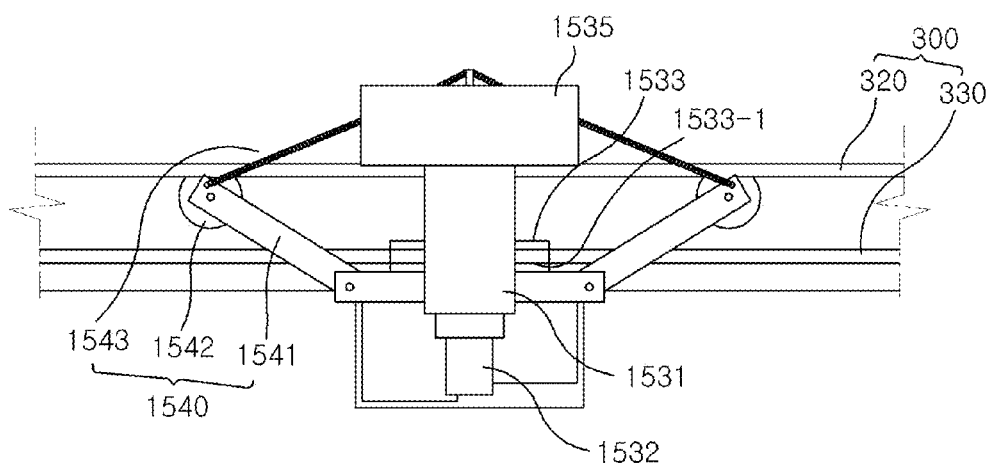
FIG. 46a is a view showing the operation of the balancing arm, when the scanning apparatus according to the eighth embodiment of the present invention moves on a vertical rail.
Figure 46B:
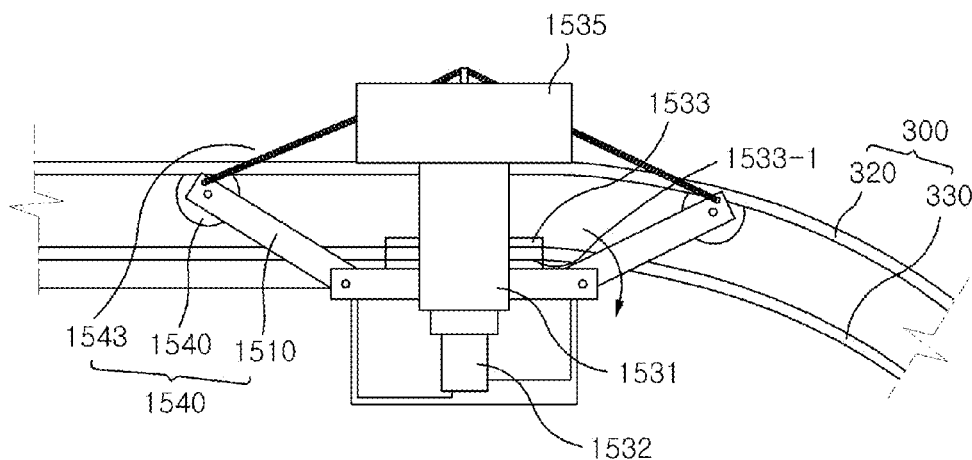
FIG. 46b is a view showing the operation of the balancing arm, when the scanning apparatus according to the eighth embodiment of the present invention moves on a curved rail of the vertical rail.
Figure 46C:
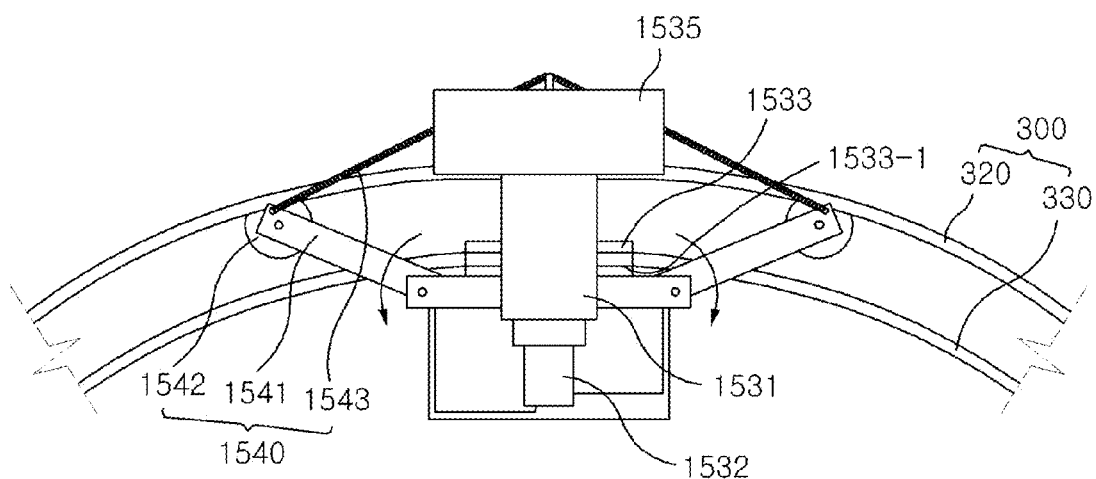
FIG. 46c is a view showing the operation of the balancing arm, when the scanning apparatus according to the eighth embodiment of the present invention moves on a curved rail.
Figure 46D:
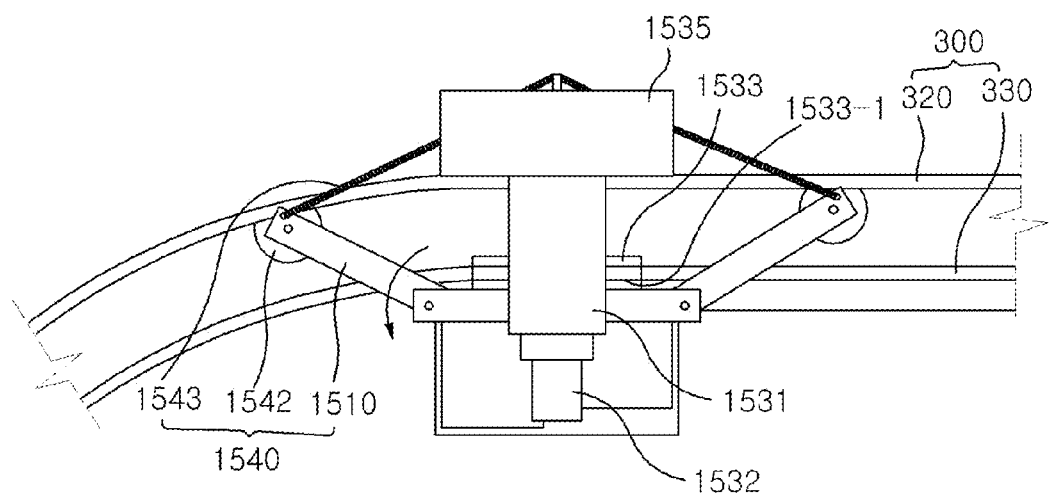
FIG. 46d is a view showing the operation of the balancing arm, when the scanning apparatus according to the eighth embodiment of the present invention moves on a curved rail.

As shown in FIG. 46a, as the horizontal driving unit 1530 moves on a straight rail, the pair of pivot bars 1541 can roll along the rail wall 310 with the angle therebetween increased at a predetermined level with respect to the driving roller 1533. As shown in FIG. 46b, as the horizontal driving unit 1530 moves to a curved rail from a straight rail, the angle of the pivot bar 1541 behind increases due to a change in curvature of the curved rail, so the horizontal driving unit 1530 can stably move horizontally with the balance maintained. As shown in FIG. 46c, as the horizontal driving unit 1530 moves on the curved rail 300, the angle between the pair of pivot bars 1541 changes due to a change in curvature of the curved rail, so horizontal movement can be stably made with the balance maintained. As shown in FIG. 46d, as the horizontal driving unit 1530 moves to a straight rail from a curved rail, the angle of the pivot bar 1541 behind decreases with the angle of the pivot bar 1541 ahead maintained, so horizontal movement can be stably made with the balance maintained.

Figure 47:
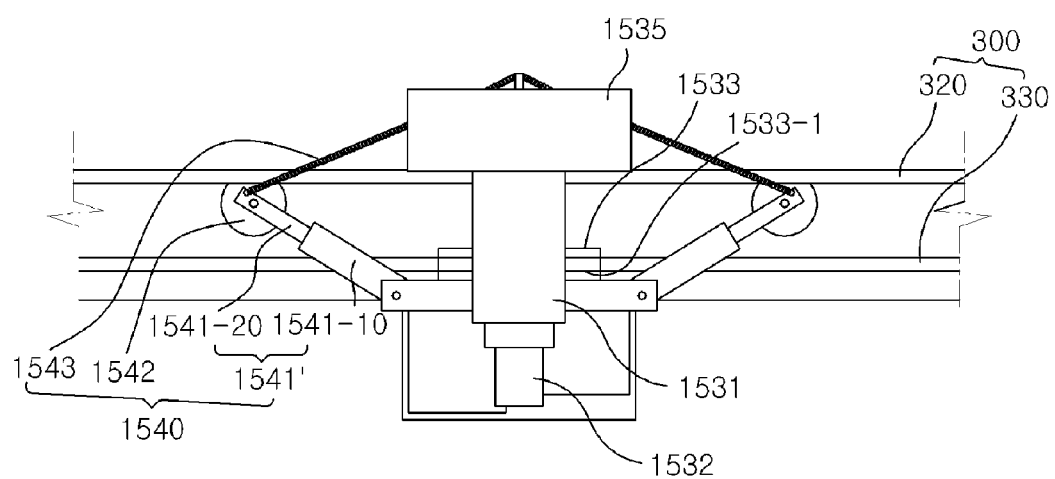
FIG. 47 is an enlarged plan view showing a balancing arm of a scanning apparatus for a display case according to a modified example of the eighth embodiment of the present invention.

As shown in FIG. 47, as a modified example of this embodiment, pivot bars 1541' of the balancing arm 1540 may change in length.

For example, the pivot bar 1541' may be composed of a main rod 1541-10 and a sub-rod 1541-20 connected to the main rod 1541-10 to be movable in/out of it The main rod 1541-10 is connected to the driving body 1531 of the horizontal driving unit 1530 to be able to horizontally pivot, the sub-rod 1541-20 is connected to the main rod 1541-10 to be movable in/out of it, and the side support roller 1542 may be coupled to an end of the sub-rod.

Accordingly, as the horizontal driving unit 1530 moves on a curved rail, the length of the pivot bar 1541' can change due to a change in curvature of the curved rail, so the horizontal driving unit 300 can move more smoothly and stably.

Figure 48A:
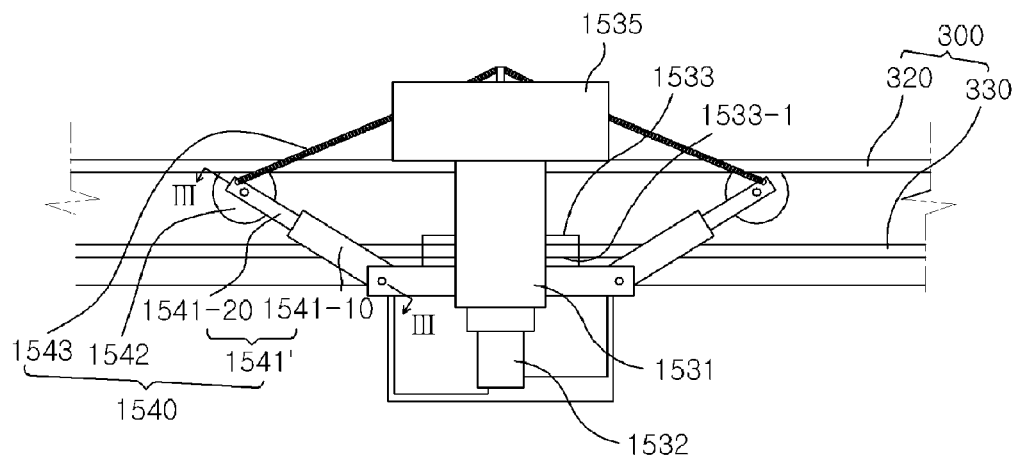
FIG. 48a is an enlarged plan view showing a balancing arm of a rail pulley block according to another modified example of the eighth embodiment.
Figure 48B:
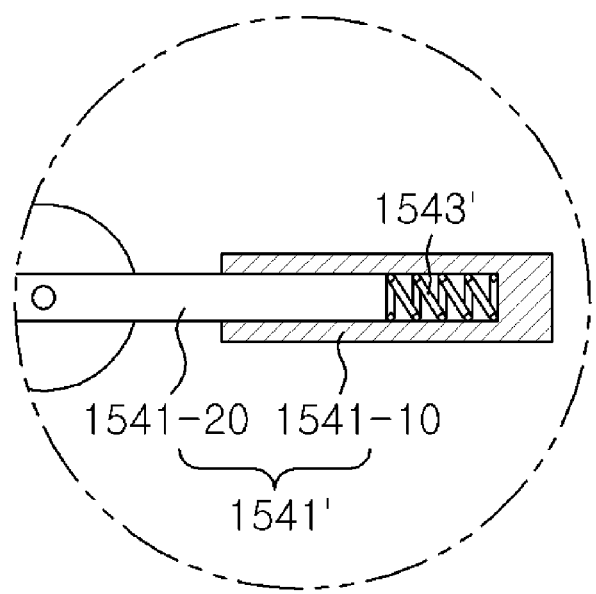

As shown in FIG. 48, as another modified example of this embodiment, the pivot bar 1541' may be composed of a main rod 1541-10 and a sub-rod 1541-20 connected to the main rod 1541-10 to be movable in/out of it, and a compression spring 1543' may be provided between the main rod 1541-10 and the sub-rod 1541-20.

The compression spring 1543' brings the side support roller 1542 in close contact with a side of the rail 300, between the main rod 1541-10 and the sub-rod 1541-20.

That is, when the driving roller 1533 moves on a curved rail, the compression spring 1543' is compressed or extended between the main rod 1541-10 and the sub-rod 1541-20, such that the length of the pivot bar 1541' can change with a change in curvature of the curved rail.

Figure 49:
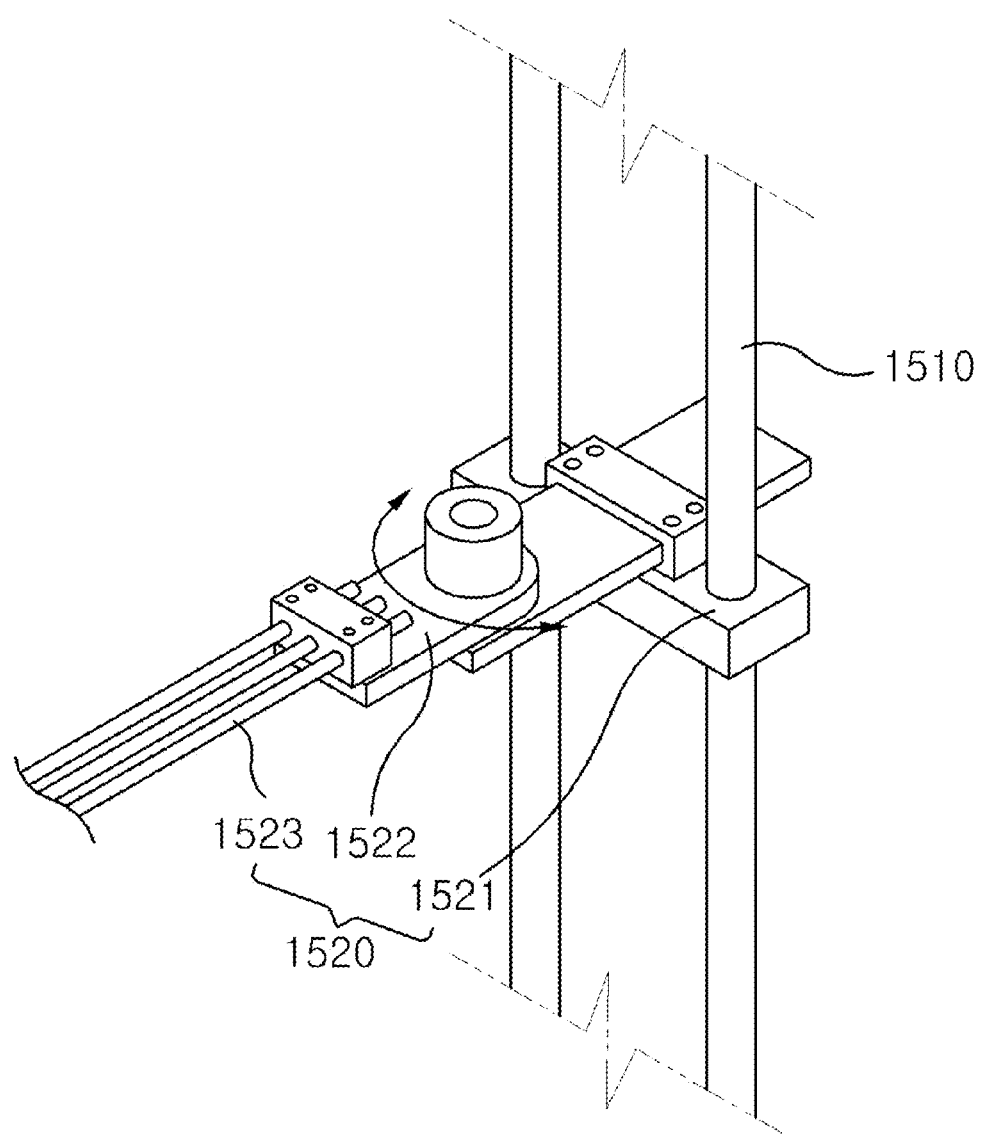
FIG. 49 is an enlarged perspective view showing a scanner of the scanning apparatus for a display case according to the eighth embodiment of the present invention.

As shown in FIG. 49, the scanner 1520 can scan articles 120 in the storage section 111 of the display case 110 by recognizing a signal from a wireless recognition part attached on the article 120, using a plurality of antennas 1523.

The scanner 1520 may include a mounting bracket 1521 disposed at a predetermined height on the body 1510, a rotary member 1522 rotatably hinged to the mounting bracket 1521, an antenna 1523 mounted at a rotational end of the rotary member 1522, and a return spring (not shown) providing elastic return force to the rotary member 1522.

The mounting bracket 1521 may be composed of a first mounting bracket 1521 fixed to the body 1510, which is composed of a pair of bars, by bolts and a second mounting bracket 1521 fixed perpendicularly to the first mounting bracket 1521 and extending to the storage section 111. Further, the return spring (not shown) providing elastic return force to the rotary member 1522 may be wound on a hinge shaft connected between the second mounting bracket 1521 and the rotary member 1522.

Although the scanner 1520 is positioned over articles in the storage section 111 in this embodiment, it is not limited thereto, and it may be positioned at the same height as the articles 120 in the storage section 111 and may come in direct contact with the articles 120, when the scanner 1520 horizontally moves.

The controller 1550 collects information data about the articles 120 from scan information from the scanner 1520 while controlling horizontal movement of the scanner 1520.

The controller 1550 receives scan information from the antennas 1523 and reads the article information data of the scanned article 120, through a reader (not shown). The reader may read out tag information signals in a UHF band or a VHF band from the RF tag on the article 120 received from the antennas 1523.

For example, when the scanner 1520 scans articles 120, the controller 1550 selects the position of the article 120 having the number of recognition of position tag having the information about the position of the display case 110, and the number of recognition of the most scanned position tag and the number of recognition of the most scanned product tag in the number of recognition of product tags having the actual information of products, as the actual position of the article 120, compares the position information and the product information of the selected article 120 with the position information and the product information of registered articles 120, and collects the article information data of the selected article 120, when the position information and the product information of the selected article 120 and the registered article 120 are the same.

The operational process of the preset invention having the configuration is described hereafter.

When power is supplied to the first and second power brushes 1536-1 and 1536-2 from the first and second power supply line 410 and 420 in a power line communication networks (PLC) and a operation signal is applied to the driving motor 1532 of the horizontal driving unit 1530 with booting of the reader, the driving roller 1533 of the horizontal driving unit 1530 can move in the longitudinal direction of the display case 110 along the rail 300 of the display case 110.

In this process, as the horizontal driving unit 1530 moves, the scanner 1520 can scan the articles 120 in the storage section 111 and the controller 1550 can select the actual positions of the articles 120 by comparing the number of times of position tag recognition of the storage section 111 with the number of times of product tag recognition of the products, from scan information sent from the scanner 1520. Further, the trigger sensor 1570 keeps monitoring the trigger 1560 on the movement path of the horizontal driving unit 1530, and when the trigger sensor 1570 finds a trigger 1560, the controller 1550 can reciprocate the horizontal driving unit 1530 in the space between the pair of triggers 1560 or stop the horizontal driving unit 1530.

When scanning the articles 120 in the storage section 111 is finished, power supply through the first and second power supply lines 410 and 420 may be stopped in the power line communication network. Further, the controller 1550 analyzes and filters information data received in the operation and sends it out through a wireless LAN, and then changes into a standby mode.

Figure 50:
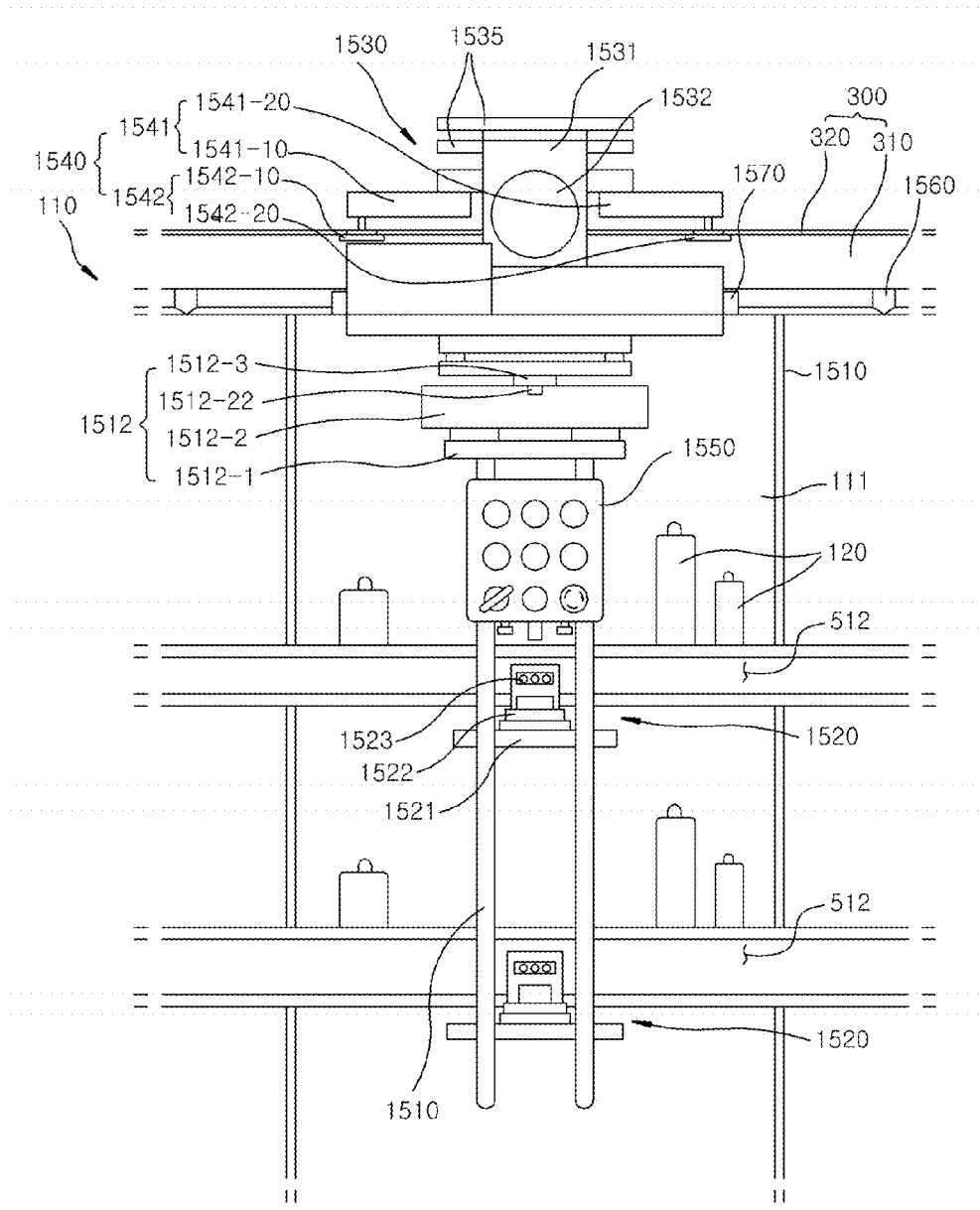
FIG. 50 is a front view showing a scanning apparatus for a display case according to another modified example of the eighth embodiment of the present invention.
Figure 51:
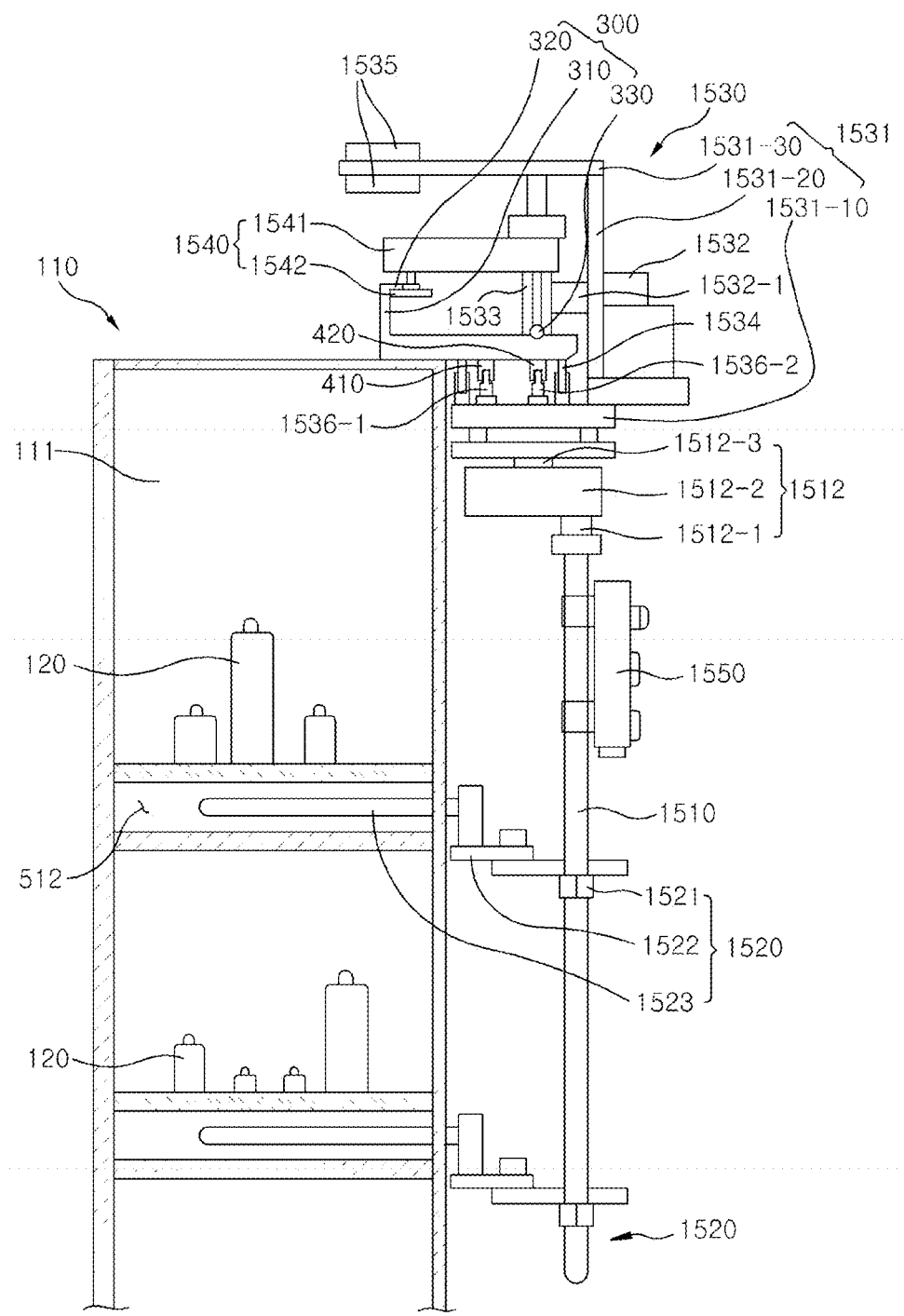
FIG. 51 is a side view showing a scanning apparatus for a display case according to another modified example of the eighth embodiment of the present invention.

As shown in FIGS. 50 and 51, in this embodiment, antenna movement sections 512 may be formed in the display case 110.

The antenna movement sections 512, which are for providing movement paths of the antennas 1523 in the display case 110, may be provided under the storage sections 111 storing the articles 120. Accordingly, as the scanner 1520 moves, the antennas 1523 moves through the antenna movement sections 512, so it is possible to prevent collision between the antenna 1523 and the article 120 and achieve quick and accurate scanning.

Figure 52:
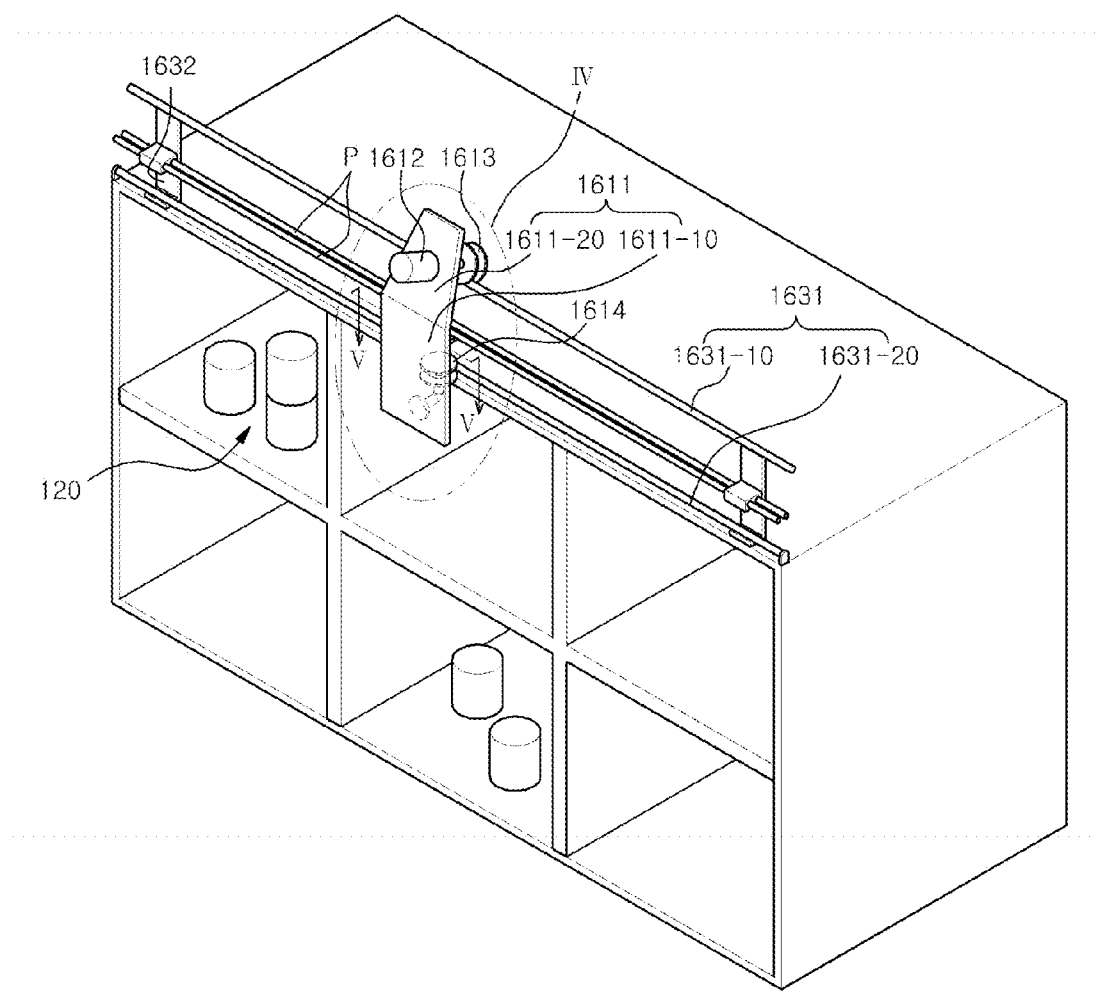
FIG. 52 is a perspective view showing a scanning apparatus for a display case according to a ninth embodiment of the present invention.
Figure 53A:
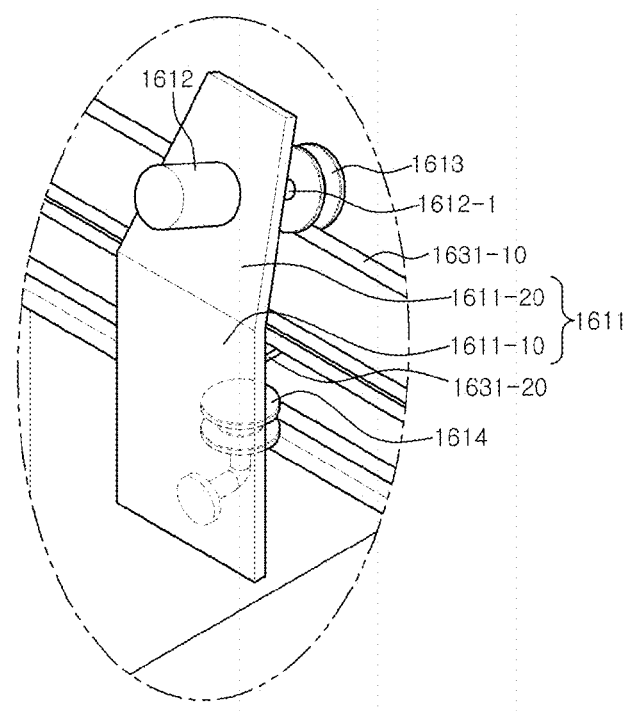
FIG. 53a is an enlarged view showing the portion IV in FIG. 52.
Figure 53B:
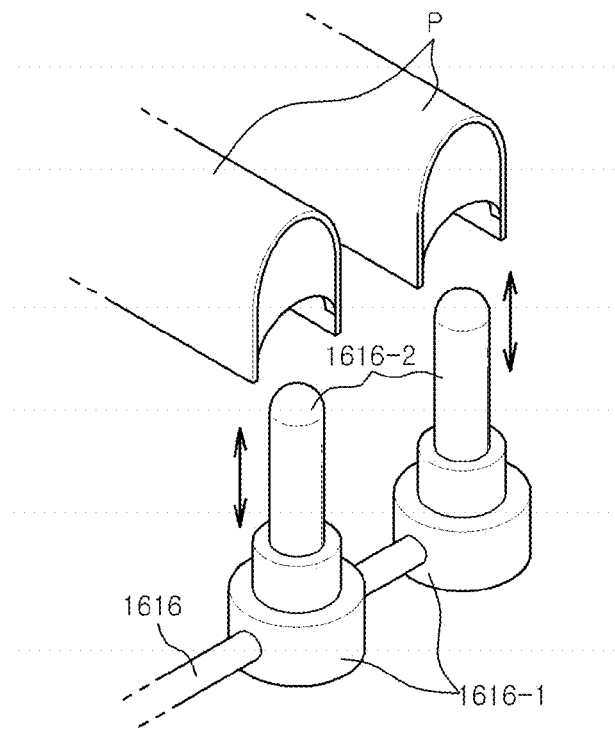
FIG. 53b is an exploded perspective view showing a connection structure between a power line communication network and the scanning apparatus for a display case in FIG. 52.
Figure 54:
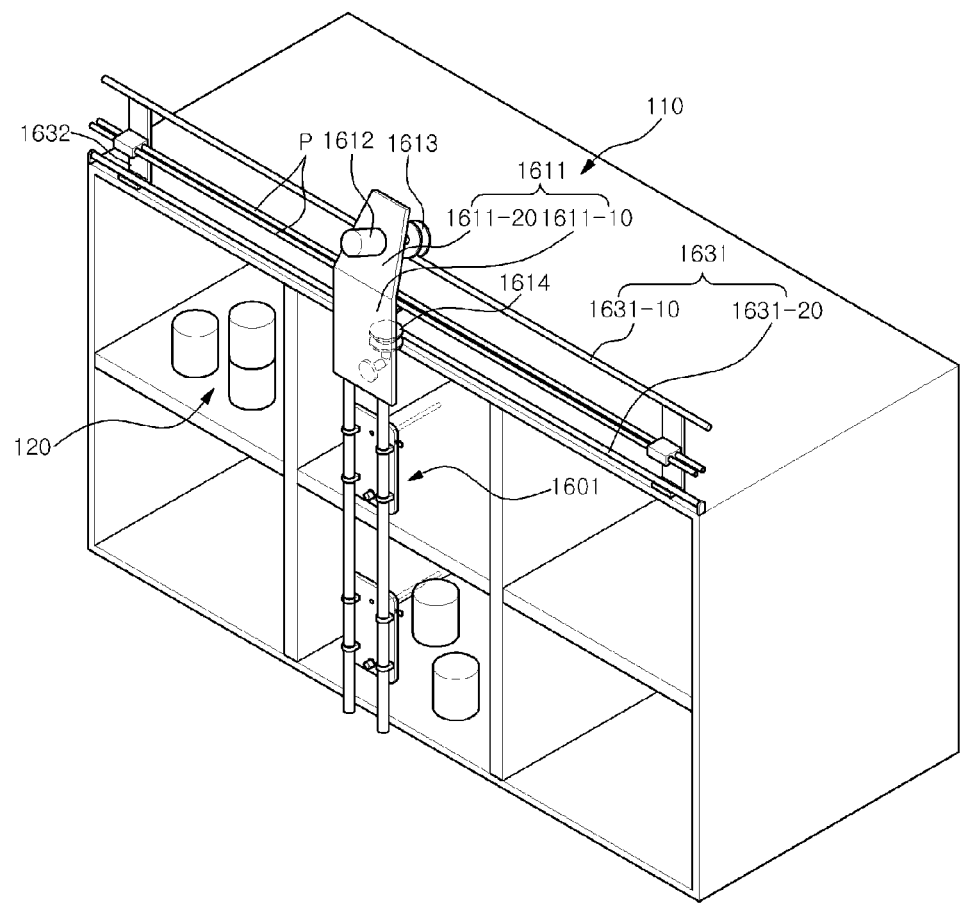
FIG. 54 is an enlarged view showing the state when a scanner is mounted on the scanning apparatus for a display case according to the ninth embodiment of the present invention.

As shown in FIGS. 52 to 54, a scanning apparatus according to a ninth embodiment of the present invention has a structure capable of moving along a guide bar 1631 longitudinally disposed on the display case 110, so it can effectively scan articles in the display case 110, using a scanner 1601.

The apparatus may include a body 16110, a driving motor 1612, a driving roller 1613, and a support roller 1614.

In detail, the body 1611, a frame where the driving roller 1613 and the support roller 1614 are mounted, can move along the guide bar 1631 of the display case 110, using the driving roller 1613 and the support roller 1614.

The scanner 1601 for scanning articles exhibited in the display case 110 may be mounted on the body 1611. The scanner 1601 can check the present state of storage and delivery of articles in the display case 110 from identifications of the articles 120 in real time. To this end, an identification such as a tag capable of providing various items of information about articles may be attached to the articles 120.

The body 1611 may include a lower support frame 1611-10 where the support roller 1614 is mounted and an upper support frame 1611-20 that is connected to the upper portion of the lower support frame 1611-10 and on which the driving motor 1612 is mounted. The upper support frame 1611-20 is connected to the a lower support frame 1611-10 to bend toward the guide bar 1631, so the driving roller 1613 connected to the driving motor 1612 can be arranged at a predetermined angle (a), for example 45 degrees (see FIGS. 55a and 55b), and accordingly, the driving roller 1613 can be stably seated on a first bar rail 1631-10 to be described below.

Obviously, the form and the shape of the body 1611 are not limited to that described above and may be modified in various forms and shapes. Further, although the driving roller 1613 is inclined at a predetermined angle along the inclination angle of the driving motor 1612 in this embodiment, the driving roller 1613 itself may be bent at a predetermined angle for smooth curved movement.

The driving motor 1612, a driving source for moving the body 1611 along the guide bar 1631, can be supplied with power by being electrically connected with a PLC (Power Line Communication) network.

To this end, a power communication line P for implementing a PLC (Power Line Communication) network may be provided in the display case 110, and when the power communication line P is used, power and data can be transmitted simultaneously to the driving motor 1612 and the scanner etc. The power line communication line is the same as common power line communication lines making it possible to use voice, data, and the internet etc. at a high speed through electric wires and is not described in detail.

For example, as shown in FIG. 53b, an electrode 1616-2 electrically in contact with the power communication line P may be mounted on a socket 1616-2 and connected to the body 1611 through a connecting member 1616. The electrode 1616-2 is detachably mounted on the socket 1616-2 to be replaceable, and it is preferably formed as long as possible in consideration of friction.

The driving motor 1612 is mounted on the body 1611, in more detail, on the upper support frame 1611-20 and may be connected with the driving roller 1613 through the driving shaft 1612-1.

Figure 55A:
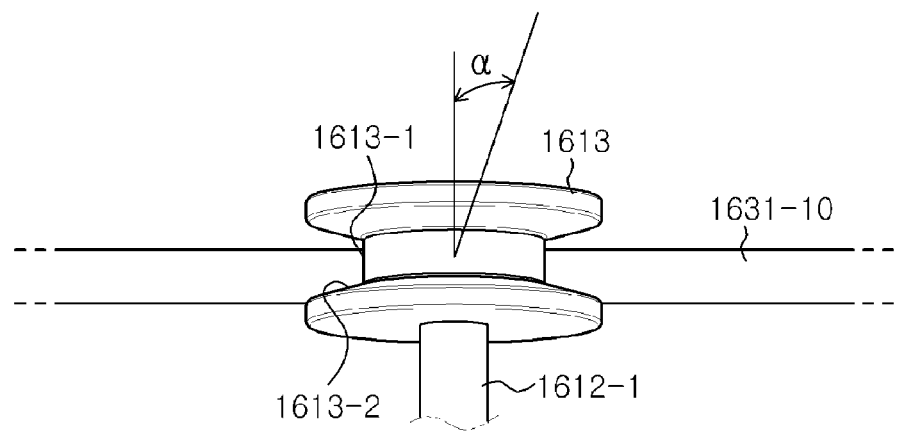
FIG. 55a is a view showing the state when a driving roller of the scanning apparatus for a display case according to the ninth embodiment of the present invention moves on a straight path.
Figure 55B:
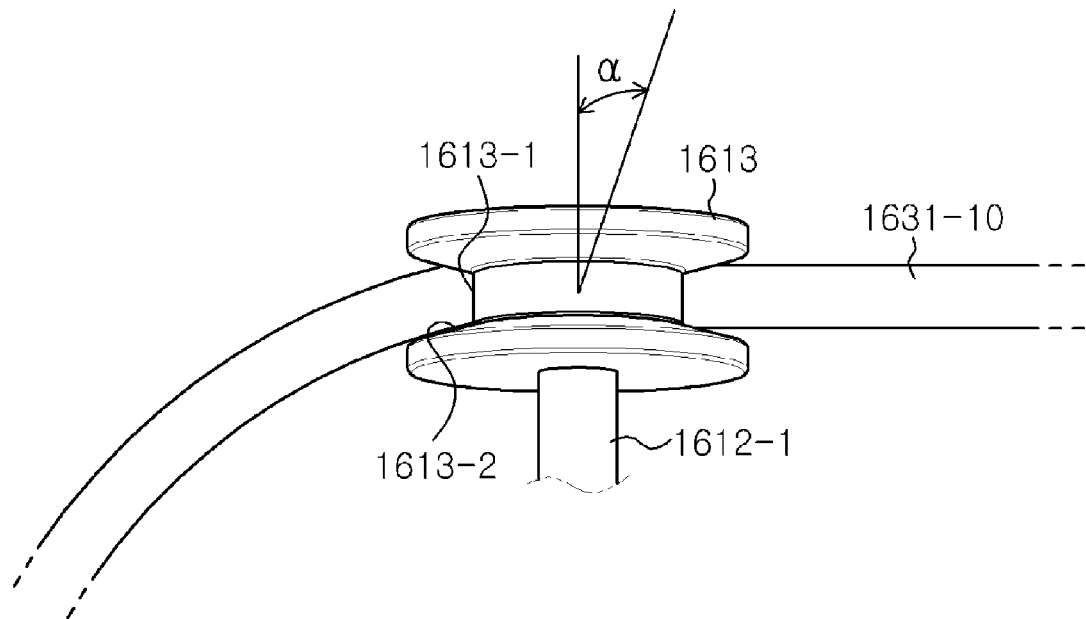
FIG. 55b is a view showing the state when a driving roller of the scanning apparatus for a display case according to the ninth embodiment of the present invention moves on a curved path.

As shown in FIGS. 55a and 55b, the driving roller 1613, which is rotated by a driving force of the driving motor 1612 transmitted through the driving shaft 1612-1, can move along the guide bar 1631 while rotating in one direction or in the other direction, when the driving motor 1612 operates.

A driving groove 1612-1 that can come in close contact with the first bar rail 1631-10 and a guide groove 1613-2 that can come in close contact with the first bar rail 1631-10 formed in the shape of a curve or an inflection line with the driving groove 1612-1 therebetween may be formed on the outer circumference of the driving roller 1613. Accordingly, the driving roller 1613 can stably move on not only the straight first bar rail 1613-10, but a first bar rail 1631-10 having the shape of a curve or an inflection line.

The driving groove 1612-1 and the guide groove 1613-2 may be applied to the support roller 1614 in the same way.

For example, though not shown, a driving groove (not shown) that can come in contact with a second bar rail 1631-20 and a guide groove (not shown) that can come in close contact with the second bar rail 1631-20 formed in the shape of a curve or an inflection line with the driving groove 1612-1 therebetween may be formed on the outer circumference of the support roller 1614 too.

The guide bar 1631 extends in the longitudinal direction of the display case 110, for example, to the left and right of the display case 110 and can provide a movement path on which the body 1611 moves.

The guide bar 1631 has a cross-section formed in a circular bar and may be composed of the first bar rail 1631-10 and the second bar rail 1631-20 combined with mounting brackets 1632 spaced in the longitudinal direction of the display case 110. The first bar rail 1631-10 is in close contact with the driving roller 1613 at a predetermined distance over the second bar rail 1631-20 in parallel, and the second bar rail 1631-20 may be in close contact with the support roller 1614 at a predetermined distance under the first bar rail 1631-10 in parallel.

Although the guide bar 1631 is composed of the first bar rail 1631-10 and the second bar rail 1631-20 in this embodiment, it is provided for the convenience of description and the guide bar 1631 may be disposed in various numbers and shapes. For example, one, or three or more guide bars 1631 may be formed and combined with the display case 110.

As described above, since the guide bar 1631 is formed in a circular bar shape, it is easy to install and change the path of a rail, and particularly, it is easy to install a curved rail.

Figure 56:
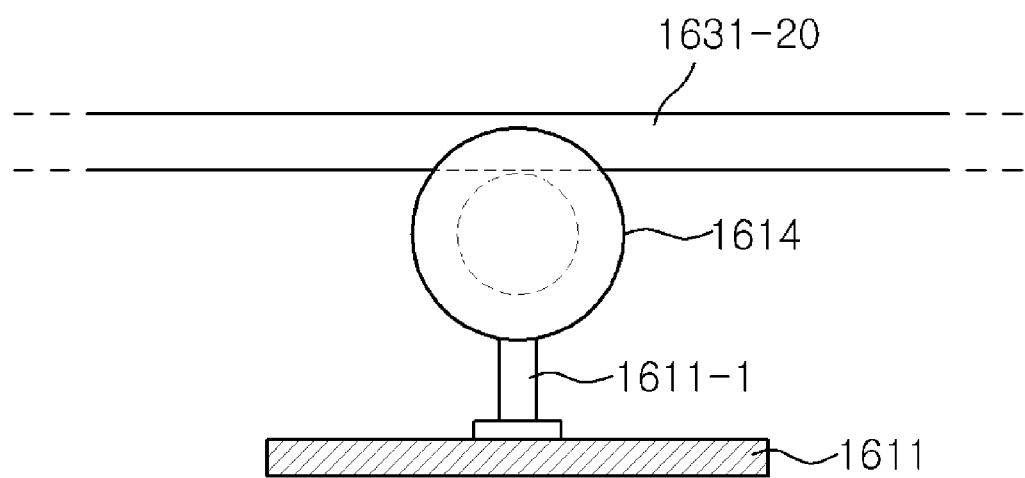
FIG. 56 is a cross-sectional plan view taken along line V-V in FIG. 52.

As shown in FIG. 56, the support roller 1614 is mounted on the lower support frame 1611-10 through a support 1611-1 in close contact with the second bar rail 1631-20 and can maintain stable movement of the body 1611, when the driving roller 1613 operates.

Accordingly, as the driving roller 1613 mounted at the upper portion of the body 1611 moves along the first bar rail 1631-10, the support roller 1614 mounted at the lower portion of the body 1611 moves along the second bar rail 1631-20, so the entire balance and stable movement of the body 1611 can be achieved.

Figure 57:
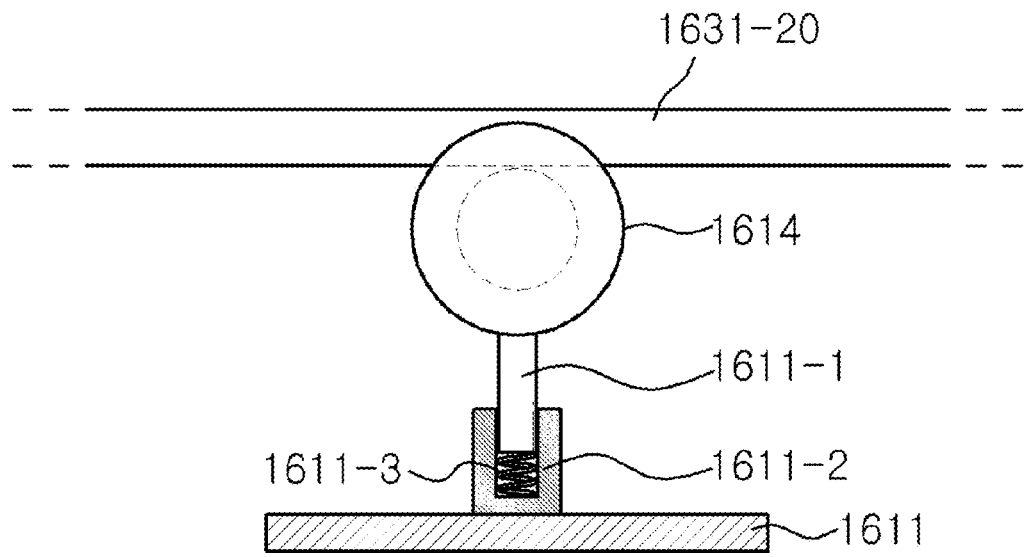
FIG. 57 is a cross-sectional plan view taken along line V-V in FIG. 52, in accordance with a modified example of the ninth embodiment.

As shown in FIG. 57, as a modified example of the ninth embodiment, for stable movement of the support roller 1614 with respect to the second bar rail 1631-20, the support 1611-1 of the support roller 1614 may be elastically supported by a coil spring 1611-3.

For example, the support 1611-1 may be connected to a support block 1611-2 mounted on the body 1611 through the coil spring 1611-3. Accordingly, the support roller 1614 can make sure of stable movement of the body 1611, even if the gap between the second bar rail 1631-20 and the body 1611 changes, in close contact with the second bar rail 1631-20, by shock-absorbing of the coil spring 1611-3.

Figure 58:
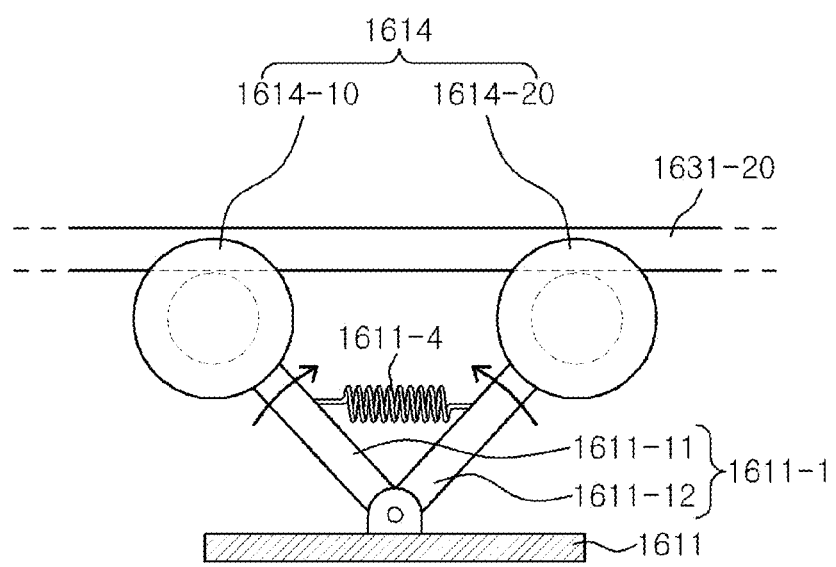
FIG. 58 is a cross-sectional plan view taken along line V-V in FIG. 52, in accordance with another modified example of the ninth embodiment.

As shown in FIG. 58, as another modified example of the ninth embodiment, a plurality of support rollers 1614 may be arranged in parallel in the horizontal direction of the display case 110.

For example, the support roller 1614 may be composed of a first support roller 1614-10 disposed ahead in the movement direction of the body 1611 and a second support roller 1614-20 disposed behind in the movement direction of the body 1611. Further, the first support roller 1614-10 and the second support roller 1614-20 may be rotatably connected to the body 1611 by hinge brackets hinged to the first support 1611-11 and the second support 1611-12.

Tension may be applied to the support 1611-1 connected to the first support roller 1614-10 and the second support roller 1614-20 by the coil spring 1611-4. Accordingly, the first support roller 1614-10 and the second support roller 1614-20 can be in close contact with the second bar rail 1631-20, and even if the support roller 1614 moves on the curved second bar rail 1631-20, the body 1611 can stably move along the guide bar 1631.

Figure 59:
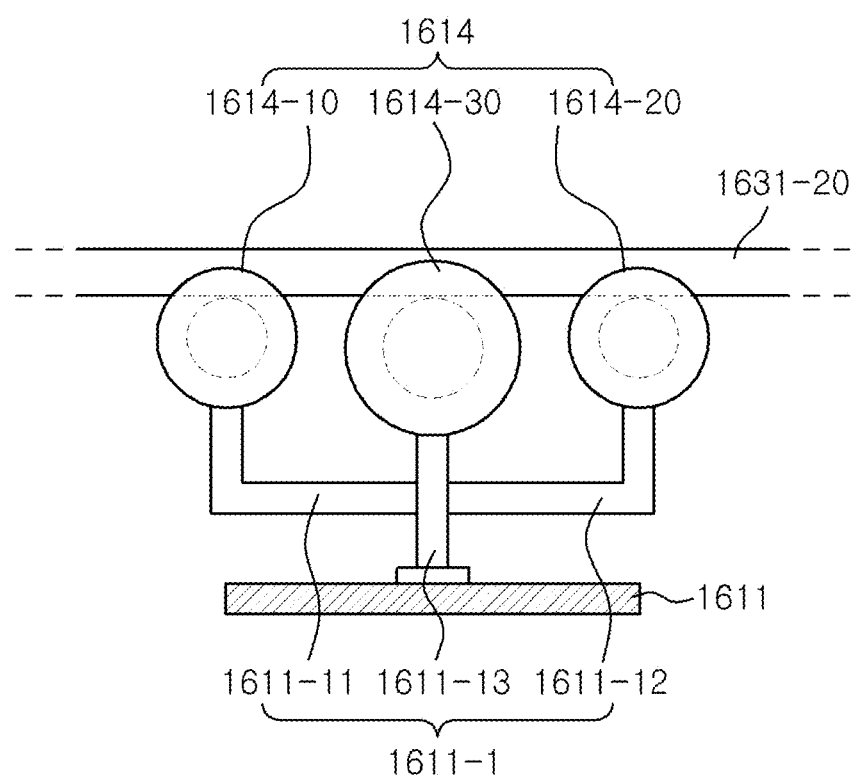
FIG. 59 is a cross-sectional plan view taken along line V-V in FIG. 52, in accordance with another modified example of the ninth embodiment.

As shown in FIG. 59, as another example of the ninth embodiment, the support roller 140 may include a first support roller 1614-10, a second support roller 1614-20, and a third support roller 1614-30.

The first support roller 1614-10 may be positioned ahead in the movement direction of the body 1611 by the first support 1611-11, the second support roller 1614-20 may be positioned behind in the movement direction of the body 1611 by the second support 1611-12, and the third support roller 1614-20 may be positioned between the first support roller 1614-10 and the second support roller 1614-20 by the third support 1611-13. Further, the first support roller 1614-10 and the second support roller 1614-20 receive tension by an elastic spring (not shown), such that they can smoothly move along the curved guide bar 1631, when the body 1611 moves on a curve.

Hereinafter, the operation of a scanning apparatus according to an embodiment of the present invention having the configuration described above is described.

As the driving roller 1613 is rotated in one direction or the other direction by the operation of the driving motor 1612, the driving roller 1613 and the support roller 1614 roll on the first bar rail 1631-10 and the second bar rail 1631-20, such that the body 1611 moves in the horizontal direction of the display case.

In this process, the scanner 1601 mounted on the body 110 moves close to the articles exhibited in the display case 110 and can repeatedly scan the articles in the display case 110.

In particular, as the body 1611 moves on the curved guide bar 1631, when the support 1611-1 is elastically supported by the coil spring 1611-2 (see FIG. 57), the coil spring 1611-3 can make sure of smooth movement of the body 1611 by contracting or stretching in accordance with the gap between the body 1611 and the guide bar 1631, and when a pair of supports 1611-1 is elastically supported by the elastic spring 1611-4 (see FIG. 58), the elastic spring 1611-4 can make sure of smooth movement of the body 1611 by contracting or stretching in accordance with the gap between the body 1611 and the guide bar 1631.

Figure 60:
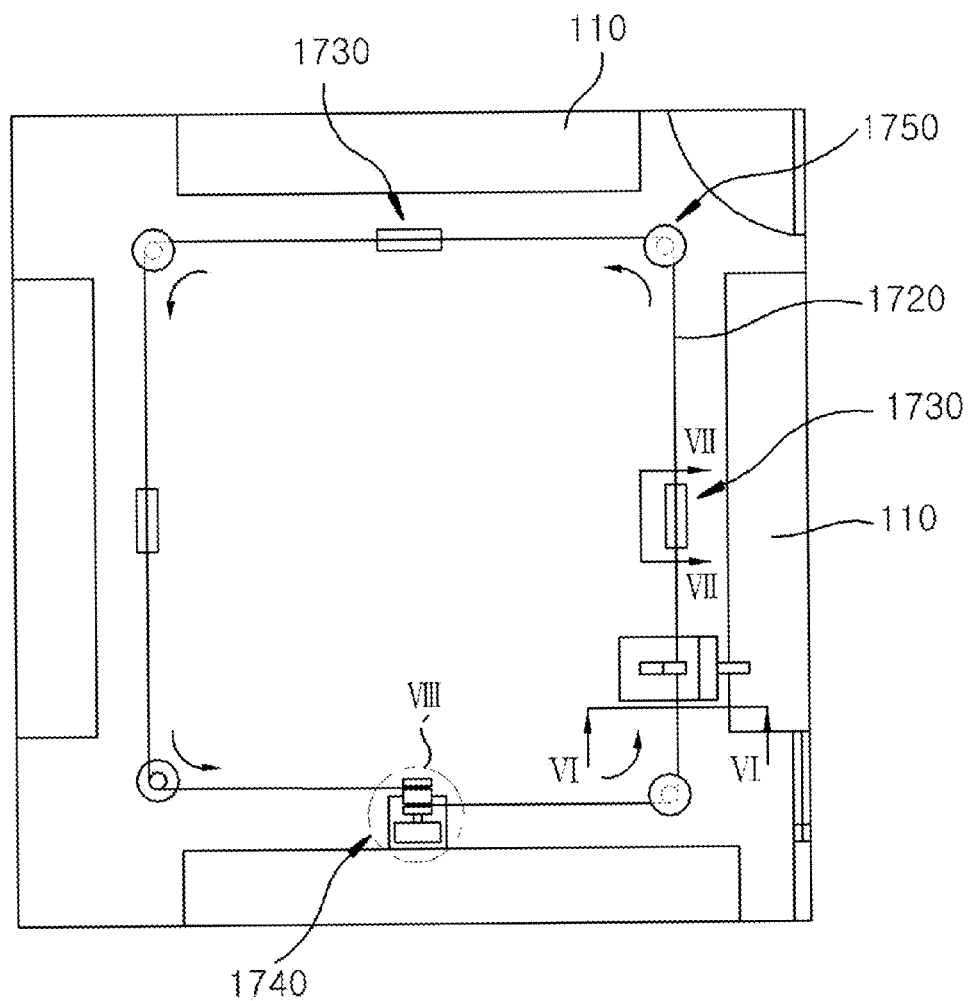
FIG. 60 is a view showing the configuration of a scanning apparatus for a display case according to a tenth embodiment of the present invention.
Figure 61A:
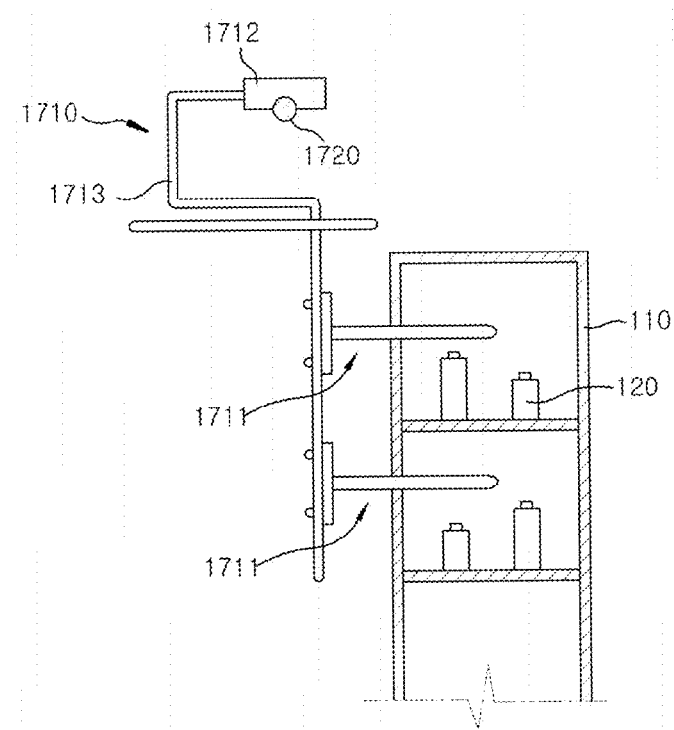
FIG. 61a is a view showing the configuration of a body of the scanning apparatus for a display case, seen from line VI-VI in FIG. 60.

As shown in FIGS. 60 to 61a, a scanning apparatus according to a tenth embodiment of the present invention includes a body 1710, a cable 1720, a driving unit 1740, a support member 1730, and a guide pulley 1750 and can stably scan articles 120 in the display case 110 by movement of the cable 1720.

In detail, the body 1710, which can move along an edge of the display case 110 by a cable 200, may include a fixed bar 1712 fixed to the cable 1720, a scanner 1711 for scanning articles 120 exhibited in the display case 110, and a connecting frame 1713 connecting the fixed bar 1712 and the scanner 1711 with each other.

The fixed bar 1712 is connected perpendicularly to the cable 1720, in more detail, fixed to the upper portion of the cable 200, such that when the cable 1720 with the fixed bar 1712 fixed moves over the support member 1730, the lower portion of the cable 1720 can move, using the support pulley 1732 of the support member 1730.

Further, the connecting frame 1713 is formed in a U-shape, and of which one end may be connected to the fixed bar 1712 and the other end may be connected to the scanner 1711. The connecting frame 1713 may be connected to the scanner 1711 in consideration of the center of gravity of the body 1710 so that the scanner 1711 can keep horizontal balance.

Figure 61B:
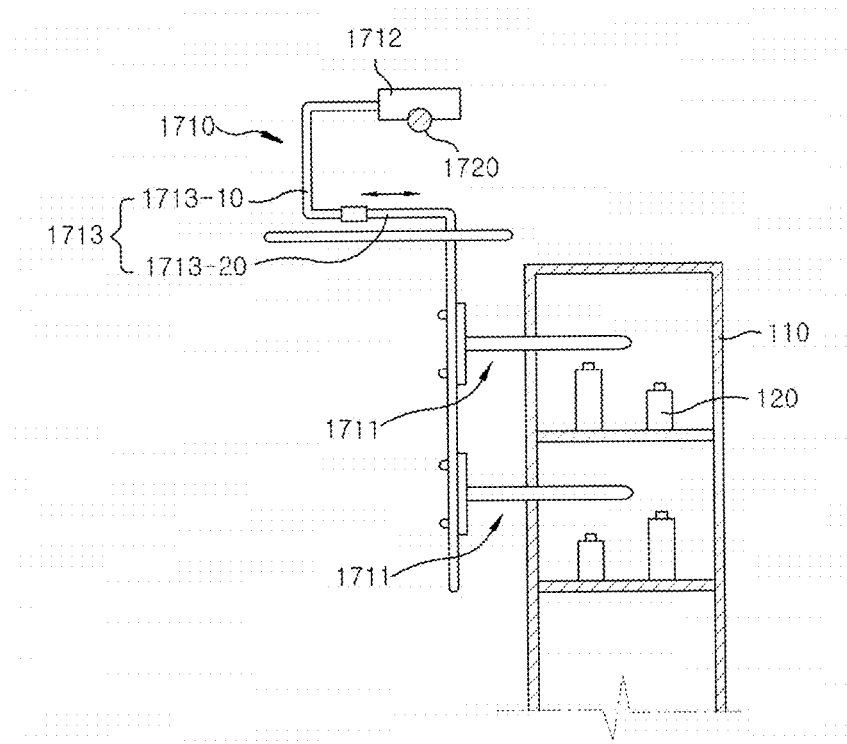
FIG. 61b is a view showing the configuration of a modification of the body of the scanning apparatus for a display case, seen from line VI-VI in FIG. 60.

For example, as shown in FIG. 61*b*, the connecting frame 1713 may be composed of a first connecting frame 1713 connected to the fixed bar 1712 and a second connecting frame 1713 connected to the first connecting frame 1713 to be movable in/out of it. When the center of gravity of the body 1710 moves to a side, the horizontal length of the connecting frame 1713 is adjusted by putting the second connecting frame 1713 into/out of the first connecting frame 1713, such that the body 1710 fixed to the cable 1720 can keep balancing and stable position.

Further, the scanner 1711 can check the present state of storage and delivery of articles 120 in the display case 110 from identifications of the articles 120 in real time. To this end, an identification such as a tag capable of providing various items of information about articles 120 may be attached to the articles 120.

An RFID-based technology is applied to this embodiment, so the scanner 1711 can receive RF signals from the RF tags on the articles 120. The scanner 1711 may be formed in the shape of an antenna arm that can rotate in the horizontal direction of the display case 110. Obviously, other than the RFID-based technology, other types of wireless recognition technologies that can wirelessly transmit the information of the article 120 may be applied in various ways to the present invention.

The cable 1720 can be supported vertically and horizontally by the support member 1730 or the guide pulley 1750 arranged along the display case 110 and can be moved along the edge of the display case 110 by a driving force from the driving unit 1740.

The cable 1720 may be formed in a closed loop around the ceiling or the edge of the display case 110. Accordingly, the body 1710 fixed to the cable 1720 can circulate clockwise or counterclockwise. That is, when the cable 1720 is pulled in one direction, the body 1710 fixed to the cable 1720 can move in one direction, and when the cable 1720 is pulled in the other direction, the body 1710 fixed to the cable 1720 can move in the other direction.

Figure 62:
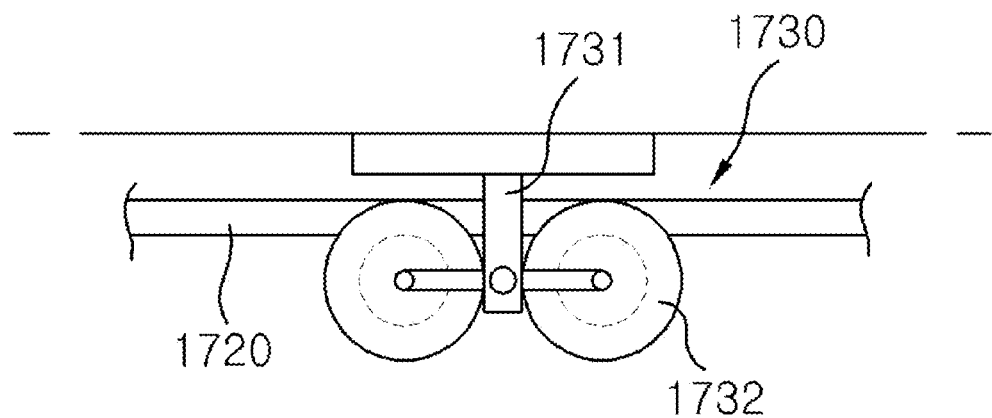
FIG. 62 is a view showing the configuration of a support of the scanning apparatus for a display case, taken along line VII-VII in FIG. 60.
Figure 63:
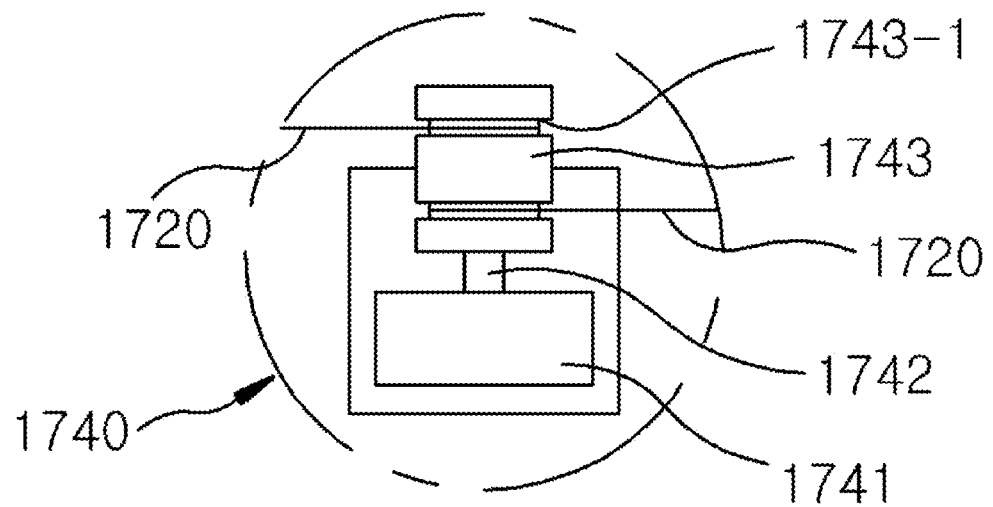
FIG. 63 is an enlarged view showing the portion VIII in FIG. 60.

As shown in FIGS. 62 and 63, the driving unit 1740 can move the body 1710 along the movement path with the cable 1720 thereon by providing a driving force to the cable 1720. The driving unit 1740 may include a driving motor 1714 mounted on the ceiling or the display case 110, a driving shaft 1742 for transmitting a rotational force of the driving motor 1741 to the cable 1720, and a driving roller 1743 that mounted on the driving shaft 1742 and on which an end of the cable 1720 is wound.

The driving motor 1741, a driving source for moving the cable 1720 to which the body 1710 is fixed, can be supplied with power by being electrically connected with a PLC (Power Line Communication) network. For example, the rotation (circulation) direction of the cable due to the operation of the driving motor 1741 may depend on an operation signal of a control unit/PC (not shown) which is transmitted through a power line communication network. Obviously, the power line communication network can be used as a power source for operating the scanner 1711.

Further, a driving groove 1743-1 of which the cable 1720 can be wound may be formed on the driving roller 1743. The driving groove 1743-1 is formed spirally on the outer circumference of the driving roller 1743, such that as the driving shaft 1742 with the driving roller 1743 rotates in one direction, the cable 1720 is wound and unwound in the driving groove 1743-1 of the driving roller 1743 and the body 1710 can be moved in one direction (winding direction) by the winding and unwinding of the cable 1720.

The support member 1730 is mounted on the ceiling or the display case 110 to support the vertical movement of the cable 1720, so it can stably guide movement of the body 1710.

The support member 1730 may be composed of a fixed member 1731 fixed to the ceiling or the display case 110 and a support pulley 1732 mounted on the fixed member 1731 and supporting the cable 1720. Preferably, the support pulley 1732 is provided in a pair connected with each other in a the shape of a seesaw with a hinge shaft therebetween, such that as the cable 1720 presses down one of the support pulleys 1732, the other pulley 1732 can apply tension to the cable 1720 while moving upward, and accordingly, the cable 1720 can keep tight.

The guide pulley 1750 is formed in a wheel shape to lock and turn the cable 1720 and disposed on the ceiling or the display case 110 to support side movement of the cable 1720, so it can provide a side breakpoint of the cable 1720.

In the scanning apparatus according to this embodiment, although the cable 1720 is arranged in a rectangle supported by four guide pulleys 1750, the entire arrangement of the cable 1720 may be changed in various ways in accordance with the shape of the entire space or the structure of the display case 110. For example, though not shown, the cable 1720 may be arranged in an octagon by being supported by eight guide pulleys 1750, or the cable 1720 may be arranged generally close to a circle by being supported by eight or more guide pulleys 1750.

Figure 64:
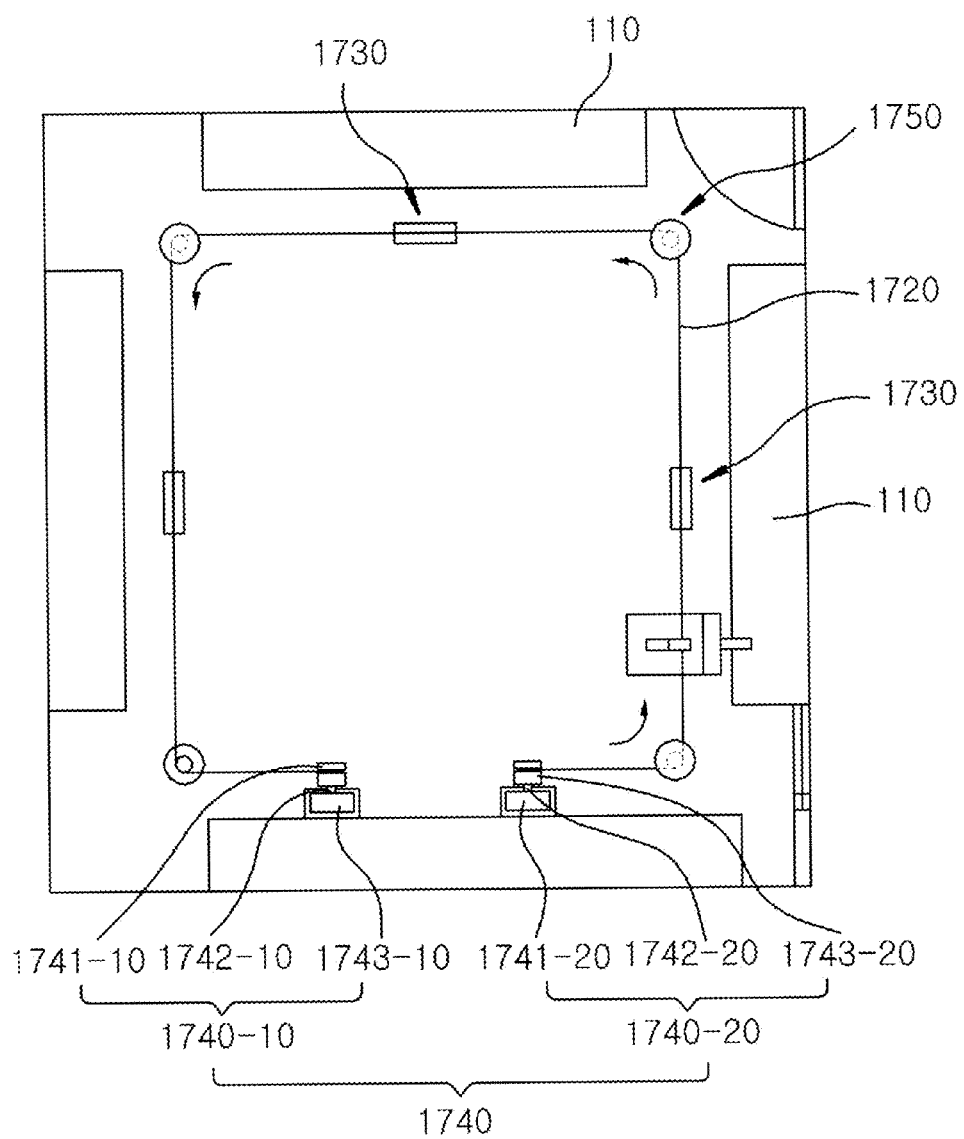
FIG. 64 is a view showing the configuration of a scanning apparatus for a display case according to a modified example of the tenth embodiment of the present invention.

As shown in FIG. 64, in a scanning apparatus according to a modified example of the tenth embodiment, the driving roller 1743 of the driving unit 1740 may be composed of a first driving roller 1743-10 and a second driving roller 1743-20, and the driving motor 1741 may be composed of a first driving motor 1741-10 and a second driving motor 1741-20.

In this example, the other configuration except for the driving unit 1740, for example, the cable 1710, the configuration of the cable 1720, the support member 1730, and the guide pulley 1750 is the same as the configuration the cable 1710, the configuration of the cable 1720, the support member 1730, and the guide pulley 1750, so the detailed description is not provided.

The first driving roller 1743-10, which is a driving roller 1743 on which one end of the cable 1720 is wound, is mounted on the first driving shaft 1742-10 and can receive a driving force from the first driving motor 1741-10. The second driving roller 1743-20, which is a driving roller 1743 on which the other end of the cable 1720 is wound, is mounted on the second driving shaft 1742-20 and can receive a driving force from the second driving motor 1742-20.

The first driving roller 1743-10 and the second driving roller 1743-20 can be controlled by the first driving motor 1741-10 and the second driving motor 1741-20 to roll in the opposite directions. For example, when the first driving roller 1743-10 rolls in the winding direction of the cable 1720, the second driving roller 1743-20 rolls in the unwinding direction of the cable 1720, such that the cable 1720 can move between the first driving roller 1743-10 and the second driving roller 1743-20.

The operational process of the preset invention having the configuration is described hereafter.

When power is applied to the scanner 1711 of the body 1710 and the driving motor 1741 of the driving unit 1740 through a power supply line (not shown), which is a power line communication (PLC) network, the reader (not shown) of the scanner 1711 is booted and the driving force of the driving motor 1741 is transmitted to the driving roller 1743, so the body 1710 can move on the cable 1720.

The scanner 1711 can scan articles 120 in the display case 110 while moving along the cable 1720 and can stably read article information data and position information data of the articles 120 from scan information scanned from the tags on the articles 120.

Figure 65:
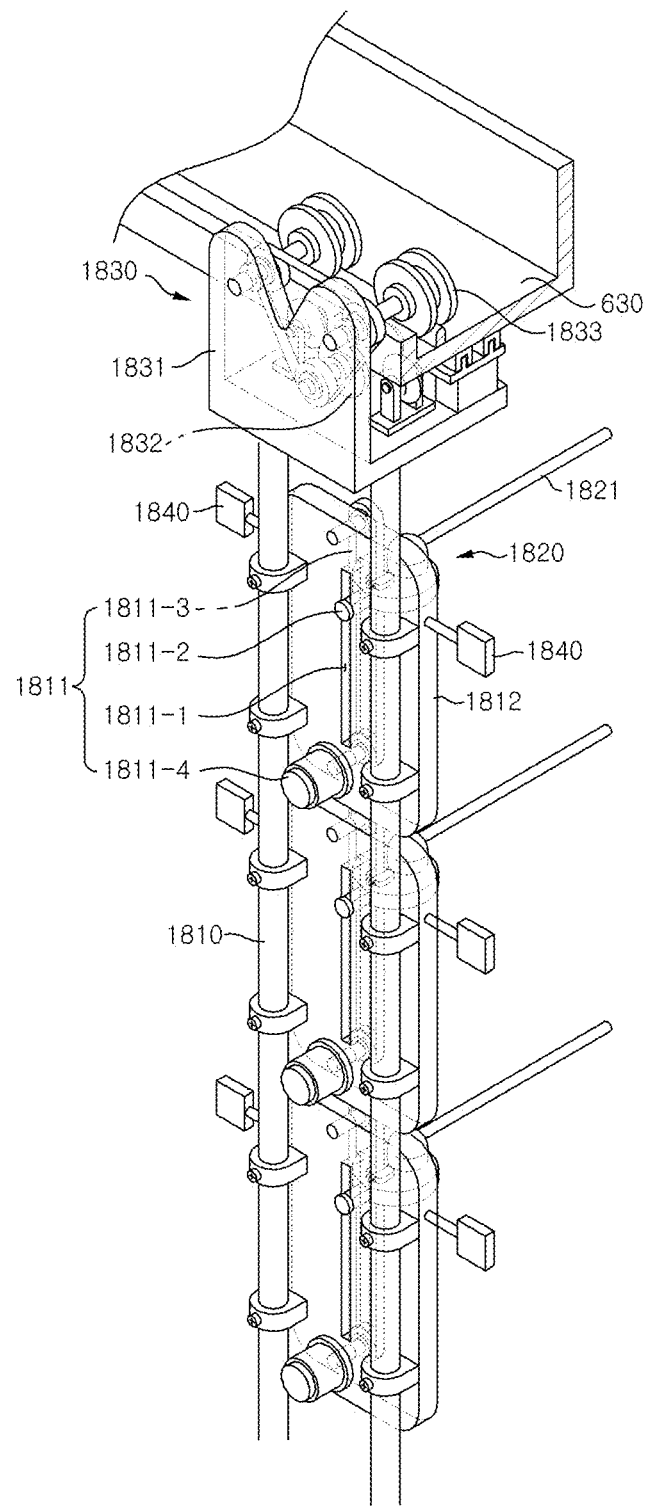
FIG. 65 is a view showing the configuration of a scanning apparatus for a display case according to an eleventh embodiment of the present invention.
Figure 66A:
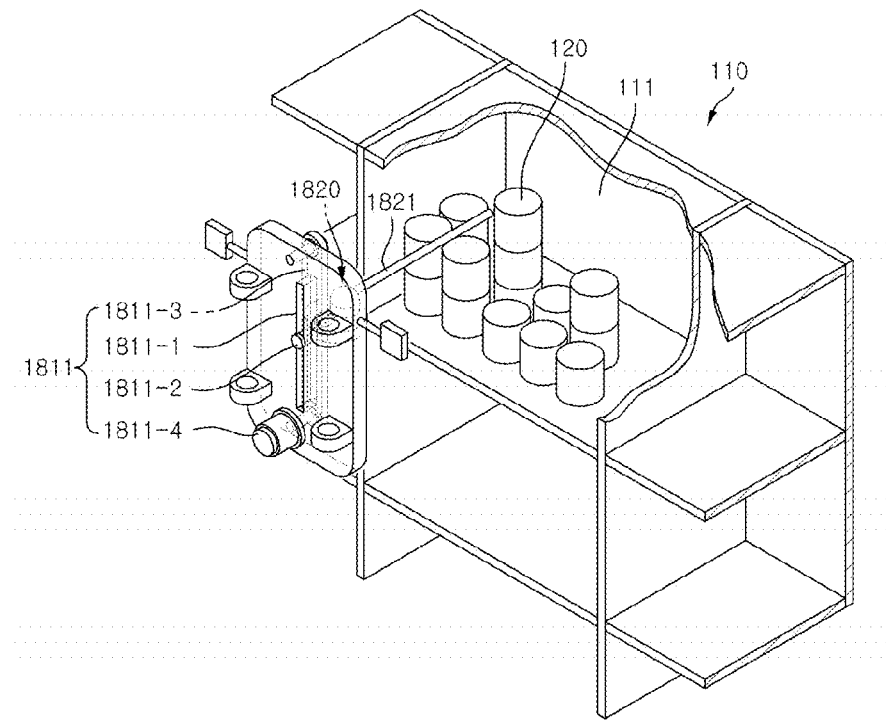
FIGS. 66a to 66d are perspective views showing a movement path in a cell of the scanning apparatus for a display case according to the eleventh embodiment of the present invention.
Figure 66B:
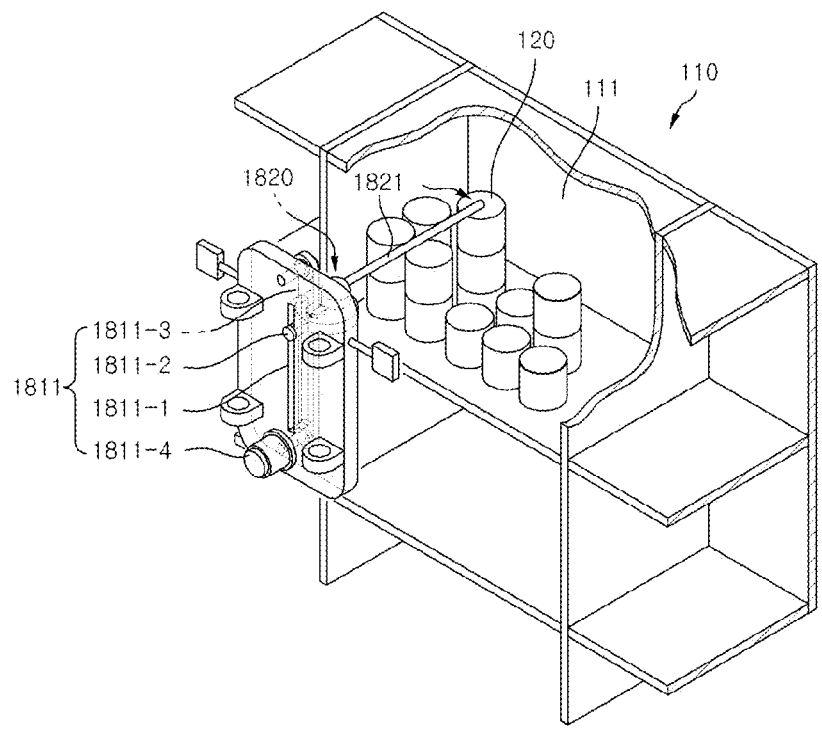
Figure 66C:
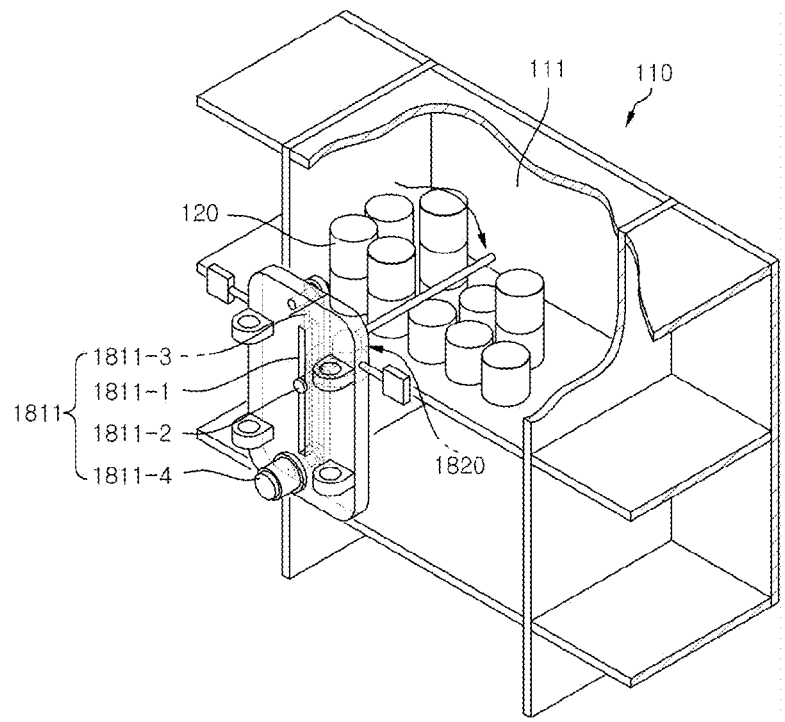
Figure 66D:
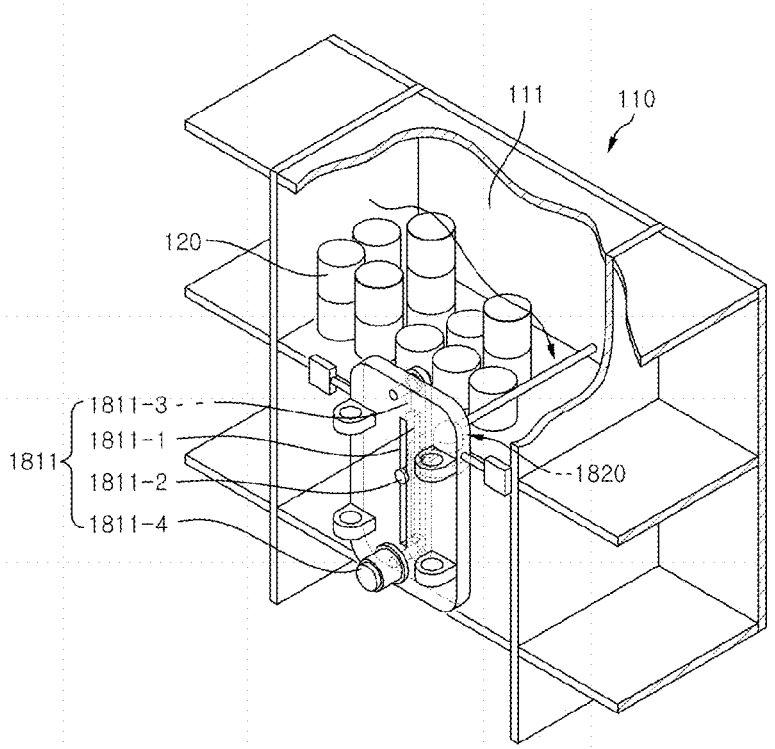

As shown in FIGS. 65 to 66*d*, in a scanning apparatus for a display case according to an eleventh embodiment, when a rail 630 of the display case 110 moves, an antenna 1821 moves as close as possible to articles 120 in a storage section 111 and makes it possible to more accurately find out the information on the articles 120 in the storage section 111.

To this end, the scanning apparatus may include a body 1810, a horizontal driving unit 1830, a scanner 1820, an article sensor 1840, and a controller (not shown).

In detail, a body 1810, which is a structure for supporting the scanner 1820, may be composed of a pair of bars having a predetermined distance and disposed perpendicular to the display case 110 and a plurality of scanners 1820 may be disposed at predetermined distances from each other on the pair of bars.

Although the body 1810 is configured in the type of a pair of bars in this embodiment, the shape is not limited and may be modified in various types within a range satisfying a structure in which the scanner 1820 can be matched in a plurality of layers of storage sections 111.

The body 1810 can be moved in the horizontal direction of the display case 110 by the horizontal driving unit 1830.

The horizontal driving unit 1830, which is a driving device for horizontally moving the scanner 1820 with respect to the display case 110, can be supplied with power from the outside, using a PLC (Power Line Communication) network. Obviously, the horizontal driving unit 1830 can be supplied with power from a disposable battery or a rechargeable battery, other than the power supplied through a power line communication network.

The horizontal driving unit 1830 may be composed of a driving body 1831 mounted at the upper portion of the body 1810, a driving motor 1832 fixed to the driving body 1831, and a driving roller 1833 connected to the driving shaft of the driving motor 1832 to be driven. The driving roller 1833 may be connected to the driving shaft of the driving motor 1832 by a driving belt to be driven and may be directly connected to the driving shaft, depending on the layout of products.

Accordingly, when the driving motor 1832 operates, the driving shaft of the driving motor 1832 can rotate clockwise or counterclockwise, and in accordance with the rotational direction of the driving shaft, the driving roller 1833 can move in one direction on the other direction of the rail 630.

The scanner 1820 can scan articles 120 in the storage section 111 of the display case 110 by recognizing a signal from a wireless recognition part attached on the article 120, using a plurality of antennas 1821. The scanner 1820 may include a scanner body 1822 connected to a mounting bracket 1812 of the body 1810 through a moving-up/down unit 1811 and an antenna 1821 combined with the scanner body 1813.

An RFID-based technology can be applied to the antenna 1821. For example, an RF tag, as a wireless recognition part, is attached to the articles 120 and the antenna 1821 can receive RF signals from the RF tags on the articles 120. Obviously, other than the RFID-based technology, other types of wireless recognition technologies that can wirelessly transmit the information of the article 120 may be applied in various ways to the present invention.

Further, although the antenna 1821 is a 1-way antenna that is mounted over articles 1821 and recognizes scan information from the articles 120 in this embodiment, it is not limited thereto and various types of antennas 1821 that can effectively scan the articles 120 may be applied. For example, the antenna 1821 may be a multi-way antenna such as a 2-way antenna or a 3-way antenna.

The scanner 1820 may be connected to the body 1810 to be vertically movable by the moving-up/down unit 1811. The moving-up/down unit 1811 may include a guide rail 1811-1, a moving-up/down member 1811-2, and a moving-up/down motor 1811-4.

For example, the guide rail 1811-1 of the moving-up/down unit 1811 extends in the height direction of the body 1810 and may have a rail groove, in which the moving-up/down member 1811-2 slides, at the center. The moving-up/down member 1811-2 can move along the guide rail 1811-1, and of which one side may be connected with the scanner 1820 and the other side may be connected with a moving-up/down wire 1811-3. The moving-up/down motor 1811-4 may be connected with the moving-up/down wire 1811-3 to be driven through the driving shaft so that the moving-up/down wire 1811-3 can turn clockwise or counterclockwise.

Accordingly, as the driving shaft of the moving-up/down motor 1811-4 is rotated clockwise by operation of the moving-up/down motor 1811-4, the moving-up/down wire 1811-3 is turned clockwise in conjunction with the driving shaft by the rotation of the driving shaft and the moving-up/down member 1811-2 can be moved upward along the guide rail 1811-1 by the movement of the moving-up/down wire 1811-3. In contrast, as the driving shaft of the moving-up/down motor 1811-4 is rotated counterclockwise by operation of the moving-up/down motor 1811-4, the moving-up/down wire 1811-3 is turned counterclockwise in conjunction with the driving shaft by the rotation of the driving shaft and the moving-up/down member 1811-2 can be moved downward along the guide rail 1811-1 by the movement of the moving-up/down wire 1811-3.

For the moving-up/down member 1811 according to this embodiment, although the structure in which the driving force of the moving-up/down motor 1811-4 is transmitted to the moving-up/down member 1811-2 through the moving-up/down wire 1811-3 is described, the configuration of transmitting the driving force of the moving-up/down motor 1811-4 to the moving-up/down member 1811-2 may be modified in various ways. For example, when a pinion gear is fitted on the driving shaft of the moving-up/down motor 1811-4 and a rack gear vertically moving in mesh with the pinion gear is fixed to the moving-up/down member 1811-2, the rotational force of the driving shaft can be transmitted to the moving-up/down member 1811-2 through the pinion gear and the rack gear and the scanner 1820 connected to the moving-up/down member 1811-2 can move perpendicularly with respect to the display case 110.

An article sensor 1840 is provided in a pair at both sides of the body 1810 and can sense articles 120 in the storage section 111 positioned in the movement direction of the body 1810. For example, when the body 1810 is moved to a side of the display case 110 by the horizontal driving unit 1830, the article sensor 1840 at a side of the body 1810 can sense the articles 120 at a side of the storage section 111, and when the body 1810 is moved to the other side of the display case 110 by the horizontal driving unit 1830, the article sensor 1840 at the other side of the body 1810 can sense the articles 120 at the other side of the storage section 1811-1.

The article sensors 1840 used in this embodiment may be various types of sensors that can sense articles 120 positioned at a predetermined distance. For example, as the article sensors 1840, an optical sensor using light, an ultrasonic distance sensor using ultrasonic waves, and a laser distance sensor (LDS) using a laser may be used.

The article sensors 1840 may be disposed at a predetermined distance ahead of and behind the antenna 1821. Accordingly, the article sensors 1840 can sense in advance the articles 120 in the movement direction of the antenna 1821, when the body 100 moves, and they can send sensing signals to the controller, when they sense the articles 120.

The controller can move the antenna 1821 to the articles 120 in the storage section 1811-1 by controlling vertical movement of the scanner 1820, when the body 1810 horizontally moves.

When the article sensors 1840 sense an article 120, the controller can send a lifting signal for moving up the scanner 1820 to the moving-up/down motor 1811-4 of the moving-up/down unit 1811, and when the article sensors 1840 do not sense an article 120, the controller can send a descending signal for moving down the scanner 1820 to the moving-up/down motor 1811-4 of the moving-up/down unit 1811.

The vertical movement range of the scanner 1820 in the storage section 111 may be limited to a range L in which it can move over the product at the uppermost side in the products exhibited in the storage section 111, and the height of the guide rail 1811-1 with respect to the body 1810 can be adjusted to prevent interference of the articles 120 on the vertical movement of the scanner 1820.

Figure 67:
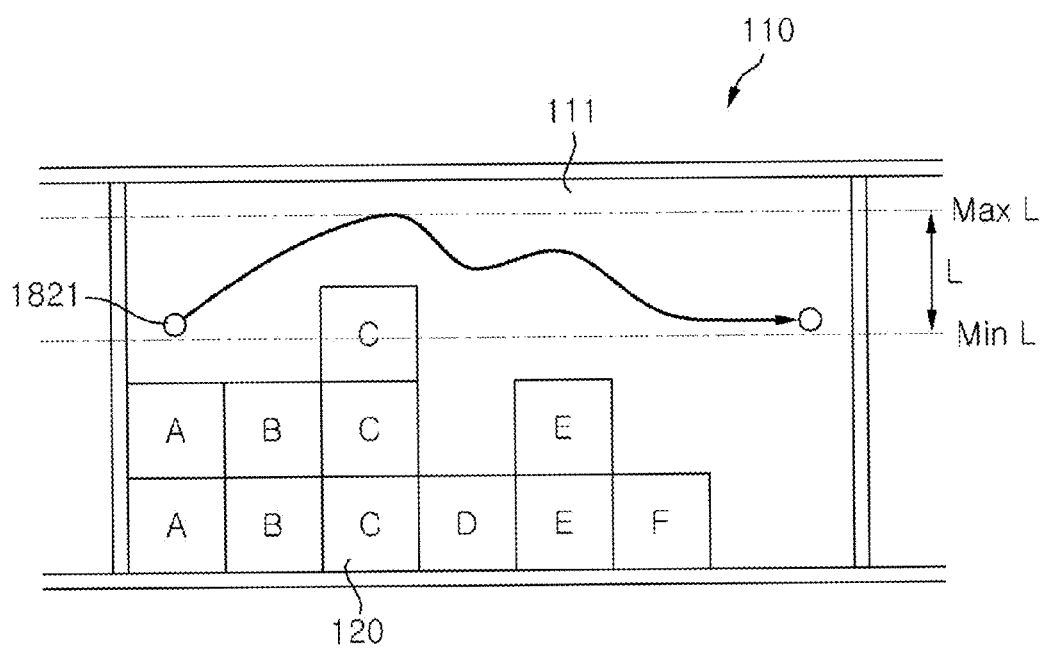
FIG. 67 is a view showing a movement path in a cell of the scanning apparatus for a display case according to the eleventh embodiment of the present invention.

For example, as shown in FIG. 67, when the scanner 1820 horizontally moves in the storage section 111 in which various articles 120 (A~F) are stacked, and when the article sensor 1840 senses the articles 120 (A2, B2, and C2), the driving shaft of the moving-up/down motor 1811-4 rotates clockwise and the scanner 1820 can move up. In this process, it is assumed that the article sensor 1840 horizontally moves at the height of the articles 120 (A2, B2, C2, and E2).

When the article sensor 1840 does not sense an article 120, the driving shaft of the moving-up/down motor 1811-4 rotates counterclockwise and the scanner 1820 can move down, and when the article sensor 1840 senses an article 120 (E2), the driving shaft of the moving-up/down motor 1811-4 rotates clockwise and the scanner 1820 can move up, and when the article sensor 1840 does not sense an article 120, the driving shaft of the moving-up/down motor 1811-4 rotates counterclockwise and the scanner 200 moves down and can move along the lowermost movement line Min1.

In particular, when the scanner 1820 reciprocates in one storage section 111, the antenna 1821 can return to the left after reaching the right wall of the storage section 111. When the antenna 1821 moves to the left, the article sensor 1840 at the right side from the scanner 1820 should not operate, and when the antenna 1821 moves to the right, the article sensor 1840 at the left side from the scanner 1820 should not be turned on. This is because when the antenna 1821 hits against the left wall, the article sensor 1840 at the right side from the scanner 1820 is spaced a predetermined distance from the left side of the storage section 111.

Accordingly, when the scanner 1820 starts to the left from the right end of a series of sections, only the article sensor 1840 at the left side always senses the distance, and when it starts to the right side from the left end of a series of sections, only the article sensor 1840 at the right side senses the distance.

Further, when it moves right in the first case cell, the article sensor 1840 at the right side senses an article and makes the antenna 1821 move vertically by giving an order to the controller, in which the controller, which has memorized the operation direction and the number of revolutions of the motor, can stop the sensing of the article sensor 1840, when the scanner 1820 returns, and drive the motor in the opposite operation direction that has been memorized in advance.

If articles are vertically exhibited in one line, when the article sensor 1840 senses an article, the antenna 1821 can quickly move to the uppermost end and the horizontal movement distance can make horizontal movement at the uppermost end as much as the sum of the distance of the article 1821 and the article sensor 1840 and the distance corresponding to the article thickness.

Figure 68:
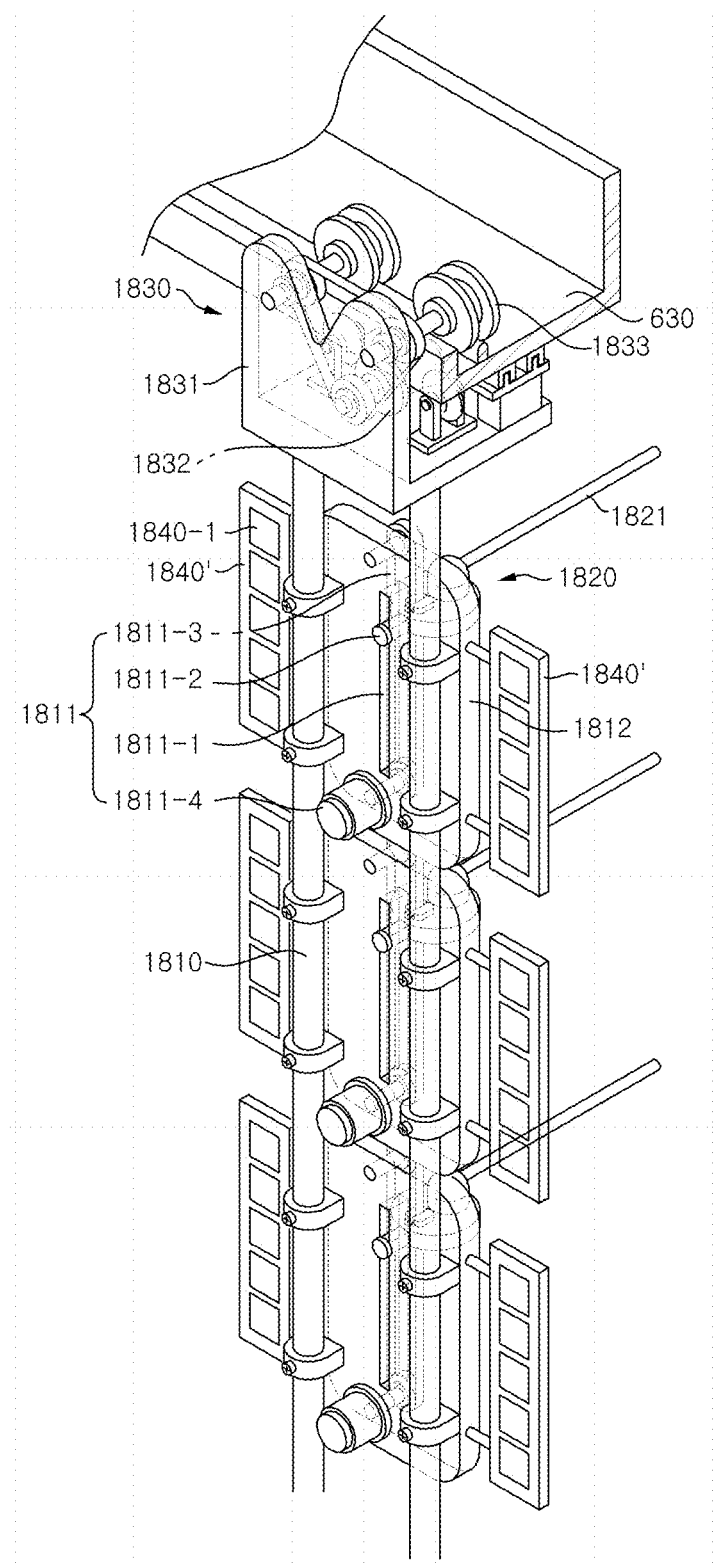
FIG. 68 is a view showing the configuration of a scanning apparatus for a display case according to a modified example of the eleventh embodiment of the present invention.
Figure 69A:
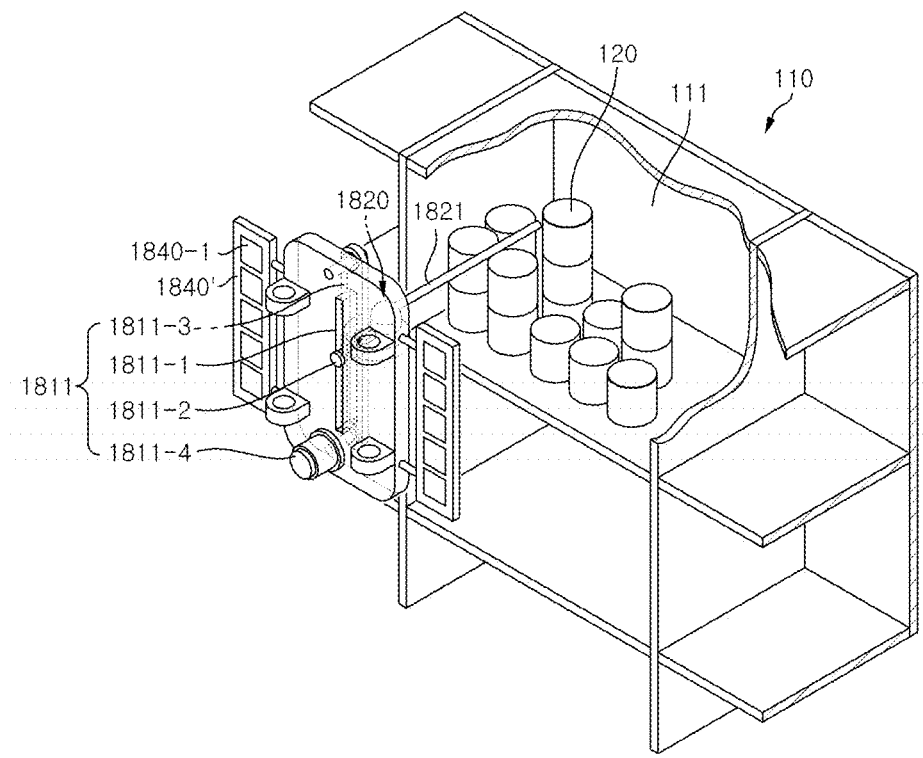
FIGS. 69a to 69d are perspective views showing a movement path in a cell of the scanning apparatus for a display case according to a modified example of the eleventh embodiment of the present invention.
Figure 69B:
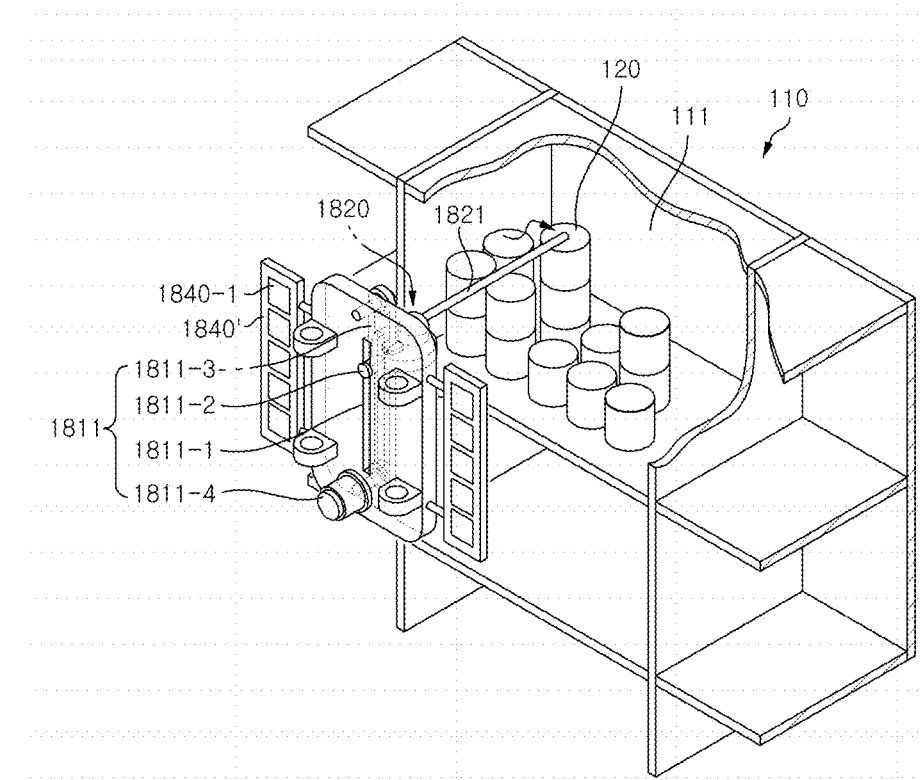
Figure 69C:
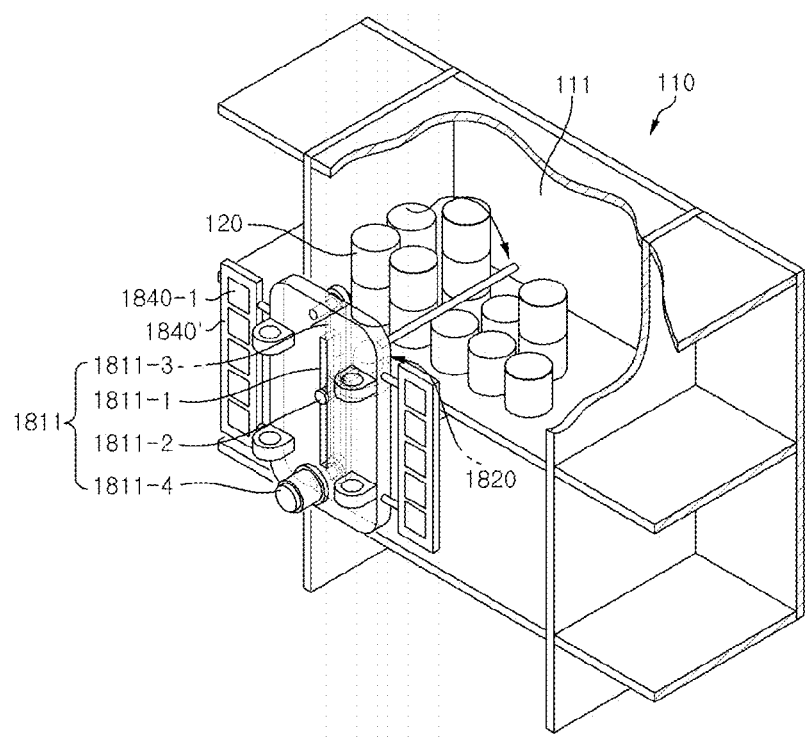
Figure 69D:
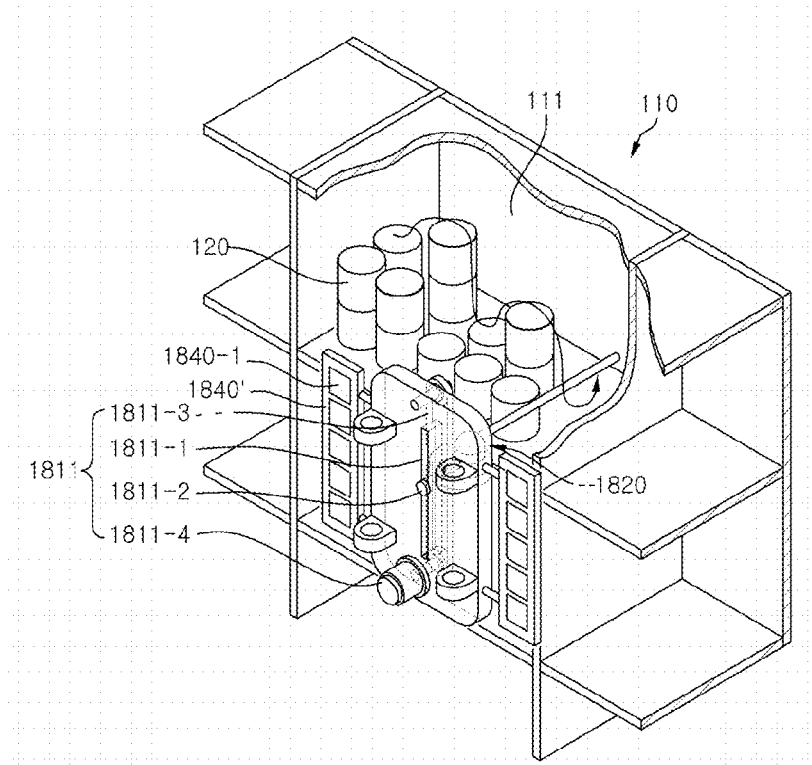

As shown in FIGS. 68 to 69*d*, a scanning apparatus for a display case according to a modified example, an antenna 1821 can be moved close to the edge of an article 120 by converting the position path for the edge of the article 120 into a trend type path.

The scanning apparatus may include a body 1810, a horizontal driving unit 1830, a scanner 1820, an article sensor 1840', and a controller, in which the configuration of the body 1810, the horizontal driving unit 1830, and the scanner 1820 is generally similar to the configuration of the body 1810, the horizontal driving unit 1830, and the scanner 1820 described in the previous embodiment, so another embodiment is described hereafter mainly with the differences from this embodiment.

The article sensor 1840' can sense a vertical position and a horizontal position to the edges of articles 120 in the storage section 111.

To this end, the article sensor 1840 may be implemented by a sensor assembly with a plurality of sensors 1840-1 spaced from each other perpendicularly with respect to the display case 110. The sensors 1840-1 sense articles 120 at their heights, so they can measure the entire height of the articles 120, and can measure the entire width of the articles 120, when they move in the horizontal direction of the display case 110.

As a result, the article sensor 1840 senses the vertical position and the horizontal position to the edges of the articles 120 and send sensing signals to the controller, such that the controller can calculate the position path to the edges of the articles 120.

When a sensing signal for the vertical position and the horizontal position of an article 120 is received from an article sensor 1840, the controller can calculate the position path to the edge of the article 120 from the received sensing signal and can find out the trend type path of a wave shape by distributing the calculated position path. The trend type path provides the movement path of the antenna 1821 at a position spaced from the edge of the article 120, so the antenna 1821 can move as close as possible to the edge of the article 120 along the trend type path.

In order to prevent interference between the article 120 and the antenna 1821 moving along the trend type path, the controller can increase the moving-up/down speed of the scanner 1820, when the inclination of the tangent line of the trend type path increases over a standard inclination, and it can decrease the moving-up/down speed of the scanner 1820, when the inclination of the tangent line of the trend type path decreases under the standard inclination. In this embodiment, the standard inclination may be 45 degrees, so when the inclination of the tangent line of the trend type path increases over 45 degrees, the moving-up/down speed of the scanner 1820 can be increased, and when the inclination of the tangent line of the trend type path decreases under 45 degrees, the moving-up/down speed of the scanner 1820 can be decreased.

Figure 70:
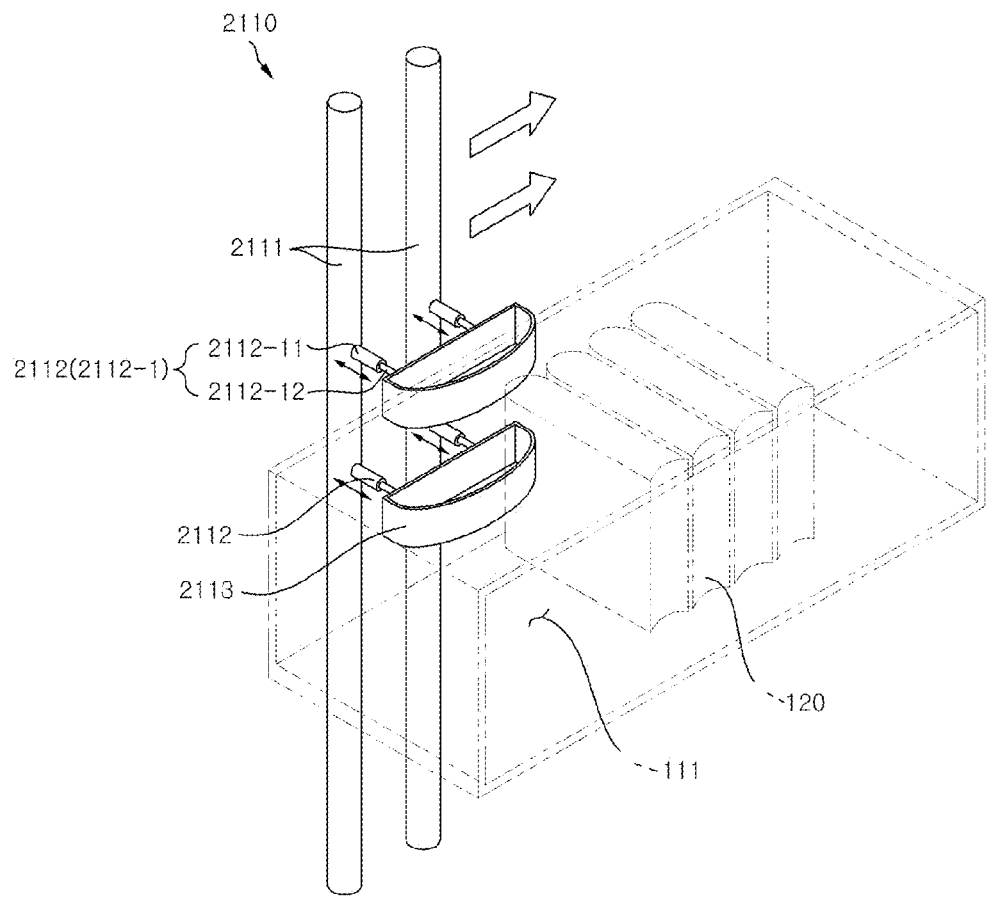
FIG. 70 is a perspective view showing a scanner for a display case according to a first embodiment of the present invention.
Figure 71:
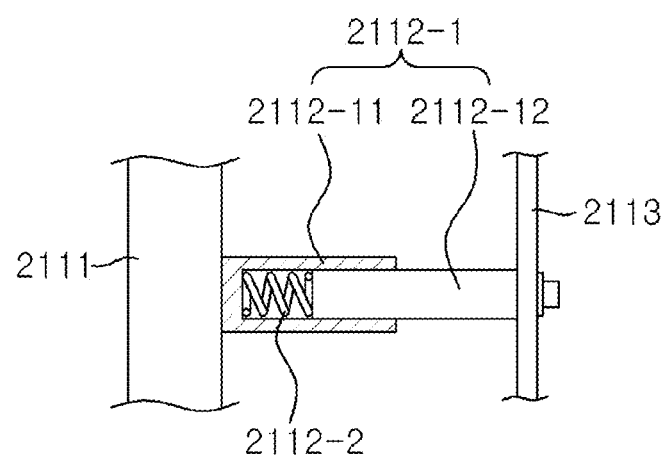
FIG. 71 is a cross-sectional view of the scanner shown in FIG. 70.

As shown in FIGS. 70 and 71, a scanner 2110 for a display case according to a first embodiment of the present invention, which is for effectively scanning articles in case cells, may include a scanner body 2111, scanner arms 2112 combined with the scanner body 2111, and antennas 2113 mounted on the scanner arms 2112 and having a curved portion.

In detail, the scanner body 2111 is a body of the scanner 2110 where the scanner arms 2112 are mounted may be positioned to face case cells in order to scan articles in a display case with the antennas 2113.

The scanner body 2111 is composed of a pair of bars extending parallel perpendicularly with respect to the display case and may be combined with a scanning apparatus to be described below. The scanner body 2111 combined with the scanning apparatus can be moved in the horizontal direction of the display case by a horizontal driving unit of the scanning apparatus, and the antennas 2113 of the scanner 2110 can effectively scan articles in case cells, when the scanner body moves in the horizontal direction of the display case.

Although the scanner body 2111 is composed of a pair of bars in this embodiment, it is only an example for combining the scanner body 2111 with a scanning apparatus and may be modified in various types, as long as, it satisfies the structure for supporting the scanner arms 2112. For example, the scanner body 2111 may be formed in the shape of a general housing to scan articles in case cells.

The scanner arms 2112 may be mounted at a predetermined height on the scanner body 2111. A plurality of scanner arms 2112 may be mounted at a predetermined distance from each other on the scanner body 2111 for one case cell. As described above, since the antenna 2113 is mounted on the scanner arms 2112, a higher reading rate for articles in case cells can be achieved, as compared with when one scanner arm 2112 is disposed for one case cell.

Further, the scanner arm 2112 can be fixed to the scanner body 2111, but the scanner arm 2112 may be mounted to be movable vertically to the scanner body 2111 by a specific moving-up/down unit in some cases. In this case, since the scanner arm 2112 can vertically move in a case cell, it is possible to effectively scan articles at different heights, using the antenna 2113.

The scanner arm 2112 may be mounted on the scanner body 2111, protruding toward a case cell. For example, the scanner arm 2112 may be composed of a plurality of scanner arms 2112-1 formed in a telescopic type and elastic springs 2112-2 that can elastically supports the support arms 2112-1 may be disposed between the support arms 2112-1.

The scanner arm 2112, in detail, may include a main support arm 2112-11 and a sub-support arm 2112-12. The main support arm 2112-11 is fixed to the scanner body 2111 and the sub-support arm 2112-12 may be mounted on the other end of the main support arm 2112-11 to be movable in/out of it. The sub-support arm 2112-12 has a diameter smaller than that of the main support arm 2112-11 to be able to move in/out of it and may be combined with the antenna 2113 at the front end.

The elastic spring 2112-2 may be disposed between the main support arm 2112-11 and one or more sub-support arms 2112-12. The elastic spring 2112-2 can performs shock-absorbing that reduces a shock by being compressed, when the antenna 2113 hits against an article.

The antenna 2113 may have a curved portion that is convex toward a case cell. For example, the antenna 2113 may be a ring-shaped antenna 2113 formed in a circular ring shape or an elliptical ring shape.

As described above, since the antenna 2113 is a ring-shaped antenna, the antenna 130 can effectively scan a plurality of articles horizontally distributed in a wide area. In particular, since the antenna 2113 is disposed with the curved portion in the horizontal direction of the display case, when the scanner 2110 moves in the horizontal direction of the display case, the antenna 2113 can keep the original shape by easily returning after deforming, even if it hits against an article.

An RFID technology is applied to the antenna 2113 in this embodiment, that is, an RF tag as a wireless recognition part is attached to articles and the antenna 2113 can receive RF signals from the RF tags on the articles. Obviously, other than the RFID-based technology, other types of wireless recognition technologies that can wirelessly transmit the information of the articles may be applied in various ways to the present invention.

Figure 72A:
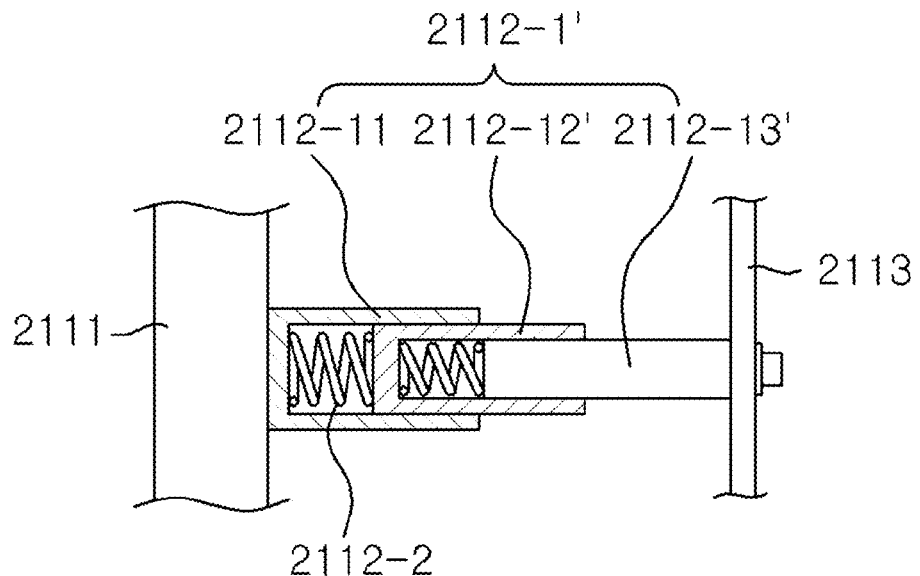
FIGS. 72a and 72b are cross-sectional views showing a scanner arm of a scanner according to a modified example of the first embodiment.

As shown in FIG. 72*a*, as a modified example of this embodiment, a plurality of sub-support arms may be connected to a main support arm 121*a* to be movable in/out of it. For example, the sub-support arm may include a first sub-support arm 2112-12' connected to the main support arm 2112-11 to be movable in/out of the main support arm and a second sub-support arm 2112-13 of which one end is connected to the first sub-support arm 2112-12 to be movable in/out of it and the other end is combined with an antenna 2113.

Figure 72B:
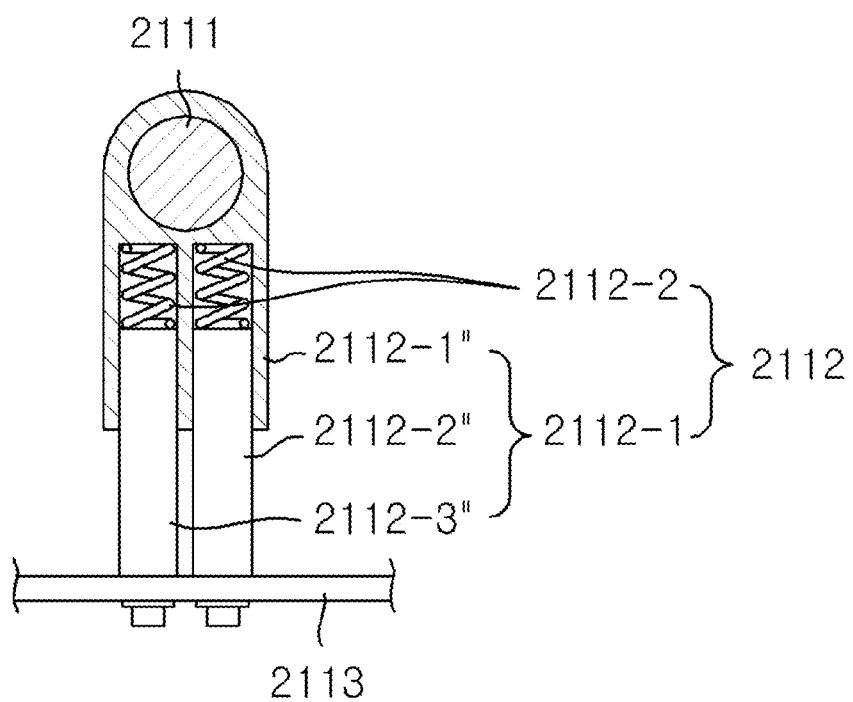

Further, as shown in FIG. 72*b*, a plurality of sub-support arms may be combined with a main support arm 2112-11" in parallel with each other to be movable in/out of it.

The sub-support arms may include a first sub-support arm 2112-12" and a second sub-support arm 2112-13". One end of each of the first and second sub-support arms 2112-12" and 2112-13" may be connected with the main support arm 2112-11" through an elastic spring 2112-2 to be movable in/out of it and the other end of each of the first and second sub-support arms 2112-12" and 2112-13" may be connected with the antenna 2113. The first and second sub-support arms 2112-12" and 2112-13" are arranged in parallel and connect the main support arm 2112-11" and the antenna 2113, the antenna 2113 can stably scan articles, keeping the balance.

Figure 73:
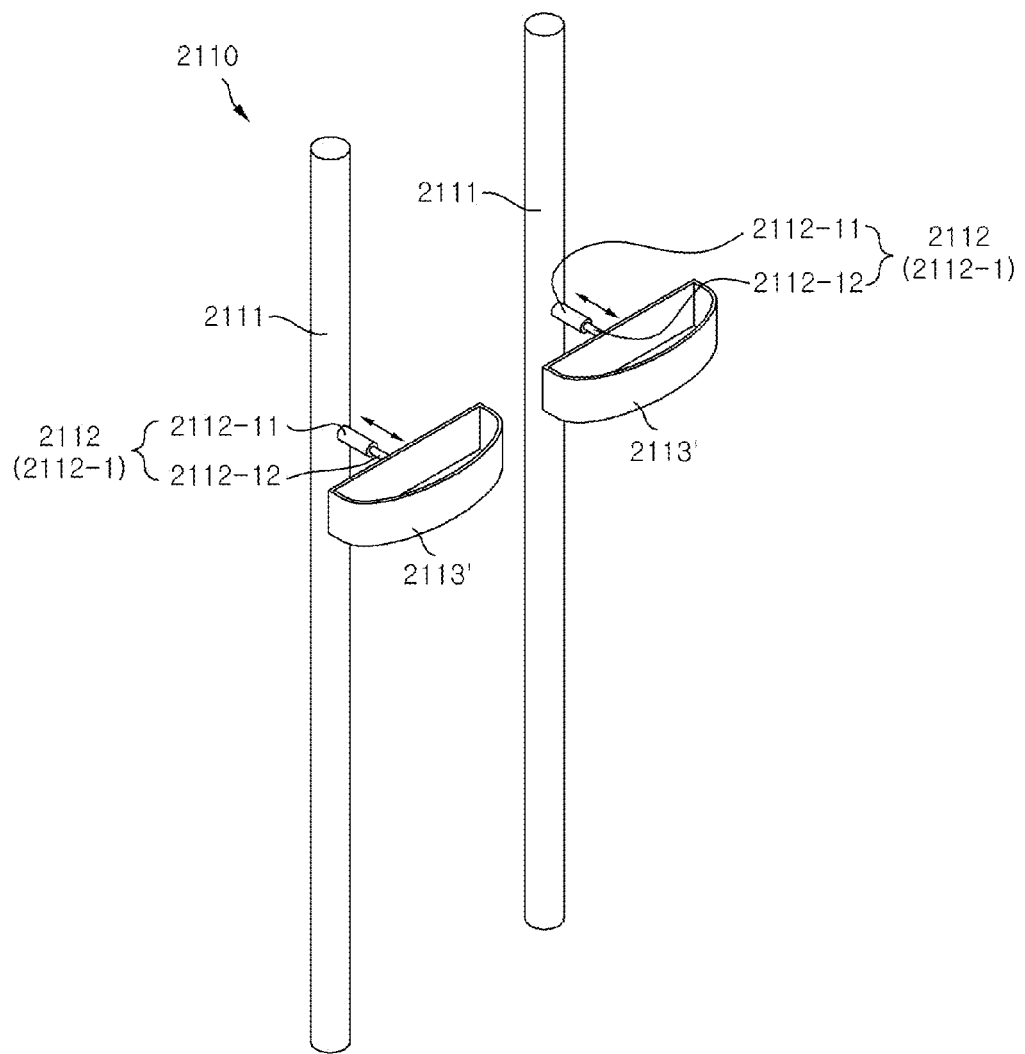
FIG. 73 is a perspective view showing a scanner for a display case according to another modified example of the first embodiment.

As shown in FIG. 73, as another modified example of this embodiment, a scanner arm 2112 and an antenna 2113' may be disposed on a bar-shaped scanner arm 2111. For example, a pair of scanner arm 120 and antenna 2113' is mounted on the scanner body 2111 composed of a pair of bars, so the antennas 2123' can independently scan one article.

Accordingly, when the scanner 2110 moves in the horizontal direction of a display case, the reading rates of the antennas 2113' scanning one article change; on the basis of the change, it is possible to detect horizontal directional of the article in a case cell.

For example, when a pair of antennas 2113' is positioned at a side from an article, when one article is positioned between a pair of antennas 2113', and when a pair of antennas 2113' is positioned at the other side of an article, the number of reading a tag by the antennas 2113' can be different. Accordingly, it is possible where the articles are horizontally in a case cell from the number of reading a tag of the article by the antennas 2113'.

Figure 74:
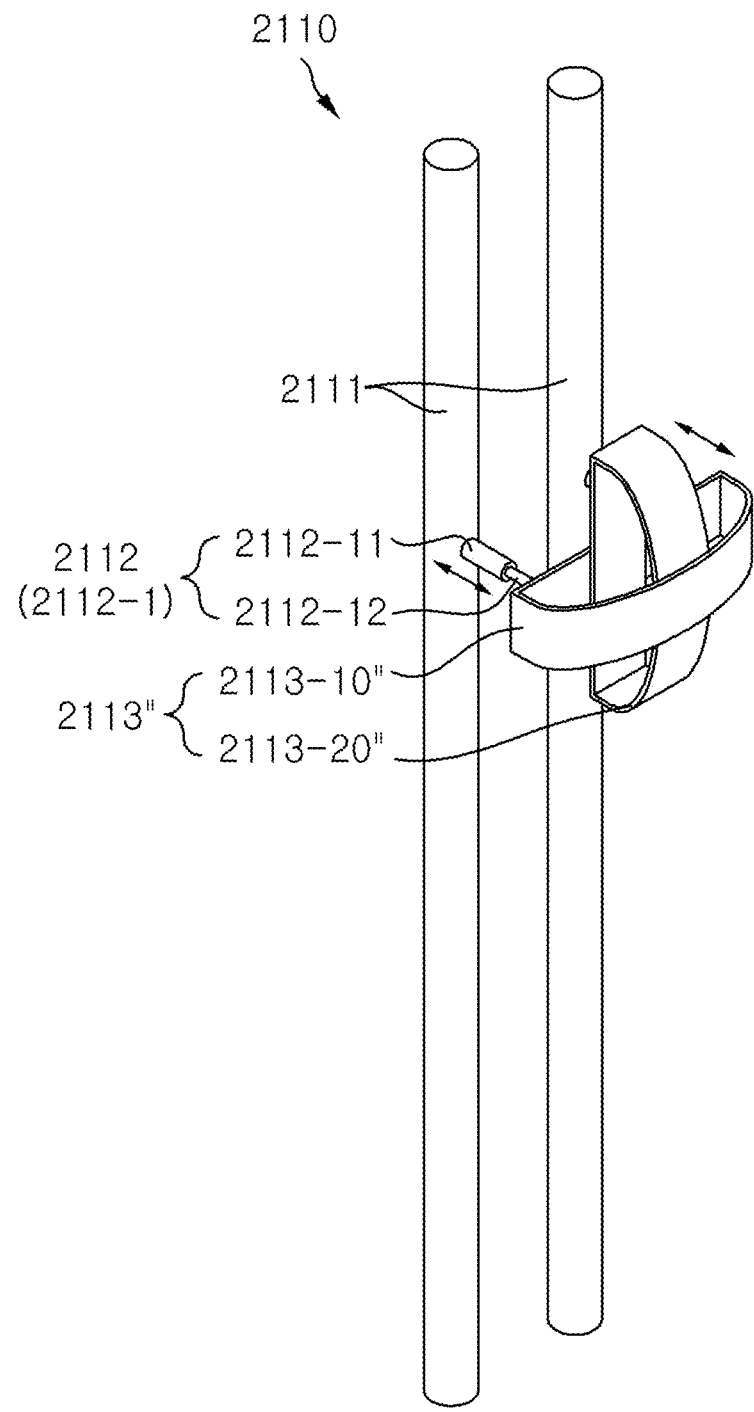
FIG. 74 is a perspective view showing a scanner for a display case according to a second embodiment of the present invention.

As shown in FIG. 74, in a scanner 2110 for a display case according to a second embodiment of the present invention, an antenna 2113" may include a horizontal ring-shaped antenna 2113-10" and a vertical ring-shaped antenna 2113-20" perpendicularly connected to the horizontal ring-shaped antenna 2113-10".

The configuration of the scanner body 2111 and the scanner arm 2112, that is the other configuration except for the antenna 2113", is generally similar to the configuration of the scanner body 2111 and the scanner arm 2112 described in the previous embodiment, so another embodiment is described mainly with the differences from this embodiment.

The horizontal ring-shaped antenna 2113-10" is disposed with a circular or elliptical ring band in the horizontal direction of a case cell, the vertical ring-shaped antenna 2113-20" is disposed with a circular or an elliptical ring band perpendicularly with respect to a case cell, and the horizontal ring-shaped antenna 2113-10" and the vertical ring-shaped antenna 2113-20" may cross each other.

Accordingly, the antenna 2113" can effectively scan articles at different heights in a case cell. In particular, when the scanner arm 2112 may be moved vertically to the scanner body 2111 by a specific moving-up/down unit, the antenna 2113" can keep the original shape by easily returning after deforming, even if it hits against an article.

Figure 75:
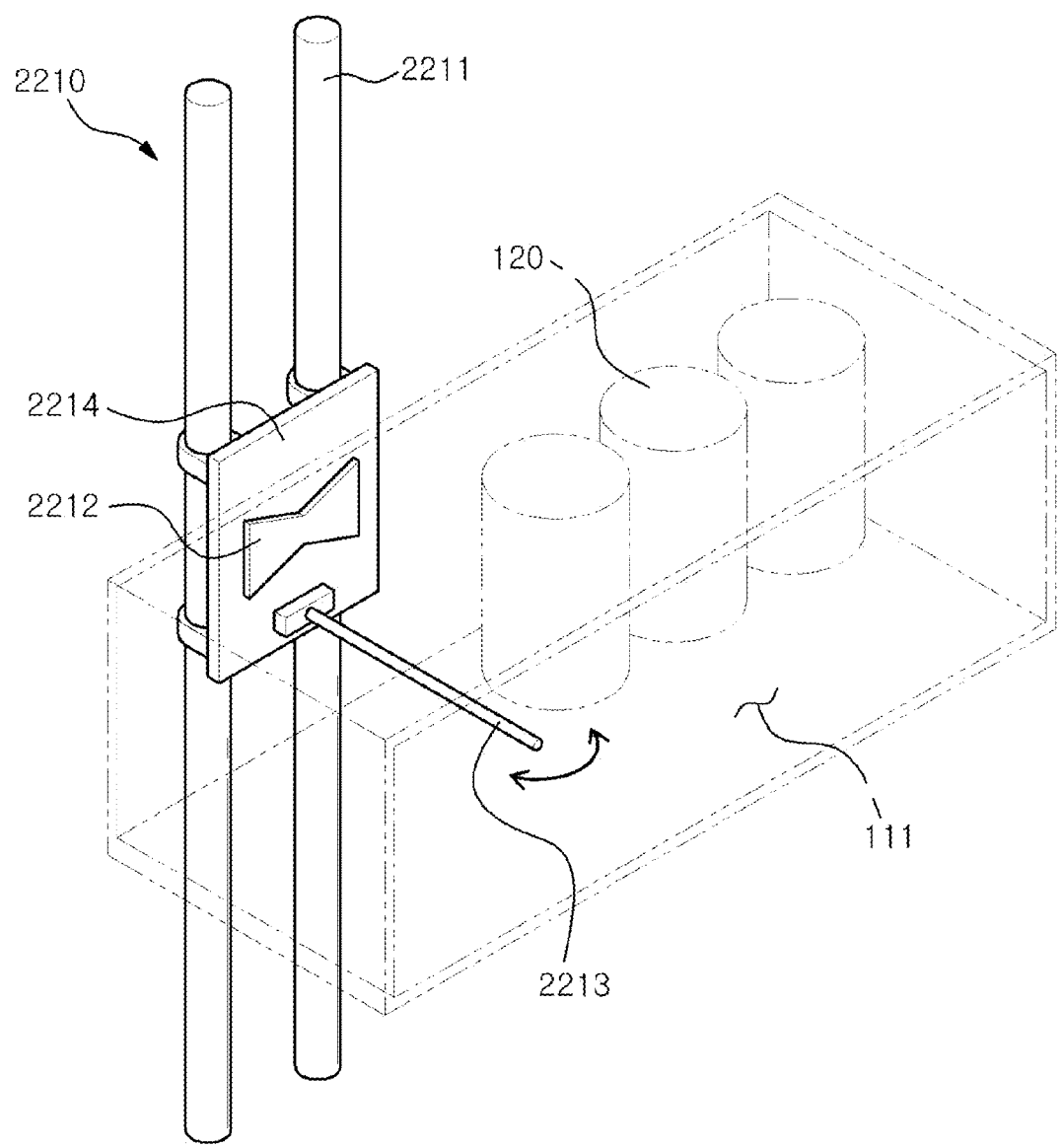
FIG. 75 is a perspective view showing the scanner for a display case according to the second embodiment of the present invention.

As shown in FIG. 75, a scanner 2210 for a display case according to the second embodiment of the present invention can effectively scan articles in a storage section 111 in a case cell through a vertical antenna 2212 and a horizontal antenna 2213 mounted on a scanner body 2211.

In detail, the scanner body 2211 is a body of the scanner 2210 where the vertical antenna 2212 and the horizontal antenna 2213 are mounted may be positioned to face case cells in order to scan articles in a display case with the antenna.

The scanner body 2211 is composed of a pair of bars extending parallel perpendicularly with respect to the display case and may be combined with a scanning apparatus to be described below. The scanner body 2211 combined with the scanning apparatus can be moved in the horizontal direction of the display case by a horizontal driving unit 2220 of the scanning apparatus, and the scanner 2210 can effectively scan articles in case cells through the vertical antenna 2212 and the horizontal antenna 2213, when the scanner body moves in the horizontal direction of the display case.

Although the scanner body 2211 is composed of a pair of bars in this embodiment, it is only an example for combining the scanner body 2211 with a scanning apparatus and may be modified in various types, as long as, it satisfies the structure for supporting the antenna. For example, by forming the scanner body in the shape of a general housing or bracket, it is possible to stably scan articles in a case cell.

The vertical antenna 2212 and the horizontal antenna 2213 may be mounted at a predetermined height on the scanner body 2211 by a support plate 2214. A plurality of support plates 2214 may be mounted at a predetermined distance from each other on the scanner body 2211 to face case cells, respectively.

Further, the horizontal antenna 2213 can be fixed to the scanner body 2211, but the horizontal antenna 2213 may be mounted to be movable vertically to the scanner body 2211 by a specific moving-up/down unit (not shown) in some cases. In this case, since the horizontal antenna 2213 can vertically move in a case cell, it is possible to effectively scan articles at different heights, using the antenna.

The vertical antenna 2212 may include a thin patch antenna that is mounted on the scanner body 2211 to face a case cell. The patch antenna, a kind of microstrip antenna, may be formed in a thin patch (patched piece) shape by making a strip-shaped conductor wide.

Although the vertical antenna 2212 is a directional patch antenna in this embodiment, it is not limited thereto and may include all of antennas that are disposed to face a case cell to be able to effectively scan articles in a case cell.

The horizontal antenna 2213 may extend perpendicularly with respect to the display case to protrude toward case cells.

Figure 76A:
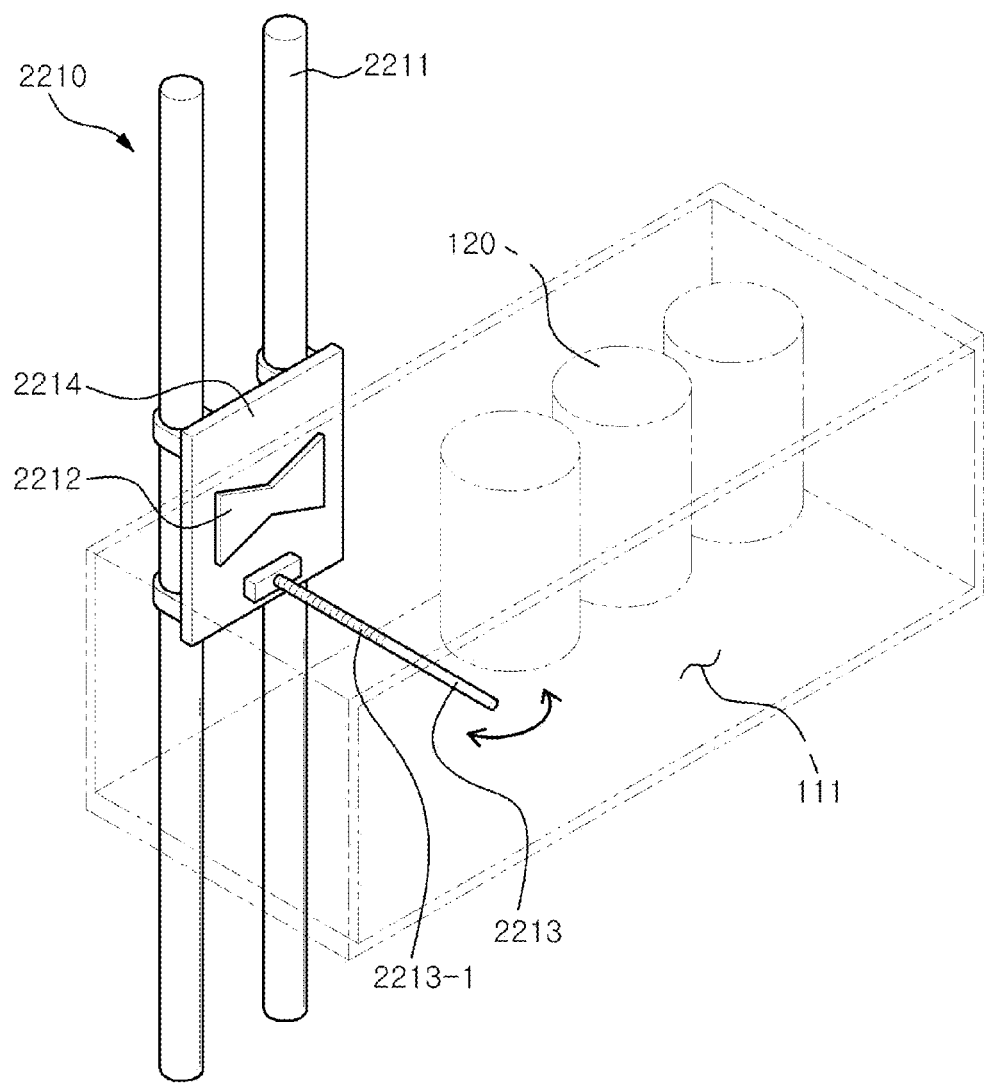
FIG. 76a is a perspective view showing a scanner for a display case according to a modified example of the second embodiment.
Figure 76B:
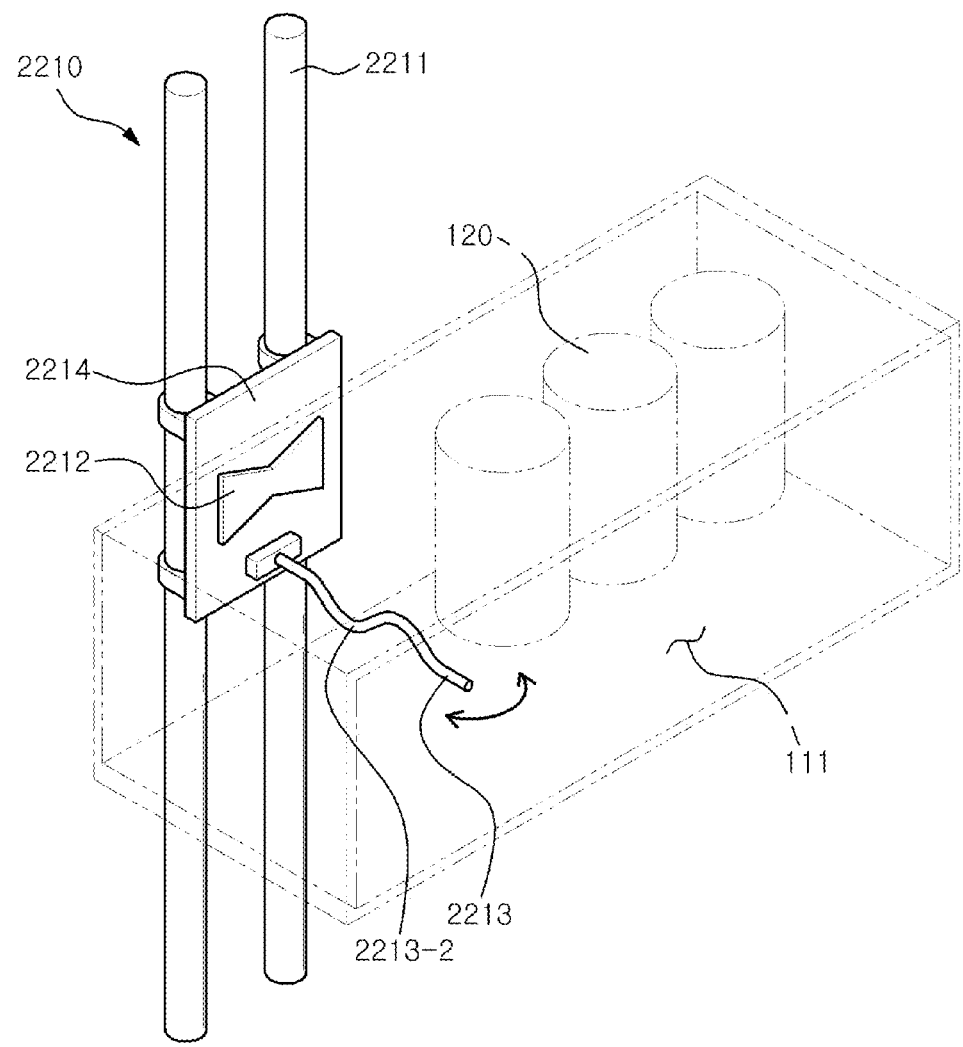
FIG. 76b is a perspective view showing a scanner for a display case according to another modified example of the second embodiment.

The horizontal antenna 2213 may be an antenna that has flexibility to be able to actively cope with an external shock, for example, a flexible antenna. To this end, the horizontal antenna 2213 may be made of a flexible elastic material, or as shown in FIG. 76*a*, wrinkles 2213-1 may be formed on the horizontal antenna 2213, or as shown in FIG. 76*b*, a bend 2213-2 may be formed on the horizontal antenna 2213.

Figure 77:
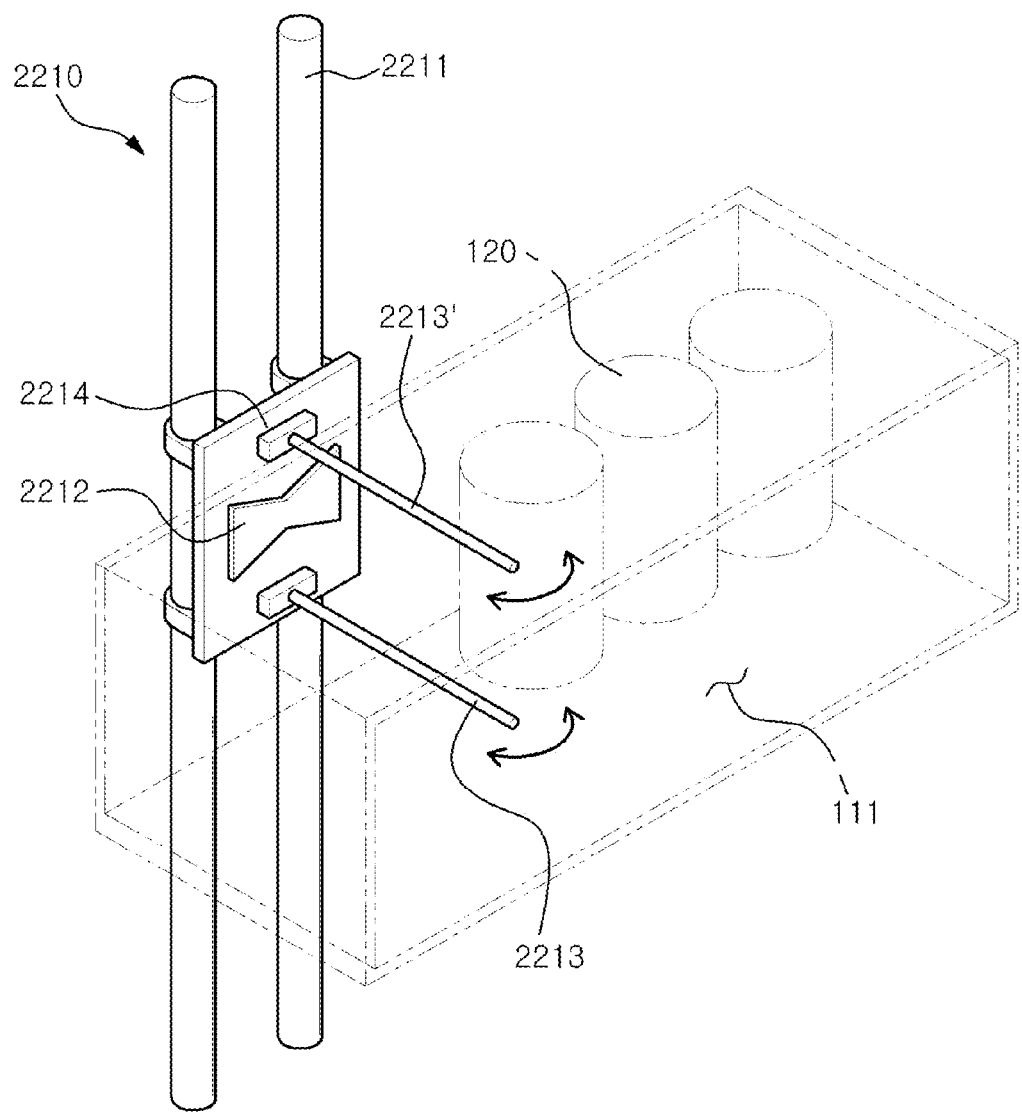
FIG. 77 is a perspective view showing a scanner for a display case according to another modified example of the second embodiment of the present invention.

As shown in FIG. 77, a scanner 2210 for a display case according to another modified example of the second embodiment of the present invention may include a scanner body 2211, a vertical antenna 2212, a plurality of horizontal antennas 2213 and 2213'. The scanner body 2211 and the vertical antenna 2212 may be similar to or substantially the same as the configuration of the scanner body 2211 and the vertical antenna 120 described in the first embodiment, so the description of the configuration and operation stated above may not be provided and like components may be given like reference numerals.

The horizontal antennas 2213 and 2213' are composed of a pair of antennas disposed over and under an article 120 in a case cell, respectively, such that it is possible to effectively scan an RF signal from an RF tag on the article 120 in the case cell.

Figure 78:
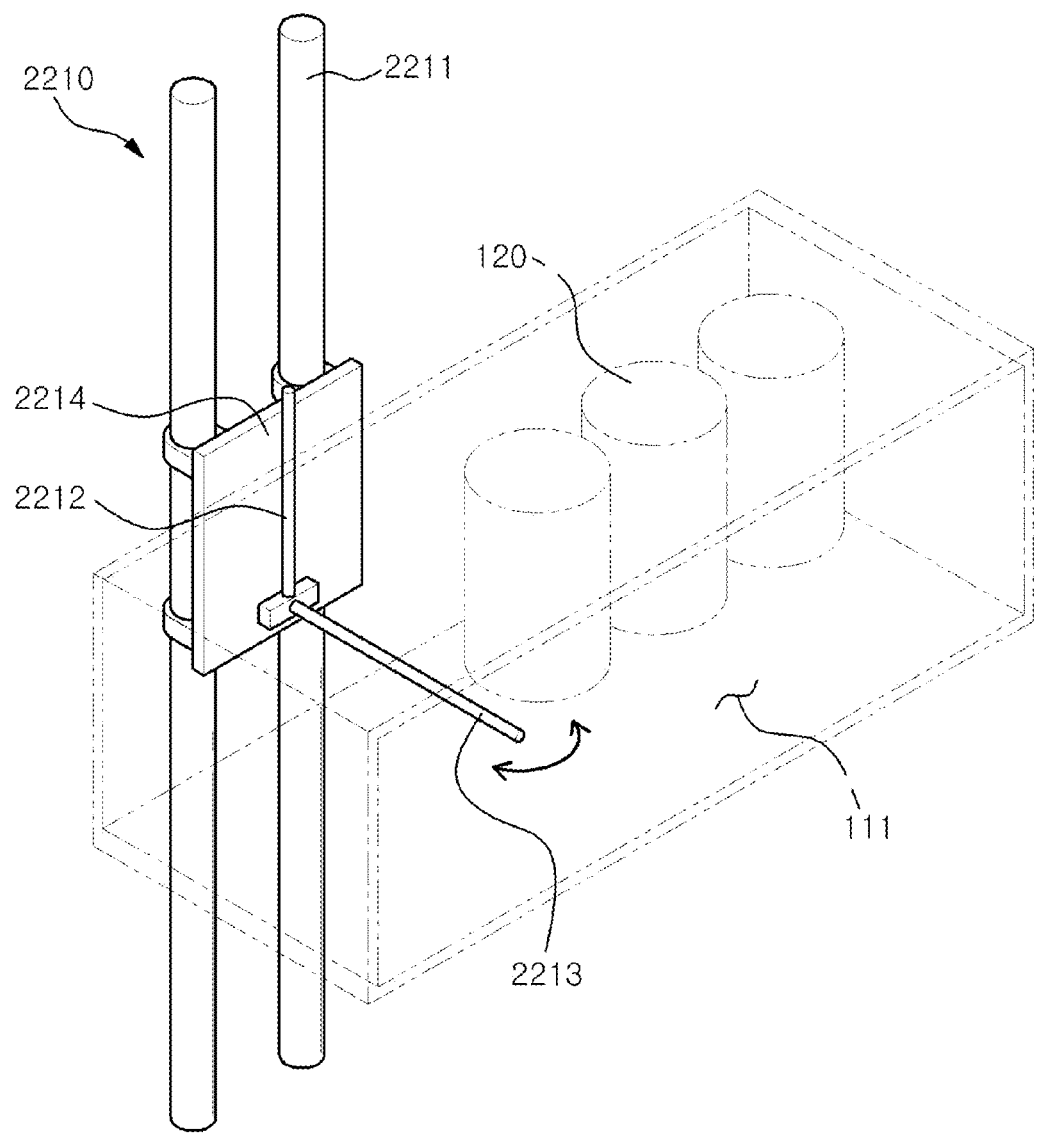
FIG. 78 is a perspective view showing a scanner for a display case according to another modified example of the second embodiment of the present invention.

As shown in FIG. 78, in a scanner 2210 for a display case according to another modified example of the second embodiment, a vertical antenna 2212 and a horizontal antenna 2213 may be disposed vertically in an L-shape on a scanner body 100.

The vertical antenna 2212 may be a bar-shaped vertical flexible antenna disposed perpendicular to a display case and the horizontal antenna 2213 may be a bar-shaped horizontal flexible antenna disposed in parallel with a display case to protrude toward a case cell.

Figure 79:
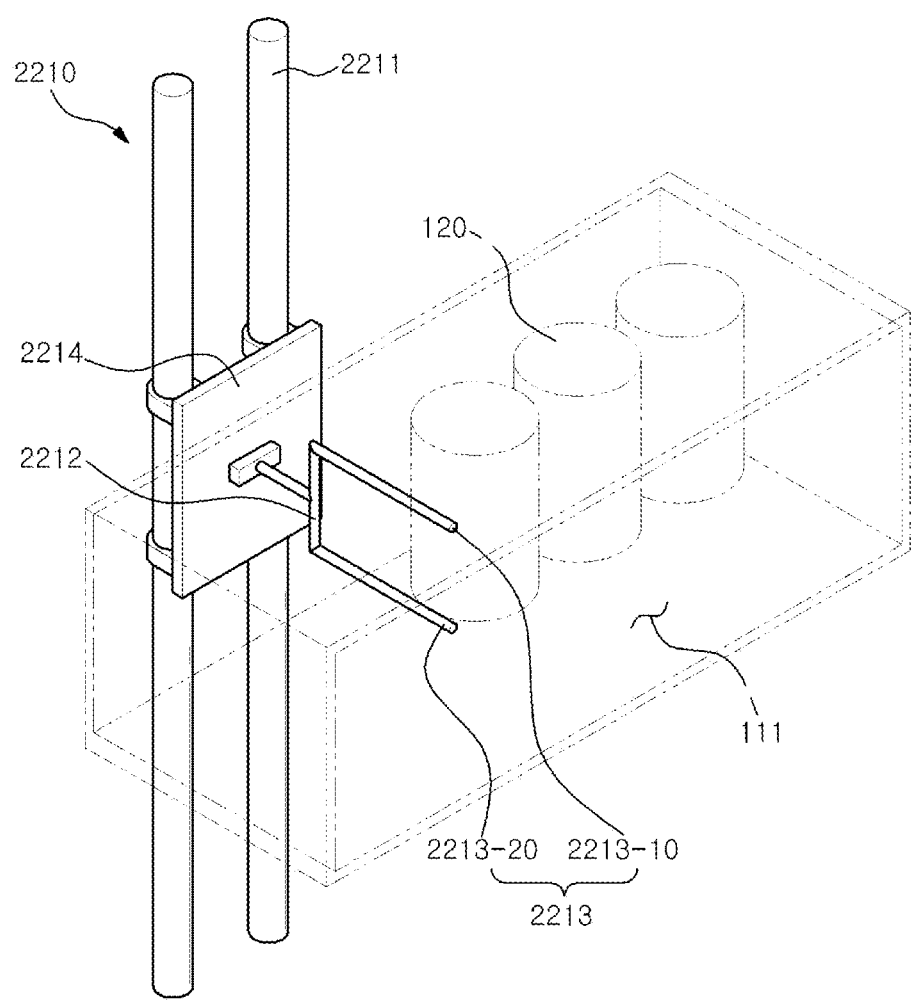
FIG. 79 is a perspective view showing a scanner for a display case according to another modified example of the second embodiment of the present invention.

As shown in FIG. 79, in a scanner 2210 for a display case according to another modified example of the second embodiment, a horizontal antenna 2213 may include a first horizontal antenna 2213-10 and a second horizontal antenna 2213-20.

That is, the first horizontal antenna 2213-10 may be perpendicularly connected to the upper end of the vertical antenna 2212 and the second horizontal antenna 2213-20 may be perpendicularly connected to the lower end of the vertical antenna 2212, in parallel with the first horizontal antenna 2213-10.

Accordingly, the vertical antenna 2212 can scan articles in a case cell, facing the front of the case cell, and the first horizontal antenna 2213-10 and the second horizontal antenna 2213-20 are disposed over and under a case cell and can effectively scan the upper and lower portions of an article in the case cell.

Figure 80:
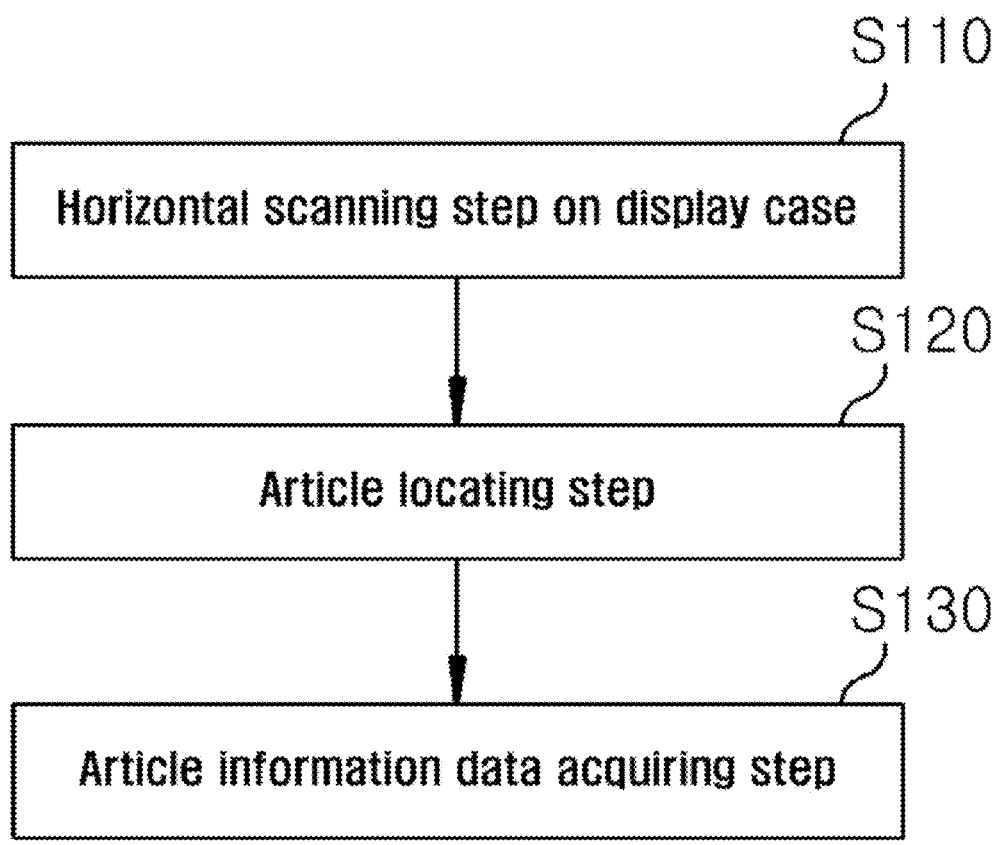
FIGS. 80 and 81 are block diagrams illustrating a scanning method for a display case according to a first embodiment of the present invention.
Figure 81:
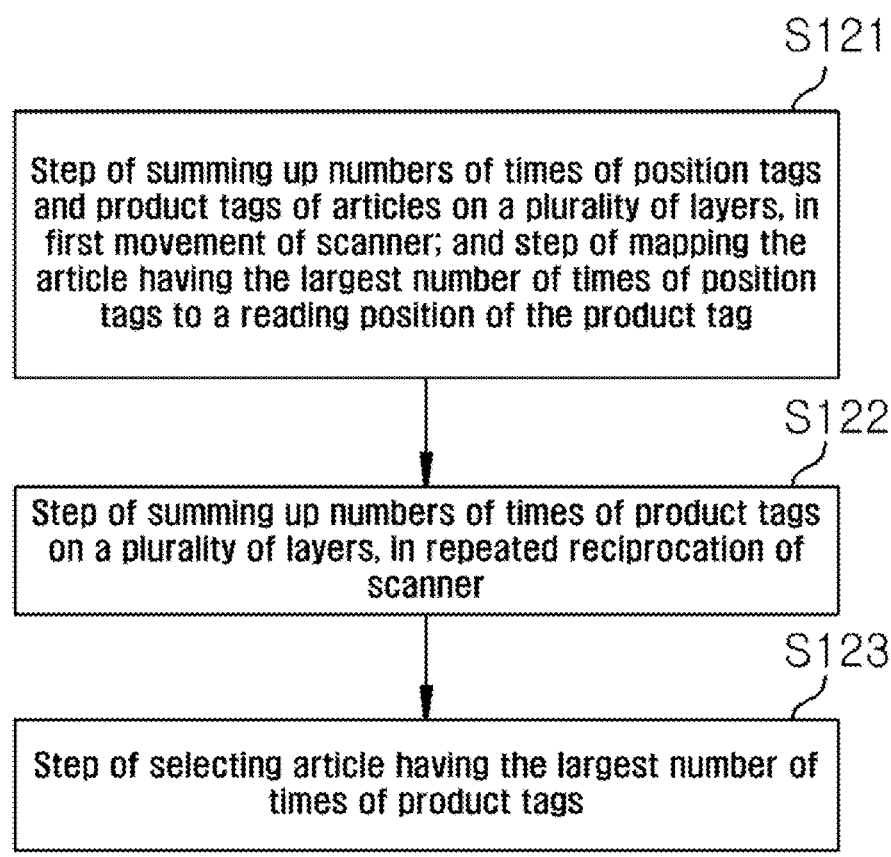

As shown in FIGS. 80 and 81, a method of scanning a display case according to a first embodiment of the present invention includes a horizontal scanning step (S110), a locating step (S120), and an information data acquiring step (S130). An RFID tag is attached to an article to be scanned, an antenna recognizes the RFID tag, and the antenna may be a patch type antenna or a film type antenna.

The horizontal scanning step (S110) is a process of repeatedly scanning articles in a display case by reciprocating a scanner in the horizontal direction of the display case, in which tags are set first for each layers in the display case, product tags are set for articles in a plurality of layers of storage sections, and then the articles are repeatedly scanned horizontally.

The locating step (S120) is a process of selecting the position of an article that is the most scanned with a scanner reciprocating as the actual position of the article, in which the position of an article having the number of times of recognizing a position tag and the number of times of recognizing a product tag which are the most scanned in the numbers of times of recognizing scanned position tags and product tags is selected as the actual position of the article.

For example, the locating step (S120) sums up the numbers of position tag times and the number of product tag times of the articles on each layer repeatedly scanned by a plurality of antennas of a scanner, when the scanner moves first time, and maps the largest number of position tag times in the calculated number of position tag times to a reading position (S121). The numbers of product tag times for each layer are added up after the step of mapping it to the reading position, when the scanner repeats reciprocating (S122). The article having the largest number of product tag times is selected by comparing the calculated numbers of product tag times for each layer (S123).

Thereafter, the information data acquiring step (S130) is a process of collecting article information data of an article from the scan information of the selected article, in which the position information and the product information of the selected article are compared with the position information and the product information of registered articles, and when the position information and the product information of the selected article and a registered article are the same, respectively, the product information data of the selected article is collected. The article information data of an article include detailed information such as the present state of storage and delivery of the article, the article features, the date of manufacture, and the period of circulation.

Figure 82:
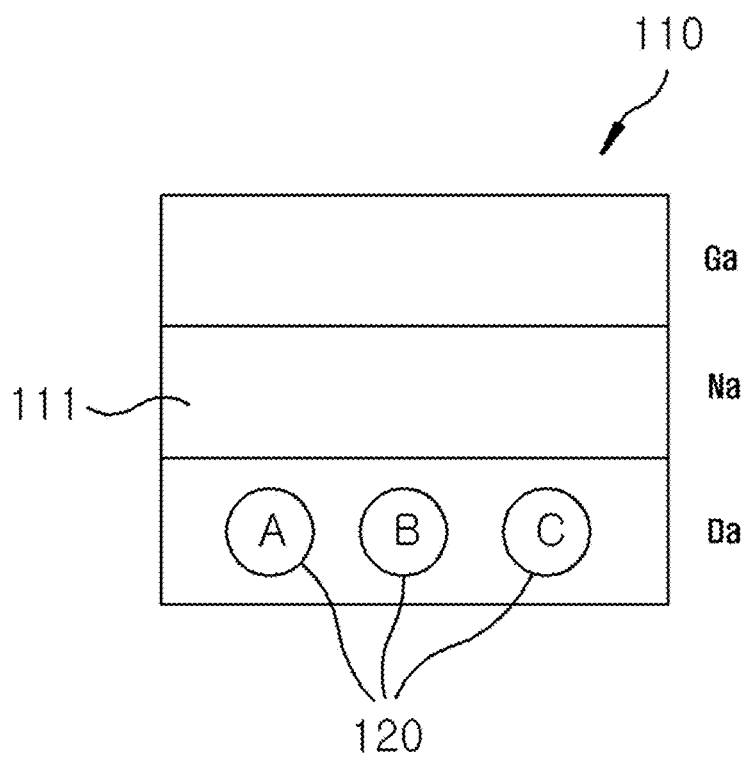
FIG. 82 is a view showing arrangement of articles to illustrating the scanning method for a display case according to the first embodiment of the present invention.

An embodiment for determining the actual position of an article is described with reference to FIG. 82.

In this embodiment, it is assumed that a display case has three layers, one storage section is defined on each of the layers of the display case, articles A, B, and C are exhibited in the storage section of the lowermost layer (first layer), and two antennas (first and second antennas for the third layer, third and fourth antennas for the second layer, and fifth and sixth antennas for the first layer) are designated for the storage section of each of the layers in the display case. Tags "Ga", "Na", and "Da" are attached to the storage sections of the layers and product tags "A", "B", and "C" are attached to the products A, B, and C.

First, when a scanner moves for the first cycle, the numbers of repeated reading of repeated product tags read by two antennas (first and second antennas) are added up.

For example, when the first antenna reads a position tag "Ga" (No. 65), a position tag "Na" (No. 31), a position tag "Da" (No. 04), a product tag "A" (No. 12), a product tag "B" (No. 14), and a product tag "C" (No. 15) and the second antenna reads a position tag "Ga" (No. 30), a position tag "Na" (No. 32), a position tag "Da" (No. 05), a product tag "A" (No. 03), a product tag "B" (No. 02), and a product tag "C" (No. 04), and when the position tags and the product tags are added up, respectively, they become a position tag "Ga" (No. 95), a position tag "Na" (No. 63), a position tag "Da" (No. 9), a product tag "A" (No. 15), a product tag "B" (No. 16), and a product tag "C" (No. 19), in which when the position tag "Ga" (No. 95), which is the position tag of the largest number of times, is selected and the product tag from which the position tag was read is mapped to the reading position, the first and second antennas map the product tag "A" (15)—"Ga", the product tag "B" (16)—"Ga", and the product tag "C" (19)—"Ga".

Thereafter, in the same way, when the position tags and the product tags read by the third and fourth antennas and the fifth and sixth antennas are mapped, the third and fourth antennas map the product tag "A" (25)—"Na", the product tag "B" (26)—"Na", and the product tag "C" (19)—"Na" and the fifth and sixth antennas map the product tag "A" (59)—"Da", the product tag "B" (54)—"Da", and the product tag "C" (47)—"Da".

As described above, when mapping between the position tags and the product tags read by the antennas is finished, after the scanner moves for the first cycle, mapping between the position tags and the product tags read by the antennas is finished, after the scanner moves for the second cycle. It is assumed that the following result was obtained, after the second cycle movement.

For example, the first and second antennas map the product tag "A" (07)—"Ga", the product tag "B" (10)—"Ga", and the product tag "C" (09)—"Ga", the third and fourth antennas map the product tag "A" (22)—"Na", the product tag "B" (21)—"Na", and the product tag "C" (15)—"Na", and the fifth and sixth antennas map the product tag "A" (81)—"Da", the product tag "B" (55)—"Da", and the product tag "C" (47)—"Da", Thereafter, the sum of the calculate values during the first cycle movement and the second cycle movement and the numbers of product tags of the articles for the layers is as follows.

For example, they are summed to the product tag "A" (22)—"Ga", the product tag "B" (26)—"Ga", and the product tag "C" (28)—"Ga" in the first and second antennas, they are summed to the product tag "A" (47)—"Na", the product tag "B" (47)—"Na", and the product tag "C" (34)—"Na" in the third and fourth antennas, and they are summed as the product tag "A" (140)—"Da", the product tag "B" (109)—"Da", and the product tag "C" (94)—"Da" in the fifth and sixth antennas.

The article having the largest number of times of product tags is selected by comparing the summed numbers of times of product tags for the layers and the number of times of reading is disregarded with only the mapping relationships left, thereby obtaining the followings.

For example, the product tag "A"—"Da", the product tag "B"—"Da", and the product tag "C"—"Da" are selected.

When the article is finally selected, as described above, the position information and the product information of the selected article and the position information and the product information of registered articles are compared, and when the position information and the product information (company code and commodity code) of the selected article and a registered article are the same, the article information data of the selected article is collected.

For example, the company codes and the commodity codes of the product tags "A", "B", and "C" are compared with the returned company code and product information, and when the information of the product tag "A" is not the same as the returned information, the product tag "A" is removed from the result. Only the product tag "B"—"Da" and the product tag "C"—"Da", which is not removed, is made in an XML format and transmitted to an application terminal.

As described above, the scanning method has a limit in finding out the accurate location of articles due to the non-certainty of the RFID technology itself, so there is a need of a tolerance in the position-based result calculated on the basis of probability and the method is to optionally put the adjacent position value to a specific article position.

To this end, since inter-comparing is possible only when a specific product has been registered at a specific position, a manager needs to register all the product groups in the display case on a PC, when install the scanner. For example, the company codes and the product codes "amodipin" and "amosartan" should be registered on the product tag in "Ga" of the display case.

Figure 83:
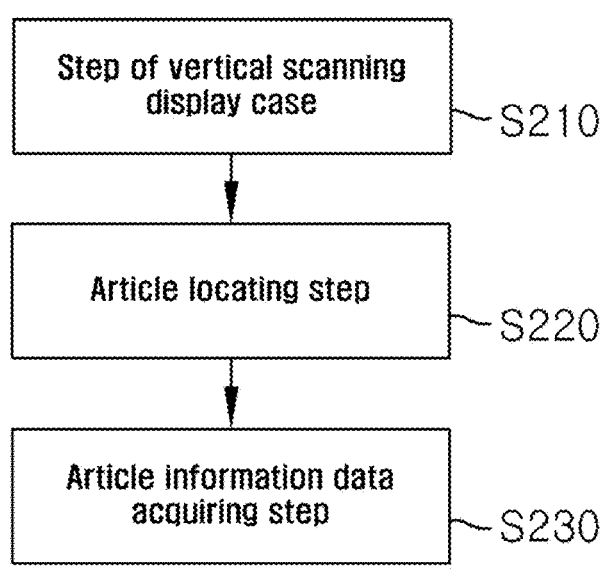
FIGS. 83 and 84 are block diagrams illustrating a scanning method for a display case according to a second embodiment.
Figure 84:
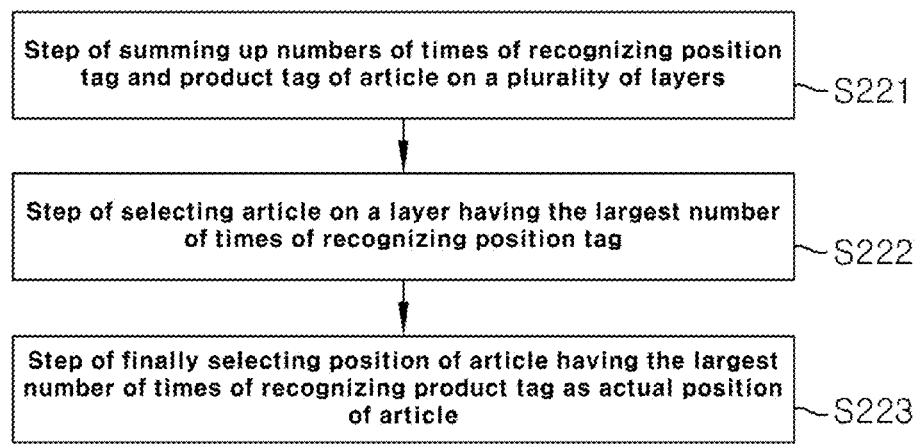

As shown in FIGS. 83 and 84, a method of scanning a display case according to a second embodiment of the present invention includes a vertical scanning step (S210), an article locating step (S220), and an article information data acquiring step (S230).

First, the vertical scanning step (S210) repeats scanning articles on a plurality of layers in a display case by reciprocating a scanner perpendicularly with respect to the display case.

In this embodiment, since an RFID-based technology is applied, the vertical scanning step (S210) sets position tags first to a plurality of layers of a display case, sets product tags to articles in storage sections on the layers, and then repeats scanning the articles In this embodiment, the article locating step (S220) is a step for selecting the position of an article that is the most scanned with a scanner reciprocating as the actual position of the article, in which the position of an article having the number of times of recognizing a position tag and the number of times of recognizing a product tag which are the most scanned in the numbers of times of recognizing scanned position tags and product tags is selected as the actual position of the article.

For example, the article locating step (S220) sums up the numbers of times of recognizing the position tags and the product tags of the articles on the layers which are repeatedly scanned by a plurality of antennas of a scanner, when the scanner repeats moving (S221), selects the articles having the largest number of times of recognizing the position tag in the calculated number of times of recognizing the position tags and the product tags (S222), and finally selects the position of the article having the largest number of times of recognizing the position tag from the selected articles as the actual position (S223).

The article information data acquiring step (S230) collects the article information data of the article from the scan information of the selected article. The article information data of an article include detailed information such as the present state of storage and delivery of the article, the article features, the date of manufacture, and the period of circulation.

Figure 85:
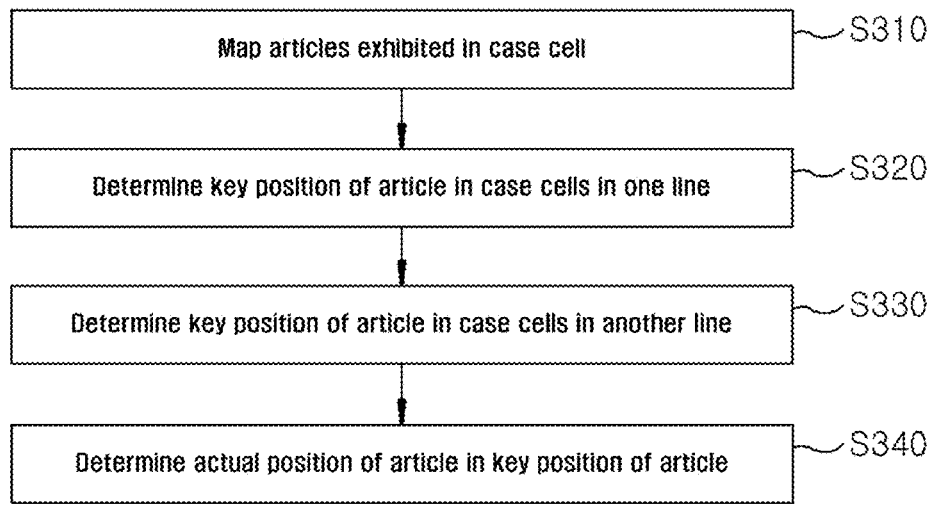
FIG. 85 is a block diagram illustrating a scanning method for a display case according to a third embodiment of the present invention.

As shown in FIG. 85, a method of scanning a display case according to a third embodiment of the present invention can accurately select the position of a specific article in a display case by memorizing a case cell and the mapping relationships of the articles exhibited in the case cell and then by repeatedly reading them in management of the stock.

The scanning method may include a mapping step (S310) of mapping a case cell and articles initially exhibited in the case cell, an article locating step for one line (S320) which selects key positions of articles display cells on one line, an article locating step for another line (S330) which selects key positions of articles in display cells on another line, and a step (S340) of determining the actual positions of articles in the key positions of the articles.

The mapping step (S310) can map case cells with the articles initially exhibited in the case cells by scanning the case cells on a plurality of layers in a display case and the articles initially exhibited in the display cells. A scanning apparatus equipped with antennas may be mounted on the display case to be movable horizontally to the display case. Although the scanning apparatus can reciprocate in the horizontal direction of a display case in this embodiment, it may reciprocate vertically with respect to a display case in some cases.

The mapping step (S310) may include a tag setting step and a mapping storing step. The tag setting step can set cell tags for case cells by attaching a cell tag to the case cells on a plurality of layers in a display case and can set article tags for articles by attaching an article tag to articles in the case cell. Further, the mapping storing step can map specific articles in a specific case cell by reading the cell tag of the case cell and the article tags on articles exhibited in the display cell, and memorize the mapping relationships on a storage.

The article locating step for one line (S320) can determine key positions of articles in a line by scanning the display cells and the articles in the line.

For example, the number of times of reading cell tags is calculated by reading the cell tags in case cells in one line through scanning of a scanning apparatus, and the position of the case cell having the most read cell tag in the calculate numbers of times of reading the cell tags is selected as the present position of the antenna. Further, the position of the display cell at the most read position in the numbers of times of reading article tags read at the present position of the selected antenna may be selected as the key position of the article in one line.

The article locating step for another line (S330) can determine key positions of articles in another line by scanning the display cells and the articles in the line. The line of the display case may be defined as the other lines except for one line of the display case. For example, when the display case is composed of 3×3 case cells and the case cells in the first line are defined as the 'case cells in one line', the display cells in the other second and third lines may be defined as 'case cells in another line'.

Accordingly, in the article locating step for another line (S330), the number of times of reading cell tag is calculated by reading the cell tags of the case cells in the other line (another line) except for one line through scanning of a scanning apparatus and the position of the case cell having the most read cell tag in the numbers of times of reading the cell tags is selected as the present position of the antenna. Further, the position of the display cell at the most read position in the numbers of times of reading article tags read at the present position of the selected antenna may be selected as the key position of the article in another line.

As described above, in the article locating steps for one line and another line (S320 and S330), the key positions of the articles in the selected lines may be finally selected as the actual positions of the articles in the step of determining the actual position of an article (S340).

The step of determining the actual position of an article (S340) can select the actual position of an article in key positions of articles selected in one line and another line.

That is, in the article locating step for one line and another line (S320 and S330), when the key position of articles are selected, the positions of the case cells at the most read positions in the key positions of the articles in one line and another line may be determined as the actual positions of the articles. Only the actual positions of the articles finally selected are recognized as the actual positions where the articles are exhibited in the display case and the key positions of the other articles not selected can be disregarded.

After the actual positions of the articles are selected, as described above, the article information data can be selected from the articles at the actual position.

For example, when the article is finally selected, as described above, the position information and the product information of the selected article and the position information and the product information of registered articles are compared, and when the position information and the product information (company code and commodity code) of the selected article and a registered article are the same, the article information data of the selected article can be collected.

The scanning method according to this embodiment is described in detail to more clearly explain the method.

Figure 86:
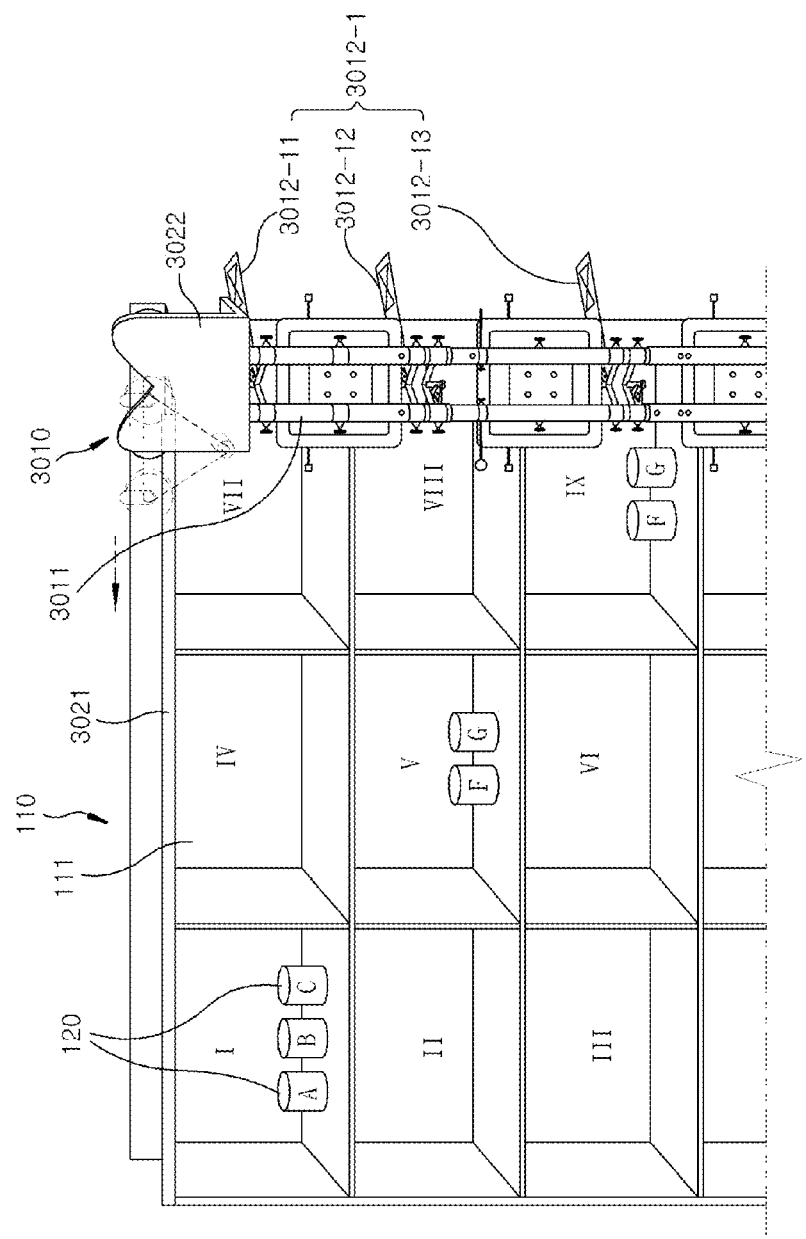
FIGS. 86 and 87 are views showing the operation of a scanning apparatus used for the scanning method for a display case according to the third embodiment of the present invention.
Figure 87:
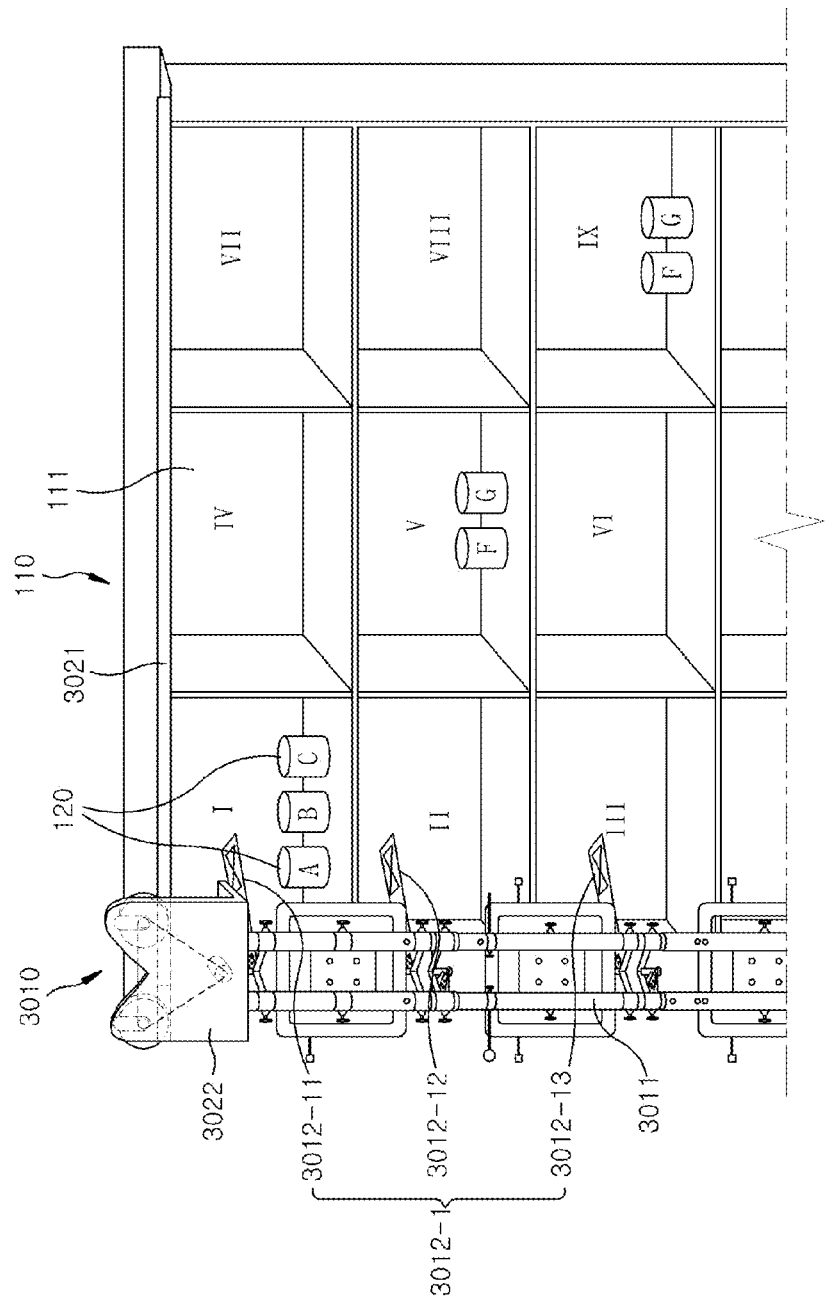

As shown in FIGS. 86 and 87, in a display case 110 of this embodiment having 3×3 storage sections 111, it may be assumed that the storage sections 111 are given cell tags I to IX, respectively, medicines with article tags of A, B, and C are exhibited in the storage section 111 having the cell tag I in the storage sections 111, medicines with article tags of D and E are exhibited in the storage section 111 having the cell tag V, and medicines with article tags F and G are exhibited in the storage section 111 having the cell tag IX. Since an RFID-based technology is applied to this embodiment, an RF tag that is a wireless recognition part is used as the article tags and the cell tags for the articles 120 and the storage sections 111, but other than the RFID-based technology of a scanning apparatus, other types of wireless recognition technologies that can provide the information of the articles 120 in wireless communication may be applied in various ways to the present invention.

The display case is provided with a guide rail 3021 and a scanning apparatus 3010 is mounted on the guide rail 3021 to be able to reciprocate in the horizontal direction of the display case 110. The scanning apparatus 3010 used in this embodiment can read the cell tags of the storage sections 111 and the article tags of the articles 120 in the storage sections 111 while reciprocating in the horizontal direction of the display case 110. For example, the scanning apparatus 3010 in this embodiment may be composed of a driving unit 3022 for moving in the horizontal direction of the display case 110, an antenna 3012-1 that reads cell tags and article tags, and a scanner arm 3012 that supports the antenna 3012-1, and the antenna 3012-1 may include first to third antennas 3012-10, 3012-20, and 3012-30 corresponding to the storage sections 111. Obviously, the scanning apparatus 3010 is not limited to this configuration and may be changed in various ways without the range that coincides with a configuration capable of reading cell tags and article tags.

When the articles 120 are exhibited in the display case 110 having the configuration, for stock management of the articles 120 in the display case, it is possible to map the storage sections 111 with the articles 120 exhibited in the storage sections 111 by reading the cell tags I~X for the storage sections 111 in the display case 110 and the article tags A~G of the articles 120 exhibited initially in the storage sections 111 (S310).

Thereafter, when there is a need of stock management, it is possible to determine key positions of the articles 120 in one line by scanning the storage sections 111 and the articles 120 in the line (S320).

For example, assuming that the scanning apparatus reciprocates one time in one line (VII-VIII-IX line) for ten seconds, the numbers of times of reading cell tags by the first to third antennas 3012-10, 3012-20, and 3012-30 are as follows in Table 1.

TABLE 1

| | Cell tag I | Cell tag II | Cell tag III | Cell tag IV | Cell tag V | Cell tag VI | Cell tag VII | Cell tag VIII | Cell tag IX |
|---|---|---|---|---|---|---|---|---|---|
| First antenna | 5 | 4 | 3 | 10 | 9 | 8 | 30 | 20 | 15 |
| Second antenna | 4 | 5 | 4 | 9 | 10 | 9 | 15 | 30 | 15 |
| Third antenna | 3 | 4 | 5 | 8 | 9 | 10 | 15 | 20 | 30 |

As shown in Table 1, the cell tag VII was the most read, 30 times, by the first antenna 3012-10, the cell tag VIII was the most read, 30 times, by the second antenna 3012-20, and the cell tag IX was the most read, 30 times, by the third antenna 3012-30. The mapping relationships between the antennas and the cell tags are calculated as first antenna—cell tag VII, second antenna—cell tag VIII, and third antenna—cell tag IX. That is, it can be determined that the first antenna 3012-10 is positioned at "VII", the second antenna 3012-20 is positioned at "VIII", and the first antenna 3012-10 is positioned at "IX", at the point of time of the present reading of one line (VII-VIII-IX line).

The numbers of times of reading articles by the first to third antennas 3012-10, 3012-20, and 3012-30 of the scanning apparatus are as the followings in Table 2. Table 2 shows the numbers of times of reading article tags by specific antennas (first to third antennas) staying at specific positions (VII, VIII, and IX) where articles 120 are.

TABLE 2

| | Article tag A | Article tag B | Article tag C | Article tag D | Article tag E | Article tag F | Article tag G |
|---|---|---|---|---|---|---|---|
| VII | 10 | 10 | 10 | 15 | 15 | 20 | 20 |
| VIII | 7 | 7 | 7 | 20 | 20 | 20 | 20 |
| IX | 5 | 5 | 5 | 15 | 15 | 30 | 30 |

As shown in Table 2, it can be determined that as key positions of the articles in one line (VII-VIII-IX), the article tags A, B, and C are likely to exist at the specific position "VII" where they were the most read, 10 times, the article tags D and E are likely to exist at the specific position "VII" where they were the most read, 20 times, and the article tags F and G are likely to exist at the specific position "IX" where they were the most read, 30 times.

Next, it is possible to determine key positions of the articles 120 in another line (I-II-III line) by scanning the storage sections 111 and the articles 120 in the line (S3).

For example, assuming that the scanning apparatus reciprocates one time in another line (I-II-III line) for ten seconds, the numbers of times of reading cell tags by the first to third antennas 3012-10, 3012-20, and 3012-30 are as follows in Table 3.

TABLE 3

|  | Cell tag I | Cell tag II | Cell tag III | Cell tag IV | Cell tag V | Cell tag VI | Cell tag VII | Cell tag VIII | Cell tag IX |
| --- | --- | --- | --- | --- | --- | --- | --- | --- | --- |
| First antenna | 30 | 20 | 15 | 10 | 9 | 8 | 5 | 4 | 3 |
| Second antenna | 15 | 30 | 15 | 9 | 10 | 9 | 4 | 5 | 4 |
| Third antenna | 15 | 20 | 30 | 8 | 9 | 10 | 3 | 4 | 5 |

As shown in Table 3, the cell tag I was the most read, 30 times, by the first antenna 3012-10, the cell tag II was the most read, 30 times, by the second antenna 3012-20, and the cell tag III was the most read, 30 times, by the third antenna 3012-30. The mapping relationships between the antennas and the cell tags are calculated as first antenna—cell tag I, second antenna—cell tag II, and third antenna—cell tag III. That is, it is possible to determine that the first antenna 3012-10 is positioned at "I", the second antenna 3012-20 is positioned at "II", and the first antenna 3012-10 is positioned at "III", at the point of time of the present reading of another line (I-II-III line).

The numbers of times of reading articles by the first to third antennas 3012-10, 3012-20, and 3012-30 of the scanning apparatus are as the followings in Table 4. Table 4 shows the numbers of times of reading article tags by specific antennas (first to third antennas) staying at specific positions (I, II, and III) where articles 120 are.

TABLE 4

|  | Article tag A | Article tag B | Article tag C | Article tag D | Article tag E | Article tag F | Article tag G |
| --- | --- | --- | --- | --- | --- | --- | --- |
| I | 30 | 30 | 30 | 15 | 15 | 8 | 8 |
| II | 25 | 25 | 25 | 20 | 20 | 10 | 10 |
| III | 15 | 15 | 15 | 18 | 18 | 12 | 12 |

As shown in Table 4, it can be determined that as key positions of the articles 120 in another line (I, II, and III line), the article tags A, B, and C are likely to exist at the specific position "I" where they were the most read, 30 times, the article tags D and E are likely to exist at the specific position "II" where they were the most read, 20 times, and the article tags F and G are likely to exist at the specific position "III" where they were the most read, 12 times.

In this embodiment, the key positions of the articles 120 were determined by scanning the storage sections 111 and the articles 120 in another line that is the "I-II-III line", and in the same way, it is possible to determine the key position of the articles 120 in another line that is the "IV-V-VI line" by scanning the storage sections 111 and the articles 120 in the line.

Next, it is possible to select the actual positions of the articles 120 in the key positions of the articles 120 determined in one line (VII-VIII-IX line) and other lines (I-II-III line and IV-V-VI line) (S340).

That is, the article tags A, B, and C were likely to exist at the specific position "VII" where they were the most read (10 times) in Table 2, but referring to Table 4, since they were the most read (30 times) not at the specific position "VII", but the specific position "I", it can be concluded that the article tags A, B, and C will be likely to exist at the specific position "I".

Similarly, the article tags F and G were likely to exist at the specific position "III" where they were the most read (12 times) in Table 4, but referring to Table 2, since they were the most read (30 times) not at the specific position "III", but the specific position "IX", it can be concluded that the article tags F and G will be likely to exist at the specific position "IX". According to determination in the same way, it can be concluded that the article tags D and E will be likely to exist at the specific position "V".

After determining the actual positions of the articles 120, it is possible to collect the article information data from the scan information of the articles 120 at the actual positions.

In the process of collecting article information data, the position information and the product information of the selected article 120 are compared with the position information and the product information of registered articles, and when the position information and the product information of the selected article 120 and a registered article are the same, respectively, the article information data of the selected article 120 can be collected. The article information data of an article include detailed information such as the present state of storage and delivery of the article, the article features, the date of manufacture, and the period of circulation.

Figure 88:
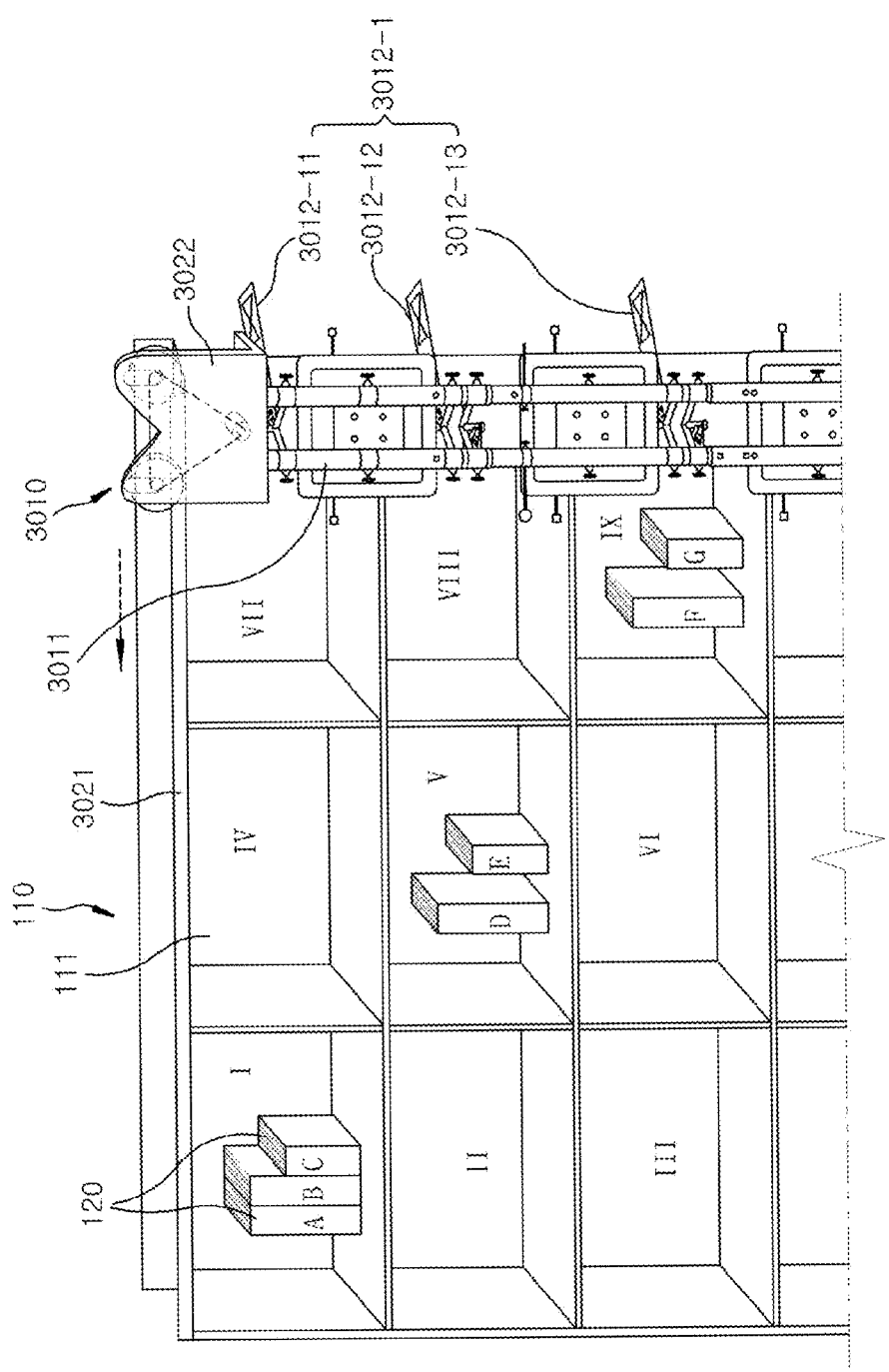
FIG. 88 is a view showing the state when the scanning method for a display case according to the third embodiment of the present invention is applied to a display case with books therein.

As the articles exhibited in a display case on which stock management is performed in this embodiment, cosmetics or medicines can be applied, and it may be applied to various filed requiring stock management other than cosmetics or medicines. For example, as shown in FIG. 88, the method of scanning a display case according to the present invention may be applied books 20' exhibited in display cases in libraries and book stores.

Figure 89:
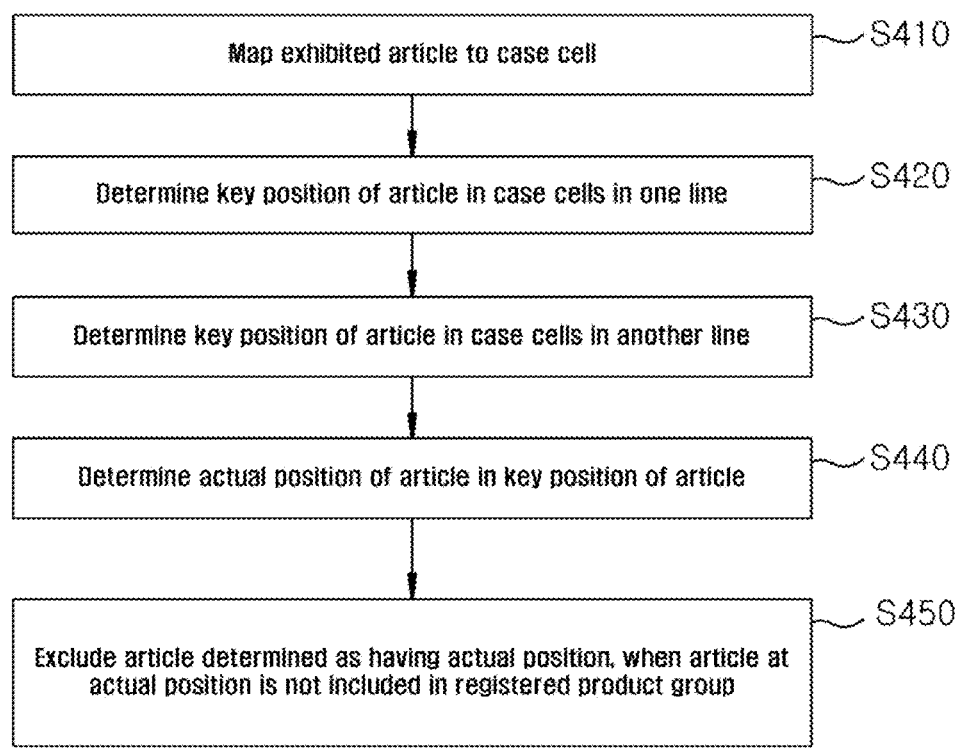
FIG. 89 is a block diagram illustrating a scanning method for a display case according to a fourth embodiment of the present invention.

As shown in FIG. 89, a method of scanning a display case according to a fourth embodiment of the present invention can accurately select the positions of specific articles in a display case and filter non-registered articles in the selected specific articles by memorizing a case cell and the mapping relationships of the articles initially exhibited in the case cell and then by repeatedly reading them in management of the stock.

The scanning method may include a mapping step (S410) of mapping a case cell and articles initially exhibited in the case cell, an article locating step for one line (S420) which determines key positions of articles display cells on one line, an article locating step for another line (S430) which determines key positions of articles in display cells on another line, a step (440) of determining the actual positions of articles in the key positions of the articles, and an article excluding step (S450) of excluding the non-registered articles from the actual positions of the articles.

The mapping step (S410), the article locating step for one line (S420), the article locating step for another line (S430), and the step of determining the actual positions of articles (S440), except for the article excluding step (S450), are the same as the mapping step (S410), the article locating step for one line (S420), the article locating step for another line (S430), and the step of determining the actual positions of articles (S440) which were described in the first embodiment, so another embodiment is described hereafter mainly with the differences from this embodiment.

In the article excluding step (S450), when the article at the actual position is not included in the registered article group, it is possible to exclude the article selected in the step (S440) of determining the actual position from the actual position.

Figure 90:
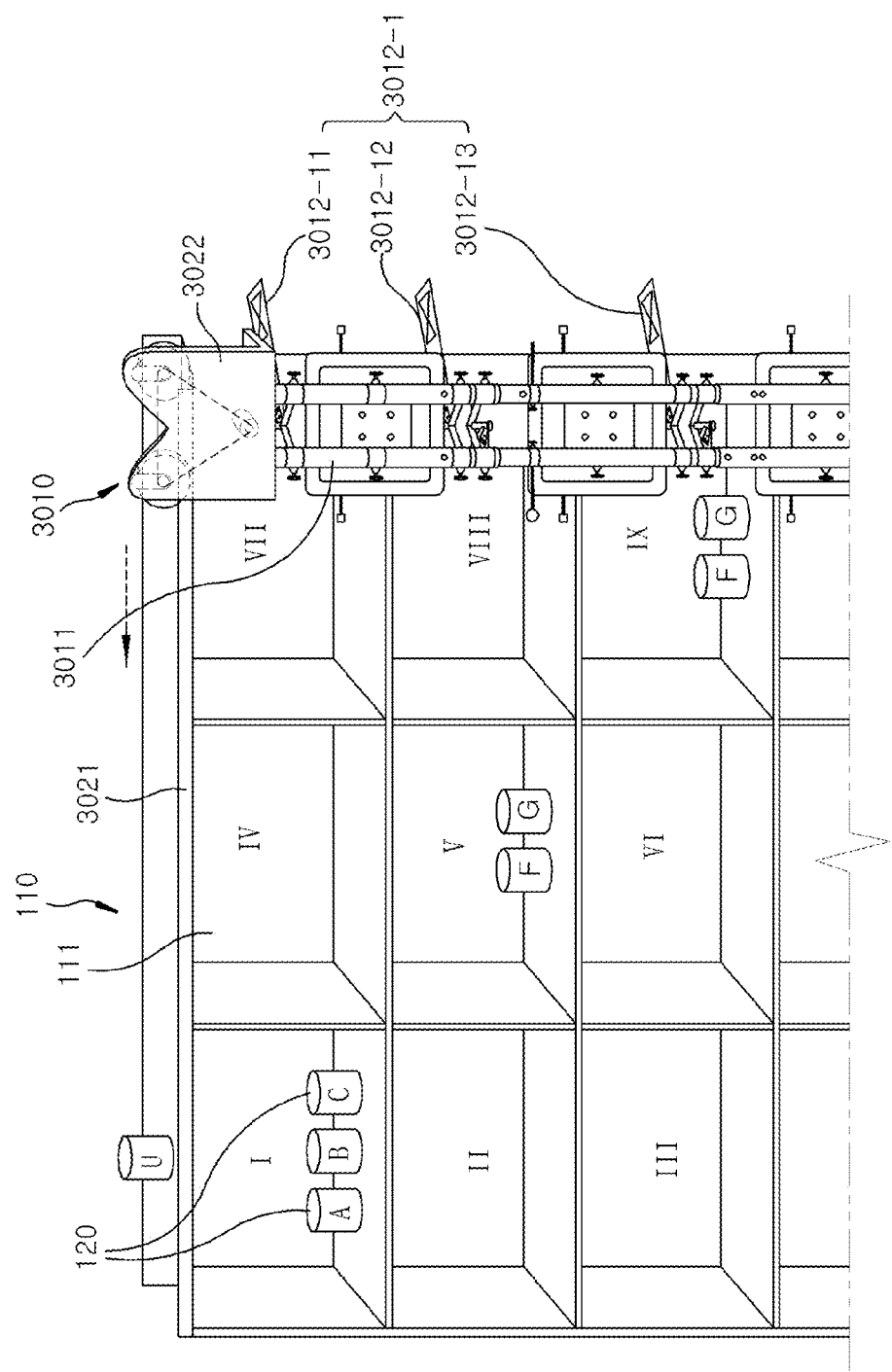
FIGS. 90 and 91 are views showing the operation of a scanning apparatus used for the scanning method for a display case according to the fourth embodiment of the present invention.
Figure 91:
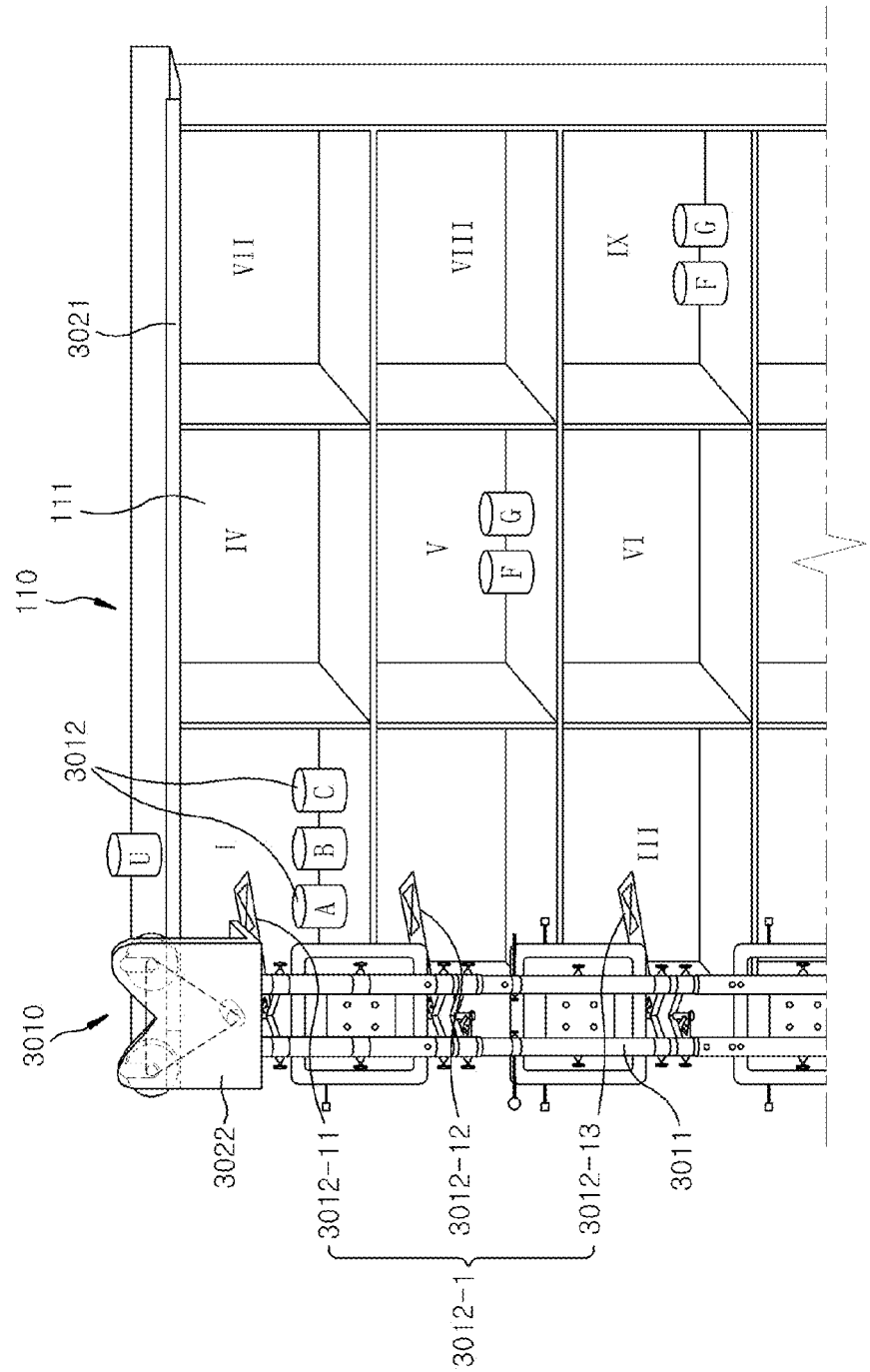

For example, as shown in FIGS. 90 and 91, when articles A~G are registered in advance and exhibited in case cells of a display case and an article U is exhibited in a display cell without registering, the article U can be determined as being positioned at a specific position in the display cell through the mapping step (S410), the article locating step for one line (S420), the article locating step for another line (S430), and the a step (440) of determining the actual positions of articles 120.

However, since the article U has not been registered in advance, even if the article U was the most read at a specific position in the step (S440) of determining the actual positions or articles, the article U can be finally excluded at the specific position in the article excluding step (S460).

Figure 92:
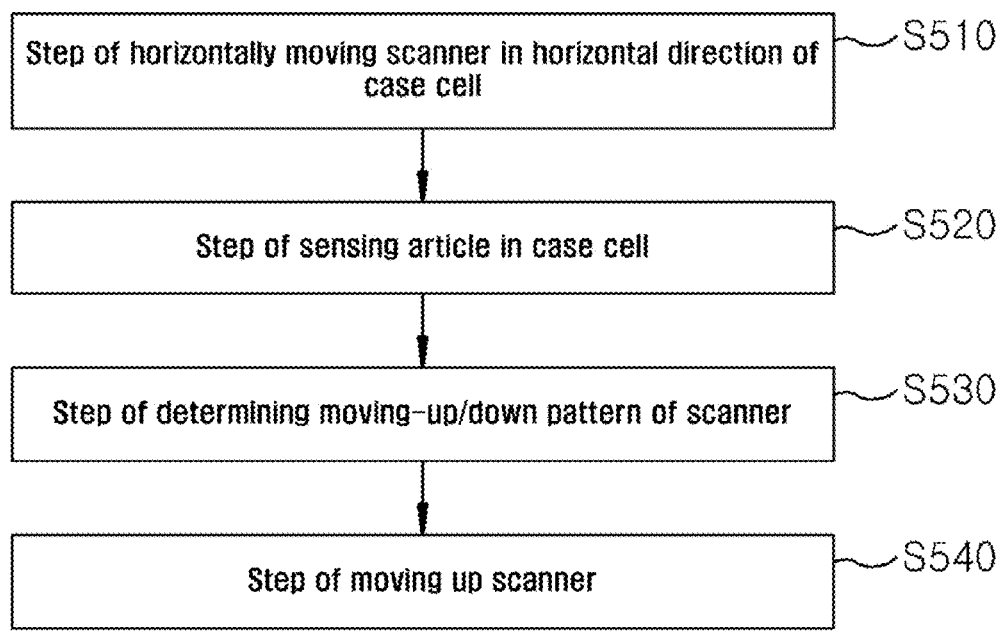
FIG. 92 is a block diagram illustrating a scanning method for a display case according to a fifth embodiment of the present invention.

As shown in FIG. 92, a method of scanning a display case according to a fifth embodiment of the present invention may include a horizontal moving step (S510) or moving a scanner in the horizontal direction of a case cell, a step (S520) of sensing articles in a case cell, a step (S530) of setting a moving-up/down pattern of a scanner, and a step (S540) of moving up/down a scanner.

The step (S510) of moving a scanner in the horizontal direction of a case cell can move at least one or more scanners in the horizontal direction of a display case, case cells having at least one or more layers. In this embodiment, one scanner may be mounted on the scanning apparatus described above and may move in a layer of case cell.

The step (S520) of sensing articles in a case cell is for sensing articles in the horizontal movement direction of a scanner and can sense in advance the articles in the movement path of a scanner before the scanner moves. The range of sensing articles may depend on the types of article sensors that can sense articles.

For example, depending on the types of article sensors, it may be possible to sense only whether there is an article or to sense the vertical position and the horizontal position to the edge of an article.

In particular, when only whether there is an article is sensed, the step (S530) of setting the moving-up/down pattern of a scanner can set a moving-up pattern for moving the scanner up, when an article is sensed by the article sensor, and it can set a moving-down pattern for moving down the scanner, when no articles is sensed by the article sensor. The moving-up/down range of the scanner in a storage section may be limited to a range in which it can move over a commodity at the uppermost position in the commodities exhibited in the storage section.

When the vertical position and the horizontal position to the edge of an article can be sensed, the step (S530) of setting the moving-up/down pattern of a scanner calculates the position path of the edge from the sensed vertical position and horizontal position and can set a moving-up/down patter for moving the antenna of the scanner close to the edge of the article in accordance with the calculated position path.

Further, the step (S530) of setting the moving-up/down pattern of a scanner can achieve a trend type path having a wave shape at a predetermined distance from the edge of an article by setting a movement path of a scanner by distributing the position path of the edge. It can achieve a moving-up/down patter that increases the moving-up/down speed of the scanner, when the inclination of a tangent line of the trend type path becomes larger than a standard inclination, and decreases the moving-up/down speed of the scanner, when the inclination of a tangent line of the trend type path becomes smaller than the standard inclination.

Since the scanner can move up/down in accordance with the set moving-up/down patter of the scanner, the scanner can move closer to an article, as compared with when the scanner moves only in the horizontal direction of a display case, such that it is possible to accurately find out the information about articles in a case cell, in the step (S540) of moving up/down a scanner.

Figure 93:
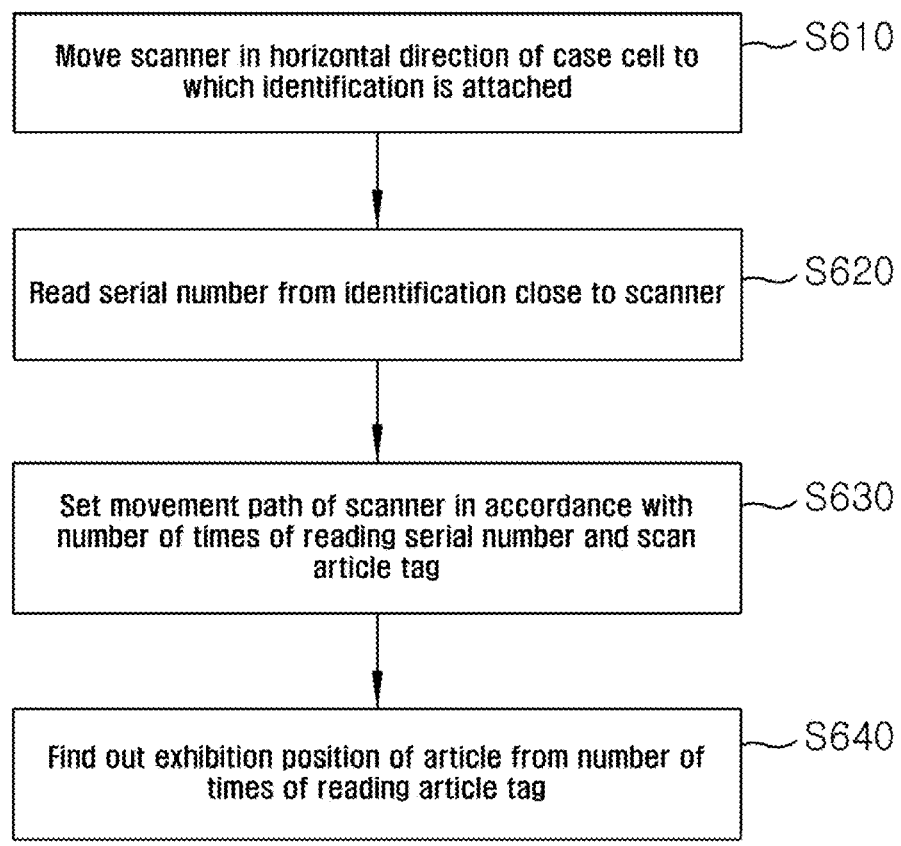
FIG. 93 is a block diagram illustrating a scanning method for a display case according to a sixth embodiment of the present invention.

As shown in FIG. 93, a method of scanning a display case according to a sixth embodiment of the present invention can effectively find out the operation of a scanner or the exhibition position of an article by determining an identification such as a barcode or a local tag (local 13.56 MHz tag) attached on a guide rail 4030 of a display case. Although the identification such as a barcode or a local tag is attached to the guide rail of a display case, it may be attached directly to a display case, other than the guide rail, or attached to the ceiling or the wall of the place where the display case is.

The scanning method moves a scanner in the horizontal direction of a case cell (S610), reads a serial number from an identification close to the scanner moving (S620), and sets the movement path of the scanner in accordance with the read serial number and reads an article tag attached on an article (S630), and can determine the exhibition position of the article on the basis of the number of times of reading the article tag.

In detail, the step (S610) of moving a scanner in the horizontal direction of a case cell can move a scanner in one horizontal direction or another horizontal direction with respect to a display case by applying an operation signal to the scanner positioned at one side or another side of the display case.

Article tags providing various items of information about articles in a case cell may be attached to the articles. Further, the scanner 4010 may be equipped with an antenna 4011 capable of receiving a tag signal from an article tag of an article 120 and a position reader 4012 capable of reading an identification such as a barcode or a local tag attached on a case cell. The position reader 4012 may be a barcode reader capable of reading barcodes or a reader in a band of 13.56 MHz which can read local tags of 13.56 MHz.

Although the scanner 4010 is equipped with the antenna 4011 capable of receiving a tag signal from an article tag and the position reader 4012 capable of reading a barcode or a local tag in this embodiment, it is not limited thereto and it may be possible to simultaneously read an article tag and a barcode or a local tag with one reader.

The step (S620) of reading a serial number from an identification close to the scanner moving can recognize a serial number inputted in an identification by reading the identification of a display case, using the position reader 4012, and store the recognized serial number on a storage in a system, when the scanner 4010 moves in one horizontal direction of another horizontal direction with respect to the display case.

The step (S630) of setting the movement path of a scanner and reading an article tag in accordance with the read serial number can control the operation (forward movement, backward movement, and stop) of a scanner by mapping control signals for controlling the operation of the scanner in accordance with the serial numbers read by the position reader 4012.

For example, when a specific serial number is read by the position reader 4012, with the scanner 4010 moving on a display case, it is possible to apply a forward movement signal, a backward movement signal, or a stop signal to the scanner in accordance with the read specific serial number.

The specific serial number may include a start serial number, a movement serial number, an end serial number, a curve start serial number, and a curve end serial number. The start serial number provides movement start information of a scanner, the movement serial number provides operation information for instructing a scanner to move and read an article, the end serial number provides movement stop information of a scanner, the curve start serial number provides only movement of a scanner by providing curved movement start information of a scanner, and the curve end serial number may instruct a scanner to move or read an article by providing curved movement end information of the scanner.

The step (S630) of setting the movement path of a scanner and reading an article tag in accordance with the read serial number can control the operation (forward movement, backward movement, and stop) of a scanner by mapping control signals for controlling the operation of the scanner in accordance with the serial numbers read by the position reader 4012.

For example, when a specific serial number is read from a read identification, with a scanner moving on a display case, it is possible to apply a forward movement signal, a backward movement signal, or a stop signal to the scanner in accordance with operation information of the scanner which has been mapped to the read specific serial number. In particular, when a specific serial number read by the position reader 4012 is smaller than a predetermined number of times of reading a specific serial number, the scanner can be reciprocated in the section between the present read identification and the previously read identification.

The step (S4) of determining the exhibition position of an article from the number of times of reading an article tag can select the position of a case cell having the most read article tag in the numbers of times of reading article tags by the scanner as the exhibition position of an article.

When the exhibition position of an article is selected, as described above, the position information and the product information of the selected article and the position information and the product information of registered articles are compared, and when the position information and the product information (company code and commodity code) of the selected article and a registered article are the same, the article information data of the selected article can be collected.

The scanning method according to this embodiment is described in detail to more clearly explain the method.

Figure 94:
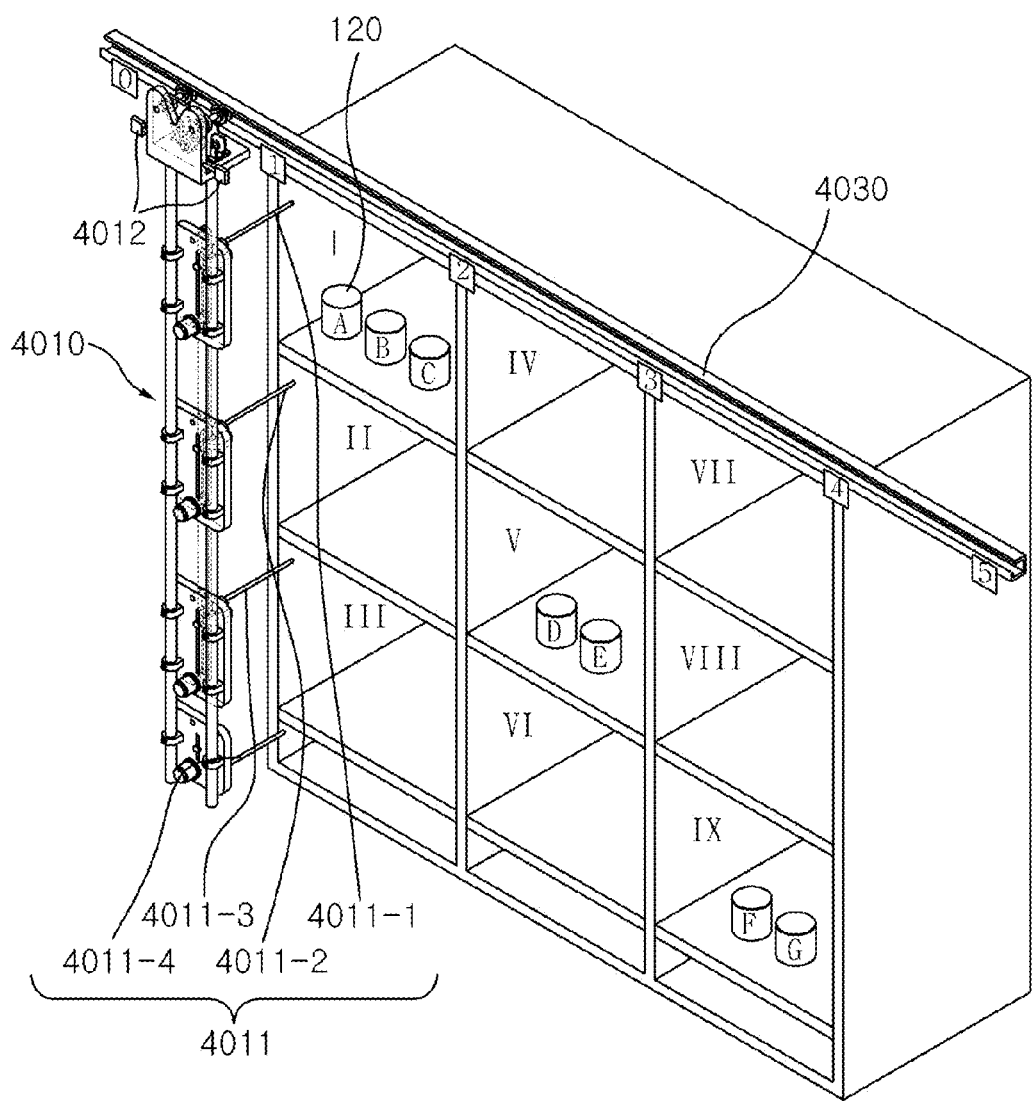
FIGS. 94 to 96 are views showing the operation of a scanning apparatus used for the scanning method for a display case according to the sixth embodiment of the present invention.
Figure 95:
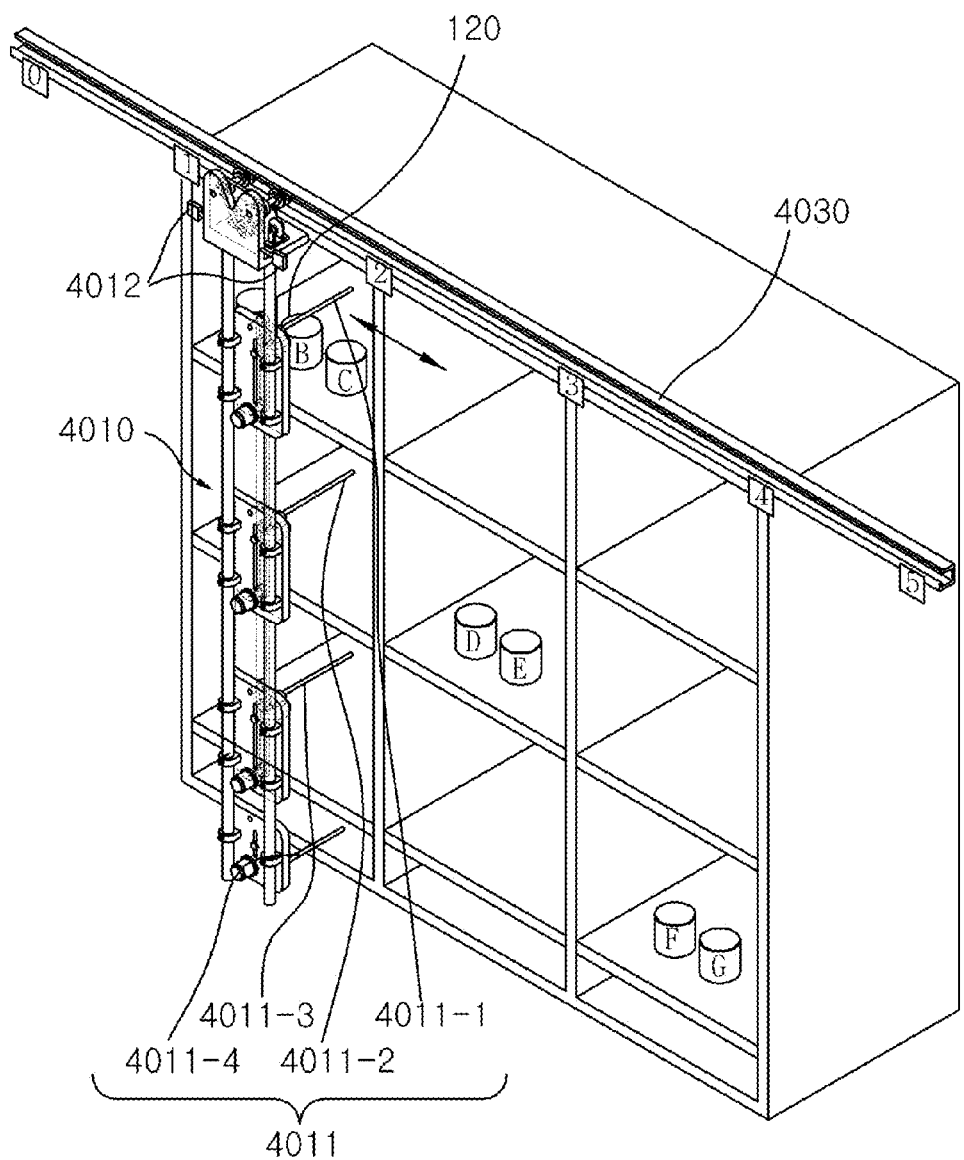
Figure 96:
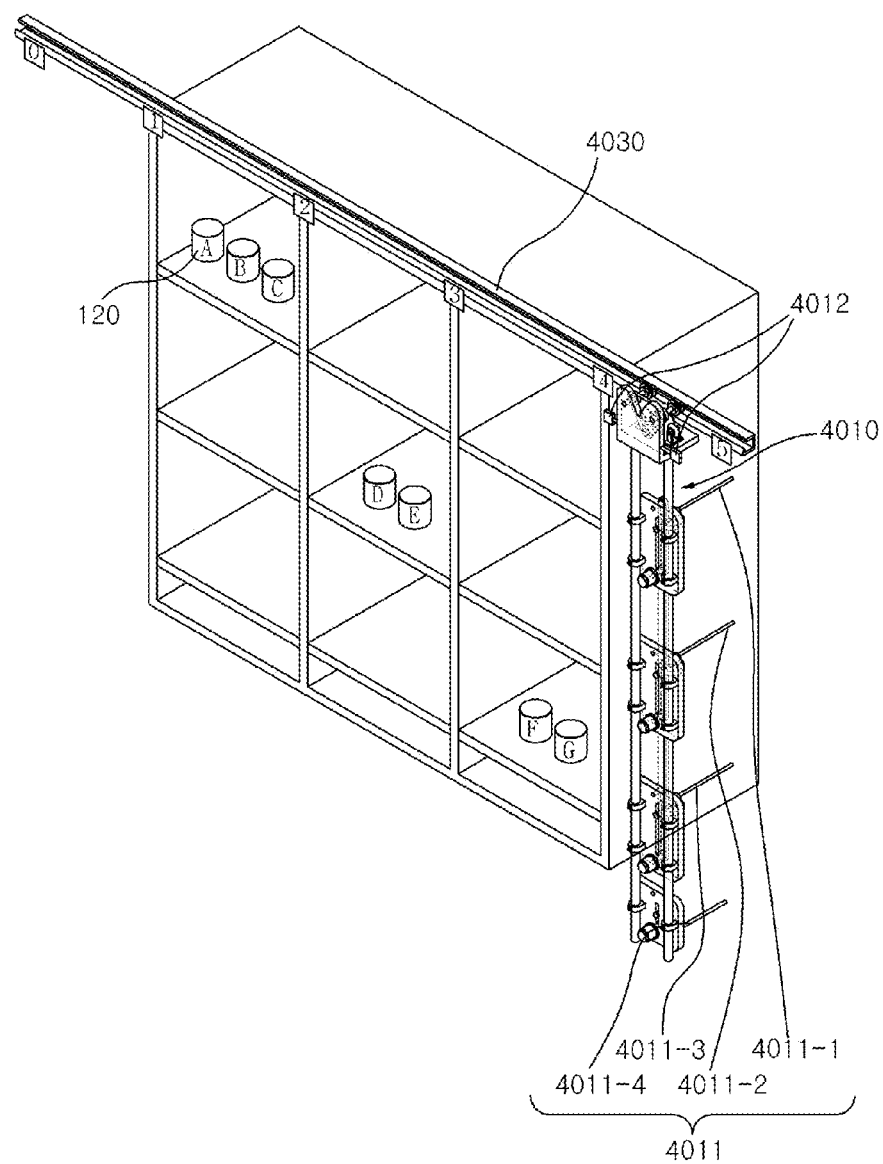

As shown in FIGS. 94 to 96, in a display case of this embodiment which has 3×3 racks, the racks are given cell tags I~IX, respectively, medicines with article tags A, B, and C are exhibited in the rack with the cell tag I in those racks, medicines with article tags D and E are exhibited in the rack with the cell tag V, and medicines with article tags F and G are exhibited in the rack with the cell tag IX. The display case is equipped with a guide rail 30 with identifications 0 to 5 attached and a scanner 4010 may be mounted on the guide rail 4030 to be able to reciprocate in the horizontal direction of the display case.

Identifications in which serial numbers 0, 1, 2, 3, 4, and 5 are attached horizontally on the display case, the reading value that is read by an antenna between the serial numbers 1 and 2 is defined as a reading group 12, the reading value that is read by an antenna between the serial numbers 2 and 3 is defined as a reading group 23, and the reading value that is read by an antenna between the serial numbers 3 and 4 is defined as a reading group 34.

Further, the scanner 4010 used in this embodiment can read the identifications on case cells and article tags on articles 120 in the case cells while reciprocating in the horizontal direction of the display case. To this end, the scanner 4010 may be equipped with an antenna 4011 that reads the article tags and a reader 4012 that reads identification on the display cells, and the antenna 4011 may include first to fourth antennas 4011-1, 4011-2, 4011-3, and 4011-4 corresponding to the case cell layers, respectively.

As shown in FIG. 94, when "0" that is the start serial number of the identifications is read by the position reader 4012 while the scanner 4010 moves on the display case, the scanner 4010 recognizes the position of the identification "0" as the start point and stores the serial number "0".

When the scanner 4010 keeps moving in the horizontal direction of the display case and the position reader 4012 reads "1" that is the movement serial number of the identifications, reading an article tag by the antenna is started and the scanner 4010 passes the position of the identification "1" and stores the serial number "1".

As shown in FIG. 95, when the scanner 4010 keeps moving in the horizontal direction of the display case and the position reader 4012 reads "2" that is the movement serial number of the identifications, the scanner 4010 reciprocates in the section between the serial numbers "1" and "2" and stores the serial number "2". When a predetermined number of times of reading the serial number "2" is larger than a specific number of times (for example, two time), the scanner 4010 can pass the serial number "2".

When the scanner 4010 keeps moving in the horizontal direction of the display case and the position reader 4012 reads the movement serial numbers "3" and "4" of the identifications, similar to the way of reciprocating in a section for the serial number "2", the scanner can reciprocate in accordance with a predetermined number of times of reading in the section between the previously read identification and the present read identification.

As shown in FIG. 96, when the scanner 4010 keeps moving in the horizontal direction of the display case and the position reader 4012 reads "5" that is the end serial number of the identifications, the scanner 4010 recognizes the position of the identification "5" as the end point, and stores the serial number "5" and stops reading an article tag. In this case, the scanner 4010 stops from horizontally moving too.

Though not shown in the figures, when the scanner 4010 keeps moving and the position reader 4012 reads the curve start serial number of the identifications, the scanner 4010 recognizes the position of the curve start serial number as a curve start point where the scanner 4010 start moving in a curve, such that the scanner 4010 may curvedly move.

Further, when the scanner 4010 curvedly moves and the position reader 4012 reads the curve end serial number of the identifications, the scanner 4010 recognizes the curve end point where the scanner 4010 stops curved movement and start straight movement, such that movement of the scanner 4010 reading of an article can be simultaneously performed.

Thereafter, when the position reader 4012 reads the end serial number, that is, "5", of the identifications, reading an article can be stopped and the horizontal movement of the scanner 4010 can also be stopped.

On the other hand, when the scanner 4010 moves, the numbers of times of reading the article tag A in the reading group 12, the reading group 23, and the reading group 34 by the first to fourth antennas are as follows in Table 5 and the sum of the numbers of times of reading article tags by a pair of adjacent antennas in the reading groups is as follows in Table 6.

TABLE 5

|  | First antenna | Second antenna | Third antenna | Fourth antenna |
|---|---|---|---|---|
| Number of times of reading article tag A in reading group 12 | 20 | 30 | 15 | 5 |
| Number of times of reading article tag A in reading group 23 | 10 | 8 | 6 | 1 |
| Number of times of reading article tag A in reading group 34 | 5 | 4 | 3 | — |

TABLE 6

|  | First antenna + Second antenna | Second antenna + Third antenna | Third antenna + Fourth antenna |
|---|---|---|---|
| Sum of the number of times of reading article tag A in reading group 12 | 50 | 45 | 20 |
| Sum of the number of times of reading article tag A in reading group 23 | 18 | 14 | 7 |
| Sum of the number of times of reading article tag A in reading group 23 | 9 | 7 | 3 |

As shown in Table 5, the article tag A was read 20 times by the first antenna, 30 times by the second antenna, 15 times by the third antenna, and 5 times by the fourth antenna in the reading group 12, the article tag A was read 10 times by the first antenna, 8 times by the second antenna, 6 times by the third antenna, and one time by the fourth antenna in the reading group 23, and the article tag A was read 5 times by the first antenna, 4 times by the second antenna, and 3 times by the third antenna in the reading group 34.

Further, as shown in Table 6, in order to increase the ability of finding out the position of the article tag A, it is possible to obtain 50 as the sum of the numbers of times of reading the article A in the reading group 12 by adding the number of times of reading the article tag by the first antenna and the number of times of reading the article A by the second antenna, it is possible to obtain 45 as the sum of the numbers of times of reading the article A in the reading group 23 by adding the number of times of reading the article A by the second antenna and the number of times of reading the article A by the third antenna, and it is possible to obtain 20 as the sum of the numbers of times of reading the article A in the reading group 34 by adding the number of times of reading the article A by the third antenna and the number of times of reading the article A by the fourth antenna.

As described above, it is possible to calculate the sum of the numbers of times of reading the article A in the reading group 12 from the number of times of reading the article A in the reading group 12, and similarly, it is possible to calculate the sum of the numbers of times of reading the article A in the reading group 23 from the number of times of reading the article A in the reading group 23 and to calculate the sum of the numbers of times of reading the article A in the reading group 34 from the number of times of reading the article A in the reading group 34.

When the sums of the numbers of times of reading the article A are calculated from the reading groups, it is possible to select 50 that is the largest in the sums of the numbers of times of reading the article A, and accordingly, the article A can be determined as being positioned between the first antenna and the second antenna of the reading group 12 (between the identifications having serial numbers 1 and 2) where "50" is calculated.

It is possible to determine the positions of the articles B, C, D, E, F, and G by applying the method of determining the position of the article A described above to the articles B, C, D, E, F, and G in the same way. This is not described in detail.

After the exhibition position of an article is determined, the position information and the product information of the selected article 120 are compared with the position information and the product information of registered articles, and when the position information and the product information of the selected article 120 and a registered article are the same, respectively, the article information data of the selected article 120 can be collected. The article information data of an article include detailed information such as the present state of storage and delivery of the article, the article features, the date of manufacture, and the period of circulation.

As the articles exhibited in a display case in this embodiment, cosmetics or medicines can be applied, and it may be applied to various filed requiring stock management other than cosmetics or medicines. For example, it may be applied to books exhibited in display cases in libraries and bookstores.

Figure 97:
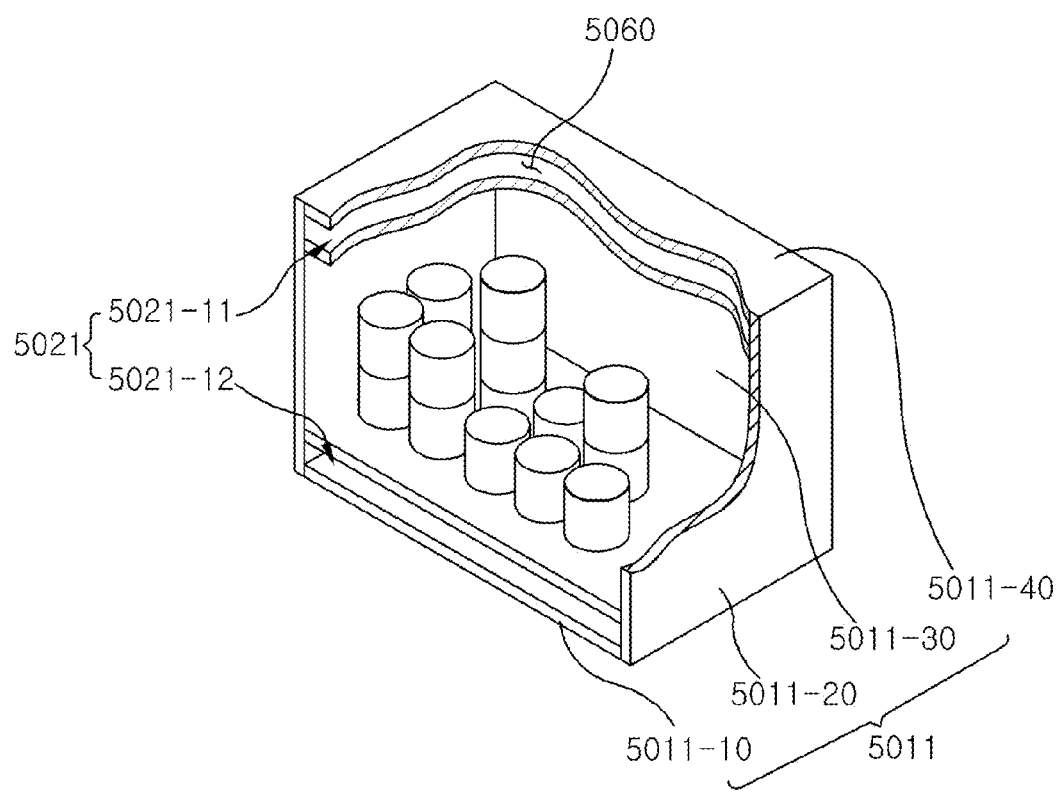
FIG. 97 is a perspective view showing a rack according to a first embodiment of the present invention.

As shown in FIG. 97, a display case according to the present invention provides a movement path 5060 for an antenna arm in the horizontal direction of the display case, such that it is possible to effectively sense signals from articles 120 in an exhibition cell 5011.

The display case for moving type scanning may include the exhibition cell 5011 where the articles 120 are stacked and a scanner cell 5021 providing the movement path 5060 for an antenna arm in the horizontal direction of the display case.

In detail, the exhibition cell 5011, a space where various articles 120 are stacked and exhibited, may include a bottom plate 5011-10, side plates 5011-20 vertically connected to both sides of the bottom plate 5011-10, a back plate 5011-3 vertically connected to the rear end of the bottom plate 5011-10, and a top plate 5011-40 vertically connected to both side plates 5011-20 and the back plate 5011-30 over the bottom plate 5011-10, in parallel with the bottom plate 5011-10.

The articles 120 stacked in the exhibition cell 5011 may be medicines, cosmetics, books, clothes, food, and industrial materials and identifications such as a tag which can provide various items of information about the articles may be attached to the article 120.

The scanner cell 5021 may be disposed at the upper and lower portions of the exhibition cell 5011 so that the antenna arm of a scanner 5050 can move in the horizontal direction of a display case.

The scanner cell 5021 may include an upper scanner cell 5021-11 extending in the horizontal direction of the display case, at the upper portion of the exhibition cell 5011, and a lower scanner cell 5021-12 extending in the horizontal direction of the display case, at the lower portion of the exhibition cell 5011.

That is, the upper scanner cell 5021-11 is disposed at the upper portion of the exhibition cell 5011, with a partition 5031 therebetween in the exhibition cell 5011, and it can provide the movement path 5060 through which the antenna arm 5051 can move in the horizontal direction of the display case, over the articles 120 in the exhibition cell 5011. Further, the lower scanner cell 211b is disposed at the lower portion of the exhibition cell 110, with the partition 310 therebetween in the exhibition cell 110, and it can provide the movement path 5060 through which the antenna arm 5051 can move in the horizontal direction of the display case, under the articles 120 in the exhibition cell 110.

The partition 310 may be made of a signal transmissive material that transmits receiving signals read by the antenna arm 5051, and the bottom plate 110a, both side plate 110b, back plate 110c, and top plate 110d of the case cell may be made of signal non-transmissive material that does not transmit receiving signal read by the antenna arm 5051.

Accordingly, the antenna arm 5051 can move in the horizontal direction of the display case without hitting against the articles 120, such that it is possible to preclude reduction of recognition rate in scanning and malfunction of the scanner due to hitting against the articles 120.

Although, in the scanner cell 5021, the upper scanner cell 5021-11 and the lower scanner cell 5021-12 which are disposed at the upper portion and the lower portion of the exhibition cell 5011 were described in this embodiment, it is not limited thereto and the scanner cell 5021 may be disposed only at the upper portion of the exhibition cell 5011 or only at the lower portion of the exhibition cell 5011.

Figure 98:
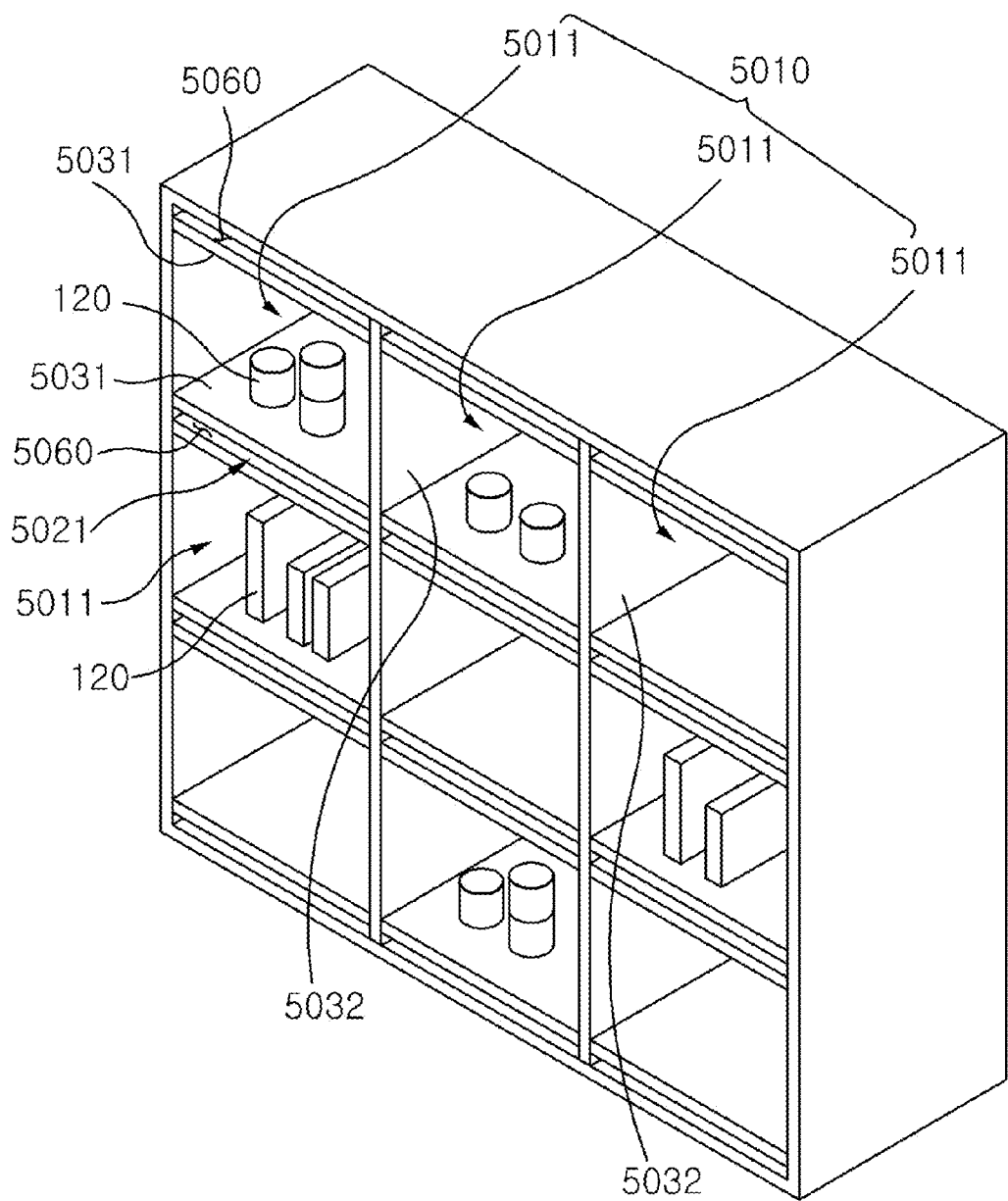
FIG. 98 is a perspective view showing a rack assembly of a display case according to the first embodiment of the present invention.

As shown in FIG. 98, a plurality of exhibition cells 5011 may be arranged in a matrix shape, thereby forming an exhibition cell assembly 5010 in the first embodiment. The exhibition assembly 5010 may include a plurality of exhibition cells 5011 and scanner cells 5021 which form rows and columns.

A partition 5032 may be disposed between different exhibition cells 5011 arranged horizontally. The partition 5032 forms a side of a display case and may be made of a signal non-transmissive material that does not transmit receiving signals read by the antenna arm 5051, or a signal transmissive material or a signal non-transmissive material which respectively transmits or does not transmit receiving signal read by the antenna arm. Further, a partition 310 may be disposed between the exhibition cell 5011 and the scanner cell 5021 vertically arranged. The partition 5031 forms the bottom of a case cell and may be made of a signal transmissive material that transmits receiving signals read by the antenna arm 5051.

Accordingly, in the exhibition assembly 5010, as the scanner 5050 moves in the horizontal direction of the display case, the antenna arm 5051 of the scanner 5050 can receive position information and article information of articles in the exhibition cell 5011 while moving in the horizontal direction of the display case along the scanner cell 5021. The antenna arm 5051 can move over the partition 5032 that divides a plurality of scanner cells 5021 while moving in the horizontal direction of the display, in which the antenna arm 5051 can be reversed to the original position by an elastic return force, after turning forward at a predetermined angle.

Figure 99:
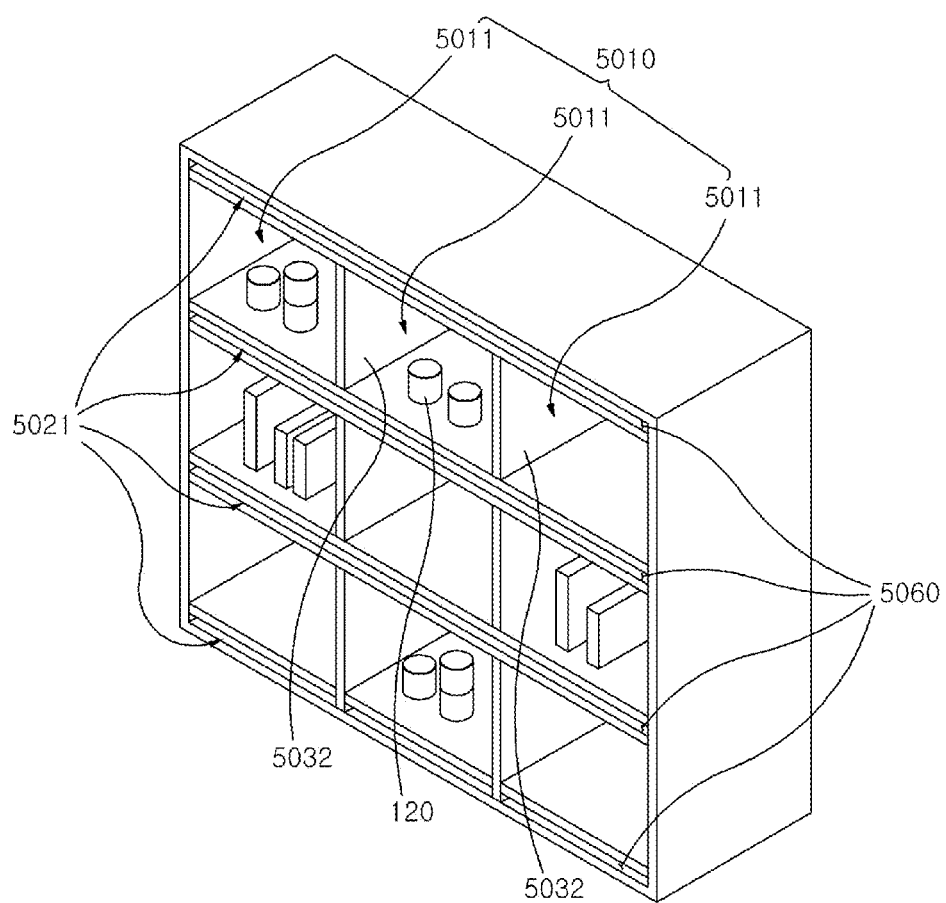
FIG. 99 is a perspective view showing a rack assembly of a display case according to a modified example of the first embodiment of the present invention.

As shown in FIG. 99, an exhibition cell assembly 5010 according to a modified example of the first embodiment may provide one movement path 5060 continuously and in the horizontal direction of a display case.

For example, a partition 5032 shown in FIG. 2 is not provided between a plurality of scanner cells 5021 arranged in the horizontal direction of a display case, so when the scanner 5050 moves in the horizontal direction of the display case, the antenna arm 5051 of the scanner 5050 can continuously move in the horizontal direction of the display case along the scanner cells 5021 without hitting against the partition 5032.

Figure 100:
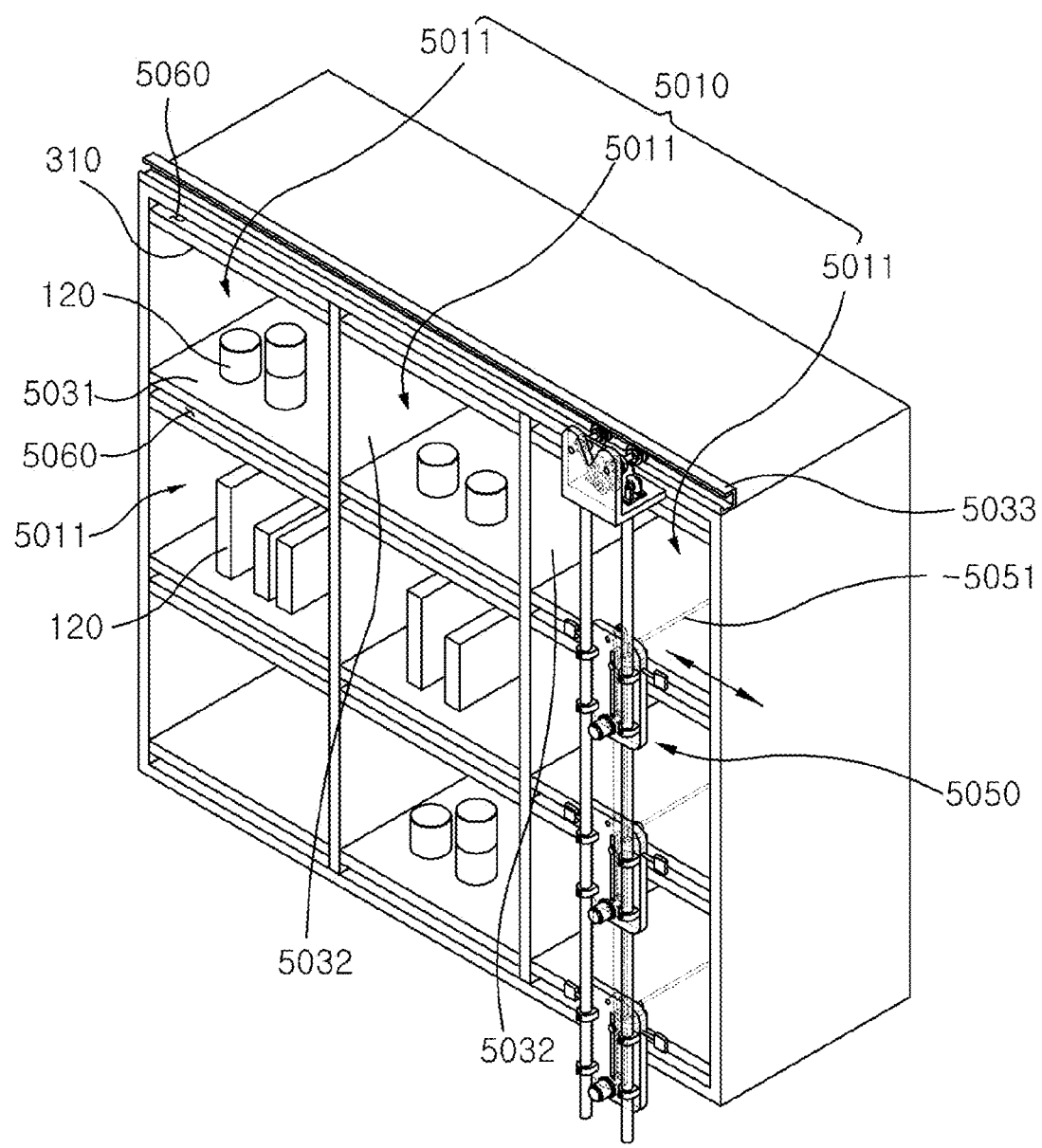
FIG. 100 is a perspective view showing a rack assembly of a display case according to another modified example of the first embodiment of the present invention.

As shown in FIG. 100, an exhibition cell assembly 5010 according to another modified example of the first embodiment may be provided with a guide rail 5033 that guides movement of the scanner 5050.

The guide rail 5033 may extend in the longitudinal direction at the upper portion of the exhibition cell assembly 5010. A rail on which the scanner can move in the horizontal direction of the display case, with the upper end restricted, may be provided on the guide rail 5033.

Figure 101:
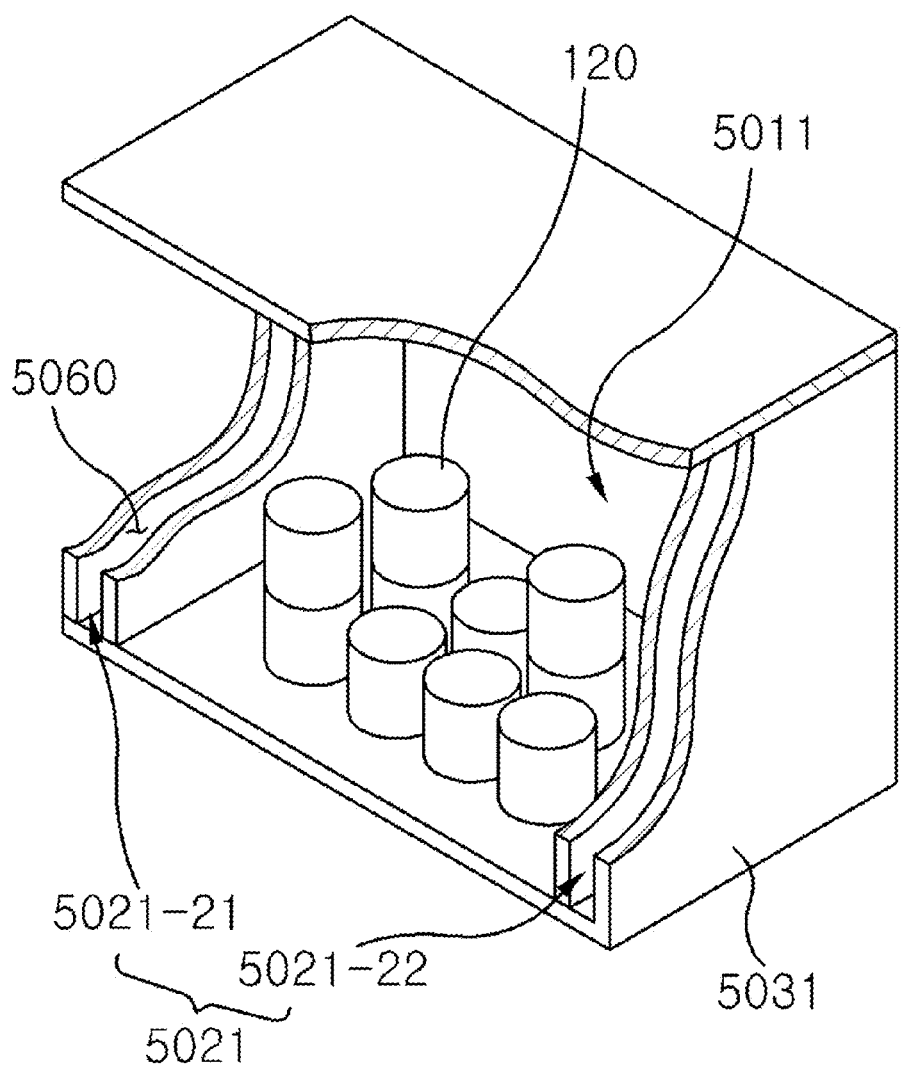
FIG. 101 is a perspective view showing a rack according to a second embodiment of the present invention.

As shown in FIG. 101, a display case according to a second embodiment of the present invention provides a movement path 5060 for an antenna arm 5051 in the vertical direction of the display case, such that it is possible to effectively sense signals from articles 120 in an exhibition cell 5011.

The display case for moving type scanning may include the exhibition cell 5011 where the articles 120 are stacked and a scanner cell 5021 providing the movement path 5060 for an antenna arm 5051 in the vertical direction of the display case.

The scanner cell 5021 may include a side scanner cell 5021-21 extending perpendicular to the display case, at a side of the exhibition cell 5011, and another side scanner cell 5021-22 extending in the vertical direction of the display case, at the other side of the exhibition cell 5011.

For example, the side scanner cell 5021-21 is disposed at a side of the exhibition cell 5011, with a partition 5031 therebetween in the exhibition cell 5011, and it can provide the movement path 5060 through which the antenna arm 5051 can move in the vertical direction of the display case, at a side of the articles 120 in the exhibition cell 5011. Further, the side scanner cell 5021-22 is disposed at the other side of the exhibition cell 5011, with the partition 5031 therebetween in the exhibition cell 5011, and it can provide the movement path 5060 through which the antenna arm 5051 can move in the vertical direction of the display case, at the other side of the articles 120 in the exhibition cell 5011. The partition 5031 may be made of a signal transmissive material that transmits receiving signals read by the antenna arm 5051.

Accordingly, the antenna arm 5051 can move in the vertical direction of the display case without hitting against the articles 120, such that it is possible to preclude reduction of recognition rate in scanning and malfunction of the scanner due to hitting against the articles 120.

Although, in the scanner cell 5021, the side scanner cell 5021-21 and the side scanner cell 5021-22 which are disposed at a side and the other side of the exhibition cell 5011 were described in this embodiment, it is not limited thereto and the scanner cell 5021 may be disposed only at a side of the exhibition cell 5011 or only at the other side of the exhibition cell 5011.

Figure 102:
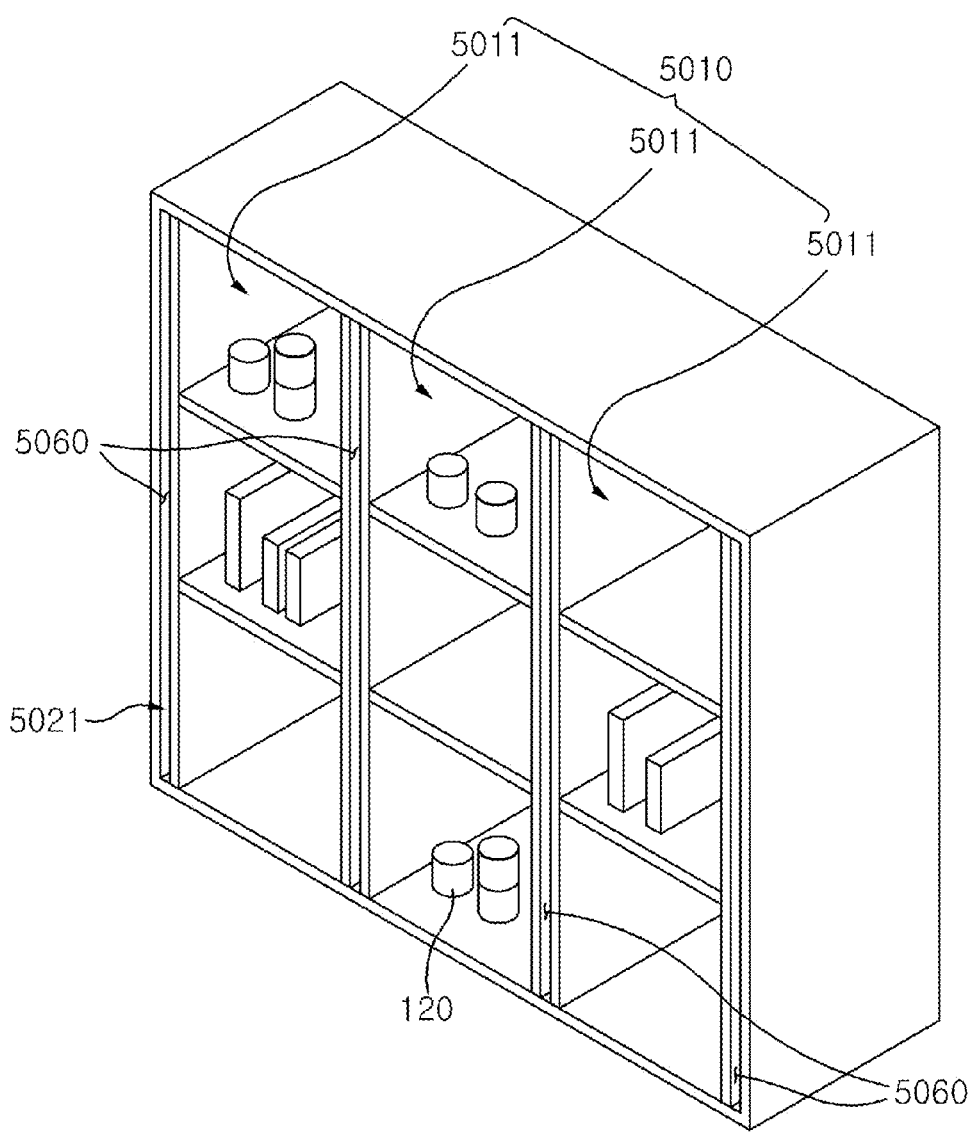
FIG. 102 is a perspective view showing a rack assembly of a display case according to the second embodiment of the present invention.

As shown in FIG. 102, a plurality of exhibition cells 5011 may be arranged in a matrix shape, thereby forming an exhibition cell assembly 5010 in the second embodiment. The exhibition assembly 5010 may include a plurality of exhibition cells 5011 and scanner cells 5021 which form rows and columns.

A partition 320 may be disposed between different exhibition cells 5011 arranged vertically. The partition 5032 forms the bottom of a display case and may be made of a signal non-transmissive material that does not transmit receiving signals read by the antenna arm 5051, or a signal non-transmissive material which does not transmit receiving signal read by the antenna arm 5051. Further, a partition 5031 may be disposed between the exhibition cell 5011 and the scanner cell 5021 horizontally arranged. The partition 5031 forms a side of a case cell and may be made of a signal transmissive material that transmits receiving signals read by the antenna arm 5051.

Accordingly, in the exhibition assembly 5010, as the scanner moves in the vertical direction of the display case, the antenna arm 5051 of the scanner can receive position information and article information of articles in the exhibition cell 5011 while moving in the vertical direction of the display case along the scanner cell 5021.

Figure 103:
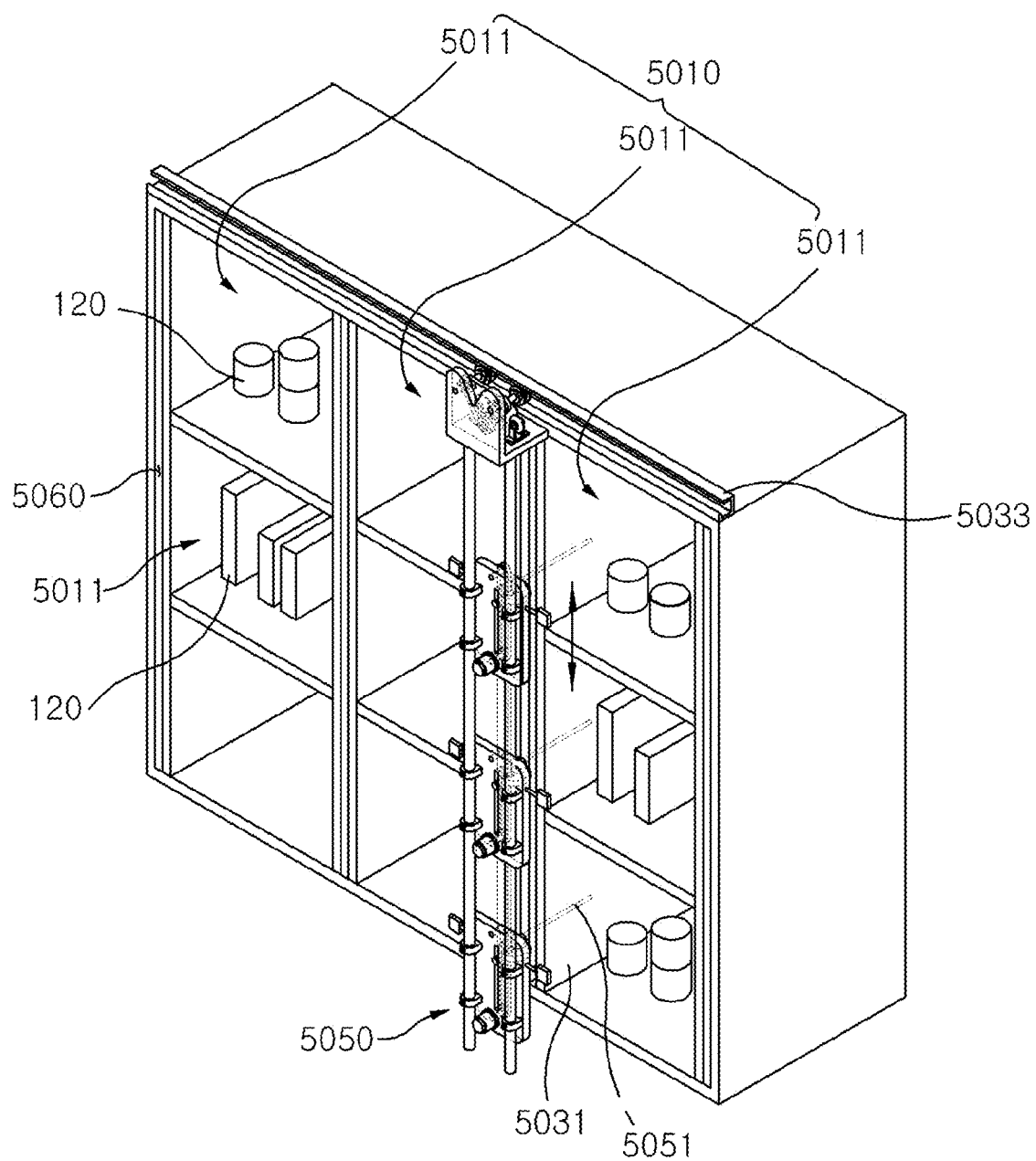
FIG. 103 is a perspective view showing a rack assembly of a display case according to a modified example of the second embodiment of the present invention.

As shown in FIG. 103, an exhibition cell assembly 5010 according to another modified example of the second embodiment may be provided with a guide rail 5033 that guides movement of the scanner.

The guide rail 5033 may extend in the longitudinal direction at the upper portion of the exhibition cell assembly 5010. A rail on which the scanner can move in the horizontal direction of the display case, with the upper end restricted, may be provided on the guide rail 5033.

Figure 104:
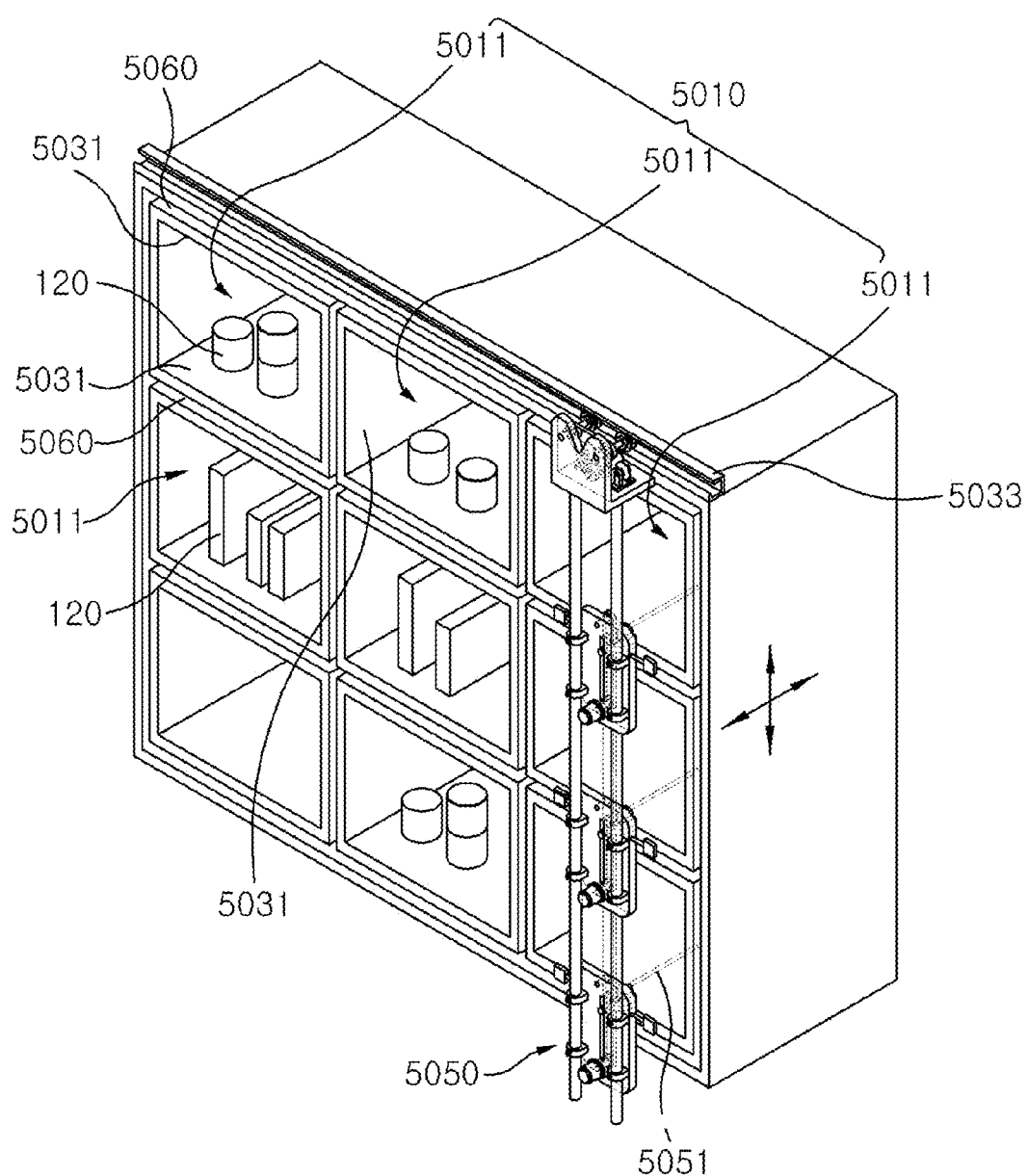
FIG. 104 is a perspective view showing a rack assembly of a display case according to a third embodiment of the present invention.

As shown in FIG. 104, a display case according to a third embodiment of the present invention provides a movement path 5060 for an antenna arm 5051 horizontally and in the vertical direction of the display case, such that it is possible to effectively sense signals from articles 120 in an exhibition cell 5011.

The display case for moving type scanning may include the exhibition cell 5011 where the articles 120 are stacked and a scanner cell 5021 providing the movement path 5060 for an antenna arm 5051 horizontally and in the vertical direction of the display case.

The scanner cell 5021 may include an upper scanner cell 5021-11 extending in the horizontal direction of the display case, at the upper portion of the exhibition cell 5011, a lower scanner cell 5021-12 extending in the horizontal direction of the display case, at the lower portion of the exhibition cell 5011, a side scanner cell 5021-21 extending in the vertical direction of the display case, at a side of the exhibition cell 5011, and another side scanner cell 5021-22 extending in the vertical direction of the display case, at the other side of the exhibition cell 5011

For example, the upper scanner cell 5021-11 is disposed at the upper portion of the exhibition cell 5011, with a partition 5031 therebetween in the exhibition cell 5011, and it can provide the movement path 5060 through which the antenna arm can move in the horizontal direction of the display case, over the articles 120 in the exhibition cell 5011. Further, the lower scanner cell 5021-12 is disposed at the lower portion of the exhibition cell 5011, with a partition 310 therebetween in the exhibition cell 5011, and it can provide the movement path 5060 through which the antenna arm can move in the horizontal direction of the display case, under the articles 120 in the exhibition cell 5011. Further, the side scanner cell 5021-21 is disposed at a side of the exhibition cell 5011, with a partition 5031 therebetween in the exhibition cell 5011, and it can provide the movement path 5060 through which the antenna arm 5051 can move in the vertical direction of the display case, at a side of the articles 120 in the exhibition cell 5011. Further, the side scanner cell 5021-22 is disposed at the other side of the exhibition cell 5011, with the partition 5031 therebetween in the exhibition cell 5011, and it can provide the movement path 5060 through which the antenna arm 5051 can move in the vertical direction of the display case, at the other side of the articles 120 in the exhibition cell 5011.

Accordingly, the antenna arm 5051 can move in the horizontal and vertical directions of the display case without hitting against the articles 120, such that it is possible to preclude reduction of recognition rate in scanning and malfunction of the scanner due to hitting against the articles 120.

Although detailed embodiments were described in the description of the present invention, various modifications may be achieved without departing from the scope of the present invention. Accordingly, the scope of the present invention should be determined not by the embodiments described herein, but by claims.

The invention claimed is:

1. A method for scanning articles, performed by a scanning apparatus, in storage sections of a display case having at least one or more layers, the method comprising:
repeatedly scanning, by a scanner of the scanning apparatus, the articles in the display case by reciprocating the scanner with a plurality of antennas in a horizontal or vertical direction of the display case to receive tag information from each product tag associated with each article of the articles,
setting, by a control unit of the scanning apparatus, position tags for a plurality of positions in the display case, each position tag corresponding to a layer of the at least one or more layers;
locating, by the control unit, the articles when the scanner repeats reciprocating in the horizontal or vertical direction, counting the number of times that each product tag associated with each article has been repeatedly scanned and the number of times that each position tag has been repeatedly scanned based on the tag information from each product tag and information from the position tags,
selecting, by the control unit, a position of an article corresponding to a position tag of which a counted number is the largest among the counted numbers of each position tag, where a counted number of a product tag of an article is the largest, as the actual position of said article; and
collecting, by the control unit, tag information of said article from scanning the product tag associated with said article of the selected position;
wherein the scanner further comprises at least one article sensor to sense the articles in the storage sections, and the control unit moves the scanner up/down, when the scanner horizontally moves, to move the plurality of antennas close to the articles in accordance with a sensing result of the at least one article sensor,
wherein the control unit determines an up/down pattern of the scanner movement based on vertical and horizontal positions of edges of the articles in the storage sections which are sensed by the at least one article sensor and controls a driving unit of the scanning apparatus to move the scanner up/down based on the determined up/down pattern.

2. The method for scanning the articles of claim 1, wherein the locating step further comprises:
summing up, by the control unit, the number of times that each product tag has been repeatedly scanned by the plurality of antennas moving in the same layer of the display case and the number of times that each position tag has been repeatedly scanned by the plurality of antennas moving in the same layer of the display case, for each of the at least one or more layers, and mapping the summed number of each product tag to a position corresponding to a position tag having the largest summed number among the position tags, when the scanner moves first time;

repeating the summing up step and the mapping step when the scanner moves repeatedly, and then summing up the summed numbers of each product tag mapped to the same positions in the mapping step, for each of the at least one or more layers; and selecting, by the control unit, a position mapped to the largest total number for each products tag among the positions mapped to the total number summed up in the repeating step for the each product tag as the actual position of each article corresponding to each product tag.

3. The method for scanning the articles of claim 1, wherein the scanning step further comprises mapping the articles initially exhibited in the storage sections; and wherein the locating step further comprises:

determining a key position of each article by scanning the articles in the storage sections in a line;

determining a key position of each article by scanning the articles in the storage sections in another line; and determining the actual position of each article among the key positions of each article determined in the line and the another line, wherein the determining the actual position of each article further comprises:

selecting, by the control unit, the present position of an antenna of the plurality of antennas by reading position tags of the storage sections in the line, and selecting the key position of each article by reading product tags at the present position of the antenna.

4. The method for scanning the articles of claim 1, wherein the scanning step further comprises setting, by the control unit, a movement path of the scanner in accordance with position tags scanned by the scanner and reading product tags attached to the articles, wherein said reading the product tags comprises reciprocating the scanner in a section between a position tag presently scanned and a position tag previously scanned, when the number of times that the two position tags has been repeatedly scanned is smaller than a predetermined number of times, wherein each of the position tags is attached to each vertical partition of the storage sections.

5. The method for scanning the articles of claim 4, wherein the reading step comprises scanning the product tags by the plurality of antennas comprised in the scanner, for each reading group of a section between a couple of position tags neighboring each other, and wherein the locating step comprises counting, by the control unit, the number of times that each product tag has been repeatedly scanned by each of the plurality of antennas for each reading group, summing up the numbers of times scanned by each of a couple of antennas neighboring each other for each product tag and for each reading group, and determining a position corresponding to combination of a reading group and a couple of antennas of which a summed number is the largest among the summed numbers of each combination of each reading group and each couple of antennas for a product tag as the actual position of an article corresponding to the product tag.

\* \* \* \* \*